(12) United States Patent
Hamel et al.

(10) Patent No.: US 11,641,278 B2
(45) Date of Patent: *May 2, 2023

(54) DIGITAL CREDENTIAL AUTHENTICATION

(71) Applicant: Workday, Inc., Pleasanton, CA (US)

(72) Inventors: Bjorn Hamel, Dublin, CA (US);
Jonathan David Ruggiero, Danville, CA (US)

(73) Assignee: Workday, Inc., Pleasanton, CA (US)

(*) Notice: Subject to any disclaimer, the term of this patent is extended or adjusted under 35 U.S.C. 154(b) by 836 days.

This patent is subject to a terminal disclaimer.

(21) Appl. No.: 16/365,378

(22) Filed: Mar. 26, 2019

(65) Prior Publication Data

US 2019/0305952 A1 Oct. 3, 2019

Related U.S. Application Data

(63) Continuation-in-part of application No. 16/021,240, filed on Jun. 28, 2018, now Pat. No. 11,012,436, and
(Continued)

(51) Int. Cl.
*H04L 9/32* (2006.01)
*H04L 9/30* (2006.01)
(Continued)

(52) U.S. Cl.
CPC ............ *H04L 9/321* (2013.01); *H04L 9/0637* (2013.01); *H04L 9/0866* (2013.01);
(Continued)

(58) Field of Classification Search
CPC ..... H04L 9/321; H04L 9/0637; H04L 9/0866; H04L 9/0894; H04L 9/14; H04L 9/3073; H04L 2209/38
See application file for complete search history.

(56) References Cited

U.S. PATENT DOCUMENTS 6,662,299 B1 12/2003 Price, III
7,437,755 B2 10/2008 Farino
(Continued)

FOREIGN PATENT DOCUMENTS

CA 2606326 11/2006
DE 19882328 5/2014
(Continued)

OTHER PUBLICATIONS

Ori Jacobovitz. "Blockchain for identity management." The Lynne and William Frankel Center for Computer Science Department of Computer Science. Dec. 2016 (Dec. 2016) Retrieved on May 27, 2019 from https://www.cs.ogu.ac.il/~frankel/TechnicalReports/2016/16-02.pdf.
(Continued)

*Primary Examiner* — Noura Zoubair
(74) *Attorney, Agent, or Firm* — Van Pelt, Yi & James LLP

(57) ABSTRACT

A system for creating an identity mapping on a distributed ledger includes an interface and a processor. The interface is configured to receive a request to create an identity mapping on a distributed ledger. The processor is configured to generate an identity key pair; generate a mobile encryption key; encrypt a private identity key of the identity key pair using the mobile encryption key to create an encrypted private key; store the encrypted private key; create a mapping document; sign the mapping document with the private identity key of the identity key pair; and provide the signed mapping document to be stored in a distributed ledger.

18 Claims, 93 Drawing Sheets

Related U.S. Application Data a continuation-in-part of application No. 16/021,234, filed on Jun. 28, 2018, now Pat. No. 11,019,053, and a continuation-in-part of application No. 16/021,243, filed on Jun. 28, 2018.

(60) Provisional application No. 62/798,391, filed on Jan. 29, 2019, provisional application No. 62/798,404, filed on Jan. 29, 2019, provisional application No. 62/798,402, filed on Jan. 29, 2019, provisional application No. 62/798,389, filed on Jan. 29, 2019, provisional application No. 62/798,400, filed on Jan. 29, 2019, provisional application No. 62/798,398, filed on Jan. 29, 2019, provisional application No. 62/798,393, filed on Jan. 29, 2019, provisional application No. 62/798,403, filed on Jan. 29, 2019, provisional application No. 62/798,387, filed on Jan. 29, 2019, provisional application No. 62/798,397, filed on Jan. 29, 2019, provisional application No. 62/648,854, filed on Mar. 27, 2018.

(51) Int. Cl.
*H04L 9/24* (2006.01)
*H04L 9/08* (2006.01)
*H04L 9/06* (2006.01)
*H04L 9/14* (2006.01)
*H04L 9/00* (2022.01)

(52) U.S. Cl.
CPC ............ *H04L 9/0894* (2013.01); *H04L 9/14* (2013.01); *H04L 9/3073* (2013.01); *H04L 9/50* (2022.05)

(56) References Cited

U.S. PATENT DOCUMENTS

| | | | |
|---|---|---|---|
| 7,735,120 B2 | 6/2010 | Wallace | |
| 8,719,952 B1 | 5/2014 | Damm-Goossens | |
| 8,745,718 B1 | 6/2014 | Dufel | |
| 9,374,368 B1 | 6/2016 | Roth | |
| 9,419,968 B1 | 8/2016 | Pei | |
| 9,485,096 B2 | 11/2016 | Shrivastava | |
| 9,490,984 B2 | 11/2016 | Leicher | |
| 9,672,538 B1 | 6/2017 | Vaynblat | |
| 9,749,140 B2 | 8/2017 | Oberhauser | |
| 10,360,363 B1 | 7/2019 | Grosberg | |
| 10,460,313 B1 | 10/2019 | Clark | |
| 2002/0176583 A1 | 11/2002 | Buttiker | |
| 2004/0162985 A1 | 8/2004 | Freeman | |
| 2004/0177276 A1 | 9/2004 | MacKinnon | |
| 2006/0200856 A1 | 9/2006 | Salowey | |
| 2008/0148373 A1 | 6/2008 | Adams | |
| 2008/0301553 A1 | 12/2008 | Basu | |
| 2009/0119756 A1 | 5/2009 | Acuna | |
| 2011/0113484 A1 | 5/2011 | Zeuthen | |
| 2012/0079570 A1 | 3/2012 | Fu | |
| 2013/0030989 A1 | 1/2013 | Geller | |
| 2013/0125231 A1 | 5/2013 | Kuenzi | |
| 2014/0002236 A1 | 1/2014 | Pineau | |
| 2014/0075515 A1 | 3/2014 | McColgan | |
| 2014/0079221 A1 | 3/2014 | Mccallum | |
| 2014/0096213 A1 | 4/2014 | Quan | |
| 2014/0181927 A1 | 6/2014 | Sarkissian | |
| 2014/0187149 A1 | 7/2014 | Lortz | |
| 2014/0222682 A1 | 8/2014 | Dua | |
| 2014/0281525 A1 | 9/2014 | Acar | |
| 2014/0373117 A1 | 12/2014 | Le Saint | |
| 2015/0089244 A1 | 3/2015 | Roth | |
| 2015/0278500 A1 | 10/2015 | Burch | |
| 2015/0278824 A1 | 10/2015 | Zabar | |
| 2015/0288694 A1 | 10/2015 | Liebl, III | |
| 2015/0350913 A1 | 12/2015 | Eberwine | |
| 2016/0149896 A1 | 5/2016 | Sarkissian | |
| 2016/0162896 A1 | 6/2016 | Grigg | |
| 2016/0255079 A1 | 9/2016 | Harrison | |
| 2016/0330027 A1* | 11/2016 | Ebrahimi | H04L 9/0637 |
| 2017/0005804 A1 | 1/2017 | Zinder | |
| 2017/0005809 A1 | 1/2017 | Adam | |
| 2017/0012784 A1 | 1/2017 | Cross | |
| 2017/0041151 A1 | 2/2017 | Kommireddy | |
| 2017/0109759 A1 | 4/2017 | Korb | |
| 2017/0126661 A1 | 5/2017 | Brannon | |
| 2017/0155626 A1 | 6/2017 | Li | |
| 2017/0155686 A1 | 6/2017 | Yanacek | |
| 2017/0180128 A1* | 6/2017 | Lu | H04L 9/3268 |
| 2017/0222814 A1 | 8/2017 | Oberhauser | |
| 2017/0250972 A1 | 8/2017 | Ronda | |
| 2017/0257358 A1 | 9/2017 | Ebrahimi | |
| 2017/0277773 A1 | 9/2017 | Iasi | |
| 2017/0302659 A1 | 10/2017 | Shteingart | |
| 2017/0317997 A1 | 11/2017 | Smith | |
| 2017/0338967 A1 | 11/2017 | Lewison | |
| 2017/0372055 A1 | 12/2017 | Robinson | |
| 2018/0075247 A1 | 3/2018 | Campero | |
| 2018/0124041 A1 | 5/2018 | Bhalerao | |
| 2018/0144563 A1 | 5/2018 | Reymann | |
| 2018/0159839 A1 | 6/2018 | Citron | |
| 2018/0167394 A1 | 6/2018 | High | |
| 2018/0248859 A1 | 8/2018 | Zudic | |
| 2019/0036710 A1 | 1/2019 | Qiu | |
| 2019/0164156 A1 | 5/2019 | Lindemann | |
| 2019/0230073 A1 | 7/2019 | Patel | |
| 2019/0230092 A1* | 7/2019 | Patel | H04L 9/3236 |
| 2019/0363889 A1* | 11/2019 | Wang | H04L 9/006 |
| 2020/0145219 A1* | 5/2020 | Sebastian | H04L 9/3231 |

FOREIGN PATENT DOCUMENTS

| | | |
|---|---|---|
| WO | 2010083522 | 7/2010 |
| WO | 2017085546 | 5/2017 |
| WO | 2017127564 | 7/2017 |

OTHER PUBLICATIONS

Andrew Tobin, "Sovrin :What Goes on the Ledger", white paper, Apr. 2017.

Reed et al.,: "Decentralized Identifiers (DIDs) v0.9", Feb. 12, 2018 (Feb. 12, 2018), XP055855370, Retrieved from the Internet: URL: https://web.archive.org/web/20180212212114/https://w3c-ccg.github.io/did-spec/#proof-optional [retrieved on Oct. 27, 2021].

The Sovrin Foundation, "Sovrin™: a Protocol and Token for SelfSovereign Identity and Decentralized Trust", white paper, Jan. 2018.

Windley et al.: "Sovrin (TM): a Protocol and Token for Self-Sovereign Identity and Decentralized Trust a White Paper from the Sovrin Foundation", White Paper, Jan. 1, 2018 (Jan. 1, 2018), pp. 1-42, XP055648450, US, Retrieved from the Internet: URL: https://sovrin.org/wp-content/uploads/Sovrin-Protocol-and-Token-White-Paper.pdf [retrieved on Dec. 2, 2019].

* cited by examiner

Credential

```
// JWT Header
 {
   "alg": "RS256",
   "typ": "JWT"
 }                                                      2E00
// JWT Payload
 {
   "iss": "https: "https://dmv.example.gov",
   "iat":  1262300400,
   "exp": 1483228080,
   "aud": "www.sample.com",
   "sub": "did:sample:ebfeb1f712ebc6f1c276e21ec12",
   "verifiableCredential":
   {
     "@context": "https://w3.org/2018/security/v1",
     "id": "http://sample.gov/credentials/3723",
     "type': ["verifiableCrednetial", "ProofOfAgeCredential"],
     "issuer": "https://dmv.example.gov",
     "issuanceDate": "2010-01-01",
     "expirationDate": "2030-01-01",
     "claim":                                           2E02
     {
       "id": "did:sample:ebfeb1f712ebc6f1c276e21ec12",
       "age": 21
     }
   }
 }
           2E04
```

FIG. 2E

Presentation                                                2F00

```
{
  "id": "did:example:76e12ec21ebhyu1f712ebc6f1z2",
  "type": ["VerifiablePresentation"],
  "credential": [{
      "id": "https://example.com/VC/123456789",
      "type": ["VerifiableCredential", "PrescriptionCredential"],
      "issuer": "did:example:ebfeb1f712ebc6f1c276e12ec21",
      "issued": "2010-01-03",
      "claim": {                                            2F02
        "id": "did:example:76e12ec21ebhyu1f712ebc6f1z2",
        "prescription": {....}
      },                            2F04
      "revocation": {
        "id": "http://example.gov/revocations/738",
        "type": "SimpleRevocationList2017"
      }, "proof": {
        "type": "RsaSignature2018",
        "created": "2017-06-17T10:03:48Z",
        "creator": "did:example:ebfeb1f712ebc6f1c276e12ec21/keys/234",
        "nonce": "d61c4599-0cc1-4679-9efe-c63add3a43b2",
        "signatureValue": "pYw8XN1l..Cky6Ed = "
      }
    }
  ],
  "proof": [{
    "type": "RsaSignature2018",
    "created": "2017-06-18T21:19:10Z",
    "creator": "did:example:76e12ec21ebhyu1f712ebc6f1z2/keys/2",
    "nonce": "c0ae1c8e-c7e7-469f-b252-86e6a0e7387e",
    "signatureValue": "BavEll0/I1..N3JTI24 = "
  }]
}
```
                                                            2F06

FIG. 2F

DIGITAL CREDENTIAL AUTHENTICATION

CROSS REFERENCE TO OTHER APPLICATIONS

This application claims priority to U.S. Provisional Patent Application No. 62/648,854 entitled SYSTEM FOR ISSUANCE, VERIFICATION, AND REVOCATION OF CREDENTIALS filed Mar. 27, 2018 which is incorporated herein by reference for all purposes. This application also claims priority to U.S. Provisional Patent Application No. 62/798,387 entitled DIGITAL CREDENTIALING ACCESS MANAGEMENT filed Jan. 29, 2019 which is incorporated herein by reference for all purposes. This application also claims priority to U.S. Provisional Patent Application No. 62/798,389 entitled DIGITAL CREDENTIALING PRIMARY FACTOR AUTHENTICATION filed Jan. 29, 2019 which is incorporated herein by reference for all purposes. This application also claims priority to U.S. Provisional Patent Application No. 62/798,391 entitled DIGITAL CREDENTIALING PRIMARY FACTOR AUTHENTICATION FOR A PHYSICAL DEVICE filed Jan. 29, 2019 which is incorporated herein by reference for all purposes. This application also claims priority to U.S. Provisional Patent Application No. 62/798,393 entitled DIGITAL CREDENTIALING SECONDARY FACTOR AUTHENTICATION filed Jan. 29, 2019 which is incorporated herein by reference for all purposes. This application also claims priority to U.S. Provisional Patent Application No. 62/798,397 entitled DIGITAL CREDENTIALING STEP-UP AUTHENTICATION filed Jan. 29, 2019 which is incorporated herein by reference for all purposes. This application also claims priority to U.S. Provisional Patent Application No. 62/798,398 entitled DIGITAL CREDENTIALING FOR ACCESS OF SENSITIVE DATA filed Jan. 29, 2019 which is incorporated herein by reference for all purposes. This application also claims priority to U.S. Provisional Patent Application No. 62/798,400 entitled DIGITAL CREDENTIALING FOR EMPLOYEE BADGE filed Jan. 29, 2019 which is incorporated herein by reference for all purposes. This application also claims priority to U.S. Provisional Patent Application No. 62/798,402 entitled DIGITAL CREDENTIALING FOR GUEST CHECK-IN FOR PHYSICAL BUILDING ACCESS filed Jan. 29, 2019 which is incorporated herein by reference for all purposes. This application also claims priority to U.S. Provisional Patent Application No. 62/798,403 entitled SEAMLESS AND SECURE WIFI ACCESS WITH VISITOR CREDENTIALS filed Jan. 29, 2019 which is incorporated herein by reference for all purposes. This application also claims priority to U.S. Provisional Patent Application No. 62/798,404 entitled LOCATION AWARE CHECKIN filed Jan. 29, 2019 which is incorporated herein by reference for all purposes. This application is also a continuation-in-part of co-pending U.S. patent application Ser. No. 16/021,234 entitled REQUESTING CREDENTIALS filed Jun. 28, 2018 which is incorporated herein by reference for all purposes, which claims priority to U.S. Provisional Application No. 62/648,854 entitled SYSTEM FOR ISSUANCE, VERIFICATION, AND REVOCATION OF CREDENTIALS filed Mar. 27, 2018 which is incorporated herein by reference for all purposes. This application is also a continuation-in-part of co-pending U.S. patent application Ser. No. 16/021,240 entitled SHARING CREDENTIALS filed Jun. 28, 2018 which is incorporated herein by reference for all purposes, which claims priority to U.S. Provisional Application No. 62/648,854 entitled SYSTEM FOR ISSUANCE, VERIFICATION, AND REVOCATION OF CREDENTIALS filed Mar. 27, 2018 which is incorporated herein by reference for all purposes. This application is also a continuation-in-part of co-pending U.S. patent application Ser. No. 16/021,243 entitled IDENTIFYING REVOKED CREDENTIALS filed Jun. 28, 2018 which is incorporated herein by reference for all purposes, which claims priority to U.S. Provisional Application No. 62/648,854 entitled SYSTEM FOR ISSUANCE, VERIFICATION, AND REVOCATION OF CREDENTIALS filed Mar. 27, 2018 which is incorporated herein by reference for all purposes.

BACKGROUND OF THE INVENTION

A database system distributes cryptographic digital credentials to a user to allow the user to prove qualifications (e.g., a degree, employment experience, health insurance coverage, etc.). Credentials can be assigned to a user by a trusted third party client of the database system (e.g., a university, an insurer). In order for the user to securely take advantage of the credential system, the user must possess an authentication device for storing and providing the credentials. This creates a problem of how to register with the database system a trusted authentication device associated with the user.

BRIEF DESCRIPTION OF THE DRAWINGS

Various embodiments of the invention are disclosed in the following detailed description and the accompanying drawings.

FIG. 2E is a diagram illustrating an embodiment of a credential.

FIG. 2F is a diagram illustrating an embodiment of a presentation.

FIG. 4I is a flow diagram illustrating an embodiment of a process for a credential challenge.

FIG. 11F is a flow diagram illustrating an embodiment of a process for check in.

DETAILED DESCRIPTION

Figure 1A:
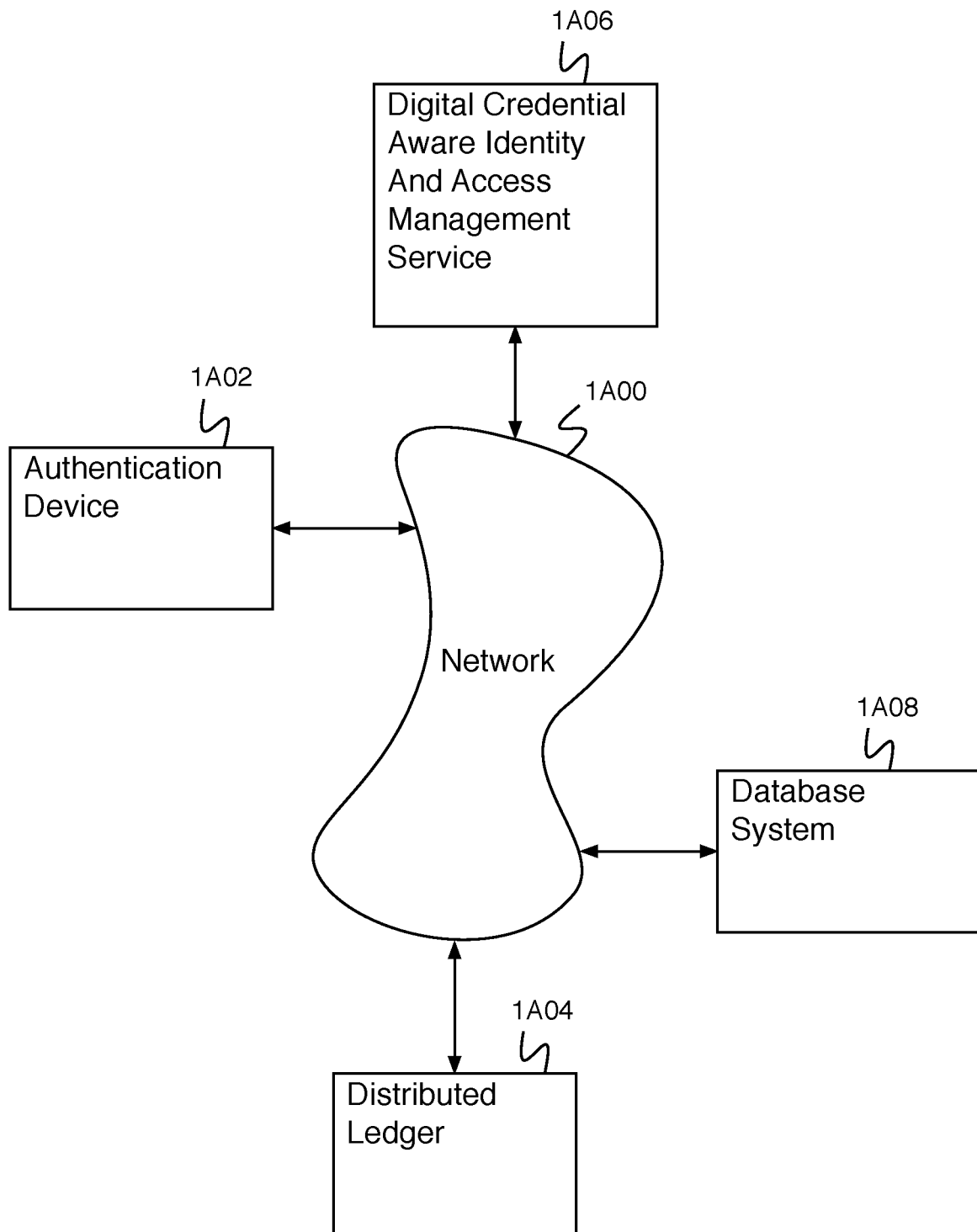
FIG. 1A is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The system for digital credentialing is designed to empower individual users to own their verifiable professional identity and to be able to enable this identity to be useable in scenarios where a verified identity allows access by providing proof of identity. An application might use the system to prove the identity or verify a user's access ability to something. The application queries the system regarding a proof of identity and the user provides the proof using a credential to the system that is ultimately passed to the application to prove identity of the user. The system allows an application developer to pick attributes that an application challenges for and the sources that will satisfy any given challenge. The proof of identity is embodied in a digital credential that is able to be secured using a combination of cryptography and a distributed ledger (e.g., a decentralized ledger, a permissioned ledger, a public ledger, etc.) to assure legitimacy of the proof of identity.

A system for digital credentialing receives the digital credential from a credential issuing system. The system for digital credentialing stores user information for the user. The system for digital credentialing further determines a set of credentials available to the user based on the user information as well as stores a record of previously issued credentials. The credentials comprise categories satisfied by the user information at differing levels of specificity (e.g., greater than an amount, in a range of amounts, less than an amount, etc.). For example, in the case where the user comprises an employee earning $95,000 per year, the system for digital credentialing could determine credentials available to the user indicating that the user earns more than $60,000 per year, that the user earns more than $80,000 per year, that the user earns in the range of $90,000-$100,000 per year, etc. When the user interacts with the system for digital credentialing using a credential requesting app or application, the system determines the set of credentials available to the user and provides the list of credentials to the credential requesting app or application. The user can then provide (e.g., from a storage on a user device) one or more available credentials to the credential requesting app or application.

In various embodiments, a credential comprises data that is validated or verified to be authentic—for example, data verifying academic diplomas, academic degrees, certifications, security clearances, identification documents, badges, passwords, user names, keys, powers of attorney, human resource data, personal information, or any other relevant information, When a user indicates to provide a credential, a credential is provided to the system for digital credentialing. The system determines whether the credential is valid for the user, and in the event the credential is valid for the user, the system provides it to the application to prove identity and enable access. By enabling the transfer of personal information between disparate database systems using authenticated credentials, this system allows that transfer of information with a level of trust and security not previously accomplished. This allows the reduction or elimination of problems such as data theft during information transfer and misrepresentation of personal information.

The system is a better computer system enabling efficient secure proof of identity and enablement of access. For example, the system is set up to securely receive and provide credentials. The security protocols and the distributed ledger storage enable the credentials to act as a trusted source. The credentials can then be used to provide access or prove identity enabling a system to trust the user. In the disclosed below, example use cases and/or example applications are described for digital credentials.

Case A—Digital Credential Authentication

A system for creating an identity mapping on a distributed ledger comprises an interface configured to receive a request to create an identity mapping on a distributed ledger, and a processor configured to generate an identity key pair, generate a mobile encryption key, encrypt a private identity key of the identity key pair using the mobile encryption key to create an encrypted private key, store the encrypted private key, create a mapping document, sign the mapping document with the private identity key of the identity key pair, and provide the signed mapping document to be stored in a distributed ledger.

A system for creating an identity mapping on a distributed ledger comprises an authentication device in communication with a distributed ledger (e.g., a permissioned ledger, a public ledger, a decentralized ledger, a blockchain, etc.). The identity mapping enables being able to securely and verifiably provide credentials from a user's authentication device to a requestor (e.g., a requesting application). The authentication device comprises a computing device (e.g., a computer, a smartphone, a tablet, etc.). For example, the authentication device comprises a mobile computing device. An identity mapping comprises a mapping from a user identifier to an authentication device public key. For example, an authentication device public key comprises a public key of an identity key pair (IKP) of the authentication device. The IKP comprises a public key and a private key (e.g., a public identity key and a private identity key). The public key is public (e.g., publicly known and shared widely) and the private key is private (e.g., known only to the authentication device as a carefully guarded secret). Another system can securely send data to the authentication device by encrypting the data using the authentication device public key. It can then only be decrypted using the authentication device private key (e.g., it can only be decrypted by the authentication device). Conversely, if the authentication device can sign data by encrypting the data using the authentication device private key. The authentication device private key cannot be recovered from the signed data, however, the signed data can be decrypted using the authentication device public key (e.g., proving that the signed data comes from the authentication device). Storing a mapping in a distributed ledger from a user identifier to a public key value comprises a method of publicizing the public key value in a trusted way and of indicating that the user is in good standing.

The authentication device creates an IKP comprising a public key and a private key. For example, the IKP is generated using an RSA algorithm or an ed25519 algorithm. A mapping document is created (e.g., according to the world wide web consortium decentralized identifier (DID) document specification). For example, the mapping document maps a user identifier to the authentication device public key value. In some embodiments, the user identifier comprises a public key. In some embodiments, the user identifier is a random value and the mapping document points to the current public key associated with this value—this enables key rotation. In some embodiments, the form of the mapping doc includes four sections or key/value pairs: 1) an identifier key/value pair, 2) a JSON-LD reference which designates the schema for the doc, 3) the public key being registered, and 4) an agent endpoint that other parties can use to discover or interact with. The mapping document is then signed using the authentication device private key and submitted to a decentralized ledger for storage. For example, a permissioned writer of the decentralized ledger receives the mapping document, verifies that the authentication device is a trusted source, and adds the mapping document to the decentralized ledger. In some embodiments, the mapping document includes a decentralized identifier. The authentication device then securely stores the IKP private key. For example, the authentication device generates a mobile encryption key that is securely stored on the authentication device (e.g., using dedicated hardware for securely storing mobile encryption key data). In some embodiments, the encryption key is stored in a secure enclave like a hardware security module (HSM) that the mobile encryption key data cannot leave. The IKP private key is encrypted using the mobile encryption key and only the encrypted IKP private key is stored. Decrypting the encrypted IKP private key requires access to the mobile encryption key, which is access limited, for example, using a biometric.

FIG. 1A is a block diagram illustrating an embodiment of a network system. In some embodiments, the network system of FIG. 1A comprises a network system for a database processing system. In the example shown, FIG. 1A comprises network 1A00. In various embodiments, network 1A00 comprises one or more of the following: a local area network, a wide area network, a wired network, a wireless network, the Internet, an intranet, a storage area network, or any other appropriate communication network. Authentication device 1A02, distributed ledger 1A04, digital credential aware identity and access management service (DCIAMS) 1A06, and data base system 1A08 communicate via network 1A00. Authentication device 1A02 comprises an authentication device associated with a user (e.g., a user of database system 1A08). For example, authentication device 1A02 comprises a computer, a smartphone, a tablet, a mobile device, etc. Distributed ledger 1A04 comprises a distributed ledger (e.g., a blockchain). For example, distributed ledger 1A04 is stored on a plurality of systems and comprises one or more permissioned writer systems for writing to the distributed ledger. DCIAMS 1A06 comprises a system for interacting with authentication device 1A02, distributed ledger 1A04, database system 1A08, and any other appropriate systems. DCIAMS 1A06 comprises a system for coordinating a login for database system 1A08, for providing a credential to authentication device 1A02, for requesting a credential from authentication device 1A02, for verifying a user identifier or a signature in distributed ledger 1A04, etc. Database system 1A08 comprises a system for executing a database application, storing database data, requesting database data, creating a report based on database data, creating a document, accessing a document, etc. In some embodiments, DCIAMS 106 helps to protect application systems other than database systems.

Authentication device 1A02 comprises a system for creating an identity mapping on a distributed ledger (e.g., on distributed ledger 1A04). For example, authentication device 1A02 comprises a system for receiving a request to create an identity mapping on a distributed ledger, generating an IKP, generating a mobile encryption key, encrypting a private identity key of the IKP using the mobile encryption key to create an encrypted private key, storing the encrypted private key, creating a mapping document, signing the mapping document with the private identity key of the IKP, and providing the signed mapping document to be stored in a distributed ledger.

Figure 1B:
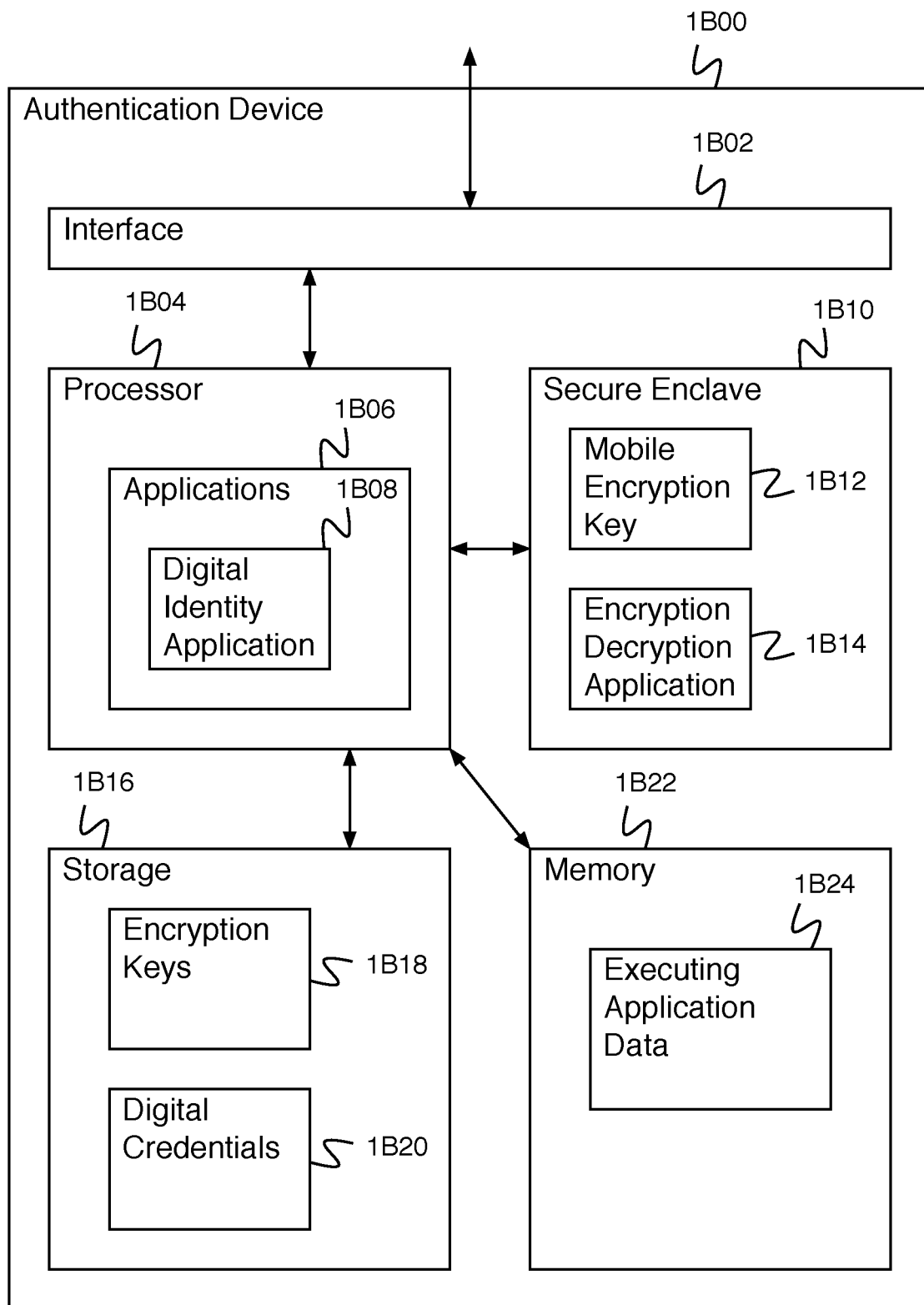
FIG. 1B is a block diagram illustrating an embodiment of an authentication device.

FIG. 1B is a block diagram illustrating an embodiment of an authentication device. In some embodiments, authentication device 1B00 of FIG. 1B comprises authentication device 1A02 of FIG. 1A. In the example shown, authentication device 1B00 comprises interface 1B02. For example, interface 1B02 comprises an interface for receiving data, providing data, receiving a request for data, etc. Processor 1B04 comprises a processor for executing applications 1B06. Applications 1B06 comprises digital identity application 1B08 and any other appropriate applications. Digital identity application 1B08 comprises an application for creating an identity mapping on a distributed ledger. For example, digital identity application 1B08 comprises an application for generating an IKP, generating a mobile encryption key, encrypting a private identity key of the IKP using the mobile encryption key to create an encrypted private key, storing the encrypted private key, creating a mapping document, signing the mapping document with the private identity key of the IKP, and providing the signed mapping document to be stored in a distributed ledger. Digital identity application 1B08 additionally comprises an application for receiving a proof request challenge, determining a set of stored digital credentials, determining a subset comprising the credentials of a set of stored digital credentials that satisfy the proof request challenge, providing a user interface for allowing a user to select a digital credential of the subset that satisfies the proof request challenge, providing a proof response comprising the selected digital credential, and proof of control of said credential through a digital signature. In some embodiments, the proof response comprises a signed verifiable form of the digital credential. In some embodiments, processor 1B04 is configured to install digital identity application 1B08 (e.g., upon receiving an indication to install the digital identity application).

Secure enclave 1B10 comprises a secure system for storing a mobile encryption key. Secure enclave 1B10 comprises mobile encryption key 1B12 and encryption decryption application 1B14. For example, secure enclave 1B10 comprises multiple mobile encryption keys, an application for generating and/or removing mobile encryption keys, etc. Secure enclave 1B10 comprises a system for receiving data, transforming it by encrypting and/or decrypting the data using a mobile encryption key or keys, and providing the transformed data. For example, secure enclave 1B10 is configured to only provide transformed input data and not to provide mobile encryption key 1B12. In some embodiments, functionality of secure enclave 1B10 is access limited using a biometric (e.g., a fingerprint, a retina scan, a DNA scan, etc.) or a personal identification number (PIN) to protect enclave access. Authentication device 1B00 additionally comprises storage 1B16. Storage 1B16 comprises encryption keys 1B18, for example comprising a public key of an identity key pair, a private key of an identity key pair, a private key of an identity key pair encrypted using mobile encryption key 1B12, etc. Storage 1B16 additionally comprises digital credentials 1B1B0, comprising digital certificates representing qualifications (e.g., a college degree, work experience, time living at an apartment, time enrolled in a health insurance plan, etc.). Authentication device 1B00 additionally comprises memory 1B22. Memory 1B22 comprises executing application data 1B24, comprising data associated with applications 1B06.

Figure 1C:
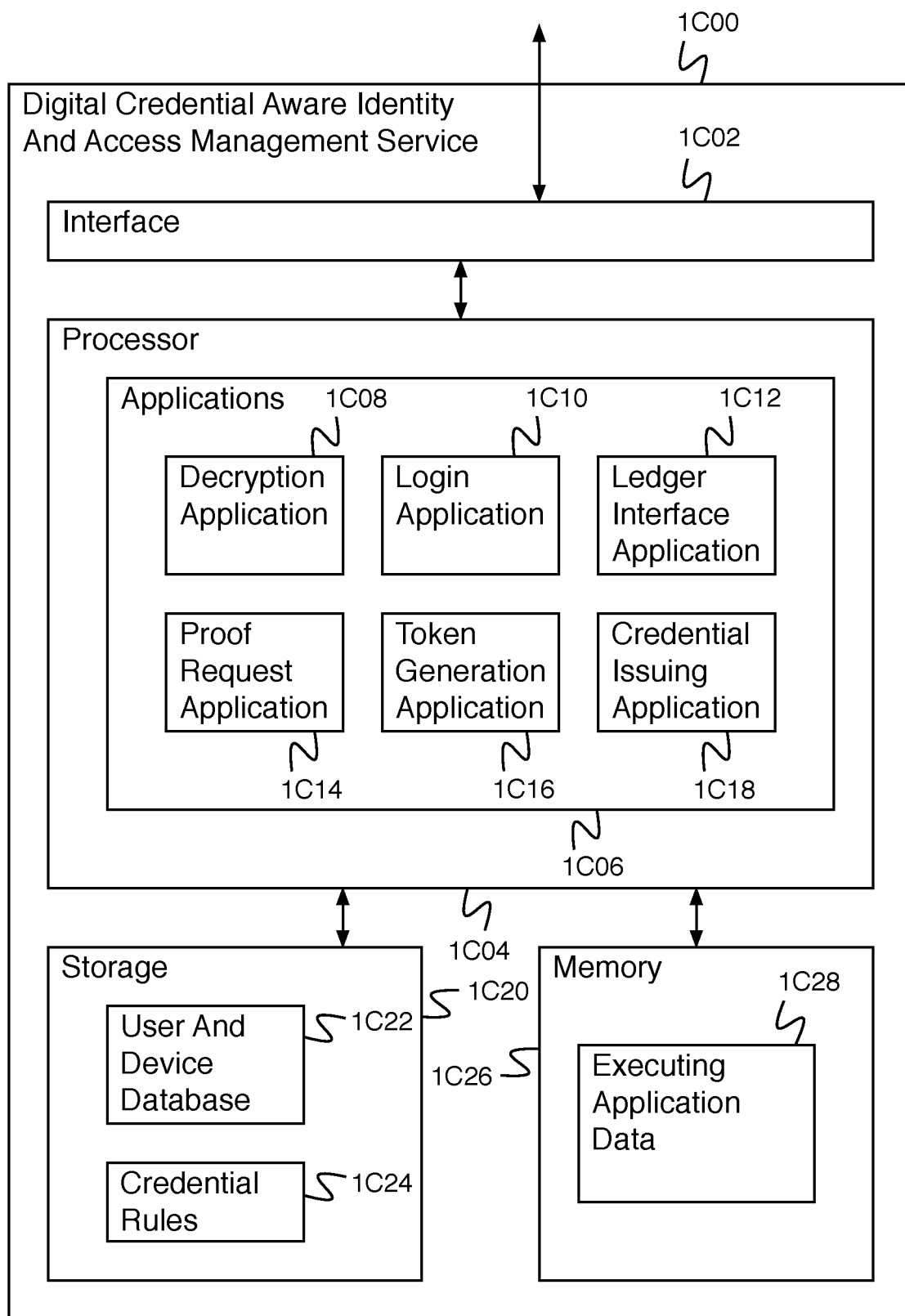
FIG. 1C is a block diagram illustrating an embodiment of a digital credential aware identity and access management service.

FIG. 1C is a block diagram illustrating an embodiment of a digital credential aware identity and access management service (e.g., a DCIAMS). In some embodiments, DCIAMS 1C00 comprises DCIAMS 1A06 of FIG. 1A. In the example shown, DCIAMS 1C00 comprises interface 1C02. For example, interface 1C02 comprises an interface for receiving data, providing data, receiving a request for data, etc. Processor 1C04 comprises a processor for executing applications 1C06. Applications 1C06 comprise a set of DCIAMS applications. Decryption application 1C08 comprises an application for coordination with an end-user device to selectively decrypt information that is encrypted with IPK keys. Login application 1C10 comprises an application for receiving login information (e.g., username and password, a credential, a QR code challenge, etc.) and providing login credentials (e.g., a login token). Login application 310 delegates to token generation application 316 to generate a token based on a successful login interaction. Ledger interface application 1C12 comprises an application for interacting with a distributed ledger (e.g., distributed ledger 104 of FIG. 1). For example, ledger interface application 1C12 comprises an application for verifying a signature in a ledger or checking a credential identifier for revocation in a ledger. Proof request application 1C14 comprises an application for creating a proof request, sending a proof request, evaluating a proof request response (e.g., a proof response), etc. Token generation application 1C16 comprises an application for generating a login token (e.g., in response to a successful login). Credential issuing application 1C18 comprises an application for issuing a digital credential for proving a qualification (e.g., a user qualification) in response to a request from a credential issuing authority to issue the credential. Applications 1C06 additionally comprises any other appropriate applications.

Storage 1C20 comprises user and device database 1C22 and credential rules 1C24. User and device database 1C22 comprises a database of registered users for a given customer organization and user details (e.g., username, password hash, contact information, email address, relationship to devices, registered public keys, registered mapping documents in a decentralized ledger, etc.). User and device database 1C22 additionally comprises a device directory comprising all the devices for a given customer organization as well as mapping documents associated with the devices and relationships with users associated with the devices. Credential rules 1C24 comprises a set of credential rules for determining one or more credentials that are needed to satisfy a given access request—for example, rules related to a credential associated schema, a credential associated organization, a credential issuer, a credential associated location, a credential associated class identifier, a credential associated license number, or any other appropriate credential rules. DCIAMS 1C00 additionally comprises memory 1C26. Memory 1C26 comprises executing application data 224, comprising data associated with applications 206.

Figure 1D:
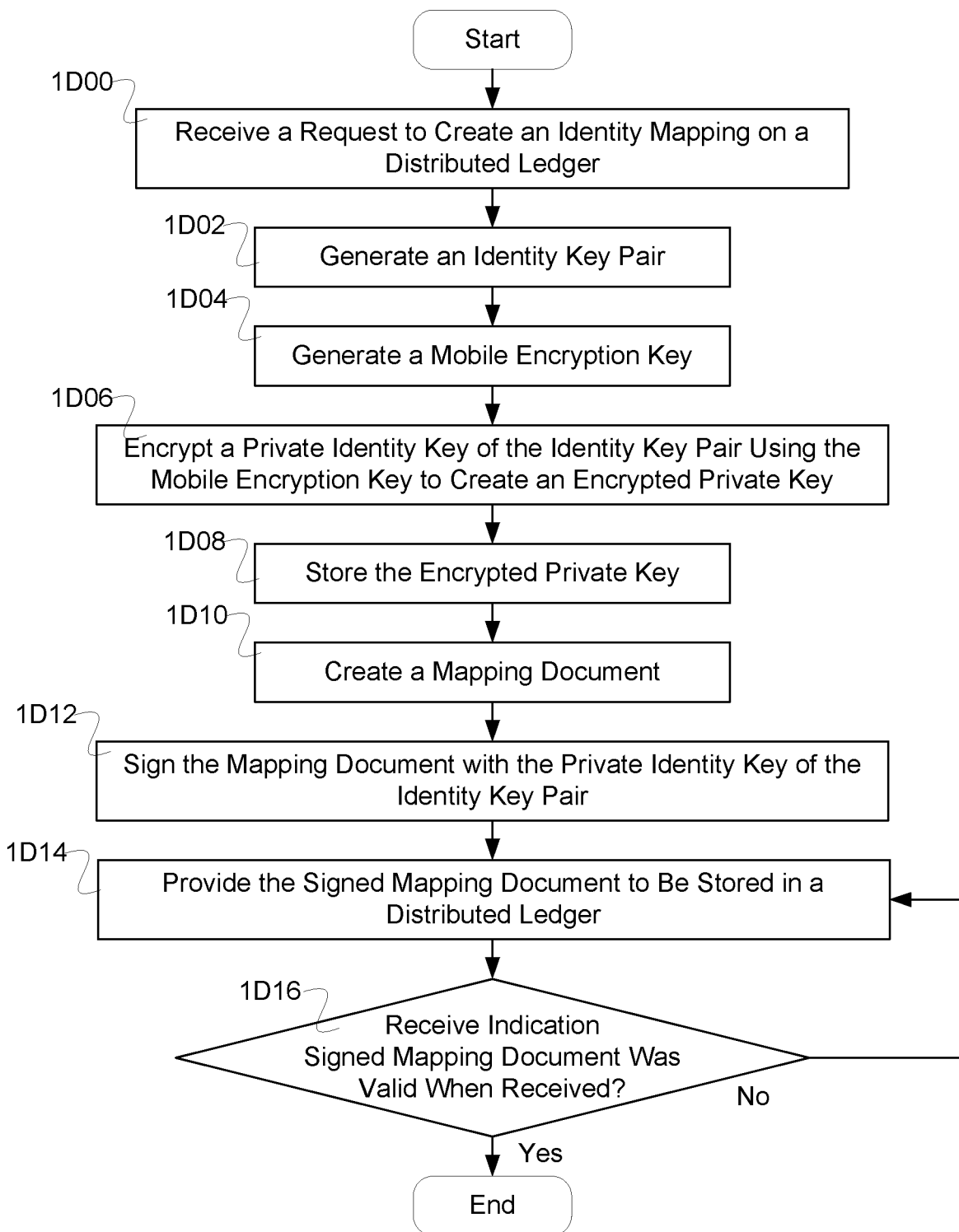
FIG. 1D is a flow diagram illustrating an embodiment of a process for creating an identity mapping on a distributed ledger.
Figure 1E:
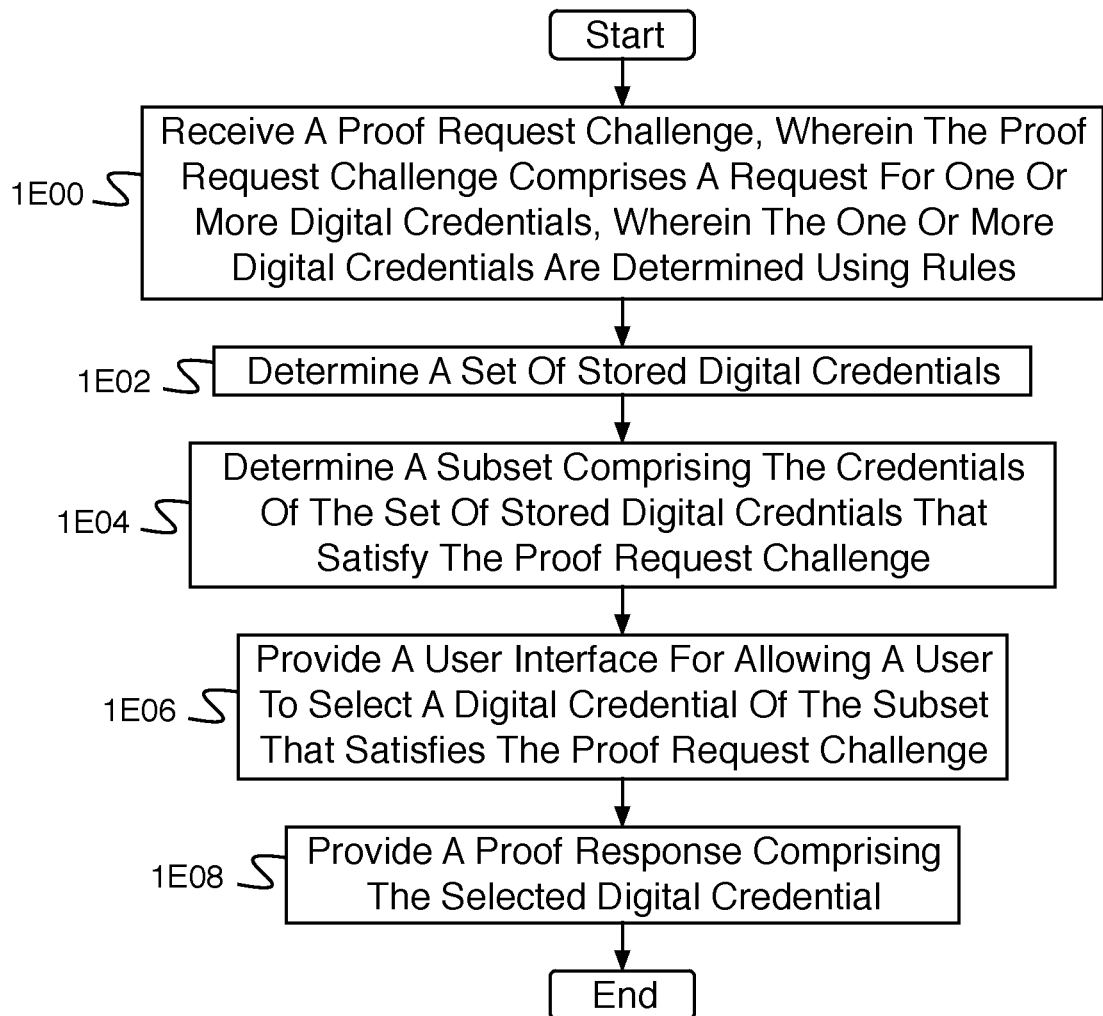
FIG. 1E is a flow diagram illustrating an embodiment of a process for responding to a proof request challenge.

FIG. 1D is a flow diagram illustrating an embodiment of a process for creating an identity mapping on a distributed ledger. In some embodiments, the process of FIG. 1D is executed by digital identity application 1B08 of FIG. 1B. In the example shown, in 1D00, a request is received to create an identity mapping on a distributed ledger. In 1D02, an identity key pair is generated. In 1D04, a mobile encryption key is generated. In 1D06, a private identity key of the IKP is encrypted using the mobile encryption key to create an encrypted private key. In 1D08, the encrypted private key is stored. In 1D10, a mapping document is created. In 1D12, the mapping document is signed with the private identity key of the IKP. In 1D14, the signed mapping document is provided to be stored in a distributed ledger. In some embodiments, providing the signed mapping document to be stored in a distributed ledger comprises providing the signed mapping document to a permissioned writer for the distributed ledger. In 1D16, it is determined whether a signed mapping document was valid when received. For example, the DCIAMS determines whether the signed mapping document was valid when received at the distributed ledger by receiving an indication that the signed mapping document passed a validation check performed by the distributed ledger prior to being stored in the ledger (e.g., was validated by checking the signature of the mapping document). In some embodiments, a further indication is received from the distributed ledger indicating that the signed mapping document was successfully accepted to be stored and confirmed to be stored in the distributed ledger FIG. 1E is a flow diagram illustrating an embodiment of a process for responding to a proof request challenge. In some embodiments, the process of FIG. 1E is executed by digital identity application 1B08 of FIG. 1B. In the example shown, in 1E00, a proof request challenge is received, wherein the proof request challenge comprises a request for one or more digital credentials, wherein the one or more digital credentials are determined using rules. In 1E02, a set of stored digital credentials is determined. In 1E04, a subset comprising the credentials of the set of stored digital credentials that satisfy the proof request challenge is determined. In 1E06, a user interface is provided for allowing a user to select a digital credential of the subset that satisfies the proof request challenge. In 1E08, a proof response is provided comprising the selected digital credential. For example, the one or more selected digital credentials are provided in response to the request, where the proof response is signed using the IKP private key to prove that is was generated by the holder of the credential and also includes timestamp to show liveness (e.g., that the proof response has not expired or is stale).

Figure 1F:
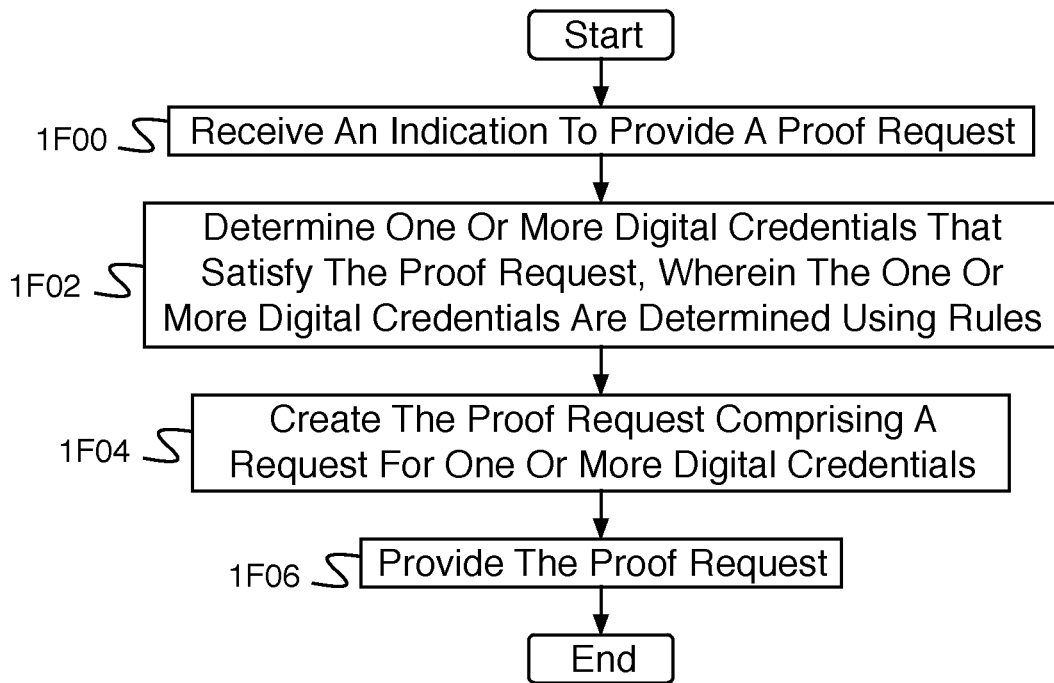
FIG. 1F is a flow diagram illustrating an embodiment of a process for providing a proof request.

FIG. 1F is a flow diagram illustrating an embodiment of a process for providing a proof request. In some embodiments, the process of FIG. 1F is executed by proof request application 1C14 of FIG. 1C. In the example shown, in 1F00, an indication is received to provide a proof request. In 1F02, one or more digital credentials that satisfy the proof request are determined, wherein the one or more digital credentials are determined using rules. For example, rules comprise rules related to a credential associated schema, rules related to a credential associated organization, rules related to a credential issuer, rules related to a credential associated location, rules related to a credential associated class identifier or identifier number, rules related to a credential associated license or license number, a credential associated class name, or any other appropriate credential rules. In some embodiments, the rules are applied selectively (e.g., based at least in part on a user identifier)—for example, employees with a credential can access application A, contractors with a credential can access application B, or any other appropriate matching of access with identifiers. In various embodiments, the rules are applied selectively based at least in part on current employment, employee type, location of user, qualification by training class, credential from a third party issuer (e.g., division of motor vehicle license, certification from school, etc.), or any other appropriate criterion. As examples of configurable credential rules to grant access: 1) access is granted in the event that a credential indicates that the holder is a current employee (e.g., issuing company is valid, employee status is not expired, and not revoked); 2) access is granted in the event that a credential indicates that the holder is an employee in an organization of the company (e.g., issuing company is valid, organization is specified organization, employee status is not expired, and not revoked); 3) access is granted in the event that a credential indicates that the holder is an employee in a specified location (e.g., issuing company is valid, location is a specified location, employee status is not expired, and not revoked); 4) access is granted in the event that a credential indicates that the holder has necessary training (e.g., issuing company is valid, training status is complete, employee status is not expired, and not revoked); and 5) access is granted in the event that a credential indicates that the holder has outside credential (e.g., issuing company is valid, outside credential is valid, outside credential issuer is third party, employee status is not expired, and not revoked); In some embodiments, selective application of rules combined with credential based authorization and single sign-on access control enable effective and configurable security. In 1F04, the proof request is created, comprising a request for one or more digital credentials. In 1F06, the proof request is provided.

A system for creating an identity mapping on a distributed ledger comprises an interface and a processor. The interface is configured to receive a request to create an identity mapping on a distributed ledger. The processor is configured to generate an identity key pair; generate a mobile encryption key; encrypt a private identity key of the identity key pair using the mobile encryption key to create an encrypted private key; store the encrypted private key; create a mapping document; sign the mapping document with the private identity key of the identity key pair; and provide the signed mapping document to be stored in a distributed ledger. In some embodiments, the processor is configured to install a digital identity application. In various embodiments, the identity key pair comprises a public identity key, a private identity key, an identity key pair generated using an RSA algorithm, an identity key pair generated using an ed25519 algorithm, or any other appropriate key pair. In some embodiments, mobile encryption key is stored in a secure enclave. In some embodiments, the mobile encryption key is access limited using a biometric. In some embodiments, the encrypted private key is stored in a user device (e.g., a mobile device). In some embodiments, the mapping document comprises a decentralized identifier. In some embodiments, the mapping document conforms to a World Wide Web Consortium decentralized identifier document specification. In some embodiments, the mapping document maps a user identifier to a public key value or the user identifier comprises a public key. In some embodiments, the processor is further configured to receive an indication that the signed mapping document was validated. In some embodiments, the distributed ledger comprises a blockchain. In some embodiments, the signed mapping document is provided to a permissioned writer for the distributed ledger. In some embodiments, the system comprises a storage for storing a digital credential for proving a user qualification. In some embodiments, the processor is configured to provide a proof response comprising a signed verifiable form of the digital credential in response to a proof request challenge. In some embodiments, the proof request challenge comprises a request for one or more digital credentials wherein the one or more digital credentials are determined according to rules. In various embodiments, the rules are associated with a credential schema, a credential organization, a credential issuer, a credential location, a credential class identifier, a credential class name, a credential issuer, an identification number associated with the credential, a license associated with the credential, or any other associated credential data. In some embodiments, the rules are applied selectively. In some embodiments, the rules are applied based at least in part on a user identifier.

Case B—Credential Storing and Verifying Using a Distributed Ledger

A system for credential storing and verifying using a distributed ledger is disclosed. The system includes an interface and a processor. The interface is configured to receive an indication to register a credential. The processor is configured to indicate to store in a distributed ledger a decentralized identifier (DID) document associated with a holder identifier using a smart contract, wherein storing using the smart contract employs a dual signature authentication scheme to authorize storing based at least in part on an individual signature and a ledger writer signature; indicate to store in the distributed ledger a schema associated with an issuer of the credential using the smart contract; and indicate to store in the distributed ledger a credential definition associated with the schema using the smart contract.

The system for credential storing and verifying using a distributed ledger is used by the system to check a credential that is being used to establish identity or legitimacy. A server system acts to intermediate between a requestor requesting a credential and a user holding a credential. The server system is able to verify the legitimacy of the credential as the credential, a pointer to the credential (e.g., an identifier), other related information (e.g., a decentralized identifier document), and/or information about the credential are stored in a distributed ledger by the issuer (e.g., an encryption/decryption key for a stored credential) and can be used as a check for the credential. This distributed ledger is accessible by the server system. The distributed ledger enables secure storage using a smart contract module that is run by each of the distributed ledger nodes. The smart contract ensures that the request to store an item on the distributed ledger is performed by an authorized user and by an authorized writer (e.g., by having the request and/or requested item be signed by the authorized user and by the authorized writer). In addition, smart contract module is designed to check a schema associated with the issuer of the credential, a credential definition associated with the schema, a decentralized identifier (DID) document associate with a holder identifier associated with a holder of a credential, and/or a DID document associated with an issuer of the credential.

In some embodiments, the system provides an item to the distributed ledger and the smart contract determines whether there is a signature failure (e.g., a signature of the user, a signature of the writer, or any other relevant a signature). In some embodiments, the smart contract determines whether there is a uniqueness failure (e.g., that the item to be stored is not already stored in the distributed ledger). In some embodiments, the smart contract determines whether there the storage in the distributed ledger was successful. In the event that a failure to store the item was detected, the smart contract module indicates the failure to the requestor to store the item (e.g., a server system that has requested that the item is to be stored in the distributed ledger). In the event that a storage success was detected, an indication is provided to the requestor to store the item that the item was successfully stored.

In some embodiments, the smart contract module verifies that a credential is valid by checking the credential against information stored in the distributed ledger. In some embodiments, the request for verifying the credential is also checked to make sure that it is appropriately signed—for example, with the signature of an appropriate requestor, the signature of a credential holder, the signature of a requestor, etc.). The smart contract modules determine whether the schema and the credential definition match stored information related to the schema and stored information related to the credential definition in the distributed ledger. In the event that a failure to validate the credential is detected, the smart contract module indicates to the requestor that the credential is not valid. In the event that the credential is validated using information stored in the distributed ledger, then a revocation database is checked (e.g., as stored by the smart contract module) to see whether the credential has been revoked and in the event it has not been revoked the requestor for validation is provided an indication that the credential is valid and not revoked. In the event that the credential is revoked, then the requestor is provided an indication that the credential is revoked.

The system makes a computer better by improving the ability to provide secure access. The system provides for checks ensuring that a writer and user are allowed to write to a distributed ledger and that an item to be stored is valid and unique and is successfully stored. The system further provides checks to validate a credential with stored information on the distributed ledger including schema information, credential definition information, as well as DID documents related to a holder and an issuer of a credential. The system therefore allows for making the system more secure by providing secure access to appropriate users based on a verifiable and trustworthy credential.

Figure 2A:
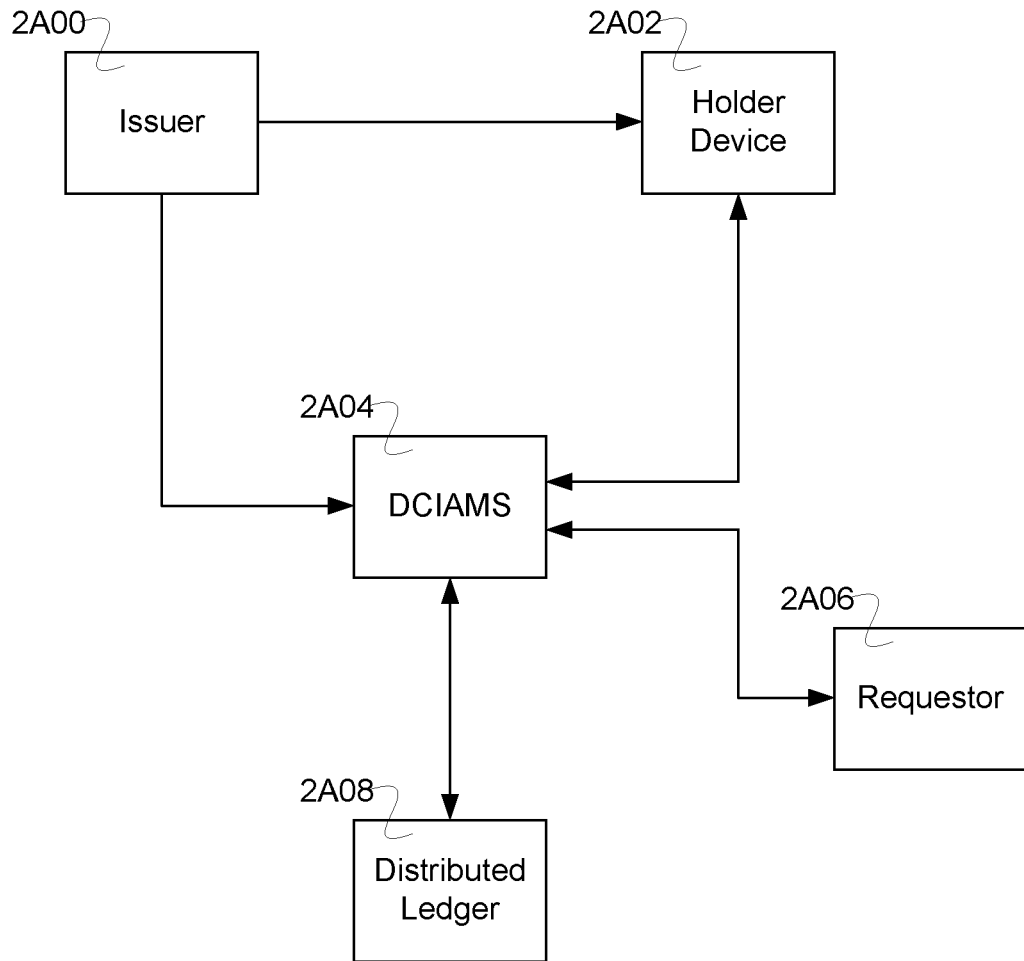
FIG. 2A is a diagram illustrating an embodiment of a system for credential storing and verifying using a distributed ledger.

FIG. 2A is a diagram illustrating an embodiment of a system for credential storing and verifying using a distributed ledger. In the example shown, issuer 2A00 provides identity information to digital credential aware identity and access management service (DCIAMS) 2A04 that is a permissioned writer/reader to distributed ledger 2A08. DCIAMS 2A04 is able to store received and signed information from issuer 2A00. This information can include identity information (e.g., a decentralized identifier) or credential information (e.g., a schema for a credential or a credential). Issuer 2A00 also provides a user the credential to hold in holder device 2A02. When a user uses the credential for establishing proof of identity or the validity of information, a request can be made to verify the credential—requestor 2A06 contacts DCIAMS 2A04 to verify a credential presented by a user using holder device 2A02. DCIAMS 2A04 is able to verify the credential by checking the credential against information placed in distributed ledger 2A08. In various embodiments, a credential schema, the credential itself, and a revocation table that are stored by issuer 2A00 on distributed ledger 2A08 can be used to check that a credential is legitimate. DCIAMS 2A04 can then provide requestor 2A06 with a verification that the credential supplied by a user held on holder device 2A02.

Figure 2B:
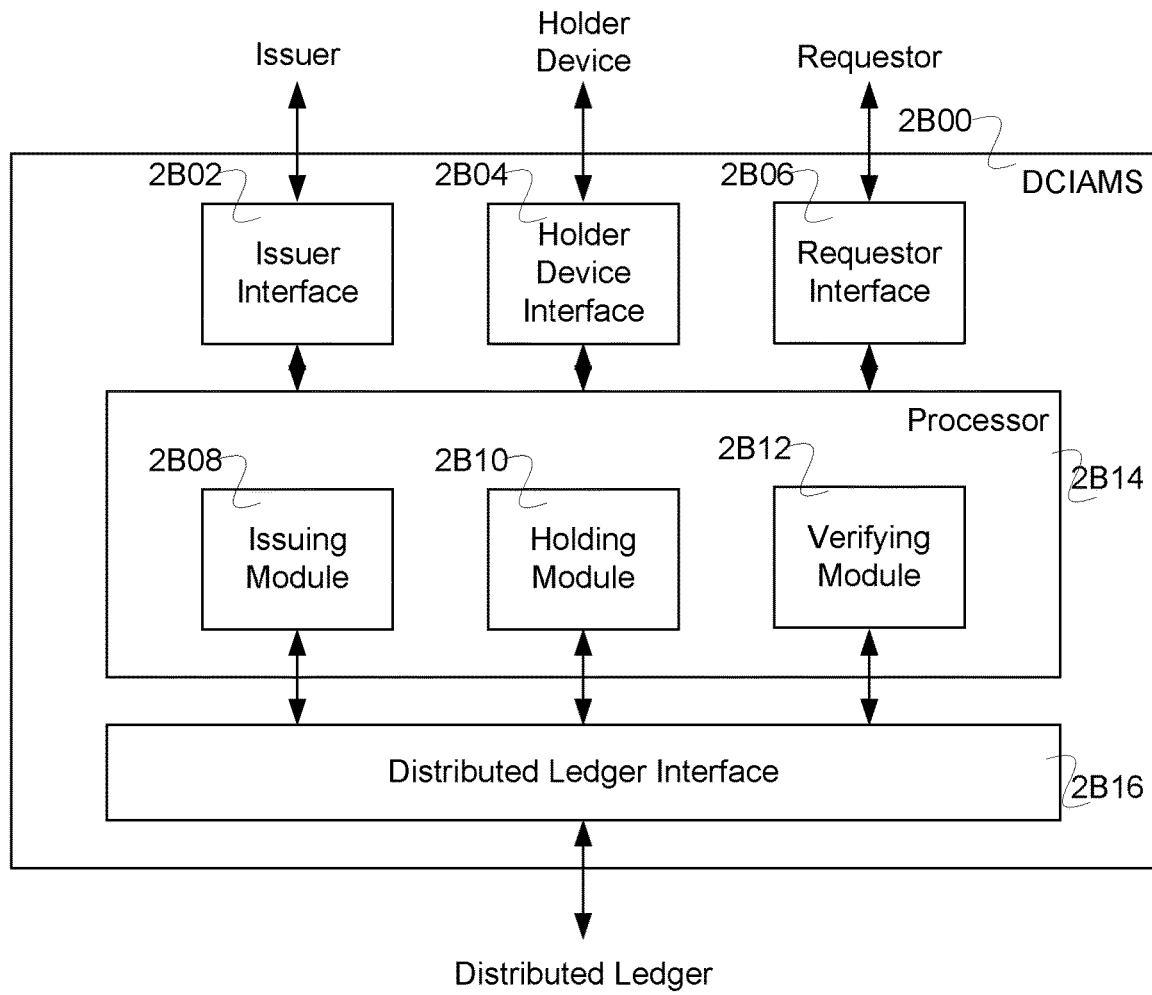
FIG. 2B is a diagram illustrating an embodiment of a DCIAMS.

FIG. 2B is a diagram illustrating an embodiment of a DCIAMS. In some embodiments, DCIAMS 2B00 of FIG. 2B is used to implement DCIAMS 2A04 of FIG. 2A. In the example shown, issuer interface 2B02 receives a DID document, a credential schema, a credential definition, a credential, or any other appropriate information from an issuer and provides the information to processor 2B14. Issuing module 2B08 of processor 2B14 indicates to a distributed ledger via distributed ledger interface 2B16 to write the information received from the issuer. The distributed ledger performs checking prior to storing on the distributed ledger including possibly checking a signature of the information, checking a signature associated with the writer, and/or ensuring that the information is unique compared to previously stored information on the distributed ledger. Holder device interface 2B04 receives a DID document or any other appropriate information from a holder device and provides the information to processor 2B14. Holding module 2B10 of processor 2B14 indicates to a distributed ledger via distributed ledger interface 2B16 to write the information received from holder device. Requestor interface 2B06 receives a request from a requestor to verify a credential that a user wishes to use to establish identity or to enable access or prove validity. Verifying module 2B12 indicates to distributed ledger via distributed ledger interface 2B16 to verify the credential. The distributed ledger performs checking to verify the credential including possibly checking the schema of the credential, checking the credential itself, and/or checking a revocation table to determine whether the credential has been revoked. In some embodiments, holder device presents credential information directly to DCIAMS 2B00 in response to a verification request regarding the credential from the requestor.

Figure 2C:
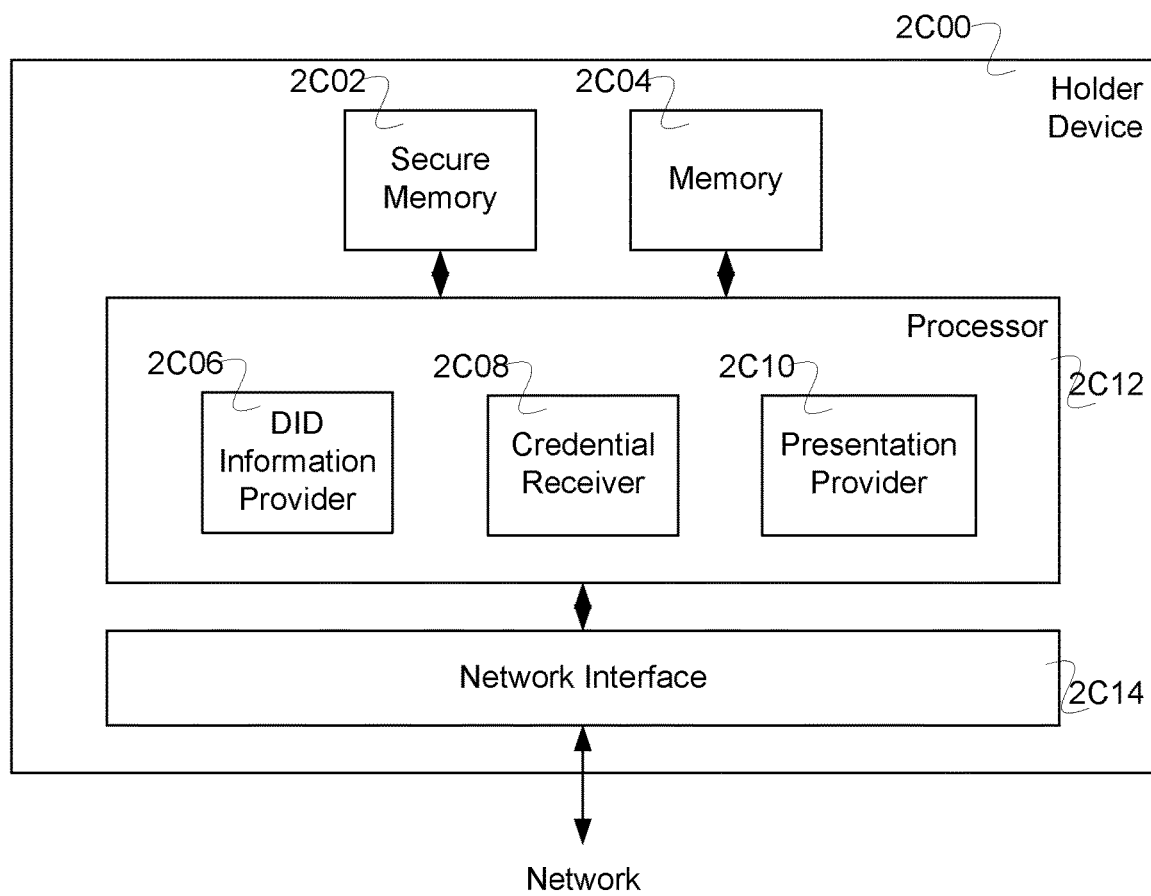
FIG. 2C is a diagram illustrating an embodiment of a holder device.

FIG. 2C is a diagram illustrating an embodiment of a holder device. In some embodiments, holder device 2C00 of FIG. 2C is used to implement 2A02 of FIG. 2A. In the example shown, DID information provider 2C06 of processor 2C12 provides DID information (e.g., an identifier or DID document) to be stored on a distributed ledger via network interface 2C14 and a network to a server (e.g., DCIAMS) that has permission to write/read to the distributed ledger. Holder device 2C00 also receives a credential and stores the information in secure memory 2C02. In some embodiments, credential receiver 2C08 of processor 2C12 handles the receipt of a credential from an issuer via network using network interface 2C14. In some embodiments, the release of information in secure memory 2C02 requires a biometric, a separate additional password, a personal identification number, a two-factor authentication, or any other appropriate security measure. In some embodiments, holder device comprises a smart phone. Holder device 2C00 also provides a presentation using presentation provider 2C10 of processor 2C12 to a server. The server is able then to request verification of the credential using information stored in a distributed ledger. Memory 2C04 is available to processor 2C12 to store instructions or other information useful for the operation of holder device 2C00.

Figure 2D:
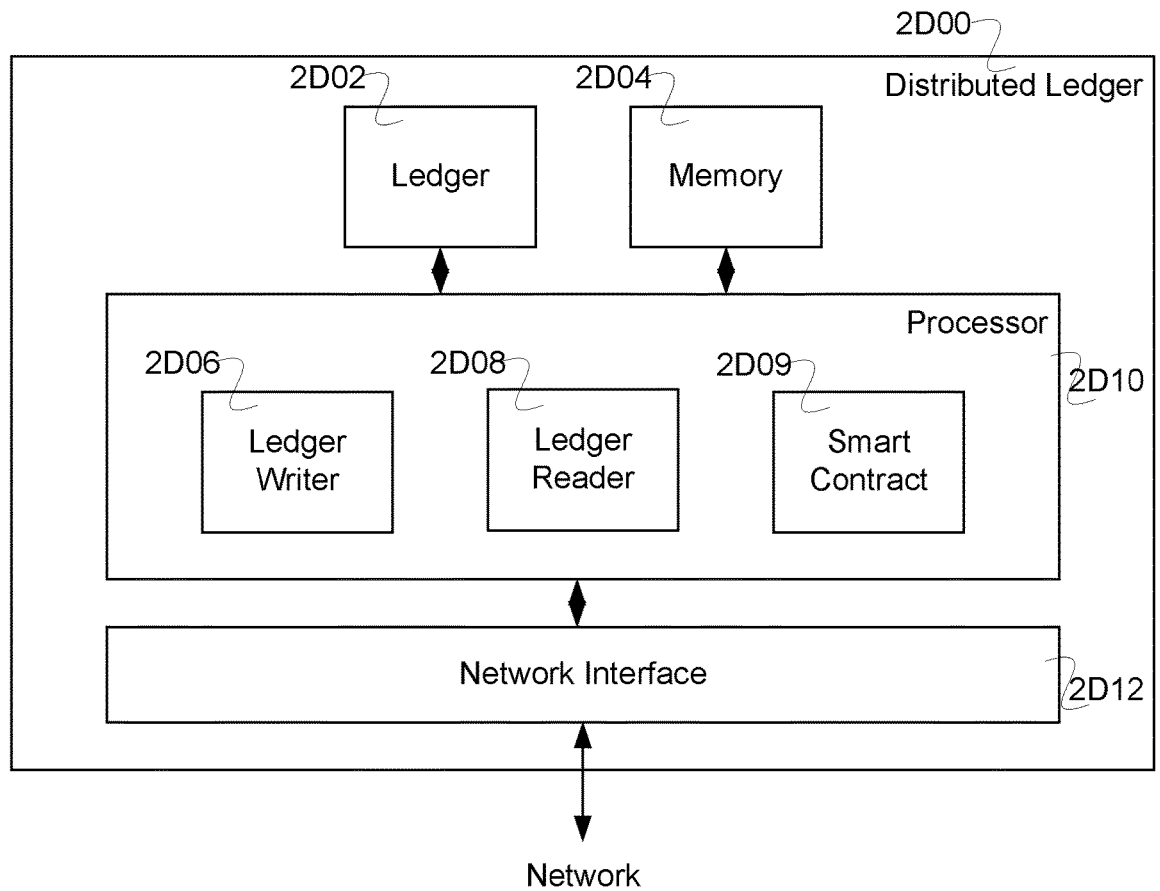
FIG. 2D is a diagram illustrating an embodiment of a distributed ledger.

FIG. 2D is a diagram illustrating an embodiment of a distributed ledger. In some embodiments, distributed ledger 2D00 of FIG. 2D is used to implement distributed ledger 2A08 of FIG. 2A. In the example shown, distributed ledger 2D00 receives information to write and read on ledger 2D02 using smart contract 2D09. Smart contract 2D09 comprises a software module that is installed in distributed ledger 2D00 that is executed to customize interactions for the system with ledger 2D02—for example, reading from the ledger and writing to the ledger are mediated by the smart contract that is configured to check signatures, check uniqueness, check that storage proceeded correctly, check schema of a credential with stored information, check a credential definition of a credential with stored information, and/or check whether a credential is on a revocation list (e.g., where the revocation list is stored in or associated with smart contract 2D09, For example, information is received from a network via network interface 2D12 and written to ledger 2D02 using ledger writer 2D06 of processor 2D10 or information is provided to the network via network interface 2D12 after being read from ledger 2D02 using ledger reader 2D08 of processor 2D10. In some cases, ledger 2D02 stores DID documents, credential schema, credential definitions, or any other appropriate information. In some embodiments, information is checked to make sure that its one or more signatures is/are valid and/or it is unique and has not previously been stored on ledger 2D02 prior to being stored on ledger 2D02. In some cases ledger 2D02 is read to obtain DID documents, credential schema, credential definitions, revocation information, or any other appropriate information that can be used to verify that a credential is valid.

FIG. 2E is a diagram illustrating an embodiment of a credential. In some embodiments, the credential of FIG. 2E is stored on distributed ledger 2A08 of FIG. 2A. In the example shown, the credential includes issuer 2E00—for example, a uniform resource identifier or a decentralized identifier (DID). Issuer 2E00 as shown is defined as https://dmv.example.gov. Credential also includes holder DID 2E02. Holder DID 2E02 as shown is defined as "did:example:ebfeb1f712ebc6f1c276e21ec12". Credential also includes claim data 2E04 (e.g., "age": 21). Credential information can also include an algorithm (e.g., RS256"), a type (e.g., "JWT"), an issue date (e.g., 2010 Jan. 1), a verifiable credential type (e.g., ProofOfAgeCredential), an expiration date (e.g., 2030 Jan. 1), or any other appropriate information.

FIG. 2F is a diagram illustrating an embodiment of a presentation. In some embodiments, the presentation is presented to a DCIAMS (e.g., DCIAMS 2A04 of FIG. 2A) in order to request verification of a credential. In the example shown, the presentation includes holder DID 2F00 (e.g., "did:example:76e12ec21ebhyu1f712ebc6f1z2"). The presentation also includes issuer DID 2F02 (e.g., "did:example: ebfeb1f712ebc6f1c276e12ec21"). The presentation also includes revocation information 2F04 (e.g., "id": "http://example.gov/revocations/738" and "type": "SimpleRevocationList2017"). The presentation also includes information to prevent replay 2F06 (e.g., a cryptographically random nonce, a create date, etc.). In addition, the presentation includes notations that indicate modification prevention (e.g., a signature over the presentation) and communication channel information (e.g., the presentation can be encrypted with the public key of the target recipient, allowing a channel specific authorization and additional privacy and security over the message).

Figure 2G:
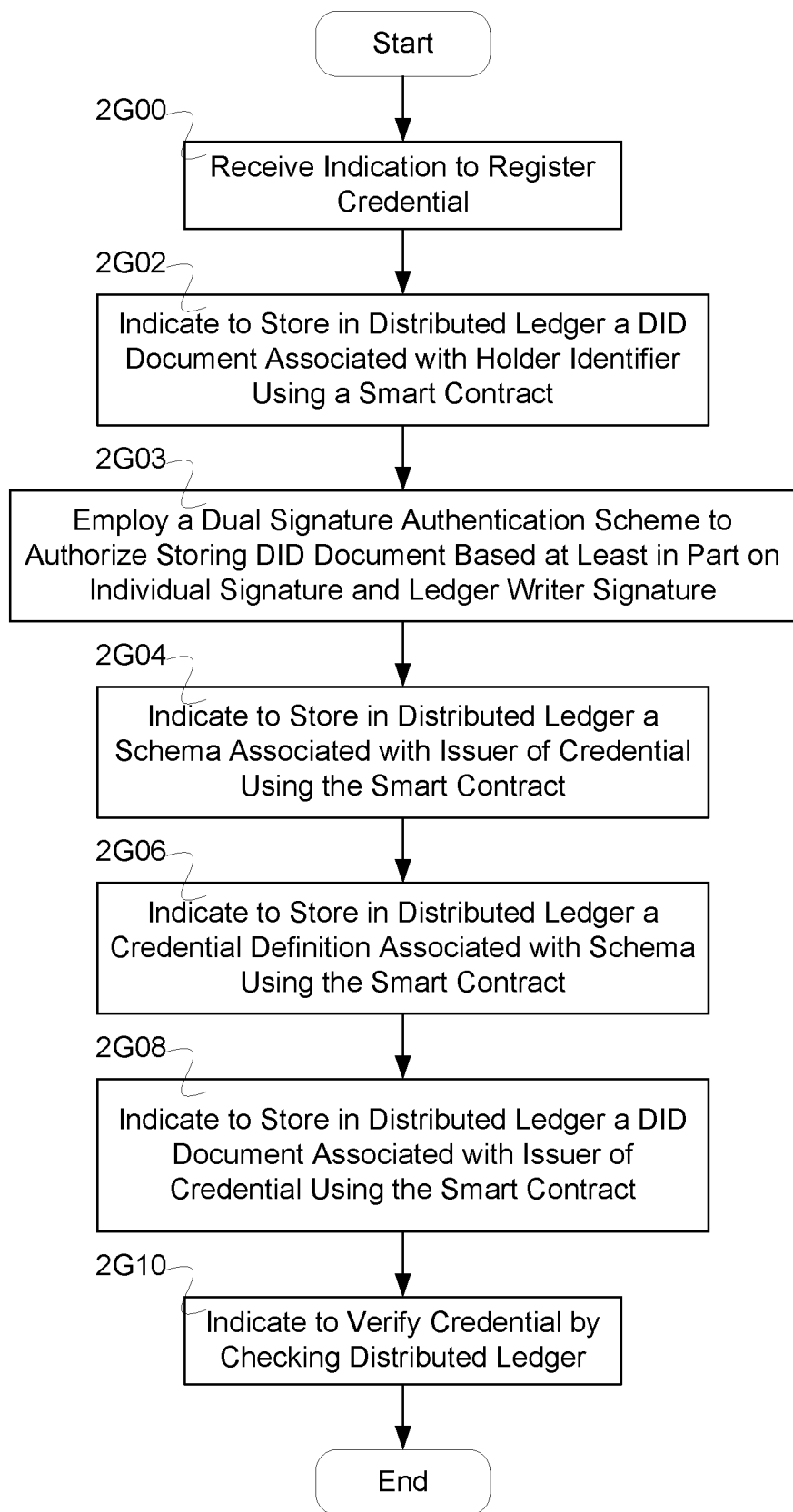
FIG. 2G is a flow diagram illustrating a process for credential storing and verifying using a distributed ledger.

FIG. 2G is a flow diagram illustrating a process for credential storing and verifying using a distributed ledger. In some embodiments, the process of FIG. 2G is executed by DCIAMS 2A04 of FIG. 2A. In the example shown, in 2G00 an indication is received to register a credential. For example, the indication is received from an issuer of a credential to store the credential associated with an issuer identifier in a distributed ledger. In 2G02, it is indicated to store in the distributed ledger a DID document associated with a holder identifier. For example, the issuer provides a credential to a user that is stored in a holder device that will later be used for identification or verification. The information regarding the credential will be verified as being associated with the holder identifier by checking stored information in the distributed ledger. In 2G03, a dual signature authentication scheme is employed to authorize storing the DID document based at least in part on an individual signature and a ledger writer signature. For example, an item stored on the distributed ledger is signed using a permissioned writer and this is used to verify that the item as it has arrived at the distributed ledger is valid. This item is then prepared to be stored by checking another associated signature with the item and storing the item with this signature—for example, a DID document associated with a holder signature, a DID document associated with a user signature, a schema associated with an issuer signature, a credential definition associated with an issuer signature (and in some cases also a credential definition key), In 2G04, it is indicated to store in the distributed ledger a schema associated with issuer of the credential. For example, the credential schema associated with the issuer of the credential is stored on the distributed ledger so that during verification a check can be performed on the schema of the credential. In 2G06, it is indicated to store in the distributed ledger a credential definition associated with the schema. For example, the credential definition is stored from an issuer that is associated with the schema information of the issuer so that during verification a check can be performed on the credential definition associated with the issuer of the credential. In 2G08, it is indicated to store in the distributed ledger a DID document associated with the issuer of the credential. For example, an identifier is stored associated with the issuer of a credential. In 2G10, it is indicated to verify a credential by checking the distributed ledger. For example, the user desires to use the credential to verify identity or validity of the information in the credential. The user can provide a requestor that wants to have certification that the identity or the information is valid and is able to query a server to get the information checked using information stored on a distributed ledger. In some cases, the request to verify triggers a request to a holder device to provide credential information that is then verified by the server using the distributed ledger. The server can then respond to the requestor that the credential is either verified or not verified.

Figure 2H:
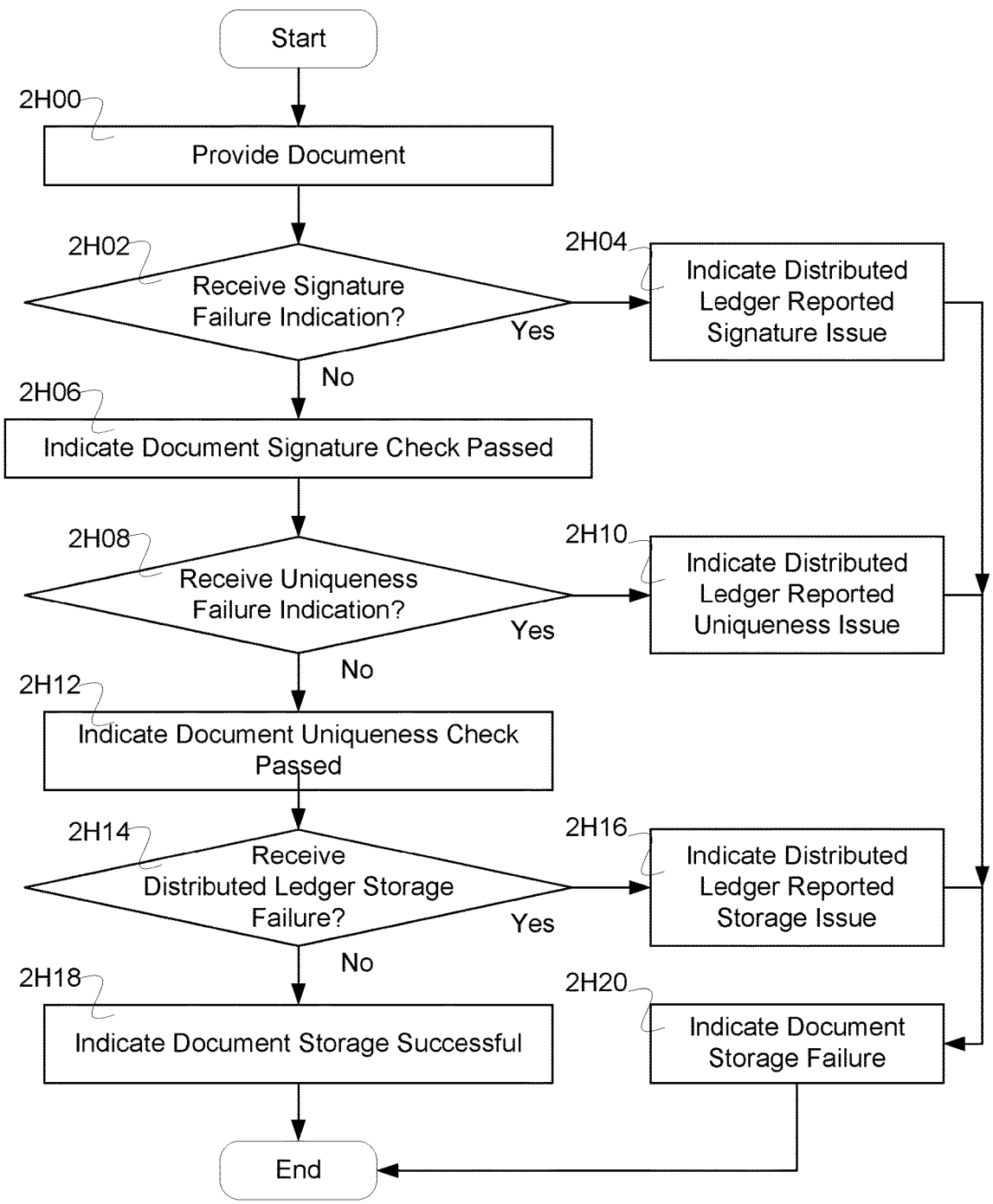
FIG. 2H is a flow diagram illustrating an embodiment of a process for storing a document on a distributed ledger.

FIG. 2H is a flow diagram illustrating an embodiment of a process for storing a document on a distributed ledger. In some embodiments, the flow of FIG. 2H is used to implement 2G02, 2G04, 2G06, or 2G08 of FIG. 2G. In the example shown, in 2H00 a document is provided to a distributed ledger. For example, a DCIAMS server system provides a distributed ledger system with a document to be stored on the distributed ledger. In some embodiments, the distributed ledger is implemented using a blockchain. In 2H02, it is determined whether a signature failure indication has been received. For example, it is determined whether a signature check (e.g., a holder signature check, a user signature check, an issuer signature check, credential definition key check, etc.) of the document provided to the distributed ledger system passed. In some cases, a failure would indicate that the document is corrupted in transmission, is not from a valid source, is signed with the incorrect key, or any other appropriate cause of failure. In response to determining that a signature failure indication is received, in 2H04 it is indicated that the distributed ledger has reported a signature issue and control passes to 2H20. In response to determining that a signature failure indication has not been received, in 2H06 it is indicated that the document signature check passed. In 2H08, it is determined whether a uniqueness failure indication has been received. For example, it is determined whether a uniqueness check of the document provided to the distributed ledger system passed. In some cases, a failure would indicate that the document is already stored on the distributed ledger either in whole or in part, that the document includes data that is not able to be stored on the distributed ledger, that the document identifier matches a document identifier of an already stored document, or any other appropriate cause of failure. In response to determining that a uniqueness failure indication is received, in 2H10 it is indicated that the distributed ledger has reported a uniqueness issue and control passes to 2H20. In response to determining that a uniqueness failure indication has not been received, in 2H12 it is indicated that the document uniqueness check passed. In 2H14, it is determined whether a storage failure indication has been received. For example, it is determined whether a storage operation for the document provided to the distributed ledger system failed. In some cases, a failure would indicate that the blockchain storage system is not working, the blockchain storage system is not able to store the document, local node is out of disk/storage capacity, local node is having a hardware failure, or any other appropriate cause of failure. In response to determining that a storage failure indication is received, in 2H16 it is indicated that the distributed ledger has reported a storage issue and control passes to 2H20. In response to determining that a storage failure indication has not been received, in 2H18 it is indicated that the document storage was successful, and the process ends. In 2H20, it is indicated that document storage failed and the process ends.

Figure 2I:
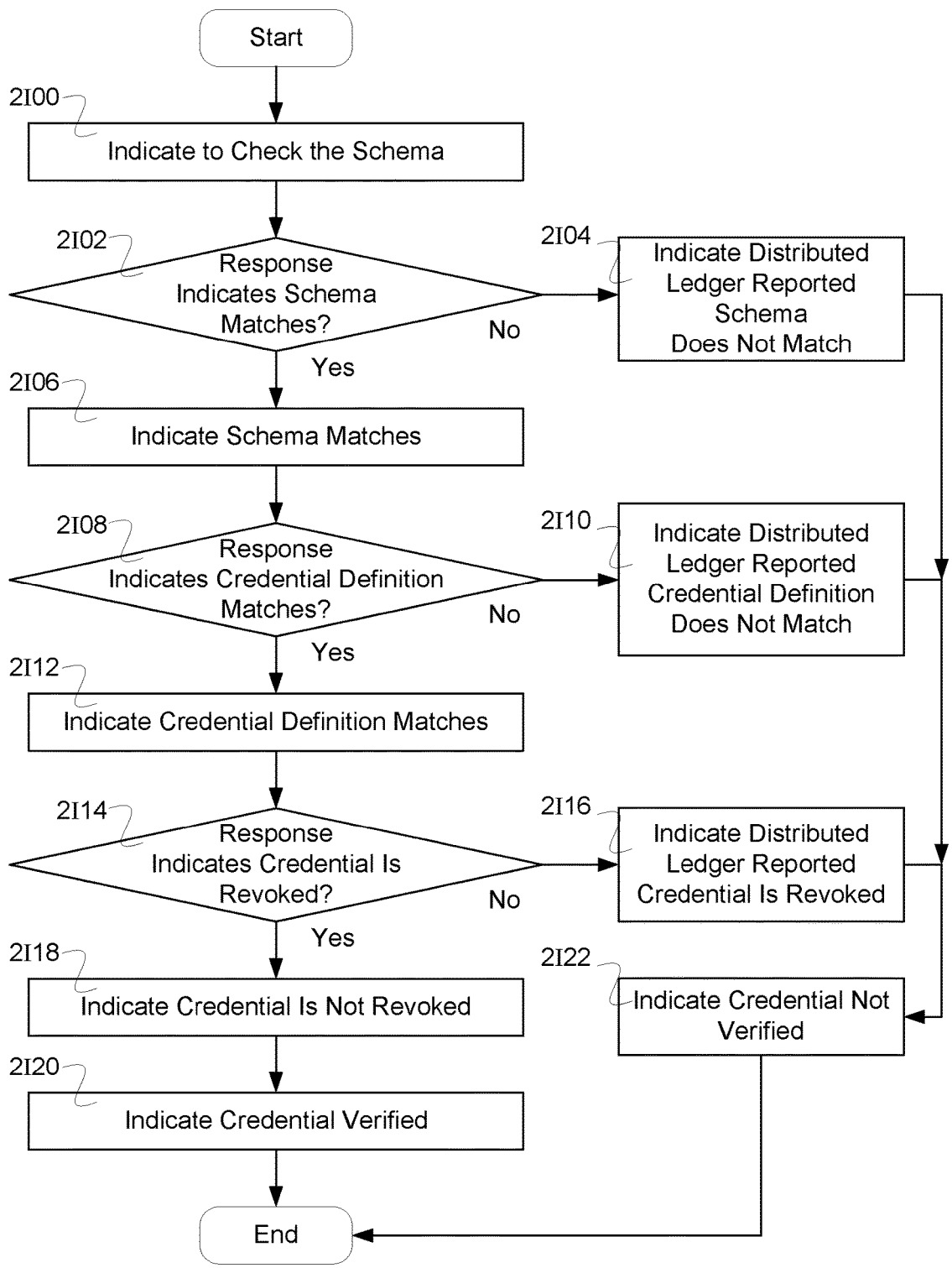
FIG. 2I is a flow diagram illustrating an embodiment of a process for verifying a credential.

FIG. 2I is a flow diagram illustrating an embodiment of a process for verifying a credential. In some embodiments, the process of FIG. 2I is used to implement 2G10 of FIG. 2G. In the example shown, in 2I00 it is indicated to check the schema. For example, the DCIAMS system indicates to the distributed ledger system to check the schema associated with a credential. The schema associated with the credential is retrieved from the distributed ledger and compared with the credential schema to determine whether the schema matches. In 2I02, it is determined whether a response indicates that the schema matches. For example, the distributed ledger checks the schema of the credential with the distributed ledger stored schema. In some embodiments, checking the schema includes checking a signature associated with the schema (e.g., an issuer signature). In response to determining that the schema does not match, in 2I04 it is indicated that the distributed ledger reported that the schema does not match, and control passes to 2I22. In response to determining that the schema does match, in 2I06 it is indicated that the schema matches. For example, the distributed ledger has reported that the credential schema matches to the credential schema stored on the distributed ledger. In 2I08, it is determined whether a response indicates that the credential definition matches. For example, the distributed ledger checks the credential definition of the credential with the distributed ledger stored credential definition. In some embodiments, the credential definition is checked using a signature check (e.g., a check of an issuer signature, a check of a credential definition signature, etc.). In response to determining that the credential definition does not match, in 2I10 it is indicated that the distributed ledger reported that the credential definition does not match, and control passes to 2I22. In response to determining that the credential definition does match, in 2I12 it is indicated that the credential definition matches. For example, the distributed ledger has reported that the credential definition matches to the credential definition stored on the distributed ledger. In 2I14, it is determined whether a response indicates that the credential is revoked. For example, the distributed ledger checks a revocation list to determine whether the credential has been revoked by the issuer. In response to determining that the credential was revoked, in 2I16 it is indicated that the distributed ledger reported that the credential was revoked, and control passes to 2I22. In response to determining that the credential was not revoked, in 2I18 it is indicated that the credential is not revoked, and control passes to 2120. For example, the distributed ledger has reported that the credential is not on a revocation list of the distributed ledger or associated with the distributed ledger. In 2120, it is indicated that the credential is verified, and the process ends. For example, it is indicated to the requestor from the DCIAMS that the credential is verified by using the distributed ledger. In 2122, it is indicated that the credential is not verified, and the process ends. For example, it is indicated to the requestor from the DCIAMS that the credential is not verified by using the distributed ledger.

A system for credential storing and verifying using a distributed ledger is disclosed. The system includes an interface and a processor. The interface is configured to receive an indication to register a credential. The processor is configured to indicate to store in a distributed ledger a decentralized identifier (DID) document associated with a holder identifier using a smart contract, wherein storing using the smart contract employs a dual signature authentication scheme to authorize storing based at least in part on an individual signature and a ledger writer signature; indicate to store in the distributed ledger a schema associated with an issuer of the credential; and indicate to store in the distributed ledger a credential definition associated with the schema. In some embodiments, the DID document associated with the holder identifier comprises a public key and a private key. In some embodiments, storing the DID document associated with the holder identifier includes checking a signature for the DID document associated with the holder identifier. In some embodiments, storing the DID document associated with the holder identifier includes checking uniqueness for the DID document associated with the holder identifier. In some embodiments, the distributed ledger comprises a blockchain. In some embodiments, the processor is further configured to store in the distributed ledger an issuer DID document associated with the issuer of the credential. In some embodiments, the credential is provided to a holder device associated with the holder identifier. In some embodiments, the holder device sends a presentation regarding the credential to a verifier. In some embodiments, the verifier verifies the credential by indicating to check the distributed ledger. In some embodiments, checking the distributed ledger comprises determining whether the schema stored in the distributed ledger associated with the presentation regarding the credential is matches the credential. In some embodiments, in response to determining the schema stored in the distributed ledger associated with the presentation regarding the credential matches the credential, indicate that the credential matches. In some embodiments, in response to determining the schema stored in the distributed ledger associated with the presentation regarding the credential does not match the credential, indicate that the credential does not match. In some embodiments, checking the distributed ledger comprises determining whether the credential definition stored in the distributed ledger associated with the presentation regarding the credential is matches the credential. In some embodiments, in response to determining the schema stored in the distributed ledger associated with the presentation regarding the credential matches the credential, indicate that the credential matches. In some embodiments, in response to determining the schema stored in the distributed ledger associated with the presentation regarding the credential does not match the credential, indicate that the credential does not match. In some embodiments, checking the distributed ledger comprises determining whether the credential definition stored in the distributed ledger associated with the presentation regarding the credential is matches the credential. In some embodiments, in response to determining the credential definition stored in the distributed ledger associated with the presentation regarding the credential matches the credential, indicate that the credential matches. In some embodiments, in response to determining the credential definition stored in the distributed ledger associated with the presentation regarding the credential does not match the credential, indicate that the credential does not match. In some embodiments, checking the distributed ledger comprises determining whether the revocation registry stored in the distributed ledger associated with the presentation regarding the credential indicates the credential is revoked. In some embodiments, in response to determining the credential is indicated as revoked, indicate that the credential is revoked. In some embodiments, in response to determining the credential is indicated as not revoked, indicate that the credential is not revoked.

Case C—Digital Credentials for Primary Factor Authentication

A system for credential authentication comprises an interface configured to receive a request for authorization to access from an application, and a processor configured to determine a set of credentials that can enable authorization to access, generate a proof request challenge, receive a proof response, determine that the proof response is valid based at least in part on information stored in a distributed ledger, generate a token, and provide the token.

A system for credential authentication comprises a server system for authorizing a login using a credential. A user using a user app (e.g., a web browser) on a user system requests access to a remote application (e.g., a web accessible application—for example, a database application). The remote application requests that the system for credentialing authorize the login attempt. The system for credentialing authorizes the login attempt by requesting a credential that proves the user has the qualifications to access the remote application. The user is associated with an authentication device including digital credentials and a digital identity application for accessing the credentials. When the system for credentialing is first requested to authorize access, it provides a secure code—for example, a quick response (QR) code—to the user device. The user then uses the authentication device to capture the secure code data (e.g., secure code data that is a time bounded one time use token acquired by imaging the QR code). The digital identity application on the authentication device provides the secure code data and the public key of the user registering to the system for credentialing creating an association between the registering user on the application instance and the user record in the credential authentication system, linking the user using the user app with the authentication device. Following a successful authentication attempt, the system for credential authentication provides a secure cookie including identifier data for the authentication device to the user app in order to streamline this process for future login attempts. The system for credential authentication provides a proof request comprising a request for one of a set of credentials (e.g., the set of credentials that can prove the user is qualified to access the remote application) to the authentication device. The authentication device determines the credentials, if any, it has stored that satisfy the proof request and provides the user with a user interface allowing the user to select the credential desired to use to authorize login. The authentication device additionally prompts the user to confirm signing a proof response using a private key. When a credential is selected that the user has confirmed signing, the authentication device creates a proof response comprising the credential and signs the proof response using a private key. The authentication device provides the signed proof response to the credential authentication system. The credential authentication system validates the signature and extracts and validates the credential. For example, the credential system determines, using information stored in a distributed ledger, whether the credential satisfies the proof request, whether the credential is valid and not expired, whether the credential is not revoked, etc. In the event the credential system determines that the proof response is satisfactory, it provides a login token back to the remote application authorizing the login. Once the remote application has received the login token, it grants access to the user. The login token is stored to enable future login attempts. The login token is then used for automatically enabling access until the login is token is determined to be expired. In various embodiments, the login token expires after a predetermined time, after a predetermined number of logins, or under any other appropriate conditions.

Figure 3A:
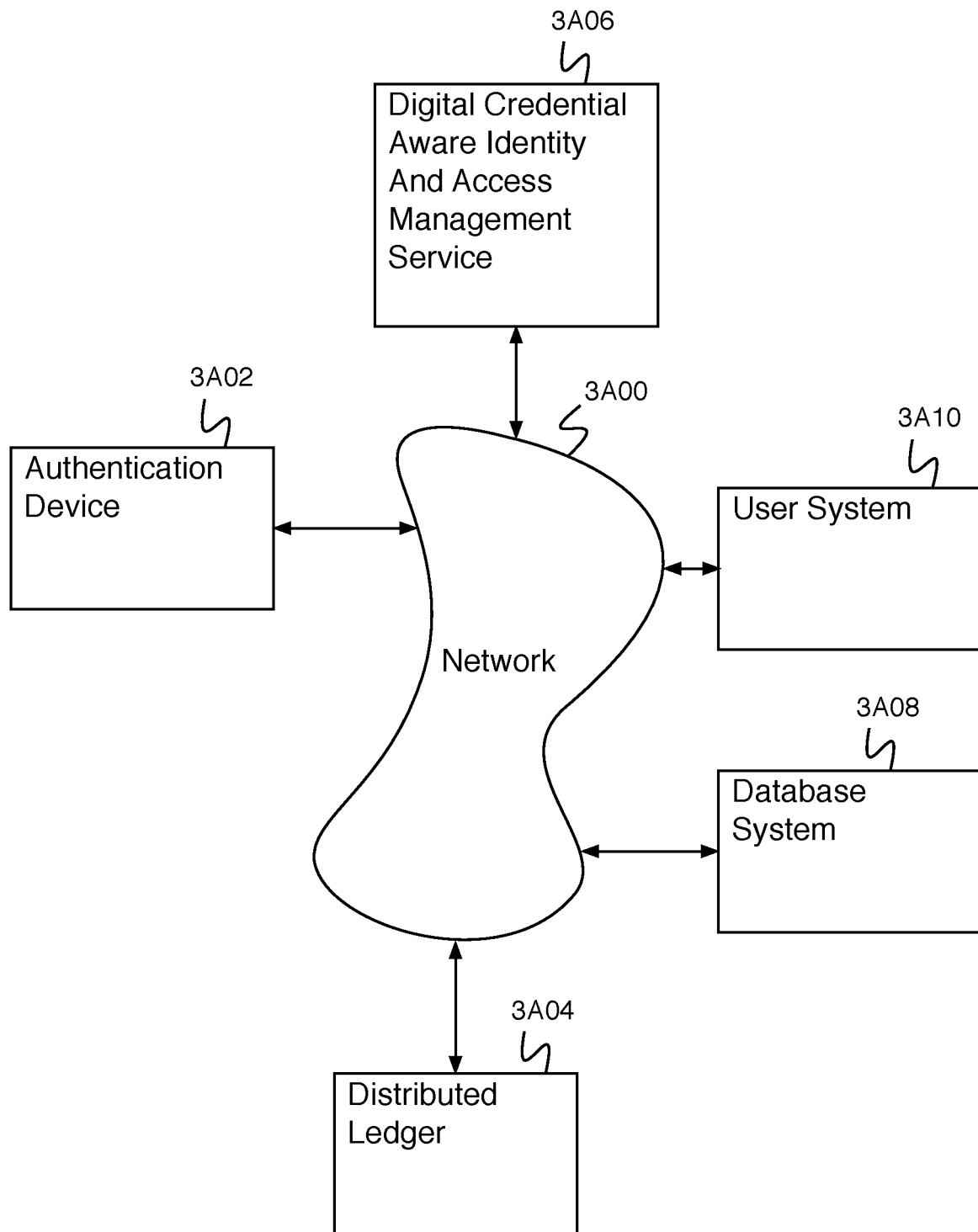
FIG. 3A is a block diagram illustrating an embodiment of a network system.

FIG. 3A is a block diagram illustrating an embodiment of a network system. In some embodiments, the network system of FIG. 3A comprises a network system for a database processing system. In the example shown, FIG. 3A comprises network 3A00. In various embodiments, network 3A00 comprises one or more of the following: a local area network, a wide area network, a wired network, a wireless network, the Internet, an intranet, a storage area network, or any other appropriate communication network. Authentication device 3A02, distributed ledger 3A04, digital credential aware identity and access management service (DCIAMS) 3A06, database system 3A08, and user system communicate via network 3A00. Authentication device 3A02 comprises an authentication device associated with a user (e.g., a user of database system 3A08, a user using user system 3A10). For example, authentication device 3A02 comprises a computer, a smartphone, a tablet, a mobile device, etc. Distributed ledger 3A04 comprises a distributed ledger (e.g., a decentralized ledger, a public ledger, a permissioned ledger, a blockchain, etc.). For example, distributed ledger 3A04 is stored on a plurality of systems and comprises one or more permissioned writer systems for writing to the distributed ledger. DCIAMS 3A06 comprises a system for interacting with authentication device 3A02, distributed ledger 3A04, database system 3A08, and any other appropriate systems. DCIAMS 3A06 comprises a system for coordinating a login for database system 3A08, for providing a credential to authentication device 3A02, for requesting a credential from authentication device 3A02, for verifying a user identifier or a signature in distributed ledger 3A04, etc. Database system 3A08 comprises a system for storing database data, requesting database data, creating a report based on database data, creating a document, accessing a document, to executing a database application, etc. A user uses user system 3A10 to access data stored on database system 3A08. For example, a user uses an application on user system 3A10 (e.g., a web browser) to connect to an application on database system 3A08 (e.g., a database application). The application on database system authenticates a user login before granting access.

DCIAMS 3A06 comprises a system for using a digital credential to authenticate a login (e.g., a user login to a database system). For example, DCIAMS 3A06 an interface configured to receive a request from an application for authorization to access, and a processor configured to determine a set of credentials that can enable authorization to access, generate a proof request challenge, receive a proof response, determine that the proof response is valid using a distributed ledger, generate a token, and provide the token.

In some embodiments, DCIAMS 3A06 helps to protect application systems other than database systems.

Figure 3B:
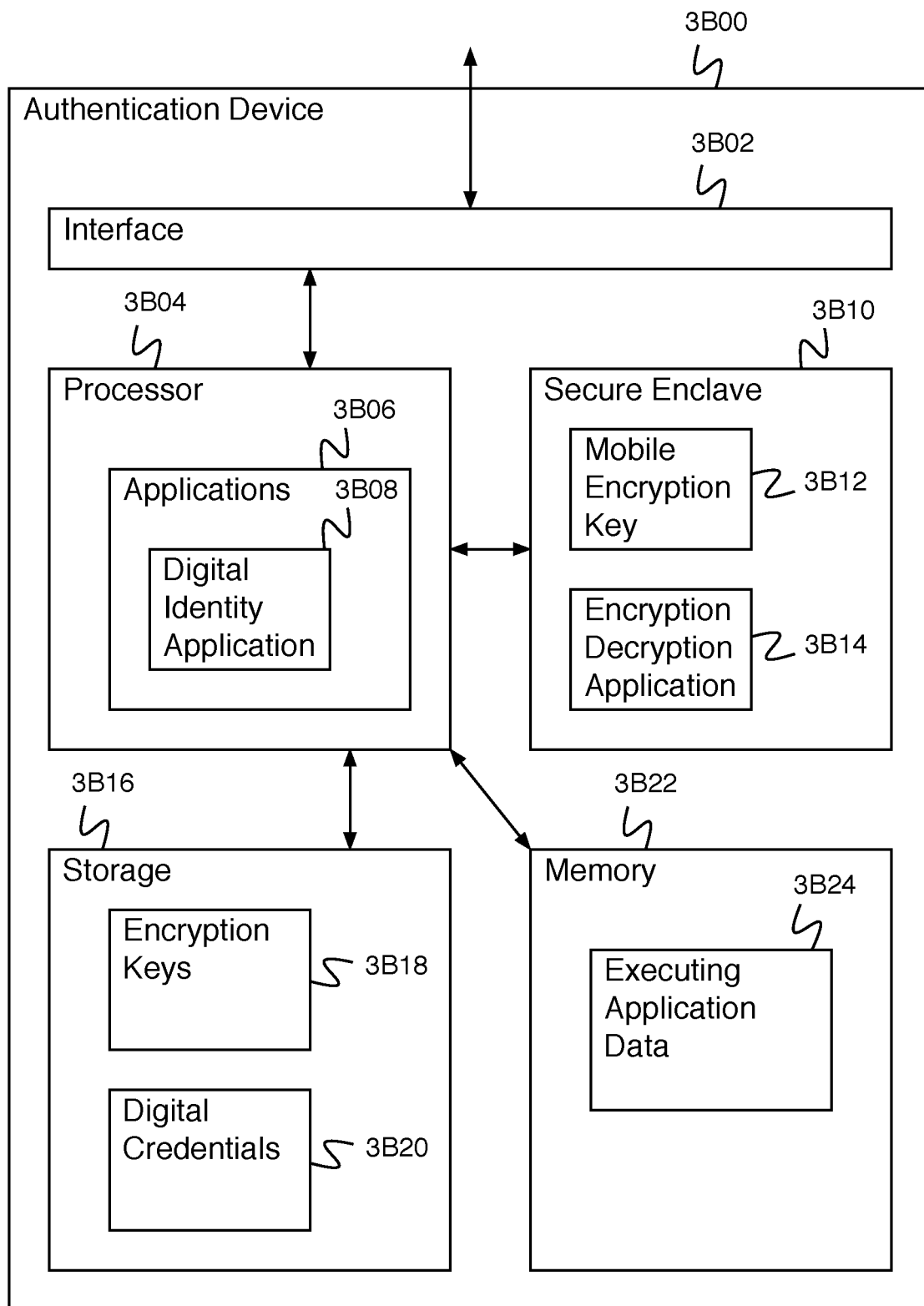
FIG. 3B is a block diagram illustrating an embodiment of an authentication device.

FIG. 3B is a block diagram illustrating an embodiment of an authentication device. In some embodiments, authentication device 3B00 of FIG. 3B comprises authentication device 3A02 of FIG. 3A. In the example shown, authentication device 3B00 comprises interface 3B02. For example, interface 3B02 comprises an interface for receiving data, providing data, receiving a request for data, etc. Processor 3B04 comprises a processor for executing applications 3B06. Applications 3B06 comprise digital identity application 3B08 and any other appropriate applications. Digital identity application 3B08 comprises an application for providing a proof response in response to a proof request. For example, digital identity application 3B08 comprises an application for receiving a proof request challenge from a DCIAMS (e.g., DCIAMS 3A06 of FIG. 3A), determining one or more credentials that match the request, providing a credential list to a user for credential selection, in the event it is determined that a credential is selected, creating a proof response, providing a request to sign the proof response, and in the event permission to sign the proof response is received, unlocking a mobile encryption key, decrypting an identity key pair private key using the mobile encryption key, signing the proof response using the identity key pair private key, and providing the signed proof response. Secure enclave 3B10 comprises a secure system for storing a mobile encryption key. Secure enclave 3B10 comprises mobile encryption key 3B12 and encryption decryption application 3B14. For example, secure enclave 3B10 comprises multiple mobile encryption keys, an application for generating and/or removing mobile encryption keys, etc. Secure enclave 3B10 comprises a system for receiving data, transforming it by encrypting and/or decrypting the data using a mobile encryption key or keys, and providing the transformed data. For example, secure enclave 3B10 is configured to only provide transformed input data and not to provide mobile encryption key 3B12. In some embodiments, functionality of secure enclave 3B10 is access limited using a biometric (e.g., a fingerprint, a retina scan, a DNA scan, etc.) or a personal identification number (PIN). Authentication device 3B00 additionally comprises storage 3B16. Storage 3B16 comprises encryption keys 3B18—for example comprising a public key of an identity key pair, a private key of an identity key pair, a private key of an identity key pair encrypted using mobile encryption key 3B12, etc. Storage 3B16 additionally comprises digital credentials 3B20, comprising digital certificates representing qualifications (e.g., a college degree, work experience, time living at an apartment, time enrolled in a health insurance plan, etc. Authentication device 3B00 additionally comprises memory 3B22. Memory 3B22 comprises executing application data 3B24, comprising data associated with applications 3B06.

Figure 3C:
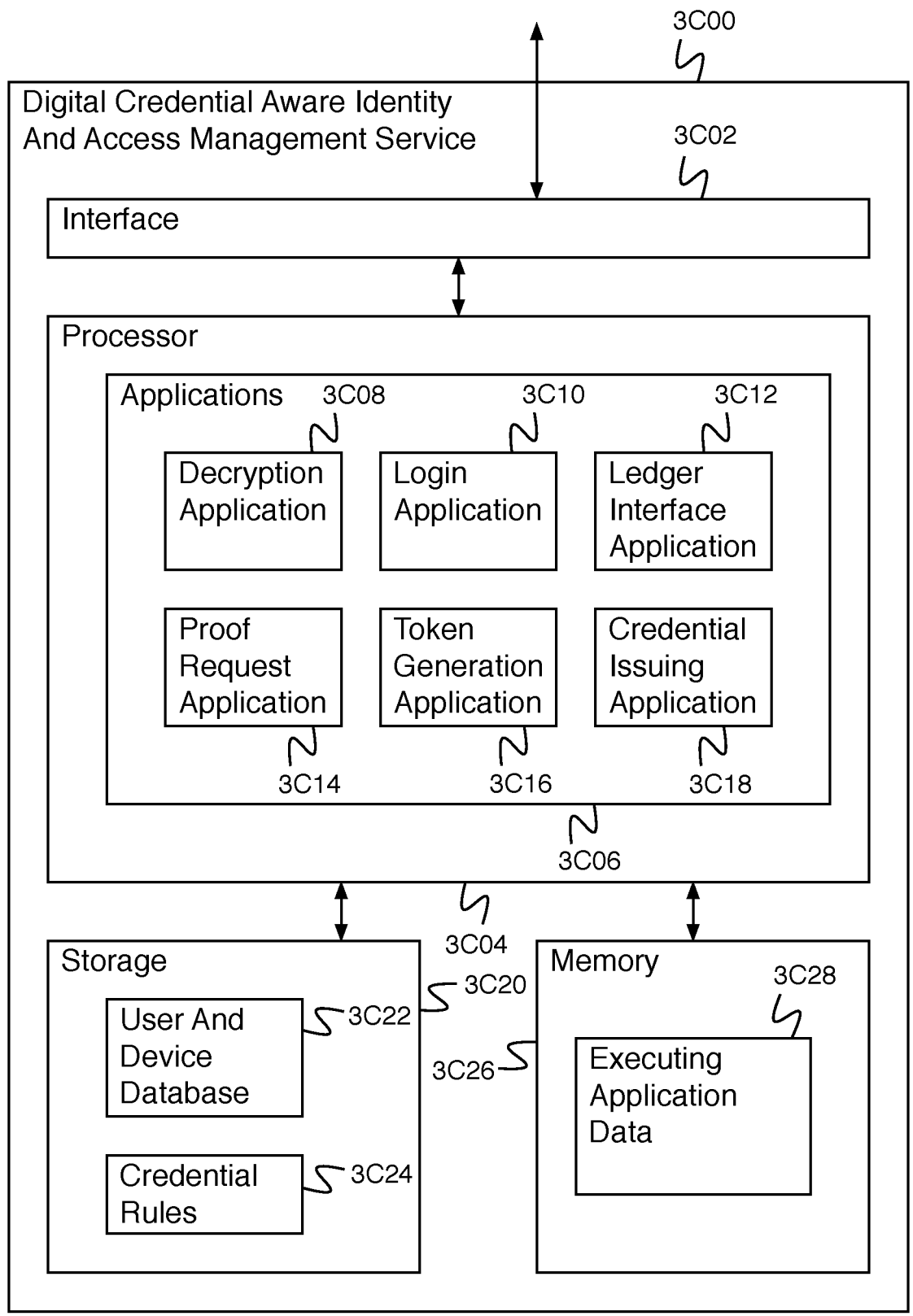
FIG. 3C is a block diagram illustrating an embodiment of a digital credential aware identity and access management service (DCIAMS).

FIG. 3C is a block diagram illustrating an embodiment of a digital credential aware identity and access management service (DCIAMS). In some embodiments, DCIAMS 3C00 comprises DCIAMS 3A06 of FIG. 3A. In the example shown, DCIAMS 3C00 comprises interface 3C02. For example, interface 3C02 comprises an interface for receiving data, providing data, receiving a request for data, etc. Processor 3C04 comprises a processor for executing applications 3C06. Applications 3C06 comprises a set of DCIAMS applications. Decryption application C308 comprises an application for decrypting encrypted data using a key. Login application 3C10 comprises an application for receiving login information (e.g., username and password, a credential, a QR code challenge, etc.) and providing login credentials (e.g., a login token). Ledger interface application 3C12 comprises an application for interacting with a distributed ledger (e.g., distributed ledger 3A04 of FIG. 3A). For example, ledger interface application 3C12 comprises an application for verifying a signature in a ledger or checking a credential identifier for revocation in a ledger. Proof request application 3C14 comprises an application for creating a proof request, sending a proof request, evaluating a proof request response (e.g., a proof response), etc. Token generation application 3C16 comprises an application for generating a login token (e.g., in response to a successful login). Credential issuing application 3C18 comprises an application for issuing a digital credential for proving a qualification in response to a request from a credential issuing authority to issue the credential. Applications 3C06 additionally comprise any other appropriate applications. For example, processor 3C04 comprises a processor configured to receive a request for authorization to access from an application, determine a set of credentials that can enable authorization to access, generate a proof request challenge, receive a proof response, determine that the proof response is valid, generate a token, and provide the token. Storage 3C20 comprises user and device database 3C22 and credential rules 3C24. User and device database 3C22 comprises a database of registered users for a given customer organization and user details (e.g., username, password hash, contact information, email address, relationship to devices, registered public keys, registered mapping documents in a distributed ledger, etc.). User and device database 3C22 additionally comprises a device directory comprising all the devices for a given customer organization as well as mapping documents associated with the devices and relationships with users associated with the devices. Credential rules 3C24 comprises a set of credential rules for determining a credential that satisfies a given access request—for example, rules related to a credential associated schema, a credential associated organization, a credential issuer, a credential associated location, a credential associated class identifier, a credential associated license number, or any other appropriate credential rules. In various embodiments, rules comprise rules related to a credential associated schema, rules related to a credential associated organization, rules related to a credential issuer, rules related to a credential associated location, rules related to a credential associated class identifier or identifier number, rules related to a credential associated license or license number, a credential associated class name, or any other appropriate credential rules. In some embodiments, the rules are applied selectively (e.g., based at least in part on a user identifier)—for example, employees with a credential can access application A, contractors with a credential can access application B, or any other appropriate matching of access with identifiers. In various embodiments, the rules are applied selectively based at least in part on current employment, employee type, location of user, qualification by training class, credential from a third party issuer (e.g., division of motor vehicle license, certification from school, etc.), or any other appropriate criterion. As examples of configurable credential rules to grant access: 1) access is granted in the event that a credential indicates that the holder is a current employee (e.g., issuing company is valid, employee status is not expired, and not revoked); 2) access is granted in the event that a credential indicates that the holder is an employee in an organization of the company (e.g., issuing company is valid, organization is specified organization, employee status is not expired, and not revoked); 3) access is granted in the event that a credential indicates that the holder is an employee in a specified location (e.g., issuing company is valid, location is a specified location, employee status is not expired, and not revoked); 4) access is granted in the event that a credential indicates that the holder has necessary training (e.g., issuing company is valid, training status is complete, employee status is not expired, and not revoked); and 5) access is granted in the event that a credential indicates that the holder has outside credential (e.g., issuing company is valid, outside credential is valid, outside credential issuer is third party, employee status is not expired, and not revoked). DCIAMS 3C00 additionally comprises memory 3C26. Memory 3C26 comprises executing application data 3C28, comprising data associated with applications 3C06.

Figure 3D:
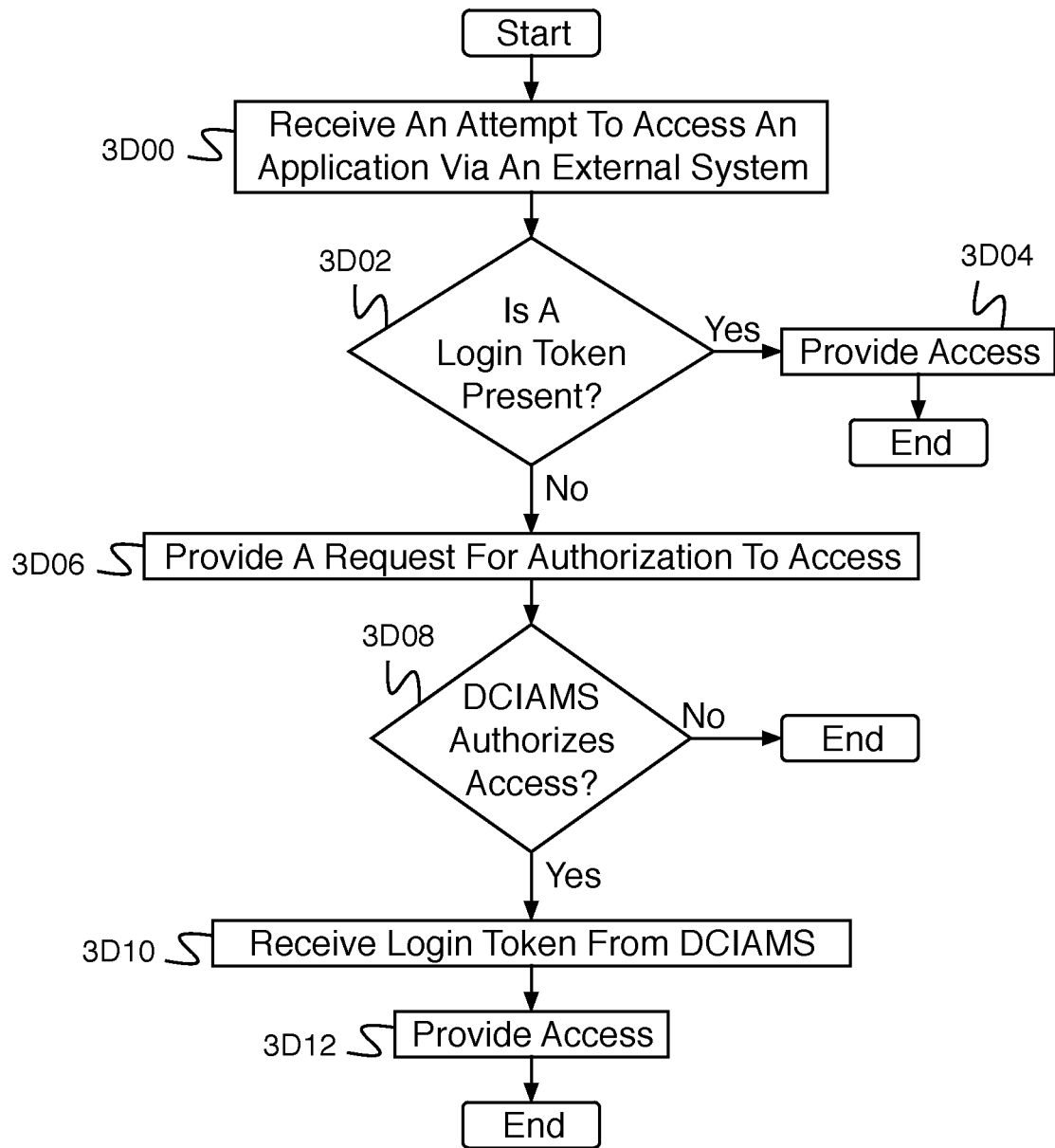
FIG. 3D is a flow diagram illustrating an embodiment of a process for authenticating a login.

FIG. 3D is a flow diagram illustrating an embodiment of a process for authenticating a login. In some embodiments, the process of FIG. 3D is executed by database system (e.g., database system 3A08 of FIG. 3A) for authenticating a login attempt from user system (e.g., user system 3A10 of FIG. 3A). In the example shown, in 3D00, an attempt is received to access an application via an external system. In 3D02, it is determined whether a login token is present. For example, the token authorizes access to the application for a user. In the event it is determined that a login token is present (e.g., as a result of a previous successful login), control passes to 3D04. In 3D04, access is provided, and the process ends. In the event it is determined in 3D02 that a login token is not present, control passes to 3D06. In 3D06, a request for authorization to access is provided. For example, an application system (e.g., a database system) provides a request for authorization to access the application system to a DCIAMS. In 3D08, it is determined whether the DCIAMS authorizes access. In the event it is determined that the DCIAMS does not authorize access (e.g., that the access attempt times out, that an indication is received indicating that the access is not authorized, etc.), the process ends. In the event it is determined in 3D08 that the DCIAMS authorizes access, control passes to 3D10. In 3D10, a login token is received from the DCIAMS. For example, the login token is stored (e.g., to authorize access to the application in a future login attempt). In 3D12, access is provided.

Figure 3E:
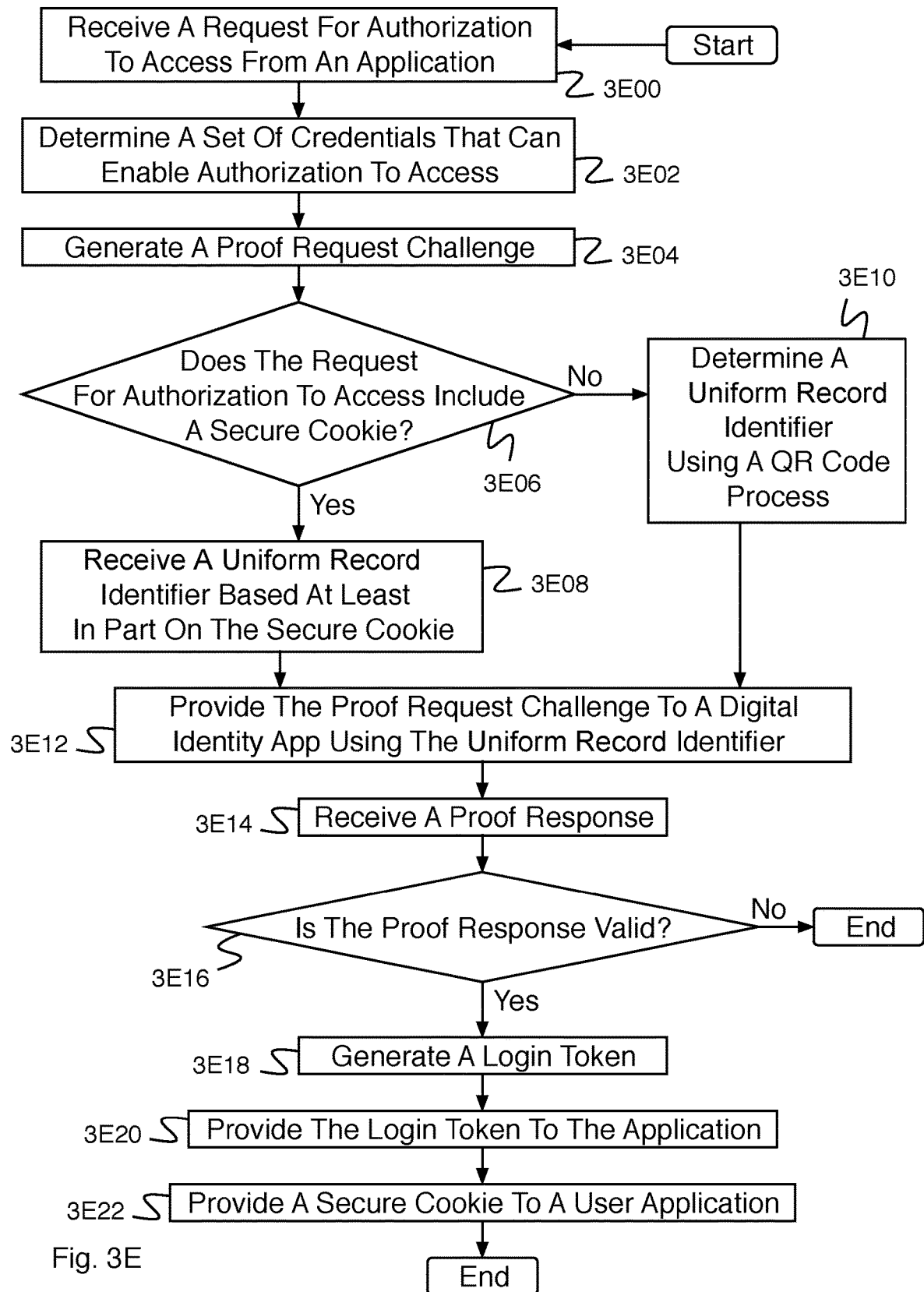
FIG. 3E is a flow diagram illustrating an embodiment of a process for credential based app authorization.

FIG. 3E is a flow diagram illustrating an embodiment of a process for credential based app authorization. In some embodiments, the process of FIG. 3E is executed by a DCIAMS (e.g., DCIAMS 3A06 of FIG. 3A) in response to access attempt redirect (e.g., access attempt redirect 3D06 of FIG. 3D). In the example shown, in 3E00, a request for authorization to access is received from an application. In 3E02, a set of credentials that can enable authorization to access is determined. For example, specific credentials are placed in the set of credentials in the event that the specific credential satisfies the rules necessary to grant access. In various embodiments, rules comprise rules related to a credential associated schema, rules related to a credential associated organization, rules related to a credential issuer, rules related to a credential associated location, rules related to a credential associated class identifier or identifier number, rules related to a credential associated license or license number, a credential associated class name, or any other appropriate credential rules. In some embodiments, the rules are applied selectively (e.g., based at least in part on a user identifier)—for example, employees with a credential can access application A, contractors with a credential can access application B, or any other appropriate matching of access with identifiers. In various embodiments, the rules are applied selectively based at least in part on current employment, employee type, location of user, qualification by training class, credential from a third party issuer (e.g., division of motor vehicle license, certification from school, etc.), or any other appropriate criterion. As examples of configurable credential rules to grant access: 1) access is granted in the event that a credential indicates that the holder is a current employee (e.g., issuing company is valid, employee status is not expired, and not revoked); 2) access is granted in the event that a credential indicates that the holder is an employee in an organization of the company (e.g., issuing company is valid, organization is specified organization, employee status is not expired, and not revoked); 3) access is granted in the event that a credential indicates that the holder is an employee in a specified location (e.g., issuing company is valid, location is a specified location, employee status is not expired, and not revoked); 4) access is granted in the event that a credential indicates that the holder has necessary training (e.g., issuing company is valid, training status is complete, employee status is not expired, and not revoked); and 5) access is granted in the event that a credential indicates that the holder has outside credential (e.g., issuing company is valid, outside credential is valid, outside credential issuer is third party, employee status is not expired, and not revoked).

In 3E04, a proof request challenge is generated. For example, the proof request challenge comprises a request for a credential of the set of credentials that can enable authorization to access. In some embodiments, generating the proof request challenge is based upon a configured set of proof request challenge rules, wherein the configured set of proof request challenge rules comprise one or more criteria which determine the set of credentials that can enable authorization to access. In some embodiments, the rule(s) comprise rule(s) that need to be satisfied to grant access similar to the rules above for the specific credential. In 3E06, it is determined whether the request for authorization to access includes a secure cookie. For example, the secure cookie comprises a secure cookie stored during a previous execution. In the event it is determined that the request for authorization to access does not include a secure cookie, control passes to 3E10. In 3E10, a uniform record identifier (URI) is determined using a quick response (QR) code process. Control then passes to 3E12. In the event it is determined in 3E06 that the request for authorization to access includes a secure cookie, control passes to 3E08. In 3E08, a uniform record identifier (URI) is received based at least in part on the secure cookie. For example, the secure cookie maps in the DCIAMS to a device id that is running the digital identity app. The DCIAMS is then able to push the URI to the digital identity app. Control then passes to 3E12. In 3E12, the proof request challenge is provided to a digital identity app using the URI. For example, the URI is used by the digital identity app to pull down the data associated with that proof request challenge from a server. The URI allows the push message or the QR encoded message to remain small and/or reasonable regardless of the content or size of the proof request challenge. In 3E14, a proof response is received. In 3E16, it is determined whether the proof response is valid. For example, the proof response is checked against information that is stored/registered in a distributed ledger (e.g., a permissioned ledger, a decentralized ledger, a public ledger, a blockchain, etc.). In the event it is determined that the proof response is not valid, the process ends. In the event it is determined that the proof response is valid, control passes to 3E18. In 3E18, a login token is generated. In 3E20, the login token is provided to the requesting application. In 3E22, a secure cookie is provided to a user application (e.g., a user application on a user system). For example, the secure cookie is provided to the user application via the requesting application.

Figure 3F:
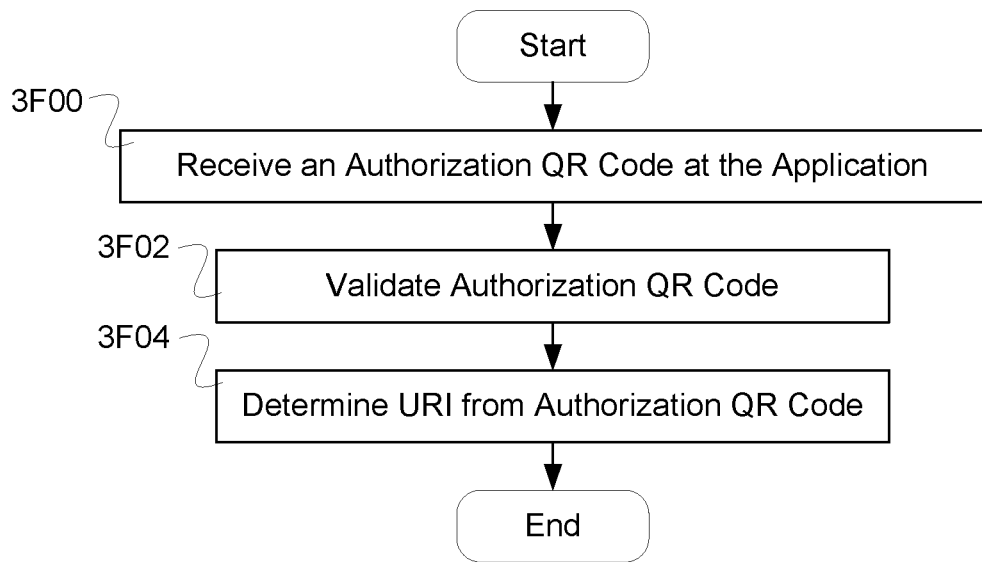
FIG. 3F is a flow diagram illustrating an embodiment of a process for determining a uniform record identifier using a QR code process.

FIG. 3F is a flow diagram illustrating an embodiment of a process for determining a uniform record identifier using a QR code process. In some embodiments, the process of FIG. 3F implements 3E10 of FIG. 3E. In the example shown, in 3F00, an authorization QR code is received at the application. In 3F02, the authorization QR code data is validated. In 3F04, a URI is determined from the authorization QR code.

Figure 3G:
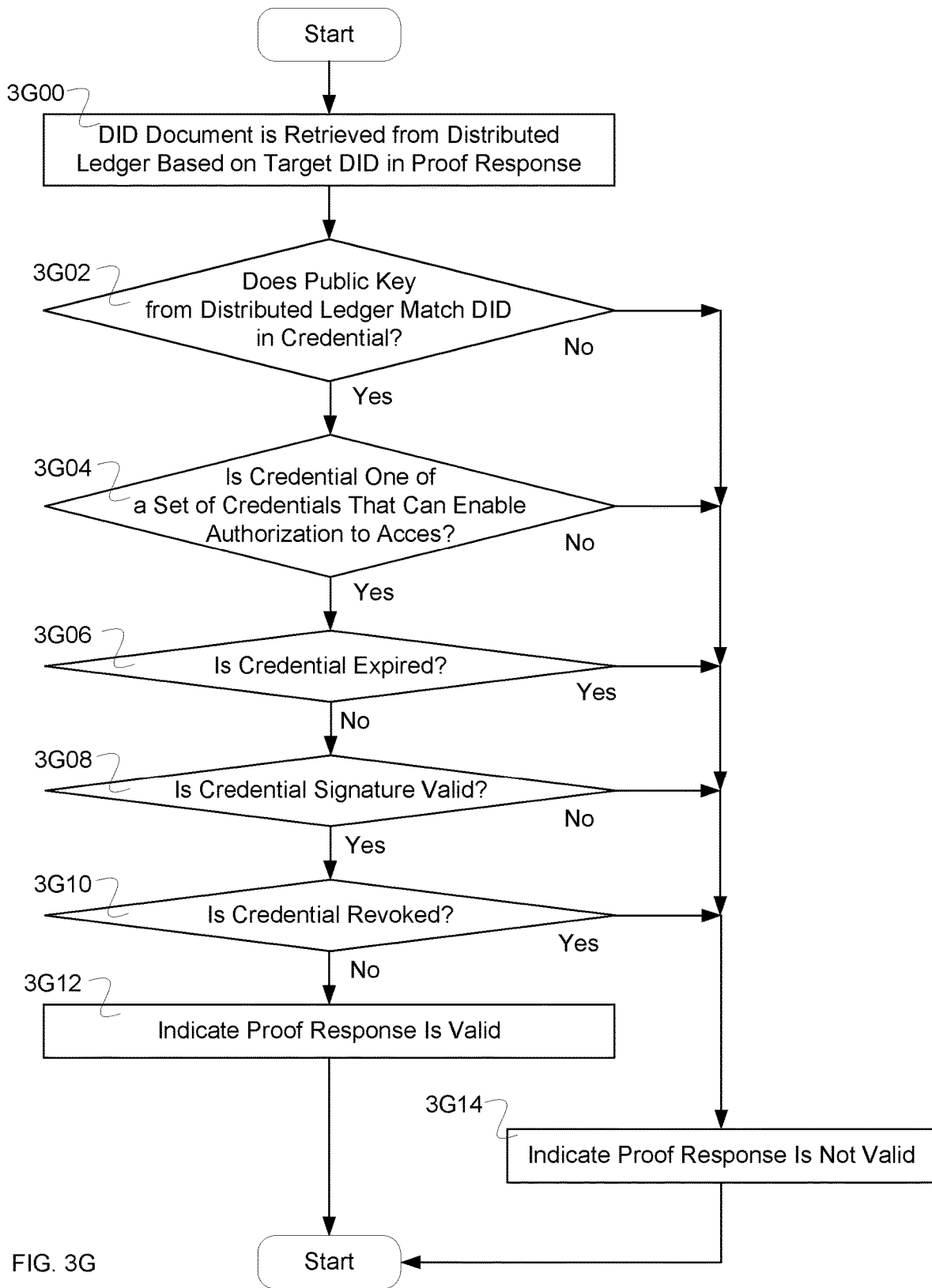
FIG. 3G is a flow diagram illustrating an embodiment of a process for determining whether a proof response is valid.

FIG. 3G is a flow diagram illustrating an embodiment of a process for determining whether a proof response is valid. In some embodiments, the process of FIG. 3G implements 3E16 of FIG. 3E. In the example shown, in 3G00, a DID document is retrieved from a distributed ledger based on target DID in proof response. In 3G02, it is determined whether a public key from a distributed ledger matches a DID (e.g., a decentralized identifier) in a credential (e.g., a credential of the proof response). In the event it is determined that a public key from a distributed ledger does not match a DID in the credential, control passes to 3G14. In the event it is determined in 3G02 that the public key from the distributed ledger matches the DID in the credential, control passes to 3G04. In 3G04, it is determined whether the credential is one of a set of credentials that can enable authorization to access. In the event it is determined that the credential is not one of the set of credentials that can enable authorization to access, control passes to 3G14. In the event it is determined in 3G04 that the credential is one of the set of credentials that can enable authorization to access, control passes to 3G06. In 3G06, it is determined whether the credential is expired. In the event it is determined that the credential is expired, control passes to 3G14. In the event it is determined in 3G06 that the credential is not expired, control passes to 3G08. In 3G08, it is determined whether the credential signature is valid. For example, determining whether the credential signature is valid uses the public key from the DID document on the ledger. In the event it is determined that the credential signature is not valid, control passes to 3G14. In the event it is determined in 3G08 that the credential signature is valid, control passes to 3G10. In 3G10, it is determined whether the credential is revoked. For example, determining that the credential is revoked comprises querying a revocation registry of a revocation database or a distributed ledger (e.g., a decentralized ledger, a permissioned ledger, a public ledger, a blockchain, etc.) In the event that the credential is revoked, control passes to 3G14. In the event that the credential is not revoked, control passes to 3G12. In 3G12, the process indicates that the proof response is valid, and the process ends. In 3G14, the process indicates that the proof response is not valid, and the process ends.

Figure 3H:
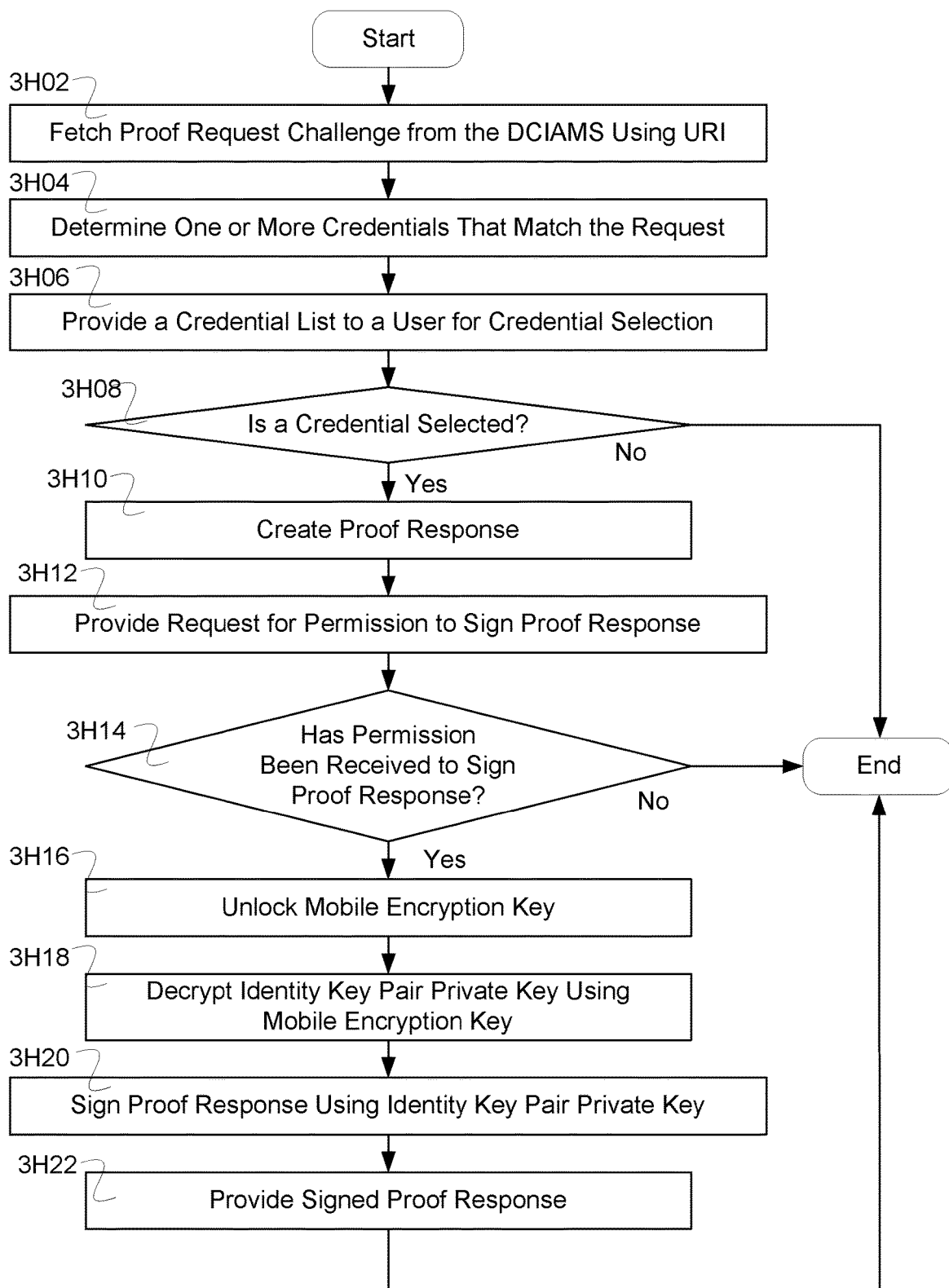
FIG. 3H is a flow diagram illustrating an embodiment of a process for a digital identity application.

FIG. 3H is a flow diagram illustrating an embodiment of a process for a digital identity application. In some embodiments, the process of FIG. 3H is executed by authentication device 3A02 of FIG. 3A. In the example shown, in 3H02, a proof request challenge is fetched from the DCIAMS using URI. For example, the URI received via a push or via a QR is used to fetch a proof request challenge, In some embodiments, the proof request challenge is fetched from a server which is not the DCIAMS. In 3H04, one or more credentials that match the request are determined. In 3H06, a credential list is provided to a user for credential selection. In 3H08, it is determined whether a credential is selected. In the event it is determined that a credential is not selected, the process ends. In the event it is determined that a credential is selected, control passes to 3H10. In 3H10, a proof response (e.g., comprising the selected one or more credentials) is created. In 3H12, a request is provided for permission to sign the proof response. In 3H14, it is determined whether permission is received to sign the proof response. In the event it is determined that permission to sign the proof response is not received, the process ends. In the event it is determined in 3H14 that permission to sign the proof response is received, control passes to 3H16. In 3H16, a mobile encryption key is unlocked. In some embodiments, unlocking the mobile encryption key requires an additional authorization—for example, the unlocking requires a biometric data or a PIN be entered by a user. In 3H18, an identity key pair private key is decrypted using the mobile encryption key. In 3H20, the proof response is signed using the identity key pair private key. In 3H22, the signed proof response is provided. In some embodiments, the signed proof response is encrypted using a per channel key.

A system for credential authentication includes and interface and a processor. The interface is configured to receive a request for authorization to access from an application. The processor is configured to determine a set of credentials that can enable authorization to access; generate a proof request challenge; receive a proof response; determine that the proof response is valid based at least in part on information stored in a distributed ledger; generate a token; and provide the token. In some embodiments, generating the proof request challenge is based upon a configured set of proof request challenge rules, wherein the configured set of proof request challenge rules comprises one or more criteria which determine the set of credentials that can enable authorization to access. In some embodiments, the proof request challenge is provided to a digital identity app. In some embodiments, the proof request challenge is provided to the digital identity app using a URI that points to the proof request challenge. In some embodiments, the digital identity app is on a mobile device. In some embodiments, the proof request challenge is provided to the mobile device using a push notification. In some embodiments, the mobile device is identified for the push notification using a secure cookie stored during a previous execution. In some embodiments, the proof request challenge is provided to the mobile device using a QR code, which comprises a URI that points to the proof request challenge. In some embodiments, the QR code is scanned by the mobile device to access the proof request challenge. In some embodiments, the proof response includes a credential. In some embodiments, the credential comprises a user selected credential. In some embodiments, the proof response is signed using a private key of an identity key pair. In some embodiments, the private key is decrypted using a mobile encryption key. In some embodiments, the mobile encryption key is accessed using a biometric. In some embodiments, the proof response is encrypted using a per channel key. In some embodiments, determining that the proof response is valid comprises determining that the proof response comprises one or more credentials of a set of credentials, wherein the set of credentials comprises credentials satisfying rules for granting access. In some embodiments, determining that the proof response is valid comprises one or more of: determining that a credential of the proof response is not expired, determining that the credential of the proof response includes a valid signature, and/or determining that a credential decentralized identifier matches a key holder associated with request. In some embodiments, determining that the proof response is valid comprises determining that a credential of the proof response is not revoked. In some embodiments, determining that the credential of the proof response is not revoked comprises querying a revocation registry of a distributed ledger. In some embodiments, the token authorizes access to the application for a user. In some embodiments, the token is stored by the application. In some embodiments, the processor is further configured to provide a secure cookie for device identification during a future execution.

Case D—Digital Credentials for User Device Authentication

A system for credential authentication comprises an interface configured to receive a request from an application for authorization to access, wherein access to the application is requested by a user using a user device, and a processor configured to provide an authentication request to the user device, receive a device credential, wherein the device credential is backed by data stored in a distributed ledger, determine a user identifier and an authentication device associated with the user based at least in part on the device credential, provide a proof request to the authentication device, receive a proof response, determine that the proof response is valid, generate a token, and provide the token to the application authorizing access for the user.

A system for digital credentials for user device authentication comprises a system for credentialing in communication with an application system, a user system, and an authentication device. A user uses the user system to access an application on the application system. For example, the user uses a web browser on the user system to access an application on the application system. The authentication system comprises a system (e.g., a mobile system, a mobile device, a smartphone, etc.) for storing authentication information (e.g., digital credentials, encryption keys, etc.) for the user. When the user attempts to access an application on the application system, the application system requests authorization to access from the system for digital credentials. The system for digital credentials provides a request to the user system for a user device authentication. In the event the user device has not authenticated recently, the user system responds to the request for user device authentication with a device credential. The device credential comprises a secure indication of the user device identity. The system for digital credentials determines the requesting user based on the device, and determines an authentication device based on the user. The system for digital credentials additionally determines a set of credentials that can be used to authenticate access to the application, creates a proof request including an indication of the set of credentials, and provides the proof request to the authentication system. The authentication system provides the user with an indication to use a credential to satisfy the proof request and to sign the proof response using an encryption key. In response to a user confirmation the authentication system creates and signs the proof response, and provides the proof response to the system for digital credentials. The system for digital credentials verifies the proof response using the distributed ledger and generates a lease key for granting access to the user device for a predetermined time period, as well as an authentication token, and provides the lease private key and the authentication token to the user device. The lease key is encrypted using the public key of the authentication device, requiring the user device to access the authentication device in order to utilize it. The authentication token is signed with the lease key allowing it to be used immediately. The user device provides the signed authentication token back as proof of authentication, and the system for digital credentials provides a login token to the application system to verify login.

Upon a second user device request to access an application on the application system during the lifetime of the lease key, the system for digital credentials provides a second request to the user system for a user device authentication. The user system determines that a valid lease key is present. In order to utilize the lease key the user system signs the encrypted lease key with the user system private key and provides the signed encrypted lease key to the authentication device. In some embodiments, in addition to signing the encrypted lease key, one more outer encryption layer(s) (e.g., a hybrid cryptographic system, a Nacl box encryption system, etc.) is/are used to protect the value during transmission from being copied or stolen. using a hybrid crypto system like Nacl box encryption so that the signed token value cannot be copied, stolen over the wire. Communication between the user device and the authentication system is performed using a proximity radio system—for example, a Bluetooth system. The authentication device checks the signature and decrypts the lease key. It then creates a new authentication token signed with the lease key, encrypts the authentication token with the user device public key, and provides the encrypted token back to the user device. The user device decrypts the token and provides the token to the system for digital credentials. In response to the token, the system for digital credentials provides a login token to the application system to verify login. Authenticating the second device request during the lifetime of the lease key thus requires proximity of the authentication system to the user system but does not require the user to provide a credential a second time.

In some embodiments, the system for credential authentication comprises a split key security model—for example, the authentication device (e.g., a user's phone) doesn't hold the encrypted session key, the user device (e.g., a user's laptop) doesn't have the key to unlock the session key, and proximity is the only thing allowing them to work together to answer challenges. In order to answer a challenge, the authentication device needs to be sitting near to the user device—for example, if the laptop is able to ping the phone, the laptop should maintain its permission to access the system; if the laptop is not able to ping the phone, the system can inform the user that the laptop is not able to respond to the challenges without the phone's decryption help. In this example, the security virtue is that a session key sits on the laptop, encrypted with a key that the laptop does not have. When a request challenge comes in that needs signing, the laptop messages the authentication device (i.e., a user's phone), which unlocks the session key, signs the request challenge, and then sends the signed challenge response back. For this system, the decrypted session private key never has to be stored on the laptop, and control is needed both of the user device with the encrypted key and the authentication device to successfully obtain authorization to gain access, but only having one of the two will not let you in.

The credential authentication system makes a computer system better by improving security and access control. The configuration of having mutually reliant components keeps the system more secure and prevents opportunistic access of the system by requiring proximity of two components (e.g., a user device and an authentication device).

Figure 4A:
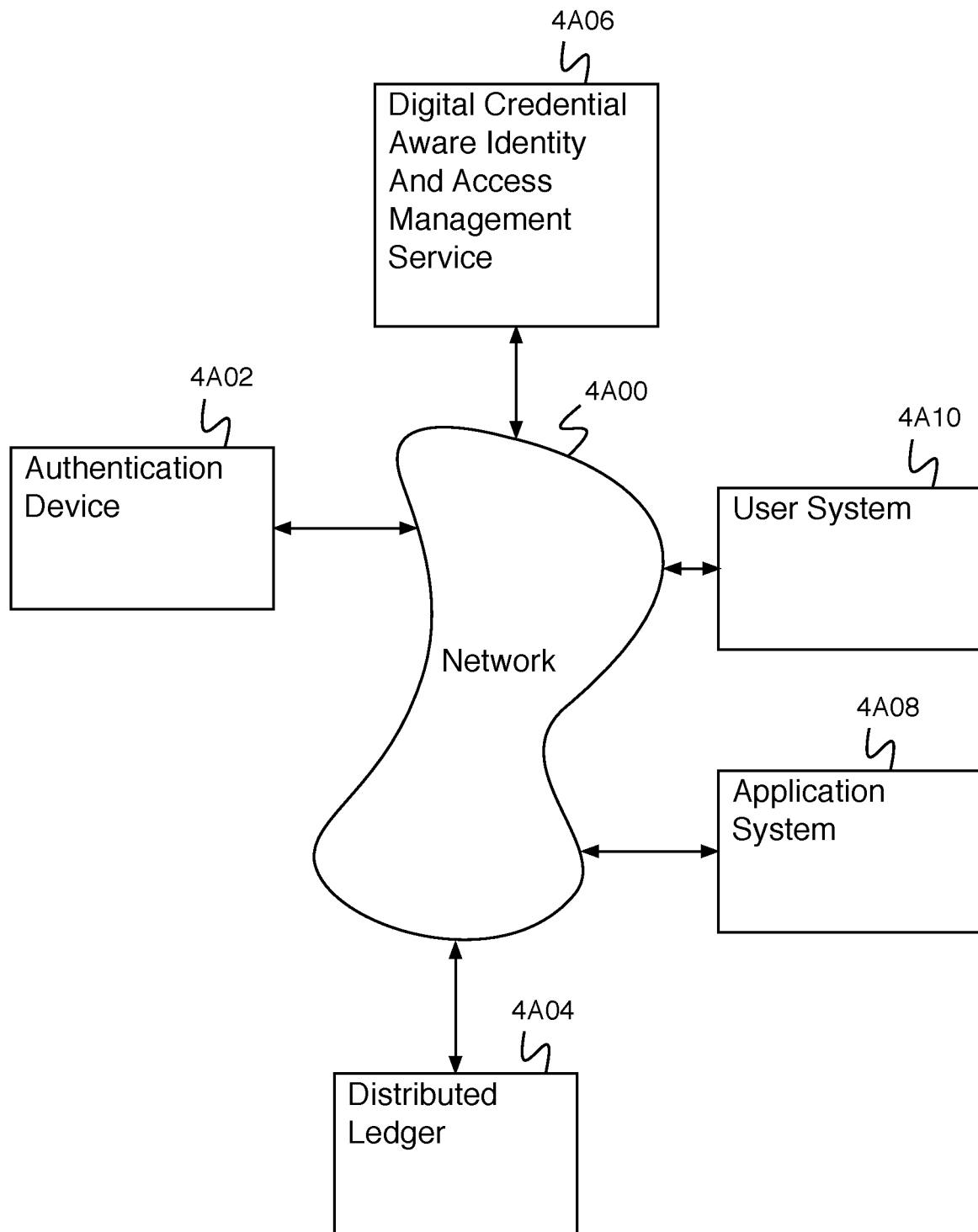
FIG. 4A is a block diagram illustrating an embodiment of a network system.

FIG. 4A is a block diagram illustrating an embodiment of a network system. In some embodiments, the network system of FIG. 4A comprises a network system for a credential system. In the example shown, FIG. 4A comprises network 4A00. In various embodiments, network 4A00 comprises one or more of the following: a local area network, a wide area network, a wired network, a wireless network, the Internet, an intranet, a storage area network, or any other appropriate communication network. Authentication device 4A02, distributed ledger 4A04, digital credential aware identity and access management service 4A06, application system 4A08, and user system communicate via network 4A00. Authentication device 4A02 comprises an authentication device associated with a user (e.g., a user of application system 4A08, a user using user system 4A10). For example, authentication device 4A02 comprises a computer, a smartphone, a tablet, a mobile device, etc. Distributed ledger 4A04 comprises a distributed ledger (e.g., a decentralized ledger, a public ledger, a permissioned ledger, a blockchain, etc.). For example, distributed ledger 4A04 is stored on a plurality of systems and comprises one or more permissioned writer systems for writing to the distributed ledger. Digital credential aware identity and access management service (DCIAMS) 4A06 comprises a system for interacting with authentication device 4A02, distributed ledger 4A04, application system 4A08, and any other appropriate systems. DCIAMS 4A06 comprises a system for coordinating a login for application system 4A08, for providing a credential to authentication device 4A02, for requesting a credential from authentication device 4A02, for verifying a user identifier or a signature in distributed ledger 4A04, etc. Application system 4A08 comprises a system for providing access to an application. For example, application system 4A08 comprises a system for providing access to a database application, a data processing application, a productivity application, a communication application, etc. A user uses user system 4A10 to access applications on application system 4A08. For example, a user uses an application on user system 4A10 (e.g., a web browser) to connect to an application on application system 4A08. The application on application system 4A08 authenticates a user login before granting access.

DCIAMS 4A06 comprises a system for using a digital credential to authenticate a login (e.g., a user login to an application system). For example, DCIAMS 4A06 comprises an interface configured to receive a request from an application for authorization to access, wherein access to the application is requested by a user using a user device, and a processor configured to provide an authentication request to the user device, receive a device credential, determine a user identifier and an authentication device associated with the user based at least in part on the device credential, provide a proof request to the authentication device, receive a proof response, determine that the proof response is valid, generate a token, and provide the token to the application authorizing access for the user.

Figure 4B:
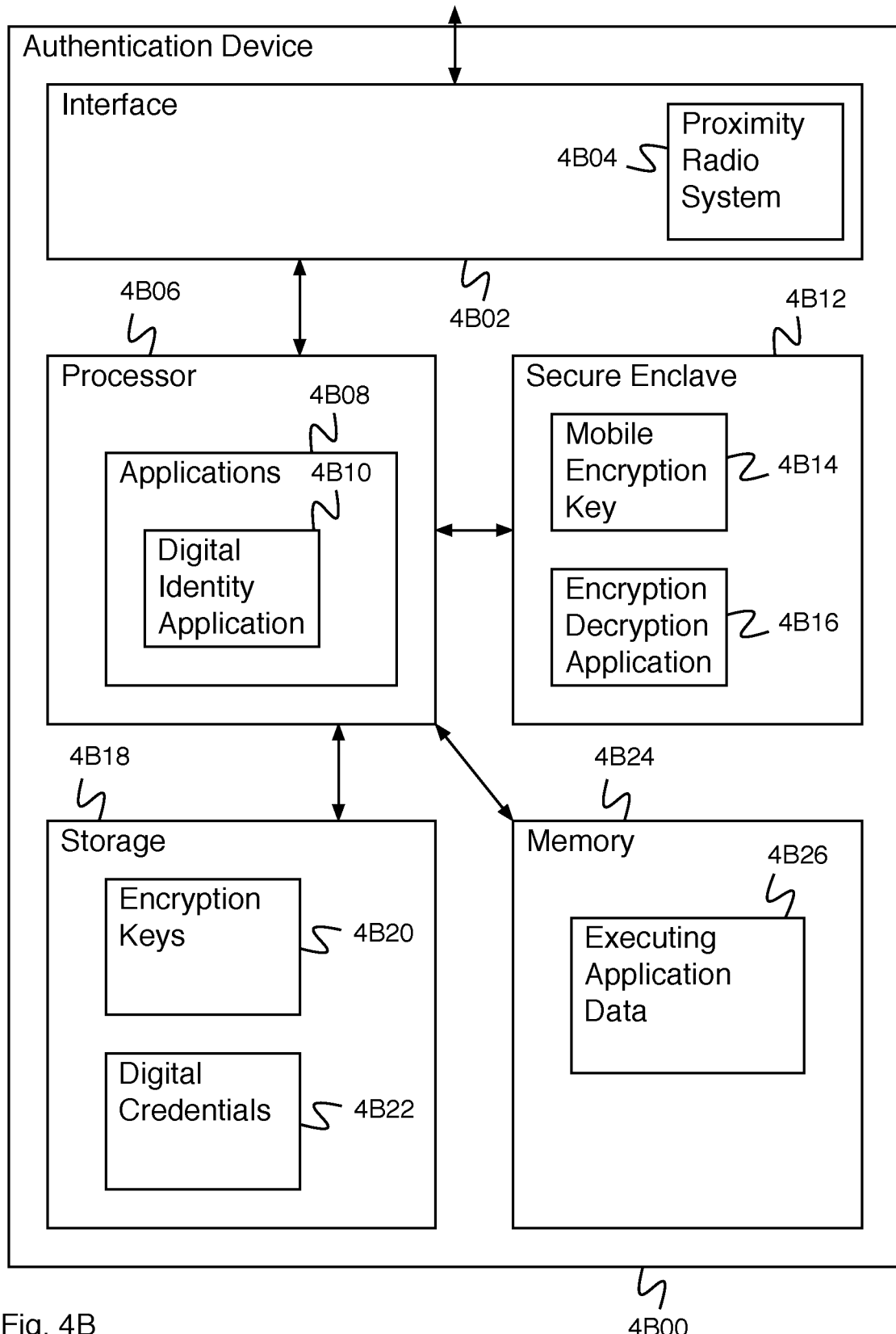
FIG. 4B is a block diagram illustrating an embodiment of an authentication device.

FIG. 4B is a block diagram illustrating an embodiment of an authentication device. In some embodiments, authentication device 4B00 of FIG. 4B comprises authentication device 4A02 of FIG. 4A. In the example shown, authentication device 4B00 comprises interface 4B02. For example, interface 4B02 comprises an interface for receiving data, providing data, receiving a request for data, etc. Interface 4B02 comprises proximity radio system 4B04. Proximity radio system 4B04 comprises a radio system for communication over a short distance. For example, proximity radio system 4B04 comprises a Bluetooth system, a Zigbee system, an ultrawideband system, a near field communication (NFC) system, an infrared communications system, a wireless personal area network system, etc. Processor 4B06 comprises a processor for executing applications 4B08. Applications 4B08 comprise digital identity application 4B10 and any other appropriate applications. Digital identity application 4B10 comprises an application for providing a proof response in response to a proof request. For example, digital identity application 4B10 comprises an application for receiving a proof request challenge from a DCIAMS (e.g., DCIAMS 4A06 of FIG. 4A), determining one or more credentials that match the request, providing a credential list to a user for credential selection, in the event it is determined that a credential is selected, creating a proof response, providing a request to sign the proof response, and in the event permission to sign the proof response is received, unlocking a mobile encryption key, decrypting an identity key pair private key using the mobile encryption key, signing the proof response using the identity key pair private key, and providing the signed proof response. Digital identity application 4B10 additionally comprises an application for receiving (e.g., via proximity radio system 4B04) a request comprising an authentication token and a lease key encrypted with an authentication device public key and signed with a user device private key, determining whether the user device signature is valid, and in response to a determination that the user device signature is valid, decrypting the lease key and the authentication token, signing the authentication token with the lease key, encrypting the signed authentication token with the user device public key, and providing (e.g., via proximity radio system 4B04) the encrypted signed authentication token to the user device. For example, prior to utilizing digital identity application 4B10, authentication device 4B00 requires the user to login.

Secure enclave 4B12 comprises a secure system for storing a mobile encryption key. Secure enclave 4B12 comprises mobile encryption key 4B14 and encryption decryption application 4B16. For example, secure enclave 4B12 comprises multiple mobile encryption keys, an application for generating and/or removing mobile encryption keys, etc. Secure enclave 4B12 comprises a system for receiving data, transforming it by encrypting and/or decrypting the data using a mobile encryption key or keys, and providing the transformed data. For example, secure enclave 4B12 is configured to only provide transformed input data and not to provide mobile encryption key 4B14. In some embodiments, functionality of secure enclave 4B12 is access limited using a biometric (e.g., a fingerprint, a retina scan, a DNA scan, etc.) or a personal identification number (PIN). Authentication device 4B00 additionally comprises storage 4B18. Storage 4B18 comprises encryption keys 4B20—for example, comprising a public key of an identity key pair, a private key of an identity key pair, a private key of an identity key pair encrypted using mobile encryption key 4B14, etc. For example, an identity key pair of authentication device 4B00 comprises a public key used by other systems for encrypting data in such a way that it can only by decrypted by authentication device 4B00, and a private key for decrypting data encrypted using the public key or for signing data for proving it came from authentication device 4B00. Storage 4B18 additionally comprises digital credentials 4B22, comprising digital certificates representing qualifications (e.g., a college degree, work experience, time living at an apartment, time enrolled in a health insurance plan, etc.). For example, digital credentials 4B22 comprises a credential wallet. In some embodiments, digital credentials 4B22 comprises a locked digital wallet able to be unlocked by a user. For example, digital credentials 4B22 are unlocked using a biometric or a PIN. Once the locked digital wallet is unlocked, a credential is retrieved. Authentication device 4B00 additionally comprises memory 4B24. Memory 4B24 comprises executing application data 4B26, comprising data associated with applications 4B08.

Figure 4C:
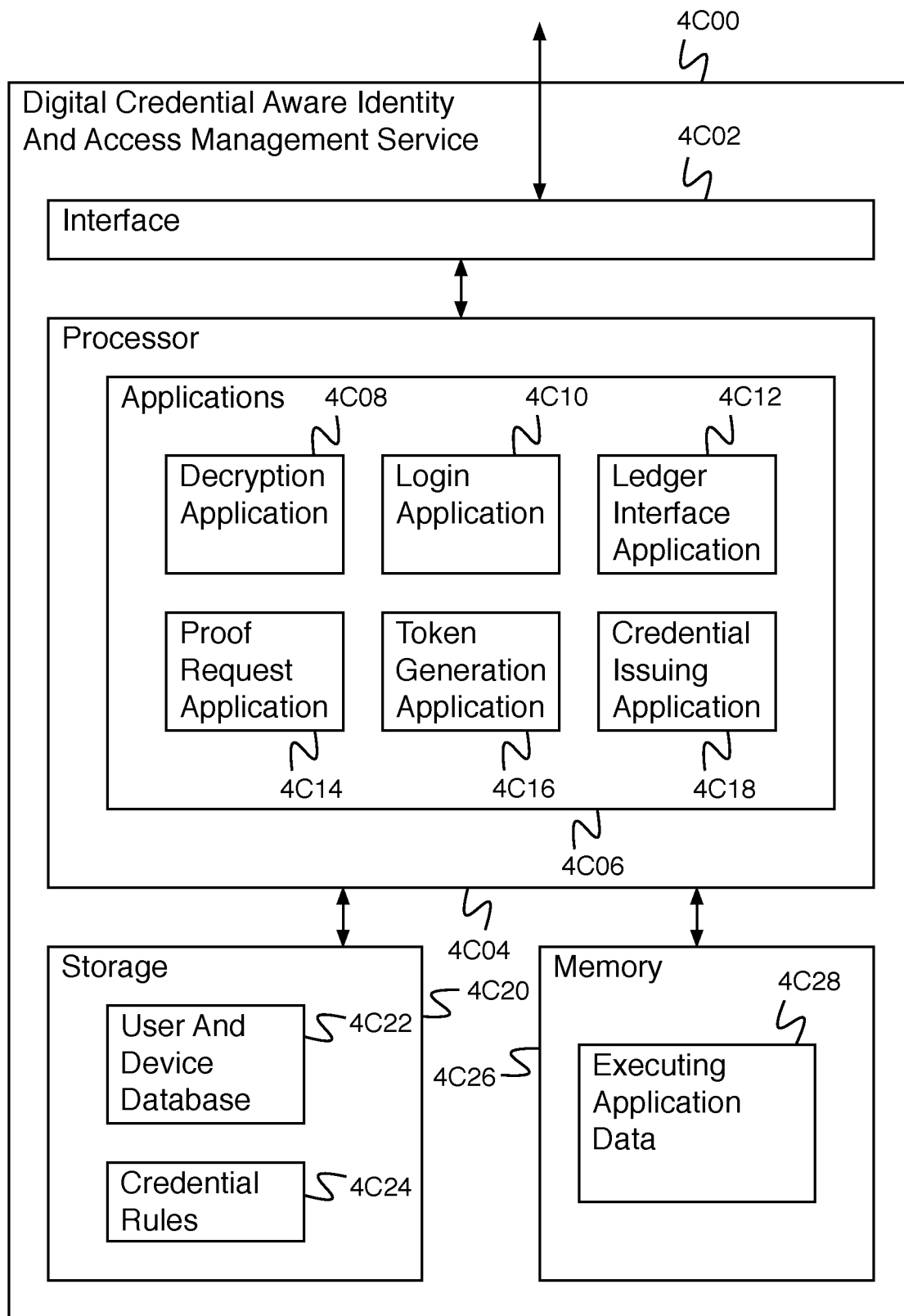
FIG. 4C is a block diagram illustrating an embodiment of a digital credential aware identity and access management service.

FIG. 4C is a block diagram illustrating an embodiment of a digital credential aware identity and access management service. In some embodiments, digital credential aware identity and access management service (DCIAMS) 4C00 comprises DCIAMS 4A06 of FIG. 4A. In the example shown DCIAMS 4C00 comprises interface 4C02. For example, interface 4C02 comprises an interface for receiving data, providing data, receiving a request for data, receive a request from an application for authorization to access, etc. Processor 4C04 comprises a processor for executing applications 4C06. Applications 4C06 comprises a set of DCIAMS applications. Decryption application 4C08 comprises an application for decrypting encrypted data using a key. Login application 4C10 comprises an application for receiving login information (e.g., username and password, a credential, a quick response (QR) code challenge, etc.) and providing login credentials (e.g., a login token). Ledger interface application 4C12 comprises an application for interacting with a distributed ledger (e.g., distributed ledger 4A04 of FIG. 4A). For example ledger interface application 4C12 comprises an application for verifying a signature in a ledger or checking a credential identifier for revocation in a ledger. Proof request application 4C14 comprises an application for creating a proof request, sending a proof request, evaluating a proof request response (e.g., a proof response), etc. Token generation application 4C16 comprises an application for generating a login token (e.g., in response to a successful login). Credential issuing application 4C18 comprises an application for issuing a digital credential for proving a qualification in response to a request from a credential issuing authority to issue the credential. Applications 4C06 additionally comprise any other appropriate applications. For example, processor 4C04 comprises a processor configured to provide an authentication request to the user device, receive a device credential, determine a user identifier and an authentication device associated with the user based at least in part on the device credential, provide a proof request to the authentication device, receive a proof response, determine that the proof response is valid using a distributed ledger, generate a token, and provide the token to the application authorizing access for the user. Storage 4C20 comprises user and device database 4C22 and credential rules 4C24. User and device database 4C22 comprises a database of registered users for a given customer organization and user details (e.g., username, password hash, contact information, email address, relationship to devices, registered public keys, registered mapping documents in a decentralized ledger, etc.). User and device database 4C22 additionally comprises a device directory comprising all the devices for a given customer organization as well as mapping documents associated with the devices and relationships with users associated with the devices. Credential rules 4C24 comprises a set of credential rules for determining a credential that satisfies a given access request, for example rules related to a credential associated schema, a credential associated organization, a credential issuer, a credential associated location, a credential associated class identifier, a credential associated license number, or any other appropriate credential rules. In various embodiments, rules comprise rules related to a credential associated schema, rules related to a credential associated organization, rules related to a credential issuer, rules related to a credential associated location, rules related to a credential associated class identifier or identifier number, rules related to a credential associated license or license number, a credential associated class name, or any other appropriate credential rules. In some embodiments, the rules are applied selectively (e.g., based at least in part on a user identifier)—for example, employees with a credential can access application A, contractors with a credential can access application B, or any other appropriate matching of access with identifiers. In various embodiments, the rules are applied selectively based at least in part on current employment, employee type, location of user, qualification by training class, credential from a third party issuer (e.g., division of motor vehicle license, certification from school, etc.), or any other appropriate criterion. As examples of configurable credential rules to grant access: 1) access is granted in the event that a credential indicates that the holder is a current employee (e.g., issuing company is valid, employee status is not expired, and not revoked); 2) access is granted in the event that a credential indicates that the holder is an employee in an organization of the company (e.g., issuing company is valid, organization is specified organization, employee status is not expired, and not revoked); 3) access is granted in the event that a credential indicates that the holder is an employee in a specified location (e.g., issuing company is valid, location is a specified location, employee status is not expired, and not revoked); 4) access is granted in the event that a credential indicates that the holder has necessary training (e.g., issuing company is valid, training status is complete, employee status is not expired, and not revoked); and 5) access is granted in the event that a credential indicates that the holder has outside credential (e.g., issuing company is valid, outside credential is valid, outside credential issuer is third party, employee status is not expired, and not revoked). DCIAMS 4C00 additionally comprises memory 4C26. Memory 4C26 comprises executing application data 4C24, comprising data associated with applications 4C06.

Figure 4D:
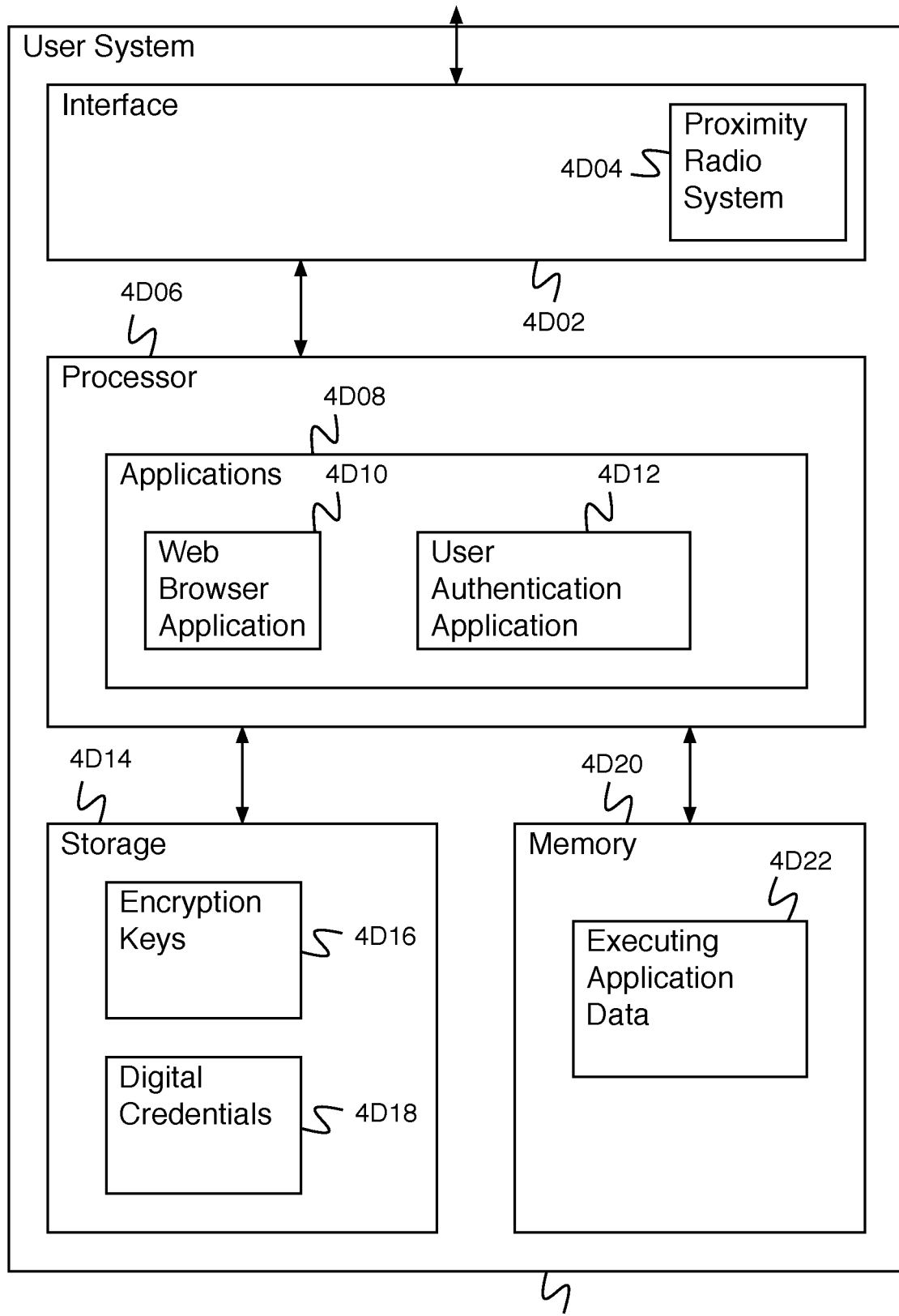
FIG. 4D is a block diagram illustrating an embodiment of a user system.

FIG. 4D is a block diagram illustrating an embodiment of a user system. In some embodiments, user system 4D00 of FIG. 4D comprises user system 4A10 of FIG. 4A. In the example shown, user system 4D00 comprises interface 4D02. For example, interface 4D02 comprises an interface for receiving data, providing data, receiving a request for data, etc. Interface 4D02 comprises proximity radio system 4D04. Proximity radio system 4D04 comprises a radio system for communication over a short distance. For example, proximity radio system 4D04 comprises a Bluetooth system, a Zigbee system, an ultrawideband system, an infrared communications system, a near field communication (e.g., NFC) system, a wireless personal area network system, etc. Processor 4D06 comprises a processor for executing applications 4D08. Applications 4D08 comprise web browser application 4D10, user authentication application 4D12, and any other appropriate applications. Web browser application 4D10 comprises a web browser application for accessing remote systems via a web protocol. User authentication application 4D12 comprises an application for executing a user authentication process. For example, user authentication application 4D12 comprises an application for receiving a request to access a network application, providing a request to the application server to access the application, receiving an authentication request from a DCIAMS, determining whether a session key is present (e.g., in encryption keys 4D16), in the event a session key is stored signing in using a proximity authentication device (e.g., an authentication device in communication using proximity radio system 4D04), in the event a session key is not stored providing a proof response comprising a user device credential, receiving an authentication response including an encrypted session key and an authentication token, encrypted with a user system public key, decrypting the authentication response, storing the encrypted session key, and providing the authentication token to the DCIAMS. In some embodiments, user authentication application 4D12 comprises a special form of application that is a kernel level driver able to intercept and act as a universal second factor (U2F) device. In some embodiments, the kernel level driver is able to perform some input-output level interaction beyond what a normal application would be able to. In some embodiments, the kernel level driver is a privileged process.

User system 4D00 additionally comprises storage 4D14. Storage 4D14 comprises encryption keys 4D16, for example comprising a public key of an identity key pair, a private key of an identity key pair, a session key, etc. For example, an identity key pair of user system 4D00 comprises a public key used by other systems for encrypting data in such a way that it can only by decrypted by user system 4D00, and a private key for decrypting data encrypted using the public key or for signing data for proving it came from user system 4D00. Storage 4D14 additionally comprises digital credentials 4D18, comprising digital certificates representing qualifications (e.g., a college degree, work experience, time living at an apartment, time enrolled in a health insurance plan, etc. User system 4D00 additionally comprises memory 4D20. Memory 4D20 comprises executing application data 4D22, comprising data associated with applications 4D08.

Figure 4E:
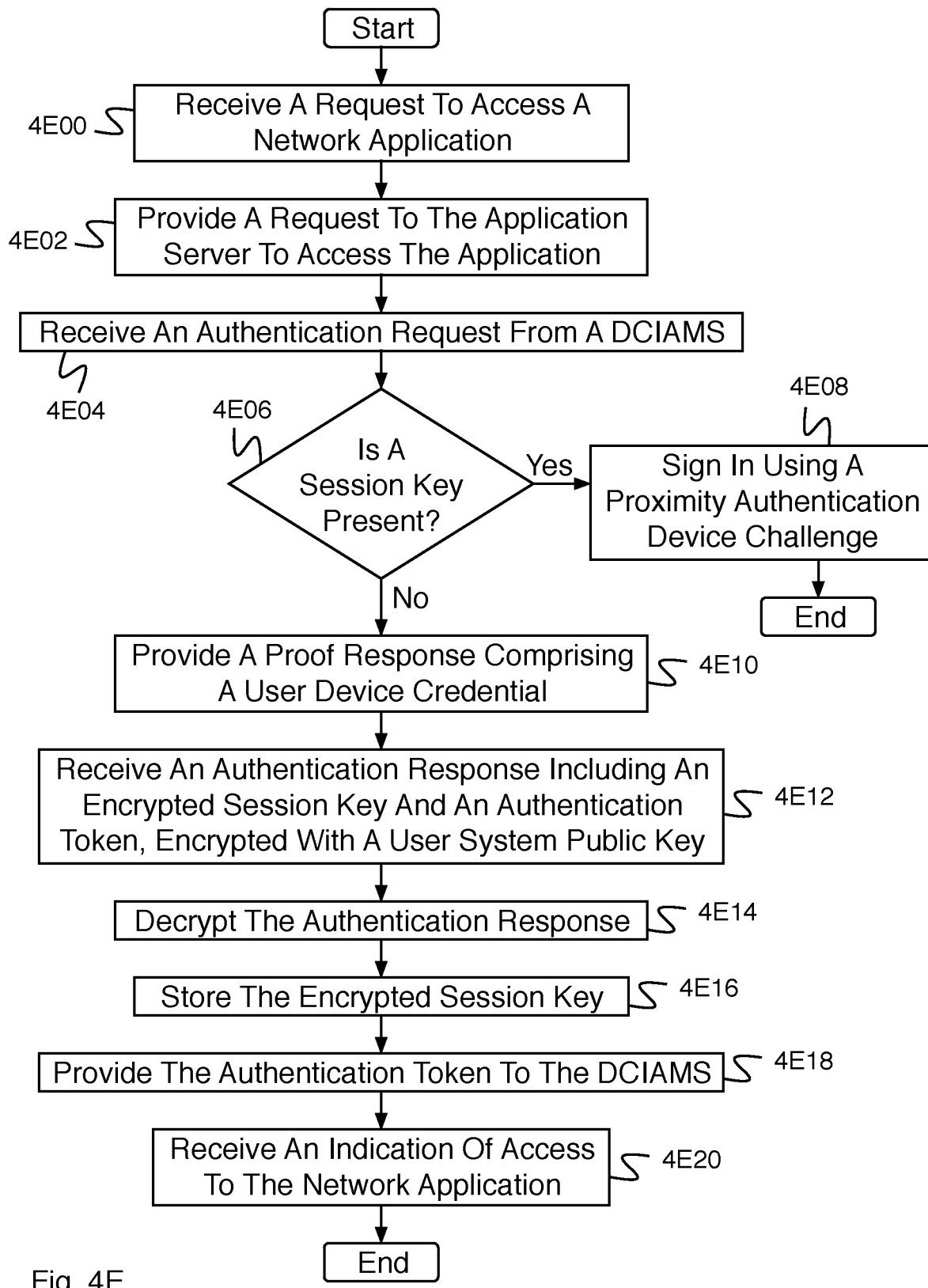
FIG. 4E is a flow diagram illustrating an embodiment of a process for accessing a network application.

FIG. 4E is a flow diagram illustrating an embodiment of a process for accessing a network application. In some embodiments, the process of FIG. 4E is executed by user device 4D00 of FIG. 4D. In the example shown, in 4E00, a request is received to access a network application. In 4E02, a request is provided to the application server to access the application. In 4E04, an authentication request is received from a DCIAMS. For example, the authentication request comprises a universal second factor (e.g., U2F) authentication request. In 4E06, it is determined whether there is a session key present (e.g., stored on the user system). In the event it is determined that a session key is present, control passes to 4E08. In 4E08, the system signs in using a proximity authentication device challenge, and the process ends. In the event it is determined in 4E06 that a session key is not present, control passes to 4E10. In 4E10, a proof response is provided comprising a user device credential. For example, a user device credential that is backed by data stored in a distributed ledger is provided as the proof response. In various embodiments, the distributed ledger comprises one or more of the following: a permissioned ledger, a decentralized ledger, a public ledger, a blockchain, or any other appropriate ledger. In 4E12, an authentication response is received including an encrypted session key and an authentication token, encrypted with a user system public key. In 4E14, the authentication response is decrypted. In 4E16, the encrypted session key is stored. In 4E18, the authentication token is provided to the DCIAMS. In 4E20, an indication of access to the network application is received.

Figure 4F:
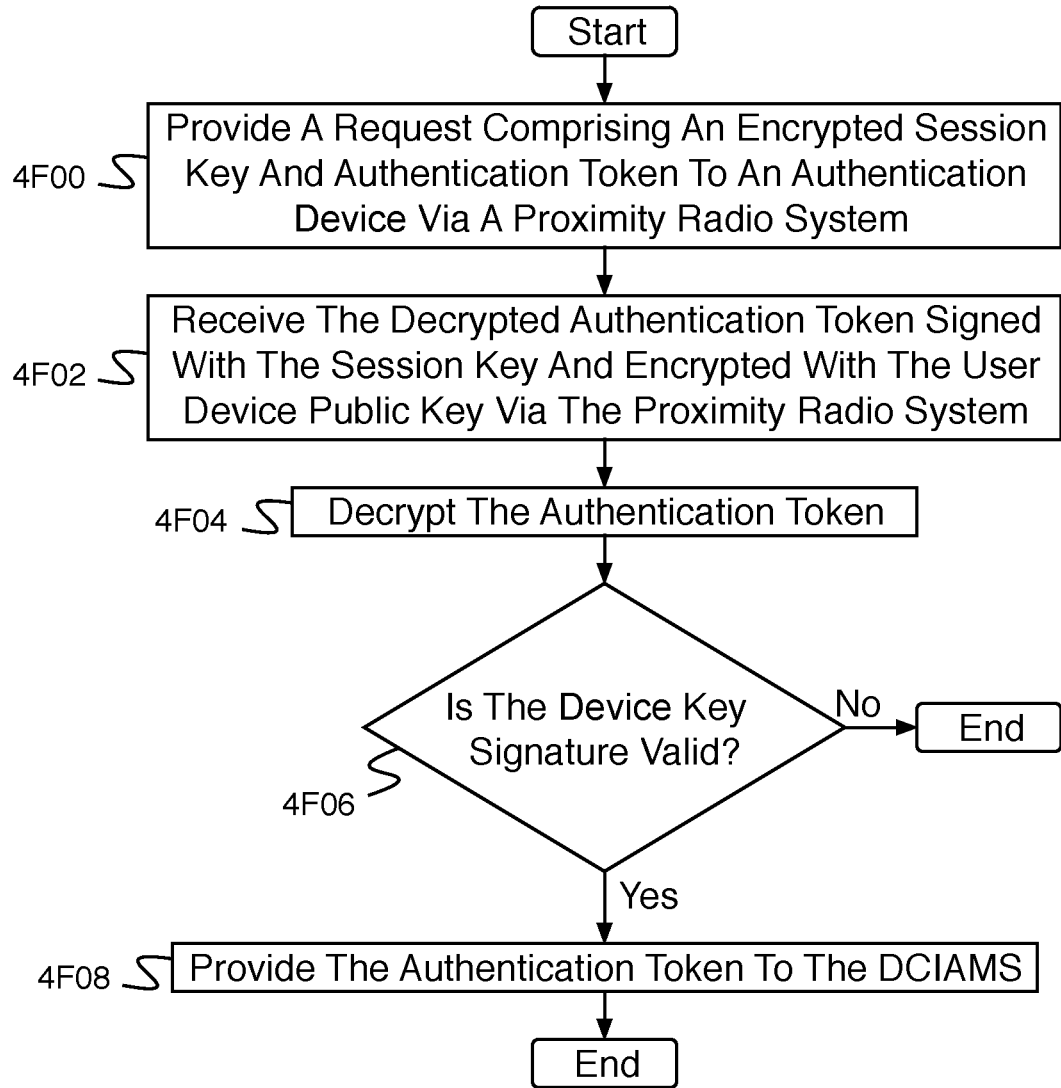
FIG. 4F is a flow diagram illustrating an embodiment of a process for signing in using a proximity authentication device challenge.

FIG. 4F is a flow diagram illustrating an embodiment of a process for signing in using a proximity authentication device challenge. In some embodiments, the process of FIG. 4F implements 4E08 of FIG. 4E. In the example shown, in 4F00, a request is provided comprising an encrypted session key and authentication token to an authentication device via a proximity radio system. For example, the authentication token comprises a raw challenge that the DCIAMS sent via U2F to the browser on the user device and is being provided to the authentication device so it can be signed. In 4F02, the decrypted authentication token is received signed with the session key and encrypted with the user device public key via the proximity radio system. For example, the authentication device decrypts the session key, signs the challenge, and encrypts the challenge to send back to the user device. In 4F04, the authentication token is decrypted. In 4F06, it is determined whether the device key signature is valid. For example, the In the event it is determined that the device key signature is not valid, the process ends. In the event it is determined that the device key signature is valid, control passes to 4F08. In 4F08, the authentication token is provided to the DCIAMS. For example, the user device then replies via the U2F protocol to the DCIAMS, which determines that the challenge is signed correctly and matches the session key and then indicates to the application that access is authorized.

Figure 4G:
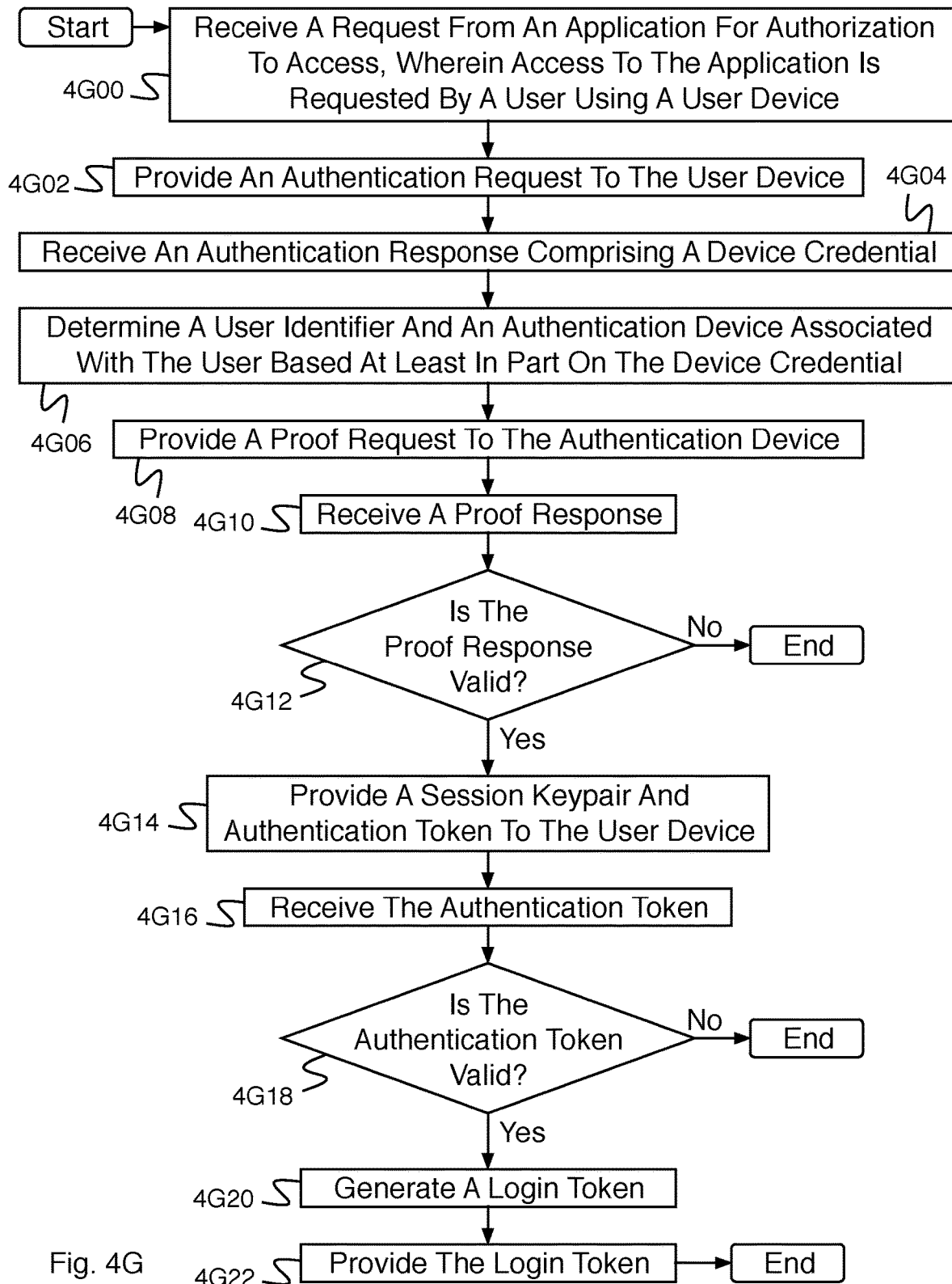
FIG. 4G is a flow diagram illustrating an embodiment of a process for credential based authorization.

FIG. 4G is a flow diagram illustrating an embodiment of a process for credential based authorization. In some embodiments, the process of FIG. 4G is executed by DCIAMS 4C00 of FIG. 4C. In the example shown, in 4G00, a request is received from an application for authorization to access, wherein access to the application is requested by a user using a user device. In 4G02, an authentication request is provided to the user device. For example, the authentication request comprises a universal second factor (e.g., U2F) authentication request. In some embodiments, the U2F authentication request comprises a presigned token from the DCIAMS. In 4G04, an authentication response comprising a device credential is received. For example, the authentication response from the user device is received and checked to make sure that the response is valid, wherein validating the authentication response comprises checking a device signature of the authentication response. In 4G06, a user identifier and an authentication device associated with the user are determined based at least in part on the device credential. In 4G08, a proof request is provided to the authentication device. For example, the DCIAMS creates the proof request. In some embodiments, the proof request comprises a request for one or more credentials of a set of credentials (e.g., a set of credentials that can enable authorization to access). In some embodiments, the DCIAMS is further configured to determine the set of credentials that can enable authorization to access (e.g., using a set of rules). In 4G10, a proof response is received. For example, the proof response comprises a credential retrieved from a credential wallet wherein the credential retrieved from the credential wallet is based at least in part on rules specified in the proof request. In some embodiments, the proof response is signed with an authentication device private key. In 4G12, it is determined whether the proof response is valid. For example, determining that the proof response is valid comprises determining that a credential is not revoked and/or determining that a credential signature is valid by checking the credential against information stored in the distributed ledger.

In the event it is determined that the proof response is not valid, the process ends. In the event it is determined that the proof response is valid, control passes to 4G14. In 4G14, a session keypair and authentication token are provided to the user device. For example, the private key of the session keypair is encrypted using an authentication device public key and the authentication token is signed using the session keypair private key. In 4G16, the authentication token is received. For example, the authentication token comprises an authentication response. In 4G18, it is determined whether the authentication token (e.g., the authentication response) is valid. In the event it is determined that the authentication token is not valid, the process ends. In the event it is determined that the authentication token is valid, control passes to 4G20. In 4G20, a login token is generated. In 4G22, the login token is provided (e.g., to an application system).

Figure 4H:
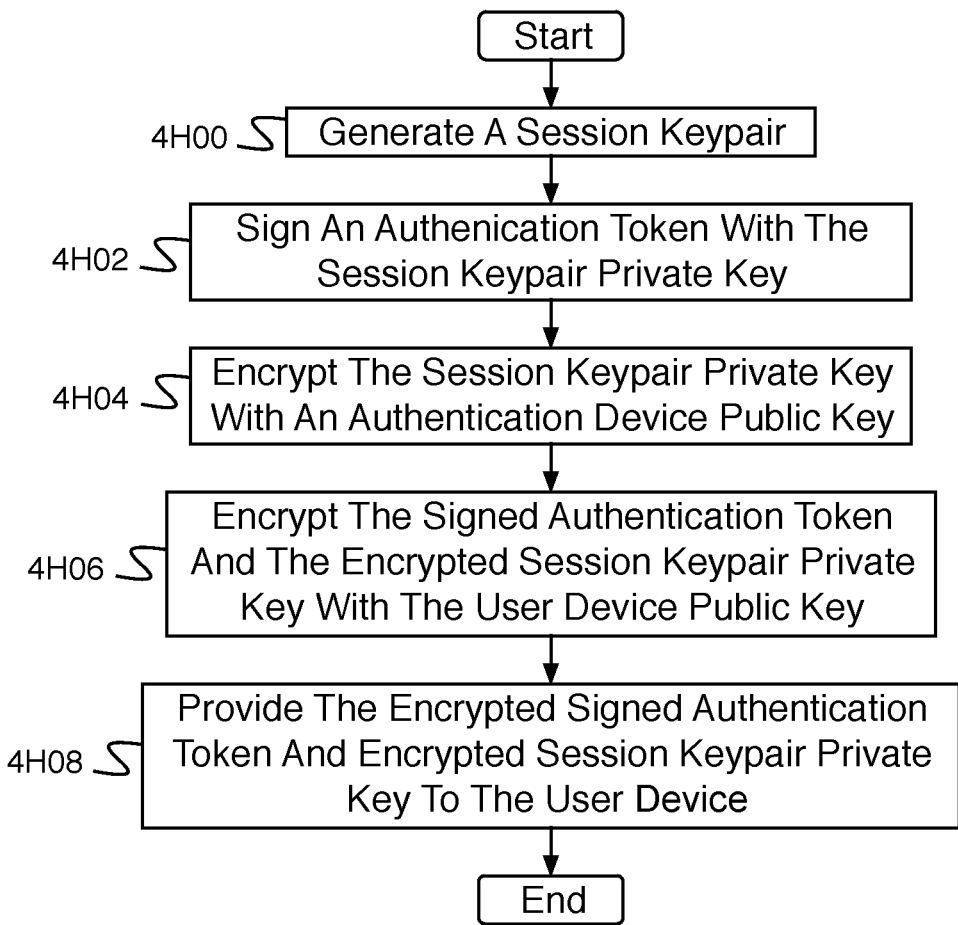
FIG. 4H is a flow diagram illustrating an embodiment of a process for providing a session keypair and authentication token to a user device.
Figure 41:
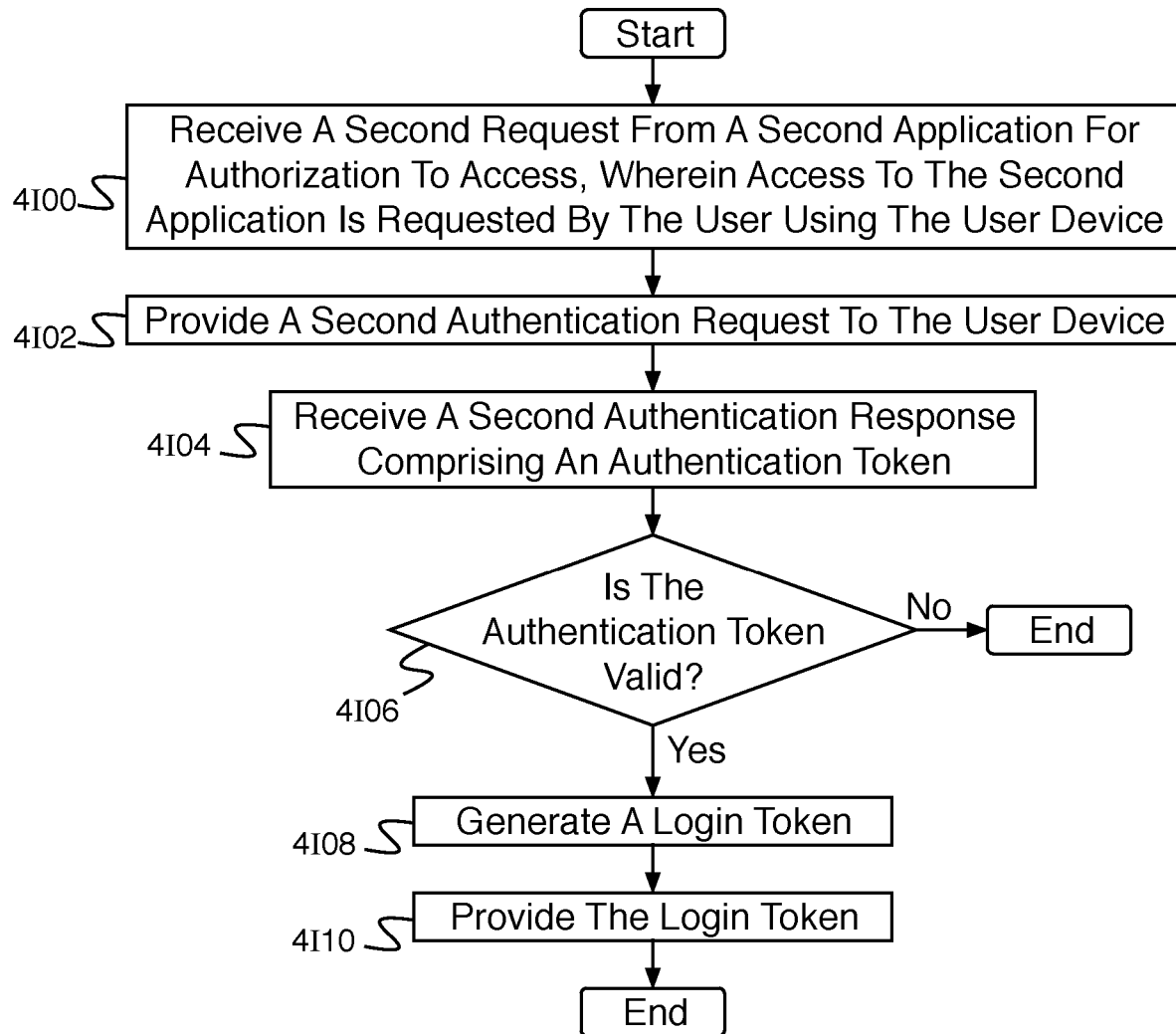

FIG. 4H is a flow diagram illustrating an embodiment of a process for providing a session keypair and authentication token to a user device. In some embodiments, the process of FIG. 4H implements 4G14 of FIG. 4G. In the example shown, in 4H00, a session keypair is generated. For example, the session keypair is associated with the pairing of the user and the user device. In some embodiments, the session keypair is associated with a time period, for example, 1 month, 1 week, 1 day, 1 hour, 1 minute, etc. In some embodiments, the time period is configurable by an administrator of a DCIAMS. In 4H02, an authentication token is signed with the session keypair private key. In 4H04, the session keypair private key is encrypted with an authentication device public key. In 4H06, the signed authentication token and the encrypted session keypair private key are encrypted with the user device public key. In 4H08, the encrypted signed authentication token and encrypted session keypair private key are provided to the user device. In some embodiments, the encrypted session keypair public key component is stored (e.g., in a storage device for session leases).

FIG. 4I is a flow diagram illustrating an embodiment of a process for a credential challenge. In some embodiments, the process of FIG. 4I is executed by DCIAMS 4C00 of FIG. 4C in response to a second request. In the example shown, in 4I00, a second request for authorization to access is received from a second application, wherein access to the second application is requested by the user using the user device. In 4I02, a second authentication request (e.g., a second U2F authentication request) is provided to the user device. For example, the second authentication request (e.g., a U2F challenge) is received from the DCIAMS at the user device. The second authentication request is intercepted by a kernel plugin running on the user device. In some embodiments, the kernel plugin is running at the OS level as a privileged process, not in the context of any given browser. The kernel plugin is able to detect whether there is a session key (e.g., the encrypted private key component of the session keypair) available, and in the event that there is a session key available, encrypts (using a user device key) a message to a nearby authentication device (e.g., a user's phone) using a proximity communication protocol. In various embodiments, a proximity communication protocol comprises a Bluetooth protocol, a near field communication (NFC) protocol, or any other appropriate communication protocol. The session key as stored on the user device is encrypted with the authentication device public key so the user device sends it via the proximity communication protocol to the authentication device to have the session key decrypted. The authentication device returns the session key decrypted to the user device and the authentication response (e.g., signed with a private key component of the session keypair) is generated using the decrypted private key component of the session key and is passed back to the DCIAMS as the authentication response. The authentication token comprises a challenge request/challenge response using U2F. The authentication token comprises a split key scenario to unlock the session key and sign the challenge response. This can be thought of as a server saying "sign hello" and then being responded to as "signed(hello)". For example, a user device passes the challenge request to "sign hello" and the encrypted session private key to authentication device via a proximity communication protocol, so that the authentication device can automatically produce and return "signed (hello)". In 4I04, an authentication response comprising an authentication token is received. For example, the authentication token is signed with a private key component of a session keypair. In 4I06, it is determined whether the authentication token is valid. For example, the authentication token is checked to see whether the session key matches a stored session key on the DCIAMS and that the authentication token is appropriately signed for the U2F challenge response. In the event it is determined that the authentication token is not valid, the process ends. In the event it is determined that the authentication token is valid, control passes to 4I08. In 4I08, a login token is generated. For example, the login token enabling access to the second application. In 4I10, the login token is provided. For example, the login token is provided the second application.

Figure 4J:
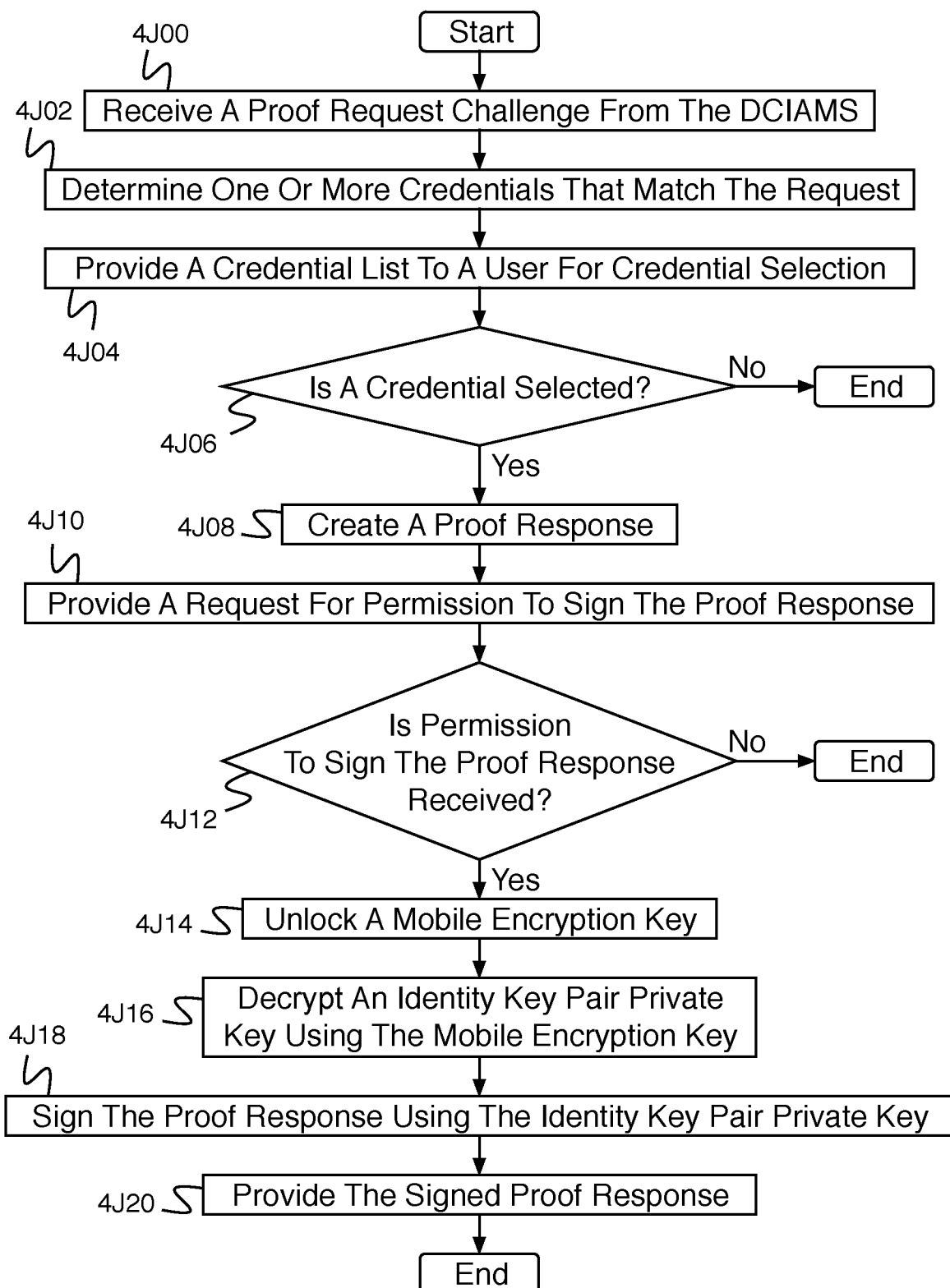
FIG. 4J is a flow diagram illustrating an embodiment of a process for a digital identity application.

FIG. 4J is a flow diagram illustrating an embodiment of a process for a digital identity application. In some embodiments, the process of FIG. 4J is executed by authentication device 4B00 of FIG. 4B. In 4J00, a proof request challenge is received from the DCIAMS. In 4J02, one or more credentials that match the request are determined. In 4J04, a credential list is provided to a user for credential selection. In 4J06, it is determined whether a credential is selected. In the event it is determined that a credential is not selected, the process ends. In the event it is determined that a credential is selected, control passes to 4J08. In 4J08, a proof response (e.g., comprising the selected credential) is created. In 4J10, a request is provided for permission to sign the proof response. In 4J12, it is determined whether permission is received to sign the proof response. In the event it is determined that permission to sign the proof response is not received, the process ends. In the event it is determined in 4J12 that permission to sign the proof response is received, control passes to 4J14. In 4J14, a mobile encryption key is unlocked. In some embodiments, unlocking the mobile encryption key requires an additional authorization, for example, comprising biometric data. In 4J16, an identity key pair private key is decrypted using the mobile encryption key. In 4J18, the proof response is signed using the identity key pair private key. In 4J20, the signed proof response is provided. In some embodiments, the signed proof response is encrypted using a per channel key.

Figure 4K:
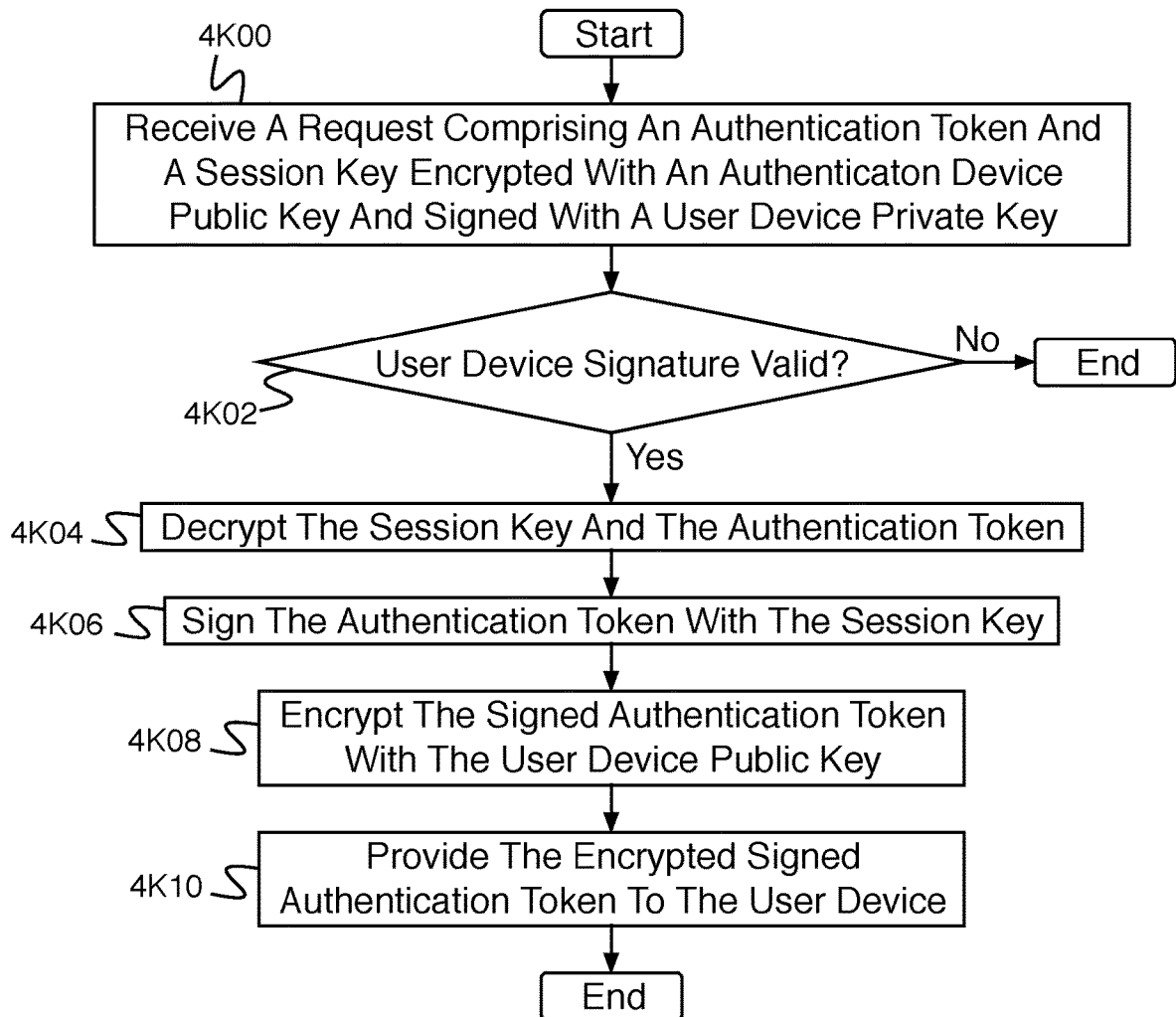
FIG. 4K is a flow diagram illustrating an embodiment of a process for providing an authentication token.

FIG. 4K is a flow diagram illustrating an embodiment of a process for providing an authentication token. In some embodiments, the process of FIG. 4K is executed by authentication device 4B00 of FIG. 4B. In the example shown, in 4K00, a request comprising an authentication token and a session key encrypted with an authentication device public key and signed with a user device private key is received. For example, the challenge request is received via a proximity radio system from the user device that includes an encrypted private key component of the session keypair that is encrypted using the authentication device public key and signed using an a user device private key. In some embodiments, the encrypted private key is for a session, a session private key is encrypted using authentication device public key, and a request from user device to the authentication device is signed with user device private key. In 4K02, it is determined whether the user device signature is valid. In the event it is determined that the user device signature is not valid, the process ends. In the event it is determined that the user device signature is valid, control passes to 4K04. In 4K04, the session key and authentication token are decrypted. For example, the private key component of the session keypair is decrypted. In 4K06, the authentication token is signed with the session key. For example, the authentication token is signed using the decrypted private key component of the session key pair. In 4K08, the signed authentication token is encrypted with the user device public key. In 4K10, the encrypted signed authentication token is provided to the user device. For example, the encrypted signed authentication token is provided to the user device via a proximity radio system as the challenge response.

A system for credential authentication includes an interface and a processor. The interface is configured to receive a request from an application for authorization to access. Access to the application is requested by a user using a user device. The processor is configured to provide an authentication request to the user device, receive a device credential, wherein the device credential is backed by data stored in a distributed ledger, determine a user identifier and an authentication device associated with the user based at least in part on the device credential, provide a proof request to the authentication device, receive a proof response, determine that the proof response is valid, generate a token, and provide the token to the application authorizing access for the user. In some embodiments, the authentication request comprises a universal second factor authentication request. In some embodiments, the processor is further configured to determine a set of credentials that can enable authorization to access. In some embodiments, the set of credentials is determined using rules. In some embodiments, the authentication device includes a credential wallet that is able to be unlocked by the user. In some embodiments, the credential wallet is unlocked using a biometric. In some embodiments, a credential is retrieved from the credential wallet. In some embodiments, the proof response includes the credential. In some embodiments, the credential retrieved from the credential wallet is based at least in part on rules specified in the proof request. In some embodiments, the proof response is signed with an authentication device private key. In some embodiments, determining that the proof response is valid comprises one or more of the following: determining that a credential is not revoked and/or determining that a credential signature is valid. In some embodiments, the processor is further configured to generate a session keypair for the device and user pairing. In some embodiments, there is a time period associated with the session keypair. In some embodiments, the time period comprises 1 week, 1 day, or 1 hour. In some embodiments, the processor is further configured to store a public key component of the session keypair. In some embodiments, the public key component of the session keypair is stored in a storage device for session leases. In some embodiments, the processor is further configured to provide a private key component of the session keypair to the user device. In some embodiments, the processor is further configured to encrypt the private key component of the session keypair. In some embodiments, the private key component of the session keypair is encrypted with an authentication device public key. In some embodiments, the private key component of the session keypair is encrypted and stored by the user device. In some embodiments, the processor is further configured to provide an authentication request to the user device comprising a presigned token and receive an authentication response from the user device, wherein the authentication response is signed with a private key component of the session keypair. In some embodiments, the processor is further configured to validate the authentication response from the user device, wherein validating the authentication response comprises checking a device signature of the authentication response.

In some embodiments, the token is generated in response to a positive validation of the authentication response from the user device. In some embodiments, the processor is further configured to receive a second request from a second application for authorization to access, wherein access to the second application is requested by the user using the user device. In some embodiments, processor is further configured to provide a second authentication request to the user device. In some embodiments, the second authentication request comprises a universal second factor authentication request. In some embodiments, the processor is further configured to receive a second authentication response from the user device, wherein the second authentication response is signed with a private key component of a session keypair. In some embodiments, the second authentication response is generated by and provided to the user device, wherein the second authentication response is generated by: 1) determining that an encrypted private key component of the session keypair is available; 2) providing the encrypted private key component of the session keypair to the authentication device using a proximity communication protocol for decryption; 3) receiving at the authentication device a decrypted private key component of the session keypair using the proximity communication protocol; and 4) generating the second authentication response that is signed using the private key component of the session keypair. In some embodiments, the authentication device challenge is provided to the authentication device via a proximity communication protocol. In some embodiments, the proximity communication protocol comprises Bluetooth or NFC.

Case E—Digital Credentials for Secondary Factor Authentication

A system for credential authentication includes an interface and a processor. The interface is configured to receive a request from an application for authorization to access, wherein the access to the application is requested by a user using a user device. The processor is configured to provide a login request to the user, validate a login response, determine a user authentication device based on the login response, provide a proof request to the user authentication device, receive a proof response, determine that the proof response is valid using a distributed ledger, generate a token, and provide the token to the application authorizing access for the user.

A system for digital credentials for user device authentication comprises a system for credentialing in communication with an application system, a user system, and an authentication device. A user uses the user system to access an application on the application system. For example, the user uses a web browser on the user system to access an application on the application system. The authentication system comprises a system (e.g., a mobile system, a mobile device, a smartphone, etc.) for storing authentication information (e.g., digital credentials, encryption keys, etc.) for the user. When the user attempts to access an application on the application system, the application system requests authorization to access from the system for digital credentials. The system for digital credentials first prompts the user for login information. For example, the system for digital credentials prompts the user for a username and password, for biometric information, for a personal identification number (PIN), or for any other appropriate login information. When the system for digital credentials receives the login information, it validates the login information and determines a user identifier (ID) associated with the login information. The system for digital credentials additionally determines an authentication device ID associated with the user ID. The system for digital credentials then provides a proof request to the authentication device associated with the determined authentication device ID. The proof request comprises a request for a digital credential that authenticates the access to the application system. For example, the proof request comprises a set of credentials that are satisfactory for authenticating access to the application system. The authentication device receives the proof request and creates a proof response comprising a digital credential that satisfies the proof request. The system for digital credentials validates the proof response using information stored in a distributed ledger, and in response to a determination that the proof response is valid, generates a login token and provides the login token to the application system requesting access.

Figure 5A:
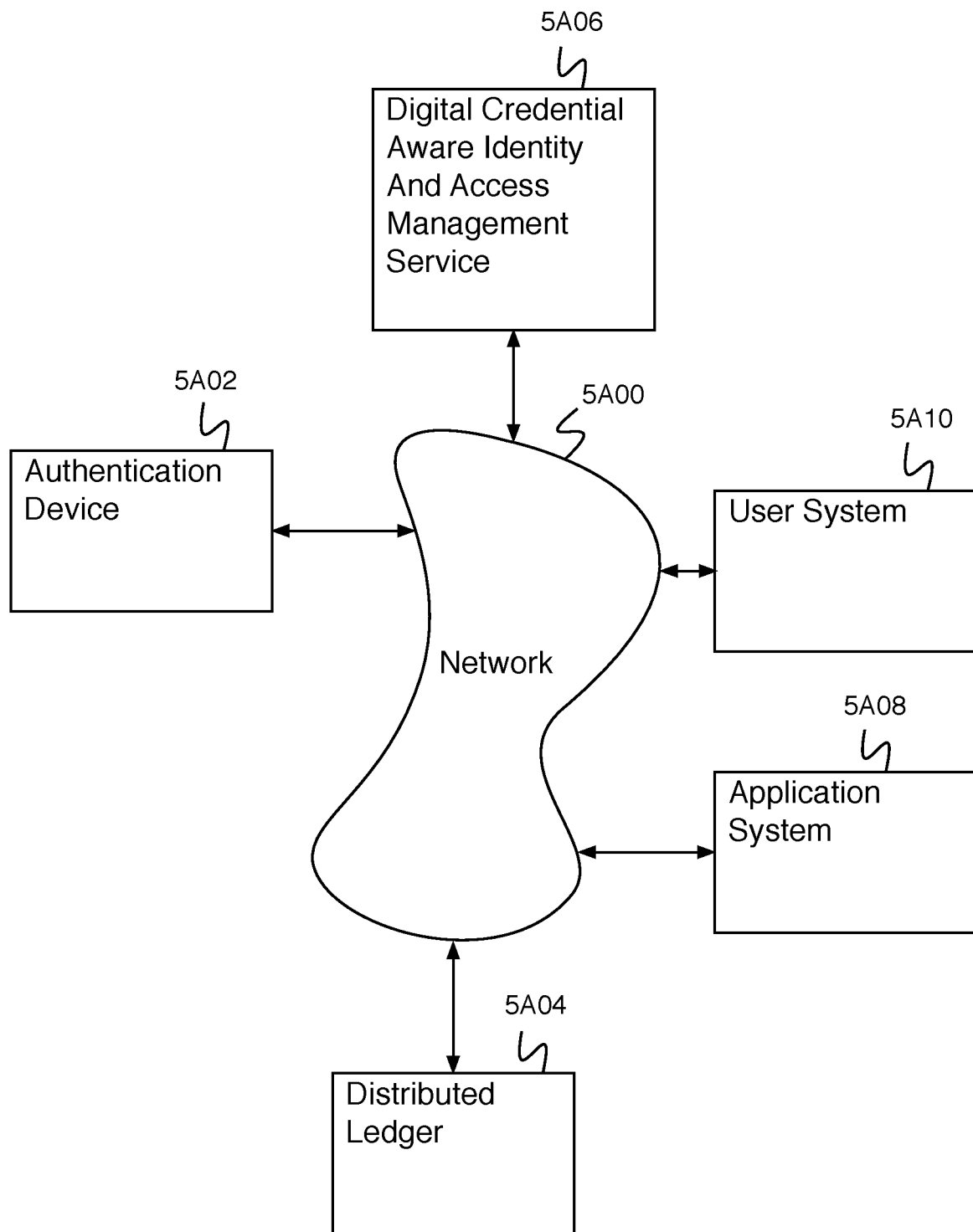
FIG. 5A is a block diagram illustrating an embodiment of a network system.

FIG. 5A is a block diagram illustrating an embodiment of a network system. In some embodiments, the network system of FIG. 5A comprises a network system for a credential system. In the example shown, FIG. 5A comprises network 5A00. In various embodiments, network 5A00 comprises one or more of the following: a local area network, a wide area network, a wired network, a wireless network, the Internet, an intranet, a storage area network, or any other appropriate communication network. Authentication device 5A02, distributed ledger 5A04, digital credential aware identity and access management service 5A06, application system 5A08, and user system communicate via network 5A00. Authentication device 5A02 comprises an authentication device associated with a user (e.g., a user of application system 5A08, a user using user system 5A10). For example, authentication device 5A02 comprises a computer, a smartphone, a tablet, a mobile device, etc. Distributed ledger 5A04 comprises one or more of the following: a decentralized ledger, a permissioned ledger, a public ledger, a blockchain, or any other appropriate distributed ledger. For example, distributed ledger 5A04 is stored on a plurality of systems and comprises one or more permissioned writer systems for writing to distributed ledger 5A04. Digital credential aware identity and access management service (DCIAMS) 5A06 comprises a system for interacting with authentication device 5A02, distributed ledger 5A04, application system 5A08, and any other appropriate systems. DCIAMS 5A06 comprises a system for coordinating a login for application system 5A08, for providing a credential to authentication device 5A02, for requesting a credential from authentication device 5A02, for verifying a user identifier or a signature in distributed ledger 5A04, etc. Application system 5A08 comprises a system for providing access to an application. For example, application system 5A08 comprises a system for providing access to a database application, a data processing application, a productivity application, a communication application, etc. A user uses user system 5A10 to access applications on application system 5A08. For example, a user uses an application on user system 5A10 (e.g., a web browser) to connect to an application on application system 5A08. The application on application system 5A08 authenticates a user login before granting access.

DCIAMS 5A06 comprises a system for using a digital credential to perform a two factor authenticated login (e.g., a user login to an application system). For example, DCIAMS 5A06 comprises an interface configured to receive a request from an application for authorization to access, wherein access to the application is requested by a user using a user device, and a processor configured to provide a login request to the user, validate a login response, determine a user authentication device based on the login response, provide a proof request to the user authentication device, receive a proof response, determine that the proof response is valid (e.g., using information stored in a distributed ledger), generate a token, and provide the token to the application authorizing access for the user.

Figure 5B:
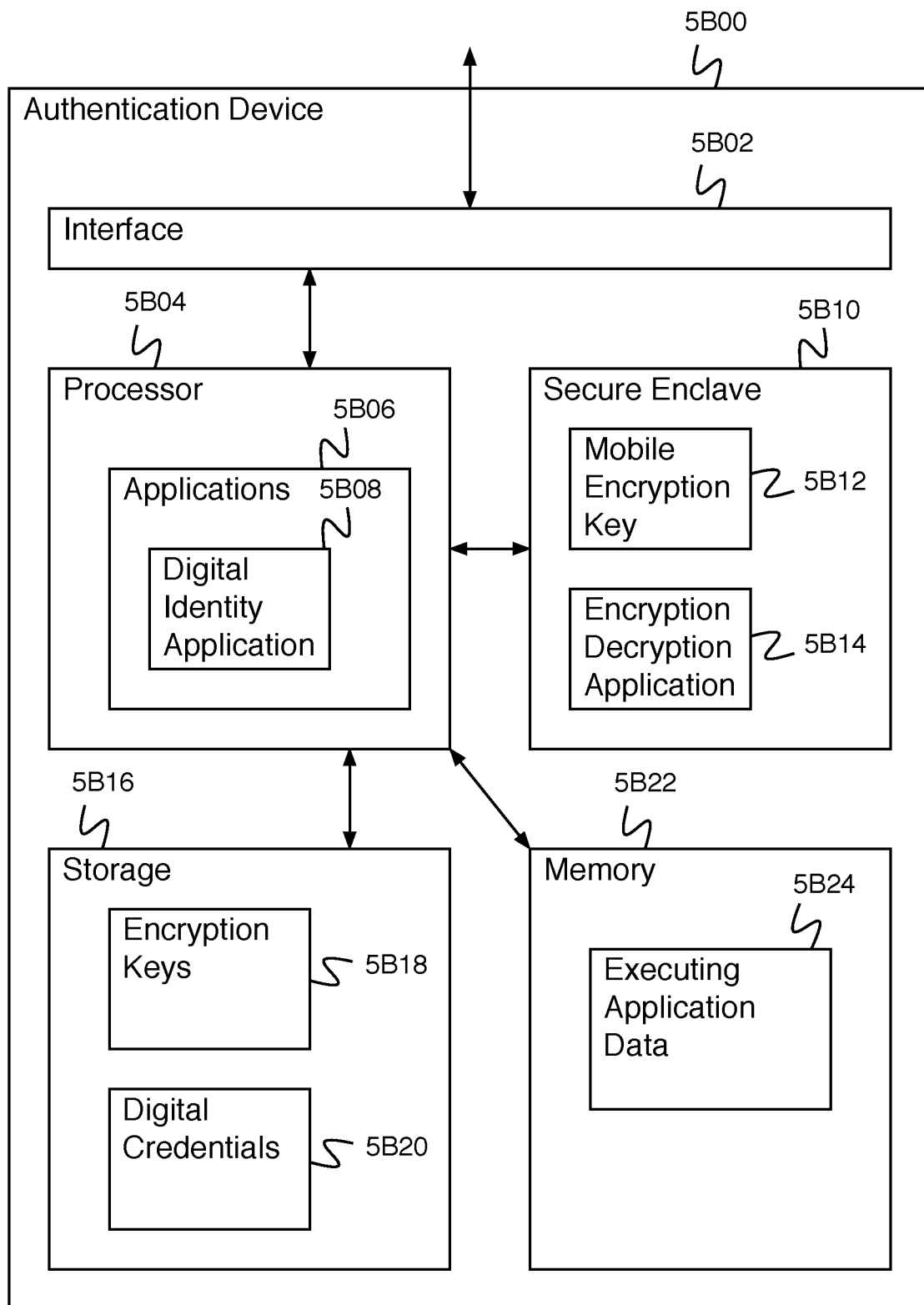
FIG. 5B is a block diagram illustrating an embodiment of an authentication device.

FIG. 5B is a block diagram illustrating an embodiment of an authentication device. In some embodiments, authentication device 5B00 of FIG. 5B comprises authentication device 5A02 of FIG. 1. In the example shown, authentication device 5B00 comprises interface 5B02. For example, interface 5B02 comprises an interface for receiving data, providing data, receiving a request for data, etc. Processor 5B04 comprises a processor for executing applications 5B06. Applications 5B06 comprise digital identity application 5B08 and any other appropriate applications. Digital identity application 5B08 comprises an application for providing a proof response in response to a proof request. For example, digital identity application 5B08 comprises an application for receiving a proof request challenge from a DCIAMS (e.g., DCIAMS 5A06 of FIG. 5A), determining one or more credentials that match the request, providing a credential list to a user for credential selection, in the event it is determined that a credential is selected, creating a proof response, providing a request to sign the proof response, and in the event permission to sign the proof response is received, unlocking a mobile encryption key, decrypting an identity key pair private key using the mobile encryption key, signing the proof response using the identity key pair private key, and providing the signed proof response. Secure enclave 5B10 comprises a secure system for storing a mobile encryption key. Secure enclave 5B10 comprises mobile encryption key 5B12 and encryption decryption application 5B14. For example, secure enclave 5B10 comprises multiple mobile encryption keys, an application for generating and/or removing mobile encryption keys, etc. Secure enclave 5B10 comprises a system for receiving data, transforming it by encrypting and/or decrypting the data using a mobile encryption key or keys, and providing the transformed data. For example, secure enclave 5B10 is configured to only provide transformed input data and not to provide mobile encryption key 5B12. In some embodiments, functionality of secure enclave 5B10 is access limited using a biometric (e.g., a fingerprint, a retina scan, a DNA scan, etc.) or a PIN. Authentication device 5B00 additionally comprises storage 5B16. Storage 5B16 comprises encryption keys 5B18—for example, a public key of an identity key pair, a private key of an identity key pair, a private key of an identity key pair encrypted using mobile encryption key 5B12, etc. For example, an identity key pair of authentication device 5B00 comprises a public key used by other systems for encrypting data in such a way that it can only by decrypted by authentication device 5B00, and a private key for decrypting data encrypted using the public key or for signing data for proving it came from authentication device 5B00. Storage 5B16 additionally comprises digital credentials 5B20, comprising digital certificates representing qualifications (e.g., a college degree, work experience, time living at an apartment, time enrolled in a health insurance plan, etc.). Authentication device 5B00 additionally comprises memory 5B22. Memory 5B22 comprises executing application data 5B24, comprising data associated with applications 5B06.

Figure 5C:
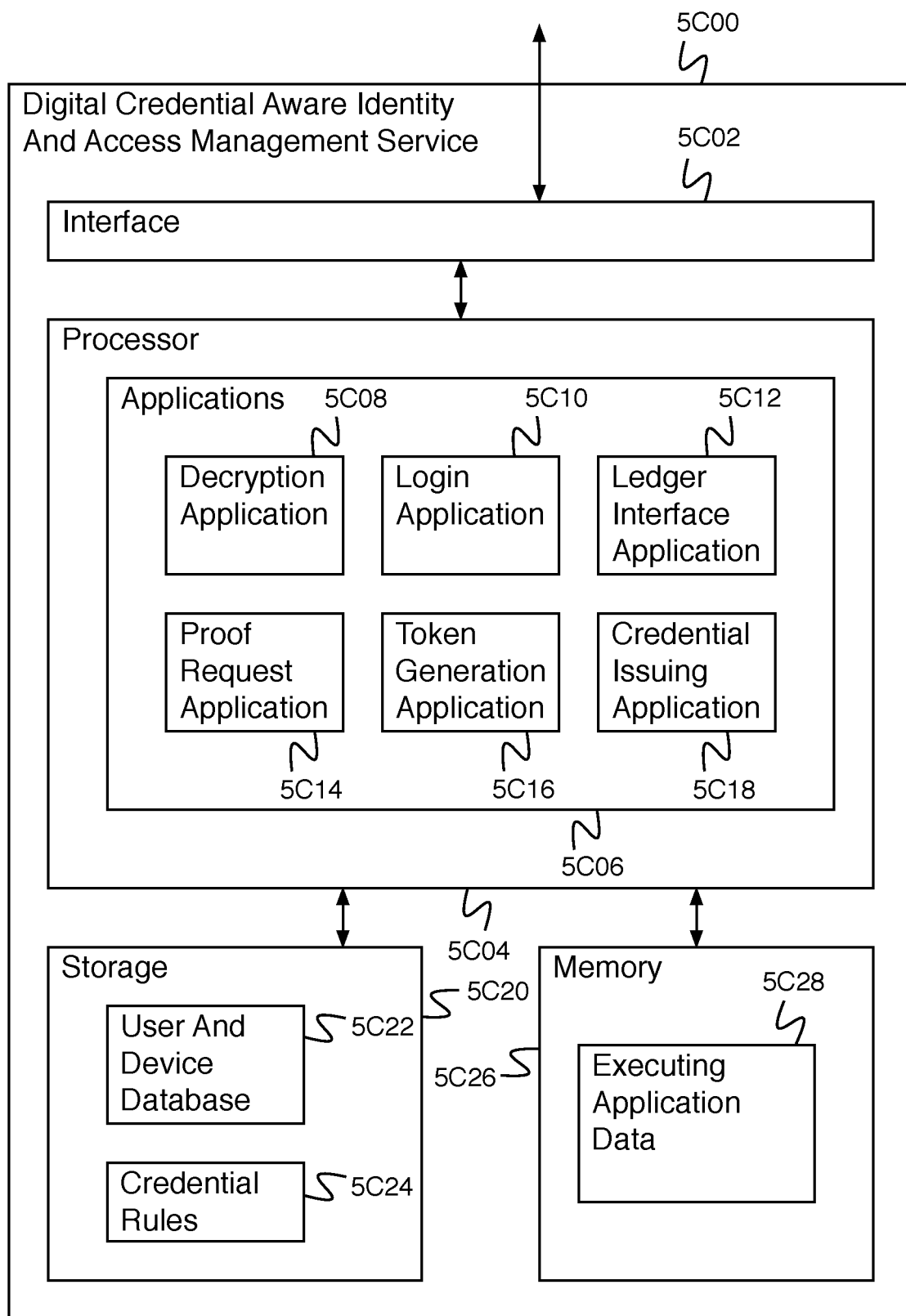
FIG. 5C is a block diagram illustrating an embodiment of a digital credential aware identity and access management service (DCIAMS).

FIG. 5C is a block diagram illustrating an embodiment of a digital credential aware identity and access management service (DCIAMS). In some embodiments, DCIAMS 5C00 comprises DCIAMS 5A06 of FIG. 5A. In the example shown DCIAMS 5C00 comprises interface 5C02. For example, interface 5C02 comprises an interface for receiving data, providing data, receiving a request for data, etc. Processor 5C04 comprises a processor for executing applications 5C06. Applications 5C06 comprises a set of DCIAMS applications. Decryption application 5C08 comprises an application for decrypting encrypted data using a key. Login application 5C10 comprises an application for receiving login information (e.g., username and password, a credential, a quick release (QR) code challenge, etc.) and providing login credentials (e.g., a login token). Ledger interface application 5C12 comprises an application for interacting with a distributed ledger (e.g., distributed ledger 5A04 of FIG. 5A). For example, ledger interface application 5C12 comprises an application for verifying a signature in a ledger or checking a credential identifier for revocation in a ledger. Proof request application 5C14 comprises an application for creating a proof request, sending a proof request, evaluating a proof request response (e.g., a proof response), etc. Token generation application 5C16 comprises an application for generating a login token (e.g., in response to a successful login). Credential issuing application 5C18 comprises an application for issuing a digital credential for proving a qualification in response to a request from a credential issuing authority to issue the credential. Applications 5C06 additionally comprises any other appropriate applications. For example, processor 5C04 comprises a processor configured to provide a login request to the user, validate a login response, determine a user authentication device based on the login response, provide a proof request to the user authentication device, receive a proof response, determine that the proof response is valid using a distributed ledger, generate a token, and provide the token to the application authorizing access for the user. Storage 5C20 comprises user and device database 5C22 and credential rules 5C24. User and device database 5C22 comprises a database of registered users for a given customer organization and user details (e.g., username, password hash, contact information, email address, relationship to devices, registered public keys, registered mapping documents in a decentralized ledger, etc.). User and device database 5C22 additionally comprises a device directory comprising all the devices for a given customer organization as well as mapping documents associated with the devices and relationships with users associated with the devices. Credential rules 5C24 comprises a set of credential rules for determining a credential that satisfies a given access request—for example, rules related to a credential associated schema, a credential associated organization, a credential issuer, a credential associated location, a credential associated class identifier, a credential associated license number, or any other appropriate credential rules. In various embodiments, rules comprise rules related to a credential associated schema, rules related to a credential associated organization, rules related to a credential issuer, rules related to a credential associated location, rules related to a credential associated class identifier or identifier number, rules related to a credential associated license or license number, a credential associated class name, or any other appropriate credential rules. In some embodiments, the rules are applied selectively (e.g., based at least in part on a user identifier)—for example, employees with a credential can access application A, contractors with a credential can access application B, or any other appropriate matching of access with identifiers. In various embodiments, the rules are applied selectively based at least in part on current employment, employee type, location of user, qualification by training class, credential from a third party issuer (e.g., division of motor vehicle license, certification from school, etc.), or any other appropriate criterion. As examples of configurable credential rules to grant access: 1) access is granted in the event that a credential indicates that the holder is a current employee (e.g., issuing company is valid, employee status is not expired, and not revoked); 2) access is granted in the event that a credential indicates that the holder is an employee in an organization of the company (e.g., issuing company is valid, organization is specified organization, employee status is not expired, and not revoked); 3) access is granted in the event that a credential indicates that the holder is an employee in a specified location (e.g., issuing company is valid, location is a specified location, employee status is not expired, and not revoked); 4) access is granted in the event that a credential indicates that the holder has necessary training (e.g., issuing company is valid, training status is complete, employee status is not expired, and not revoked); and 5) access is granted in the event that a credential indicates that the holder has outside credential (e.g., issuing company is valid, outside credential is valid, outside credential issuer is third party, employee status is not expired, and not revoked). DCIAMS 5C00 additionally comprises memory 5C26. Memory 5C26 comprises executing application data 5C28, comprising data associated with applications 5C06.

Figure 5D:
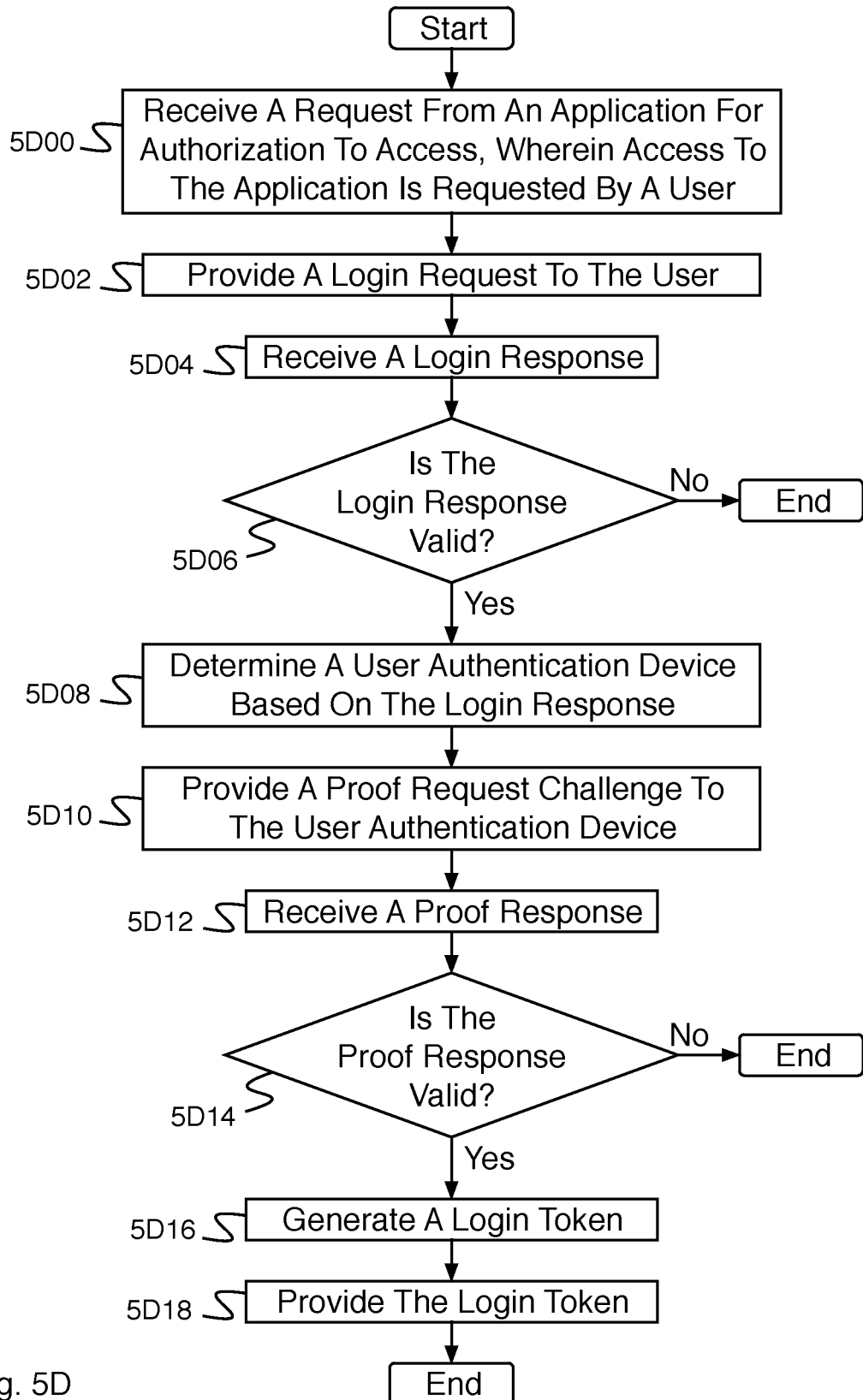
FIG. 5D is a flow diagram illustrating an embodiment of a process for credential authentication.

FIG. 5D is a flow diagram illustrating an embodiment of a process for credential authentication. In some embodiments, the process of FIG. 5D is executed by DCIAMS 5C00 of FIG. 5C. In the example shown, in 5D00, a request is received from an application for authorization to access, wherein access to the application is requested by a user. In 5D02, a login request is provided to the user. In 5D04, a login response is received. In 5D06, it is determined whether the login response is valid. For example, determining whether the login response is valid comprises password hash checking (e.g., using a bcrypt algorithm or an argon2 algorithm), validating biometric data, validating a personal identification number (PIN), etc. In the event it is determined that the login response is not valid, the process ends. In the event it is determined that the login response is valid, control passes to 5D08. In 5D08, a user authentication device is determined based on the login response. In 5D10, a proof request challenge is provided to the user authentication device. For example, the proof request challenge comprises a request for one or more of a set of credentials (e.g., a set of credentials determined using rules). In 5D12, a proof response is received. For example, the proof response comprises a credential of the set of credentials (e.g., a credential stored by the authentication device—for example, a user selected credential) that is checked against a stored document registered in a distributed ledger. In 5D14, it is determined whether the proof response is valid. In the event it is determined that the proof response is not valid, the process ends. In the event it is determined that the proof response is valid, control passes to 5D16. In 5D16, a login token is generated. In 5D18, the login token is provided.

Figure 5E:
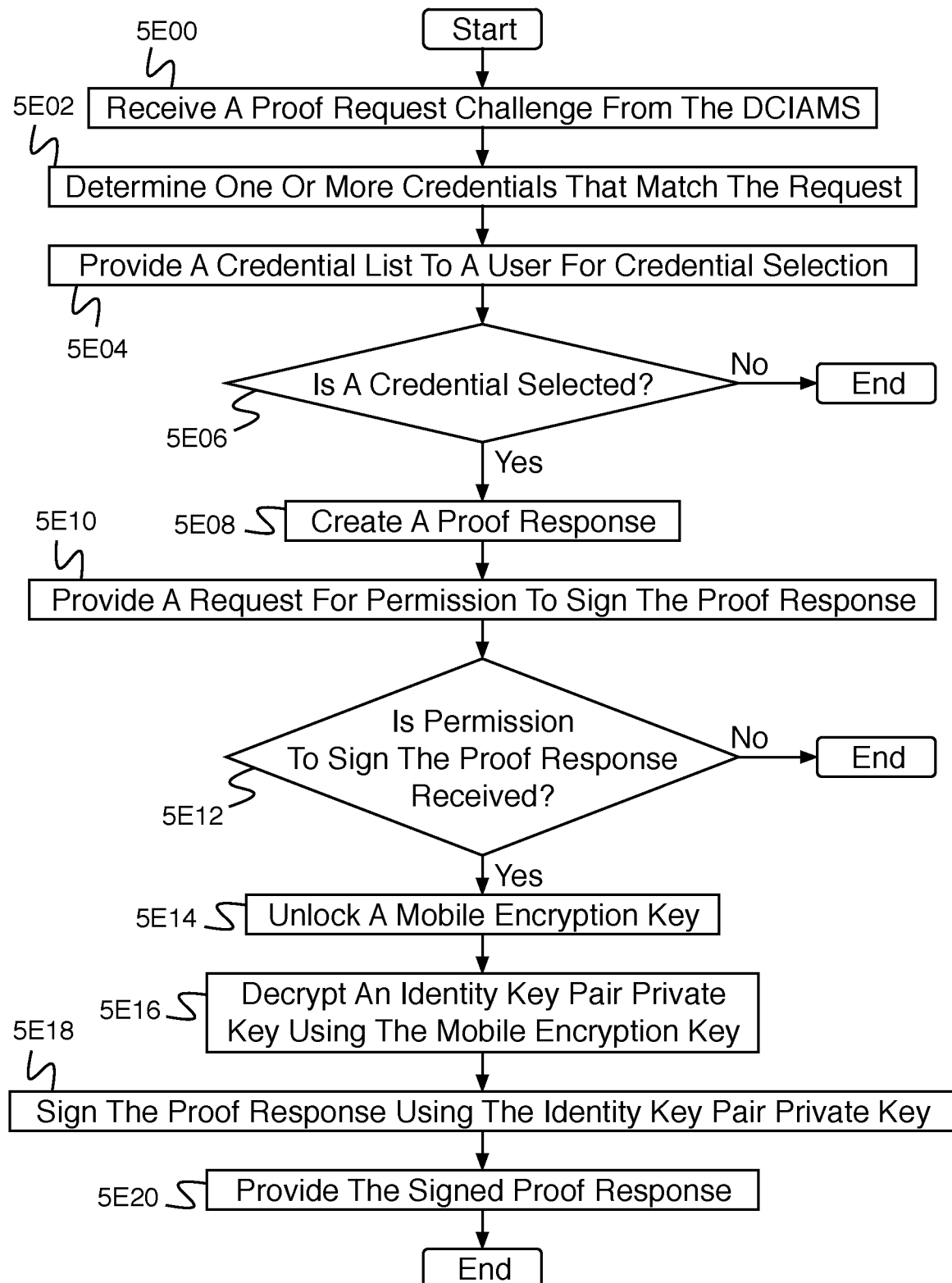
FIG. 5E is a flow diagram illustrating an embodiment of a process for a digital identity application.

FIG. 5E is a flow diagram illustrating an embodiment of a process for a digital identity application. In some embodiments, the process of FIG. 5E is executed by authentication device 5B00 of FIG. 5B. In 5E00, a proof request challenge is received from the DCIAMS. In 5E02, one or more credentials that match the request are determined. In 5E04, a credential list is provided to a user for credential selection. In 5E06, it is determined whether a credential is selected. In the event it is determined that a credential is not selected, the process ends. In the event it is determined that a credential is selected, control passes to 5E08. In 5E08, a proof response is created. In some embodiments, the proof response comprises a selected credential. In some embodiments, the proof response comprises a document signed with an Identity Private Key containing a timestamp of now, indicating they control the DID referenced Identity Private Key. In this respect, they don't have any credentials, but they do control a known key to the distributed ledger and the DCIAMS which could be considered a second factor as well. When using this approach, however, it is not possible to use the credential based rules. In 5E10, a request is provided for permission to sign the proof response. In 5E12, it is determined whether permission is received to sign the proof response. In the event it is determined that permission to sign the proof response is not received, the process ends. In the event it is determined in 5E12 that permission to sign the proof response is received, control passes to 5E14. In 5E14, a mobile encryption key is unlocked. In some embodiments, unlocking the mobile encryption key requires an additional authorization, for example, comprising biometric data. In 5E16, an identity key pair private key is decrypted using the mobile encryption key. In 5E18, the proof response is signed using the identity key pair private key. In 5E20, the signed proof response is provided. In some embodiments, the signed proof response is encrypted using a per channel key.

Figure 5F:
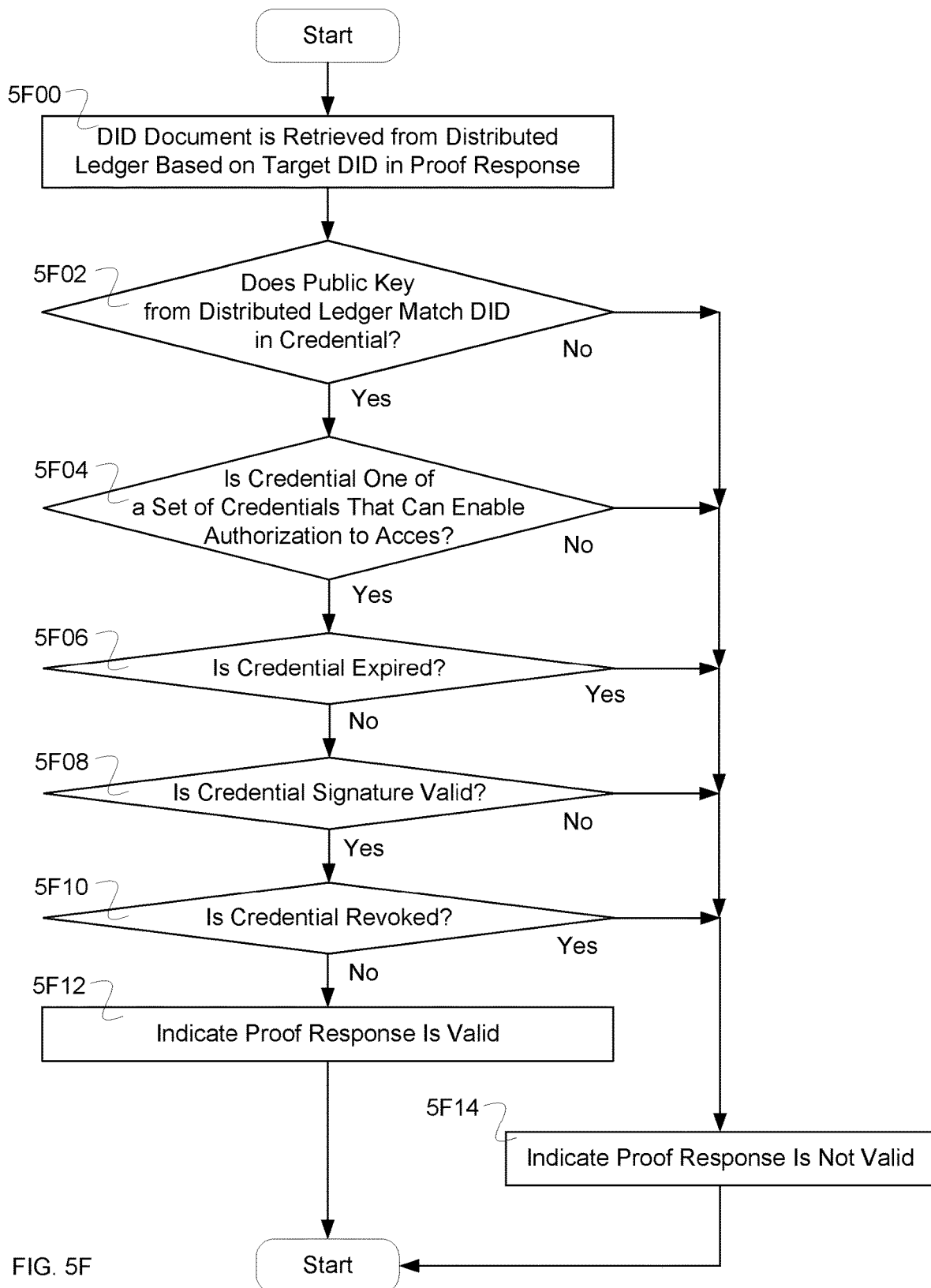
FIG. 5F is a flow diagram illustrating an embodiment of a process for determining whether a proof response is valid.

FIG. 5F is a flow diagram illustrating an embodiment of a process for determining whether a proof response is valid. In some embodiments, the process of FIG. 5F implements 5D14 of FIG. 5D. In the example shown, in 5F00, a DID document is retrieved from a distributed ledger based on target DID in proof response. In 5F02, it is determined whether a public key from a decentralized ledger matches a DID (e.g., a decentralized identifier) in a credential (e.g., a credential of the proof response). In the event it is determined that a public key from a decentralized ledger does not match a DID in the credential, control passes to 5F14. In the event it is determined in 5F02 that that a public key from a decentralized ledger matches a DID in the credential, control passes to 5F04. In 5F04, it is determined whether the credential is one of a set of credentials that can enable authorization to access. In the event it is determined that the credential is not one of the set of credentials that can enable authorization to access, control passes to 5F14. In the event it is determined in 5F04 that the credential is one of the set of credentials that can enable authorization to access, control passes to 5F06. In 5F06, it is determined whether the credential is expired. In the event it is determined that the credential is expired, control passes to 5F14. In the event it is determined in 5F06 that the credential is not expired, control passes to 5F08. In 5F08, it is determined whether the credential signature is valid. In the event it is determined that the credential signature is not valid, control passes to 5F14. In the event it is determined in 5F08 that the credential signature is valid, control passes to 5F10. In 5F10, it is determined whether the credential is revoked. For example, determining that the credential is revoked comprises querying a revocation registry of a revocation database or a distributed ledger (e.g., a decentralized ledger, a permissioned ledger, a public ledger, a blockchain, etc.) In the event that the credential is revoked, control passes to 3G14. In the event that the credential is not revoked, control passes to 3G12. In 3G12, the process indicates that the proof response is valid, and the process ends. In 5F14, the process indicates that the proof response is not valid, and the process ends.

The system for credential authentication comprises an interface and a processor. The interface is configured to receive a request from an application for authorization to access, wherein access to the application is requested by a user using a user device. The processor is configured to provide a login request to the user; validate a login response; determine a user authentication device based on the login response; provide a proof request to the user authentication device; receive a proof response; determine that the proof response is valid using a distributed ledger; generate a token; and provide the token to the application authorizing access for the user. In some embodiments, the login request comprises a username and password request. In some embodiments, the login request comprises a biometric request. In some embodiments, the processor is further configured to receive the login response. In some embodiments, the login response is validated using a password hash checking. In some embodiments, the password hash checking comprises a bcrypt algorithm or an argon2 algorithm. In some embodiments, the processor is further configured to determine a set of credentials that can enable authorization to access using rules. In some embodiments, the processor is further configured to generate a proof request challenge requesting a credential of the set of credentials. In some embodiments, the proof response comprises a credential. In some embodiments, the credential comprises a user selected credential. In some embodiments, the credential comprises a stored credential stored by the user authentication device. In some embodiments, the proof response is signed using a user authentication device private key. In some embodiments, the device private key is decrypted using a mobile encryption key. In some embodiments, the mobile encryption key is accessed using a biometric or a PIN. In some embodiments, determining that the proof response is valid comprises determining that a credential of the proof response satisfies the proof request. In some embodiments, determining that the proof response is valid comprises determining that a credential of the proof response is not expired. In some embodiments, determining that the proof response is valid comprises determining that a credential comprises a valid signature associated with the user. In some embodiments, determining that the proof response is valid comprises determining that a credential is not revoked. In some embodiments, determining that the credential of the proof response is not revoked comprises querying a revocation registry of a distributed ledger.

Case F—Digital Credentials for Step-Up Authentication

A system for credential authentication is disclosed. The system comprises an interface and a processor. The interface is configured to receive a request from an application for authorization to access, wherein access to the application is requested by a user, and receive a task request from the application for authorization to access a task, wherein access to the task is requested by the user. The processor is configured to authenticate the request from the application for authorization to access, determine that the task comprises a sensitive task, determine a user authentication device, provide a challenge for a digital credential to the user authentication device, wherein the digital credential is backed by data stored in a distributed ledger, receive a response from the user authentication device, determine the response is valid, and provide an authorization to access the sensitive task.

A system for digital credentials for user device authentication comprises a system for credential authentication in communication with an application system, a user system, and an authentication device. A user uses the user system to access an application on the application system. For example, the user uses a web browser on the user system to access an application on the application system. The authentication system comprises a system (e.g., a mobile system, a mobile device, a smartphone, etc.) for storing authentication information (e.g., digital credentials, encryption keys, etc.) for the user. When the user attempts to access an application on the application system, the application system requests authorization to access from the system for digital credentials. The system for digital credentials authenticates the access using any appropriate authentication method. As the user then uses the application, in the event the user attempts to access a task deemed a sensitive task by the application, the application provides a task request to the DCIAMS. The DCIAMS determines whether the task comprises a sensitive task, and in the event the DCIAMS determines that the task comprises a sensitive task, the DCIAMS requires an additional authentication before providing authorization to access the sensitive task. The DCIAMS utilizes either a signature challenge or a credential challenge for the additional authentication. In the event the DCIAMS utilizes a signature challenge, the DCIAMS generates a challenge document and provides the challenge document to the authentication device associated with the user. The authentication device returns the challenge document to the DCIAMS signed using the authentication device private key, proving that the user using the authentication device provides permission to access the sensitive task. In the event the DCIAMS utilizes a credential challenge, the DCIAMS determines a set of credentials satisfactory to authenticate access to the sensitive task and provides a proof request challenge requesting a credential to the authentication device. The authentication device returns a proof response to the DCIAMS, proving that the user using the authentication device has the appropriate credentials to access the sensitive task and provides permission to access the task. When the response is received, the DCIAMS determines whether the response is valid, and in response to a determination that the response is valid, provides an authorization to access the sensitive task.

Figure 6A:
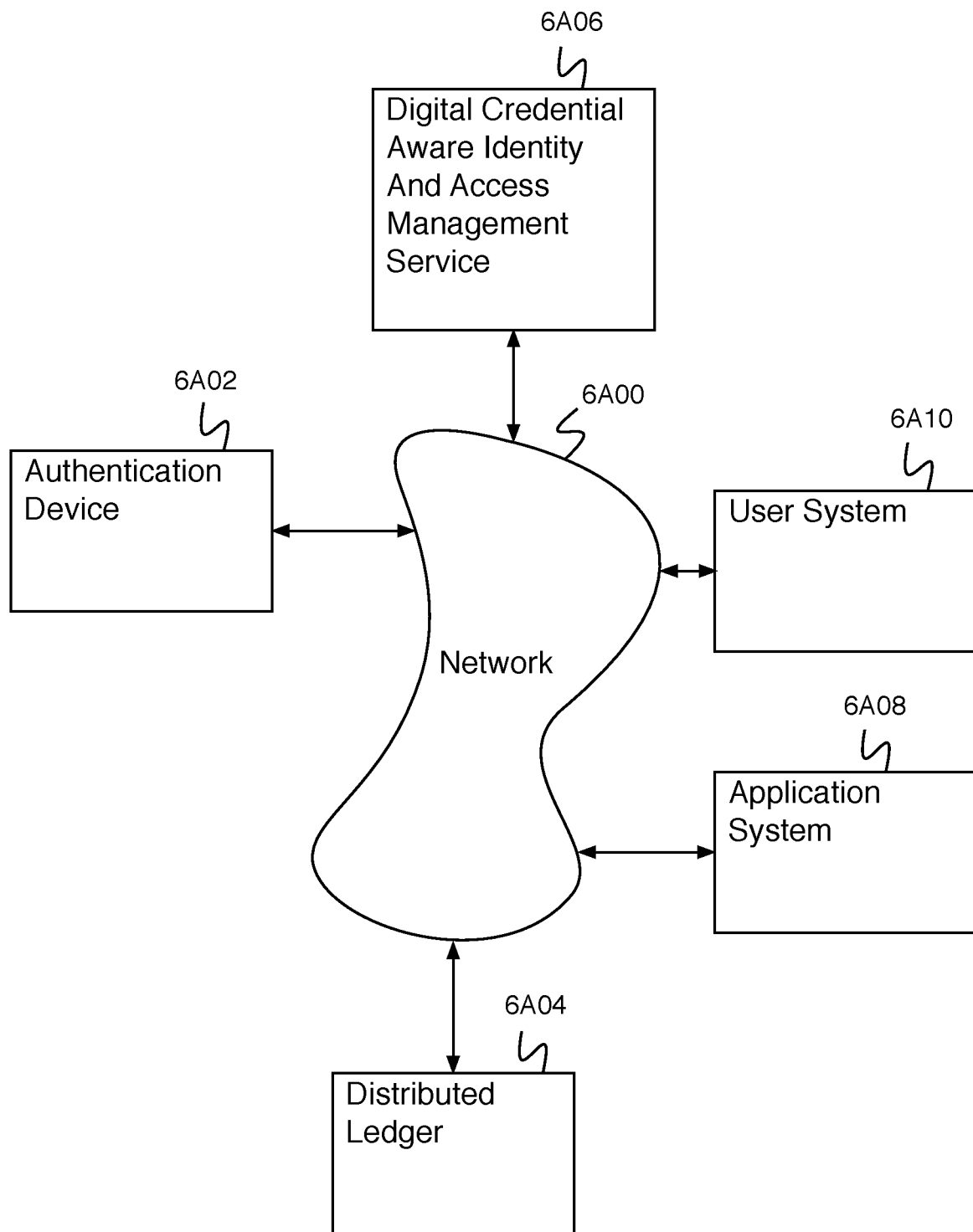
FIG. 6A is a block diagram illustrating an embodiment of a network system.

FIG. 6A is a block diagram illustrating an embodiment of a network system. In some embodiments, the network system of FIG. 6A comprises a network system for a credential system. In the example shown, FIG. 6A comprises network 6A00. In various embodiments, network 6A00 comprises one or more of the following: a local area network, a wide area network, a wired network, a wireless network, the Internet, an intranet, a storage area network, or any other appropriate communication network. Authentication device 6A02, distributed ledger 6A04, digital credential aware identity and access management service (DCIAMS) 6A06, application system 6A08, and user system communicate via network 6A00. Authentication device 6A02 comprises an authentication device associated with a user (e.g., a user of application system 6A08, a user using user system 6A10). For example, authentication device 6A02 comprises a computer, a smartphone, a tablet, a mobile device, etc. Distributed ledger 6A04 comprises a distributed ledger (e.g., a permissioned ledger, a decentralized ledger, a public ledger, a blockchain, etc.). For example, distributed ledger 6A04 is stored on a plurality of systems and comprises one or more permissioned writer systems for writing to the distributed ledger. DCIAMS 6A06 comprises a system for interacting with authentication device 6A02, distributed ledger 6A04, application system 6A08, and any other appropriate systems. DCIAMS 6A06 comprises a system for coordinating a login for application system 6A08, for providing a credential to authentication device 6A02, for requesting a credential from authentication device 6A02, for verifying a user identifier or a signature in distributed ledger 6A04, etc. Application system 6A08 comprises a system for providing access to an application. For example, application system 6A08 comprises a system for providing access to a database application, a data processing application, a productivity application, a communication application, etc. A user uses user system 6A10 to access applications on application system 6A08. For example, a user uses an application on user system 6A10 (e.g., a web browser) to connect to an application on application system 6A08. The application on application system 6A08 authenticates a user login before granting access.

DCIAMS 6A06 comprises a system for providing a step-up authentication for authenticating access to a sensitive task. For example, DCIAMS 6A06 comprises an interface configured to receive a request from an application for authorization to access, wherein access to the application is requested by a user, and receive a task request from the application for authorization to access a task, wherein access to the task is requested by the user, and a processor configured to authenticate the request from the application for authorization to access, determine that the task comprises a sensitive task, determine a user authentication device, provide a challenge to the user authentication device, receive a response from the user authentication device, determine the response is valid, and provide an authorization to access the sensitive task.

Figure 6B:
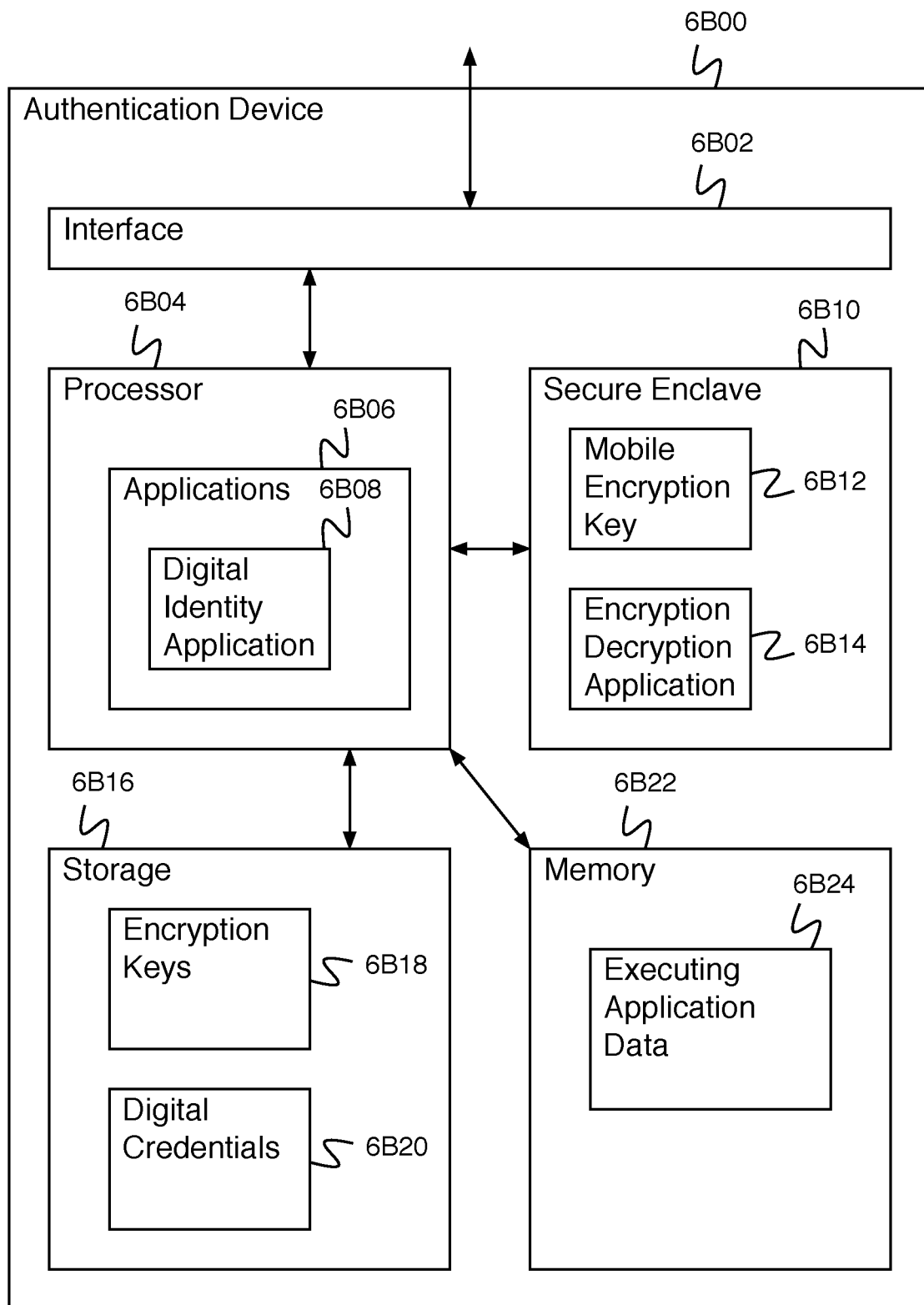
FIG. 6B is a block diagram illustrating an embodiment of an authentication device.

FIG. 6B is a block diagram illustrating an embodiment of an authentication device. In some embodiments, authentication device 6B00 of FIG. 6B comprises authentication device 6A02 of FIG. 6A. In the example shown, authentication device 6B00 comprises interface 6B02. For example, interface 6B02 comprises an interface for receiving data, providing data, receiving a request for data, etc. Processor 6B04 comprises a processor for executing applications 6B06. Applications 6B06 comprise digital identity application 6B08 and any other appropriate applications. Digital identity application 6B08 comprises an application for providing a proof response in response to a proof request. For example, digital identity application 6B08 comprises an application for receiving a credential challenge from a DCIAMS (e.g., DCIAMS 6A06 of FIG. 6A), determining a credential request from the credential challenge, determining one or more credentials that match the credential request, providing a credential list to a user for credential selection, in the event it is determined that a credential is selected, creating a proof response, providing a request to unlock a mobile encryption key, and in the event permission is received, unlocking a mobile encryption key, decrypting an identity key pair private key using the mobile encryption key, signing the proof response using the identity key pair private key, and providing the signed proof response. Digital identity application 6B08 additionally comprises an application for providing a signature challenge response in response to a signature challenge request. For example, digital identity application 6B08 comprises an application for receiving a signature challenge, unlocking a mobile encryption key (e.g., using a biometric), decrypting a private key using the mobile encryption key, signing the signature challenge using the private key, encrypting the signed signature challenge (e.g., using a per-channel key), and providing the encrypted signed signature challenge.

Secure enclave 6B10 comprises a secure system for storing a mobile encryption key. Secure enclave 6B10 comprises mobile encryption key 6B12 and encryption decryption application 6B14. For example, secure enclave 6B10 comprises multiple mobile encryption keys, an application for generating and/or removing mobile encryption keys, etc. Secure enclave 6B10 comprises a system for receiving data, transforming it by encrypting and/or decrypting the data using a mobile encryption key or keys, and providing the transformed data. For example, secure enclave 6B10 is configured to only provide transformed input data and not to provide mobile encryption key 6B12. In some embodiments, functionality of secure enclave 6B10 is access limited using a biometric (e.g., a fingerprint, a retina scan, a DNA scan, etc.) or a personal identification number (PIN). Authentication device 6B00 additionally comprises storage 6B16. Storage 6B16 comprises encryption keys 6B18—for example comprising a public key of an identity key pair, a private key of an identity key pair, a private key of an identity key pair encrypted using mobile encryption key 6B12, etc. For example, an identity key pair of authentication device 6B00 comprises a public key used by other systems for encrypting data in such a way that it can only by decrypted by authentication device 6B00, and a private key for decrypting data encrypted using the public key or for signing data for proving it came from authentication device 6B00. Storage 6B16 additionally comprises digital credentials 6B20, comprising digital certificates representing qualifications (e.g., a college degree, work experience, time living at an apartment, time enrolled in a health insurance plan, etc. Authentication device 6B00 additionally comprises memory 6B22. Memory 6B22 comprises executing application data 6B24, comprising data associated with applications 6B06.

Figure 6C:
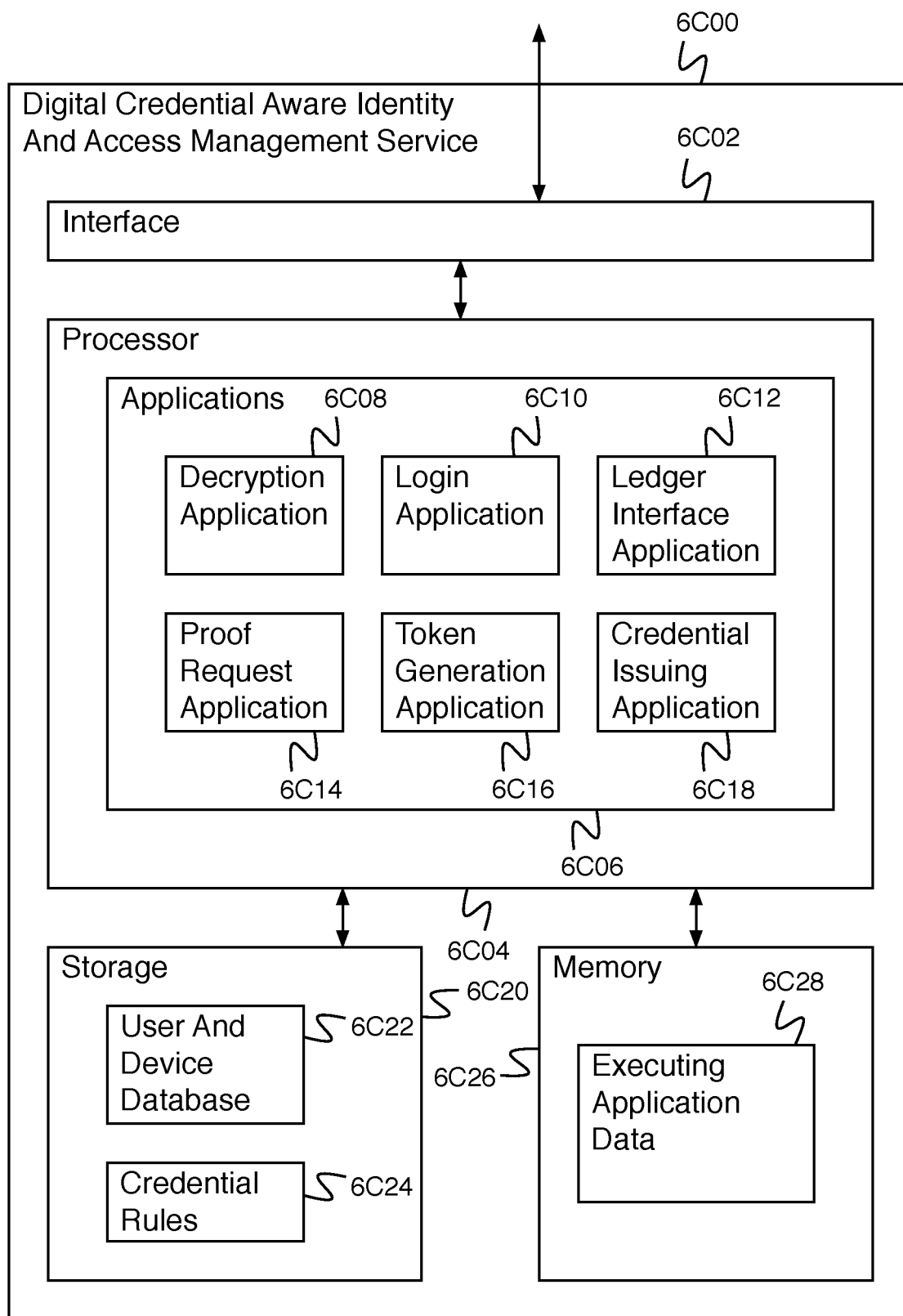
FIG. 6C is a block diagram illustrating an embodiment of a digital credential aware identity and access management service (DCIAMS).

FIG. 6C is a block diagram illustrating an embodiment of a digital credential aware identity and access management service (DCIAMS). In some embodiments, DCIAMS 6C00 comprises DCIAMS 6A06 of FIG. 6A. In the example shown DCIAMS 6C00 comprises interface 6C02. For example, interface 6C02 comprises an interface for receiving data, providing data, receiving a request for data, etc. In some embodiments, interface 6C02 comprises an interface for receiving encrypted messages or encrypted javascript object notation (JSON) messages. Processor 6C04 comprises a processor for executing applications 6C06. Applications 6C06 comprise a set of DCIAMS applications. Decryption application 6C08 comprises an application for decrypting encrypted data using a key. Login application 6C10 comprises an application for receiving login information (e.g., username and password, a credential, a quick response (QR) code challenge, etc.) and providing login credentials (e.g., a login token). Ledger interface application 6C12 comprises an application for interacting with a distributed ledger (e.g., distributed ledger 6A04 of FIG. 6A). For example ledger interface application 6C12 comprises an application for verifying a signature by looking up a public key in a ledger or checking a credential identifier for revocation in a ledger. Proof request application 6C14 comprises an application for creating a proof request, sending a proof request, evaluating a proof request response (e.g., a proof response), etc. Token generation application 6C16 comprises an application for generating a login token (e.g., in response to a successful login). Credential issuing application 6C18 comprises an application for issuing a digital credential for proving a qualification in response to a request from a credential issuing authority to issue the credential. Applications 6C06 additionally comprises any other appropriate applications. For example, processor 6C04 comprises a processor configured to authenticate a request from the application for authorization to access, determine that a task comprises a sensitive task, determine a user authentication device, provide a challenge to the user authentication device, receive a response from the user authentication device, determine the response is valid, and provide an authorization to access the sensitive task. Storage 6C20 comprises user and device database 6C22 and credential rules 6C24. User and device database 6C22 comprises a database of registered users for a given customer organization and user details (e.g., username, password hash, contact information, email address, relationship to devices, registered public keys, registered mapping documents in a decentralized ledger, etc.). User and device database 6C22 additionally comprises a device directory comprising all the devices for a given customer organization as well as mapping documents associated with the devices and relationships with users associated with the devices. Credential rules 6C24 comprises a set of credential rules for determining a credential that satisfies a given access request, for example rules related to a credential associated schema, a credential associated organization, a credential issuer, a credential associated location, a credential associated class identifier, a credential associated license number, or any other appropriate credential rules. In various embodiments, rules comprise rules related to a credential associated schema, rules related to a credential associated organization, rules related to a credential issuer, rules related to a credential associated location, rules related to a credential associated class identifier or identifier number, rules related to a credential associated license or license number, a credential associated class name, or any other appropriate credential rules. In some embodiments, the rules are applied selectively (e.g., based at least in part on a user identifier)—for example, employees with a credential can access application A, contractors with a credential can access application B, or any other appropriate matching of access with identifiers. In various embodiments, the rules are applied selectively based at least in part on current employment, employee type, location of user, qualification by training class, credential from a third party issuer (e.g., division of motor vehicle license, certification from school, etc.), or any other appropriate criterion. As examples of configurable credential rules to grant access: 1) access is granted in the event that a credential indicates that the holder is a current employee (e.g., issuing company is valid, employee status is not expired, and not revoked); 2) access is granted in the event that a credential indicates that the holder is an employee in an organization of the company (e.g., issuing company is valid, organization is specified organization, employee status is not expired, and not revoked); 3) access is granted in the event that a credential indicates that the holder is an employee in a specified location (e.g., issuing company is valid, location is a specified location, employee status is not expired, and not revoked); 4) access is granted in the event that a credential indicates that the holder has necessary training (e.g., issuing company is valid, training status is complete, employee status is not expired, and not revoked); and 5) access is granted in the event that a credential indicates that the holder has outside credential (e.g., issuing company is valid, outside credential is valid, outside credential issuer is third party, employee status is not expired, and not revoked). DCIAMS 6C00 additionally comprises memory 6C26. Memory 6C26 comprises executing application data 6C28, comprising data associated with applications 6C06.

Figure 6D:
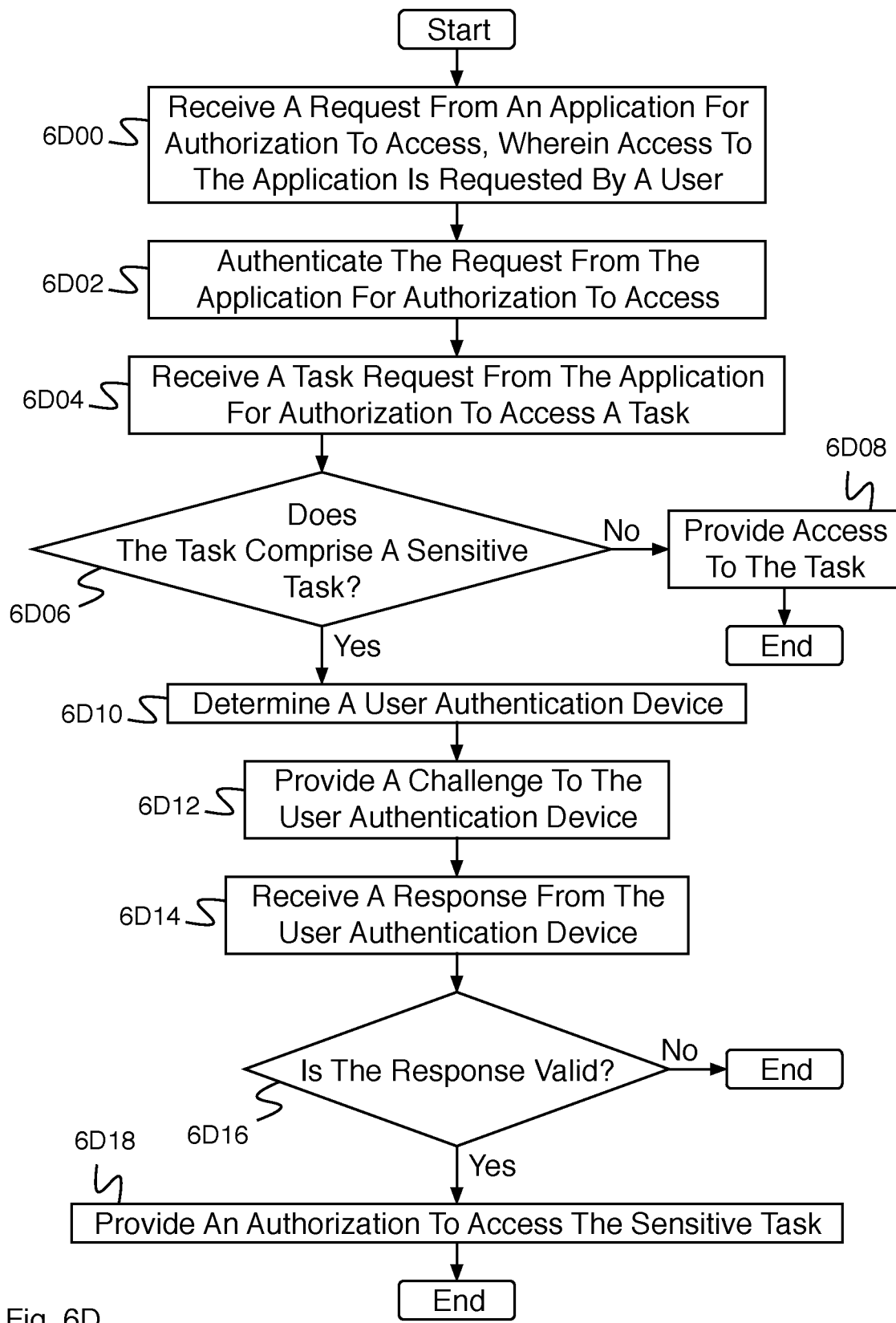
FIG. 6D is a flow diagram illustrating an embodiment of a process for credential authentication.

FIG. 6D is a flow diagram illustrating an embodiment of a process for credential authentication. In some embodiments, the process of FIG. 6D is executed by DCIAMS 6A06 of FIG. 6A. In the example shown, in 6D00, a request is received from an application for authorization to access, wherein access to the application is requested by a user. In 6D02, the request from the application for authorization to access is authenticated. For example, the request for authorization to access is authenticated using a username and password, a biometric, a credential, a two-factor authentication system, a personal identification number (PIN), etc. In some embodiments, authenticating the request from the application for authorization to access comprises providing an indication to the application of authorization to access. For example, authenticating the request from the application for authorization to access comprises providing an access token to the application. In 6D04, a task request from the application for authorization to access a task is received. In some embodiments, the task request from the application for authorization to access a task is received as an encrypted JSON message and/or the message is received using a representational state transfer application programming interface (REST API). For example, the task comprises a task within the application (e.g., the application comprises a human resources application and the task comprises an edit worker salary task). In some embodiments, a signature on the task request from the application for authorization is validated. In 6D06, it is determined whether the task comprises a sensitive task. For example, a sensitive task comprises a task enabling the viewing or modification of sensitive data, a task only available to a subset of users, a task undergoing beta testing, etc. In the event it is determined in 6D06 that the task does not comprise a sensitive task, control passes to 6D08. In 6D08, access is provided to the task, and the process ends. In the event it is determined in 6D06 that the task comprises a sensitive task, control passes to 6D10. In 6D10, a user authentication device is determined. For example, determining a user authentication device comprises determining a user identifier based at least in part on the request from an application for authorization to access and determining a user authentication device from the user identifier. In 6D12, a challenge is provided to the user authentication device. For example, the challenge for the digital credential comprises a challenge document or a proof request. The digital credential is backed by data stored in a distributed ledger. In some embodiments, the challenge for the digital credential to the user authentication device is based at least in part on rules. In some embodiments, the challenge is created based at least in part on the nature of the sensitive task being accessed. For example, viewing a worker's salary might require that the viewer hold a human resources administrator credential and/or that the viewer hold a valid personally identifiable information (PII) trained information technology (IT) worker credential. In 6D14, a response is received from the user authentication device. In 6D16, it is determined whether the response is valid. In the event it is determined that the response is not valid, the process ends. In the event it is determined that the response is valid, control passes to 6D18. In 6D18, an authorization to access the sensitive task is provided.

Figure 6E:
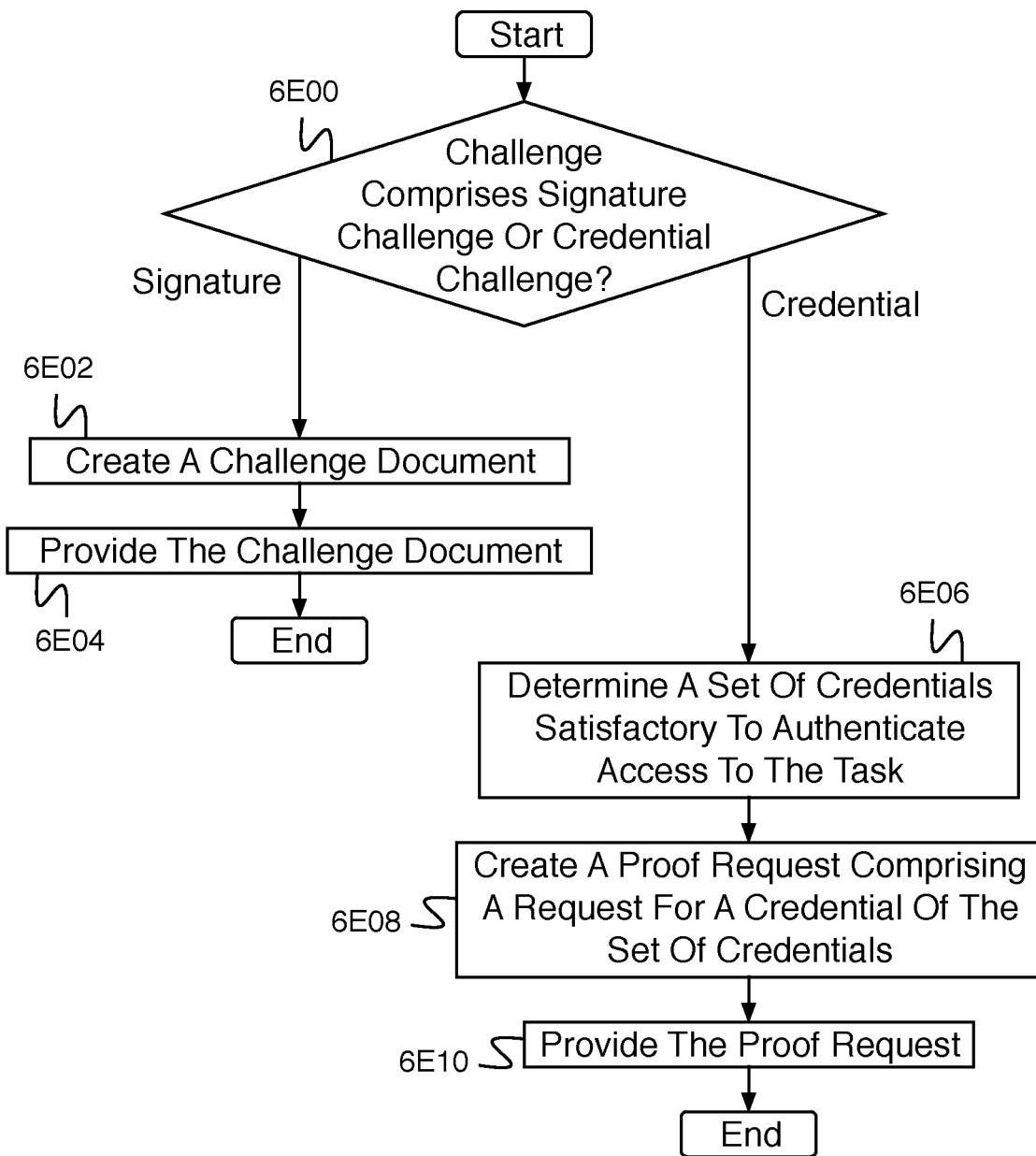
FIG. 6E is a flow diagram illustrating an embodiment of a process for providing a challenge to a user authentication device.

FIG. 6E is a flow diagram illustrating an embodiment of a process for providing a challenge to a user authentication device. In some embodiments, the process of FIG. 6E implements 6D12 of FIG. 6D. In the example shown, in 6E00, it is determined whether the challenge comprises a signature challenge or a credential challenge. For example, it is determined whether the challenge comprises a signature challenge or a credential challenge based in part on the task, on a sensitivity level, on a user, on an administrator configuration, etc. In the event it is determined that the challenge comprises a signature challenge, control passes to 6E02. In 6E02, a challenge document is created. For example, a challenge document comprises random data, hash data, a precomputed challenge document, or any other appropriate challenge document. In 6E04, the challenge document is provided. For example, the challenge document is provided to the user authentication device. In the event it is determined in 6E00 that the challenge comprises a credential challenge, control passes to 6E06. In 6E06, a set of credentials satisfactory to authenticate access to the task is determined. For example, the set of credentials satisfactory to authenticate access to the task is determined using a set of credential rules. In some embodiments, the set of credentials is based at least in part on a context of the task (e.g., viewing a worker's salary might require that the viewer hold a human resources administrator credential and/or that the viewer hold a valid personally identifiable information (PII) trained information technology (IT) worker credential, self-service viewing of a W2 requires a credential with the same government ID as the document is issued to, self-service changing the bank routing details of where an employee paycheck is sent requires a credential given to that employee when they started with the employer, etc.) and/or on rules that enable access. In 6E08, a proof request is created comprising a request for a credential of the set of credentials. In 6E10, the proof request is provided. For example, the proof request is provided to the user authentication device.

Figure 6F:
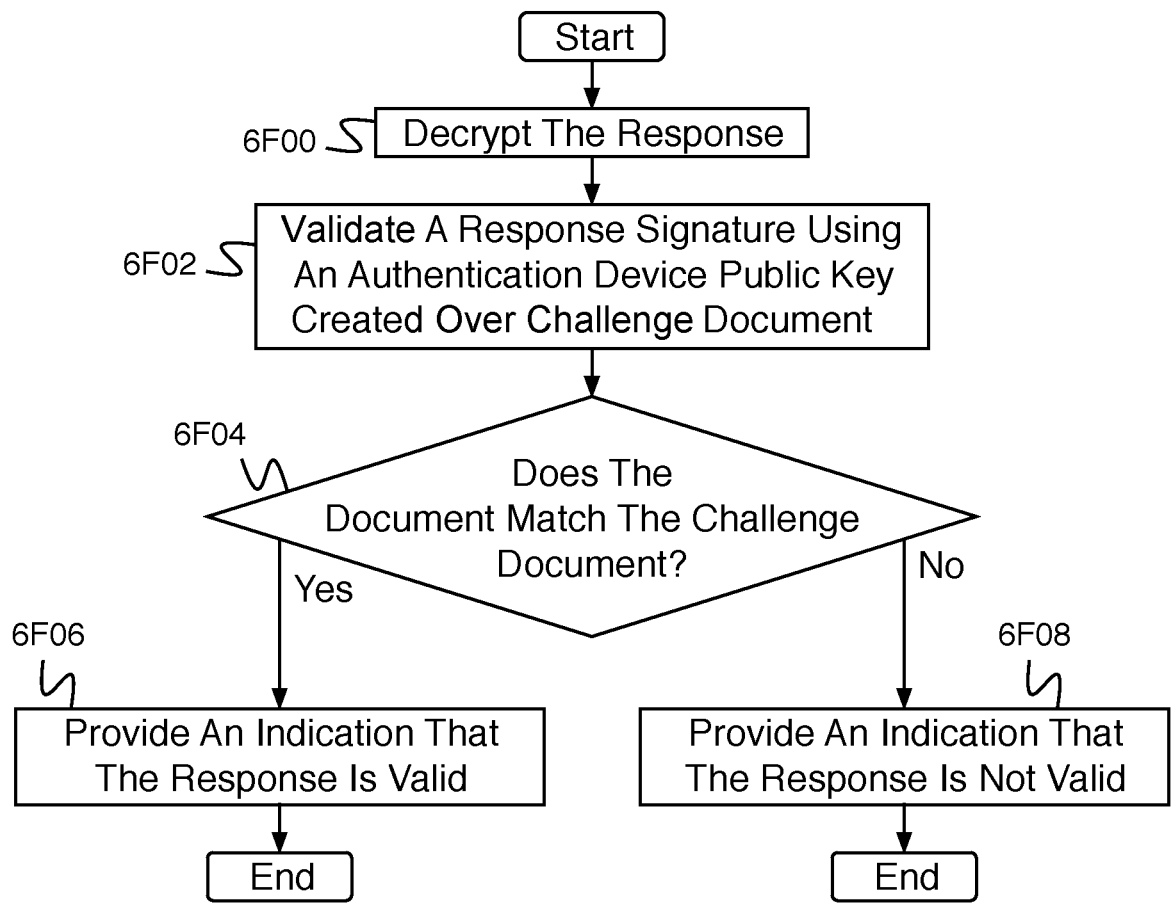
FIG. 6F is a flow diagram illustrating an embodiment of a process for determining whether a response is valid.

FIG. 6F is a flow diagram illustrating an embodiment of a process for determining whether a response is valid. In some embodiments, the process of FIG. 6F implements 6D16 of FIG. 6D in the event that the challenge comprises a signature challenge. In the example shown, in 6F00, the response is decrypted. For example, the response is transmitted encrypted with a per-channel key. In 6F02, a response signature is validated using an authentication device public key created over the challenge document. In 6F04, it is determined whether the document matches the challenge document (e.g., a challenge document created in 6E02 of FIG. 6E). In the event it is determined that the document matches the challenge document, control passes to 6F06. In 6F06, an indication is provided that the response is valid, and the process ends. In the event it is determined in 6F04 that the document does not match the challenge document, control passes to 6F08. In 6F08, an indication is provided that the response is not valid.

Figure 6G:
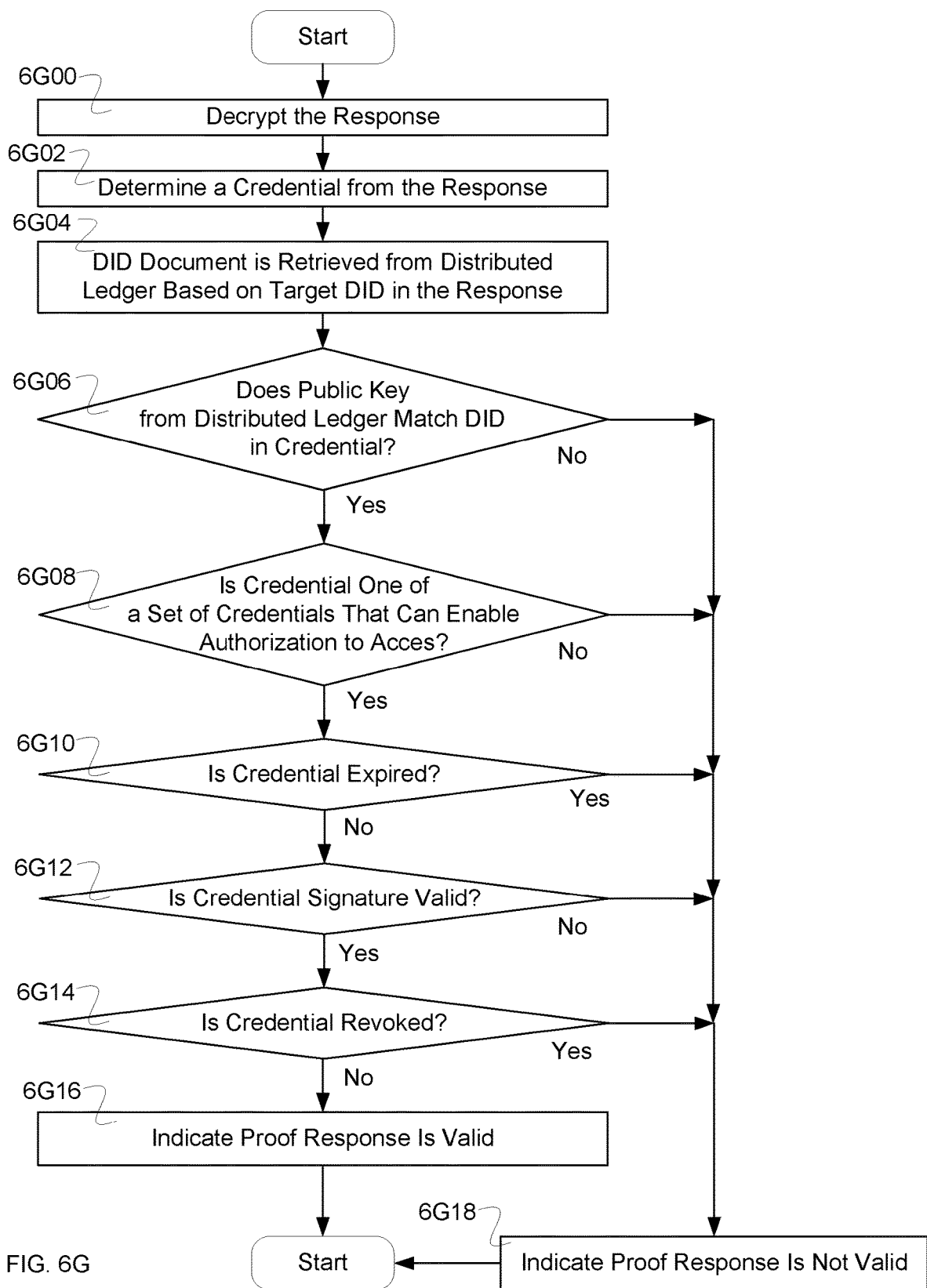
FIG. 6G is a flow diagram illustrating an embodiment of a process for determining whether a response is valid.

FIG. 6G is a flow diagram illustrating an embodiment of a process for determining whether a response is valid. In some embodiments, the process of FIG. 6G implements 6D16 of FIG. 6D in the event that the challenge comprises a credential challenge. In the example shown, in 6G00, the response is decrypted. For example, the response is transmitted encrypted with a per-channel key. In 6G02, a credential is determined from the response. In 6G04, a DID document is retrieved from a distributed ledger based on target DID in the response.

In 6G06, it is determined whether a public key from a decentralized ledger matches a decentralized identifier (DID) in the credential. In the event it is determined that a public key from a distributed ledger does not match a DID in the credential, control passes to 6G18. In the event it is determined in 6G06 that that a public key from a distributed ledger matches a DID in the credential, control passes to 6G08. In 6G08, it is determined whether the credential is one of a set of credentials that can enable authorization to access. In the event it is determined that the credential is not one of the set of credentials that can enable authorization to access, control passes to 6G18. In the event it is determined in 6G08 that the credential is one of the set of credentials that can enable authorization to access, control passes to 6G10. In 6G10, it is determined whether the credential is expired. In the event it is determined that the credential is expired, control passes to 6G18. In the event it is determined in 6G10 that the credential is not expired, control passes to 6G12. In 6G12, it is determined whether the credential signature is valid. In the event it is determined that the credential signature is not valid, control passes to 6G18. In the event it is determined in 6G12 that the credential signature is valid, control passes to 6G14. In 6G14, it is determined whether the credential is revoked. For example, determining that the credential is revoked comprises querying a revocation registry of a revocation database or a distributed ledger (e.g., a decentralized ledger, a permissioned ledger, a public ledger, a blockchain, etc.) In the event that the credential is revoked, control passes to 6G18. In the event that the credential is not revoked, control passes to 6G16. In 6G16, the process indicates that the response is valid, and the process ends. In 6G18, the process indicates that the response is not valid, and the process ends.

Figure 6H:
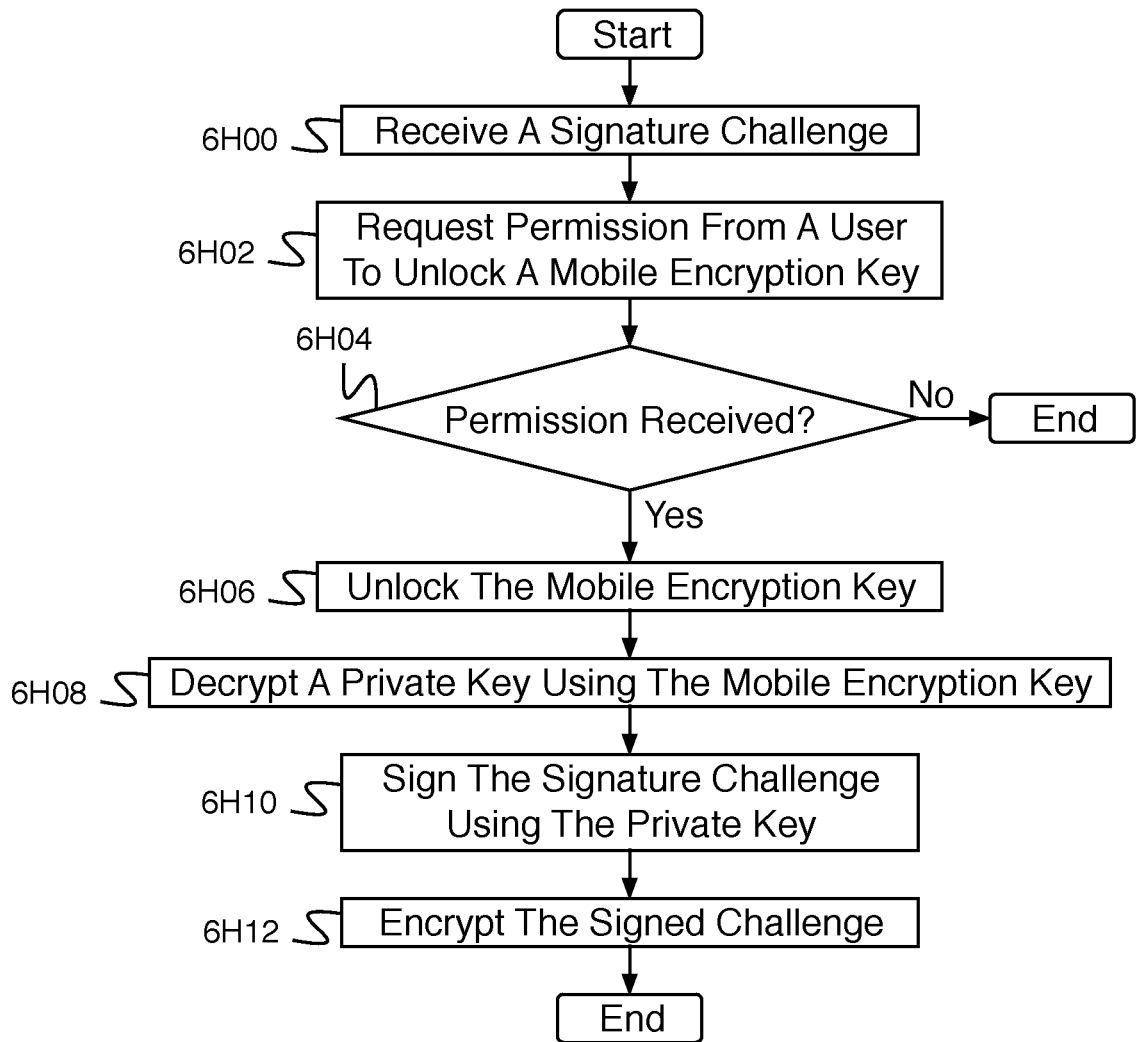
FIG. 6H is a flow diagram illustrating an embodiment of a process for responding to a signature challenge.

FIG. 6H is a flow diagram illustrating an embodiment of a process for responding to a signature challenge. In some embodiments, the process of FIG. 6H is executed by an authentication device (e.g., authentication device 6A02 of FIG. 6A). In the example shown, in 6H00, a signature challenge is received. In 6H02, permission from a user to unlock a mobile encryption key is requested. In 6H04, it is determined whether permission is received (e.g., whether the user granted permission to unlock the mobile encryption key). For example, a user providing permission comprises a user providing an indication to grant permission, a user providing login information, a user providing biometric information, etc. In the event it is determined that permission is not received, the process ends. In the event it is determined that permission is received, control passes to 6H06. In 6H06, the mobile encryption key is unlocked. In 6H08, a private key is decrypted using the mobile encryption key. In 6H10, the signature challenge is signed using the private key. For example, the signature challenge is signed using the identity private key. In 6H12, the signed challenge is encrypted (e.g., using a per-channel key).

Figure 6I:
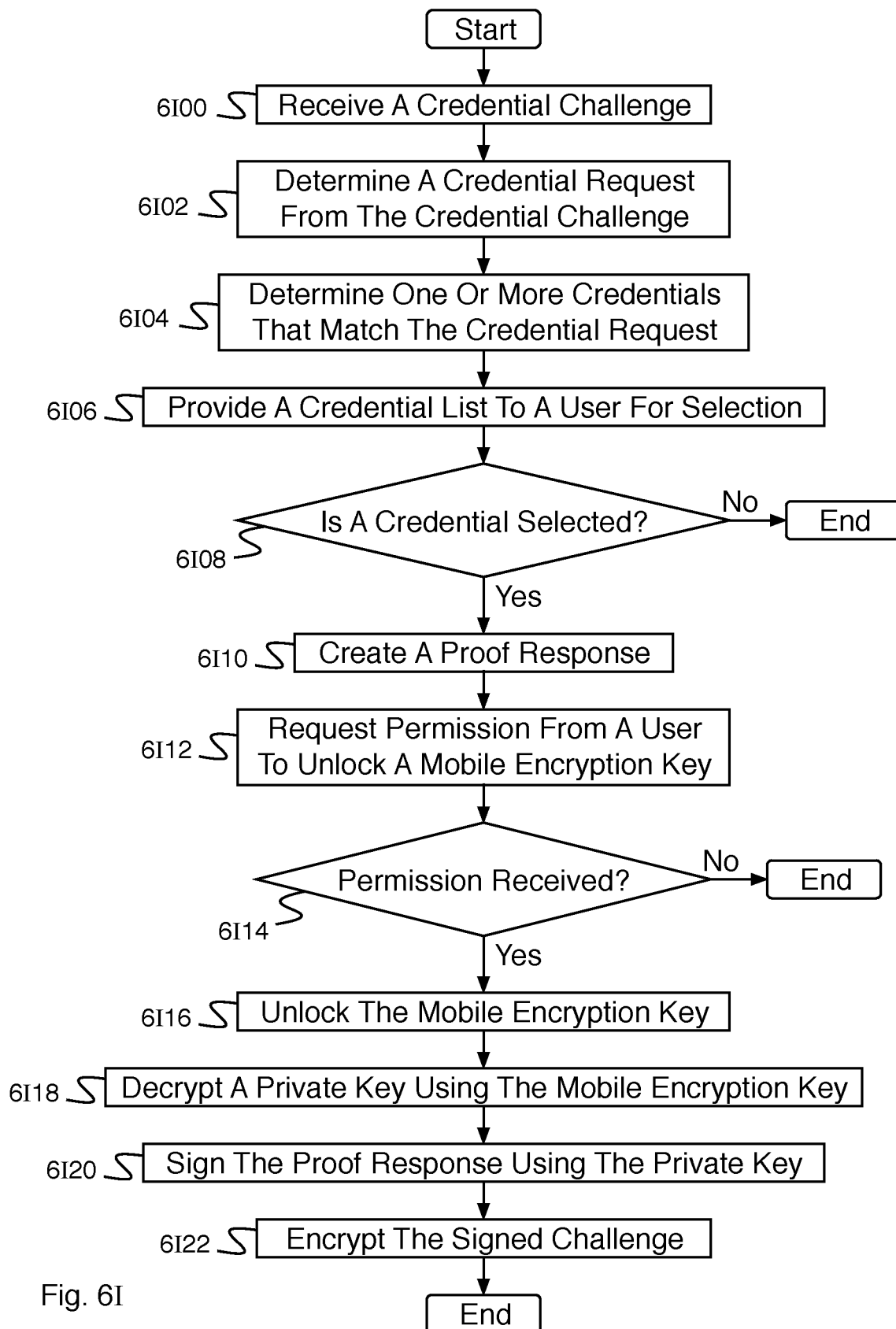
FIG. 6I is a flow diagram illustrating an embodiment of a process for responding to a credential challenge.

FIG. 6I is a flow diagram illustrating an embodiment of a process for responding to a credential challenge. In some embodiments, the process of FIG. 6I is executed by an authentication device (e.g., authentication device 6A02 of FIG. 6). In the example shown, in 6I00, a credential challenge is received. In 6I02, a credential request is determined from the credential challenge. In 6I04, one or more credentials that match the credential request are determined. In 6I06, a credential list is provided to a user for selection. In 6I08, it is determined whether a credential is selected. In the event it is determined that a credential is not selected, the process ends. In the event it is determined that a credential is selected, control passes to 6I10. In 6I10, a proof response is created (e.g., comprising the selected credential). In 6I12, permission from a user to unlock a mobile encryption key is requested. In 6I14, it is determined whether permission is received (e.g., from a user to unlock a mobile encryption key). In the event it is determined that permission is not received, the process ends. In the event it is determined that permission is received, control passes to 6I16. In 6I16, the mobile encryption key is unlocked. In 6I18, a private key is decrypted using the mobile encryption key. In 6I20, the proof response is signed using the private key. In 6I22, the signed challenge is encrypted (e.g., using a per-channel key).

Figure 6J:
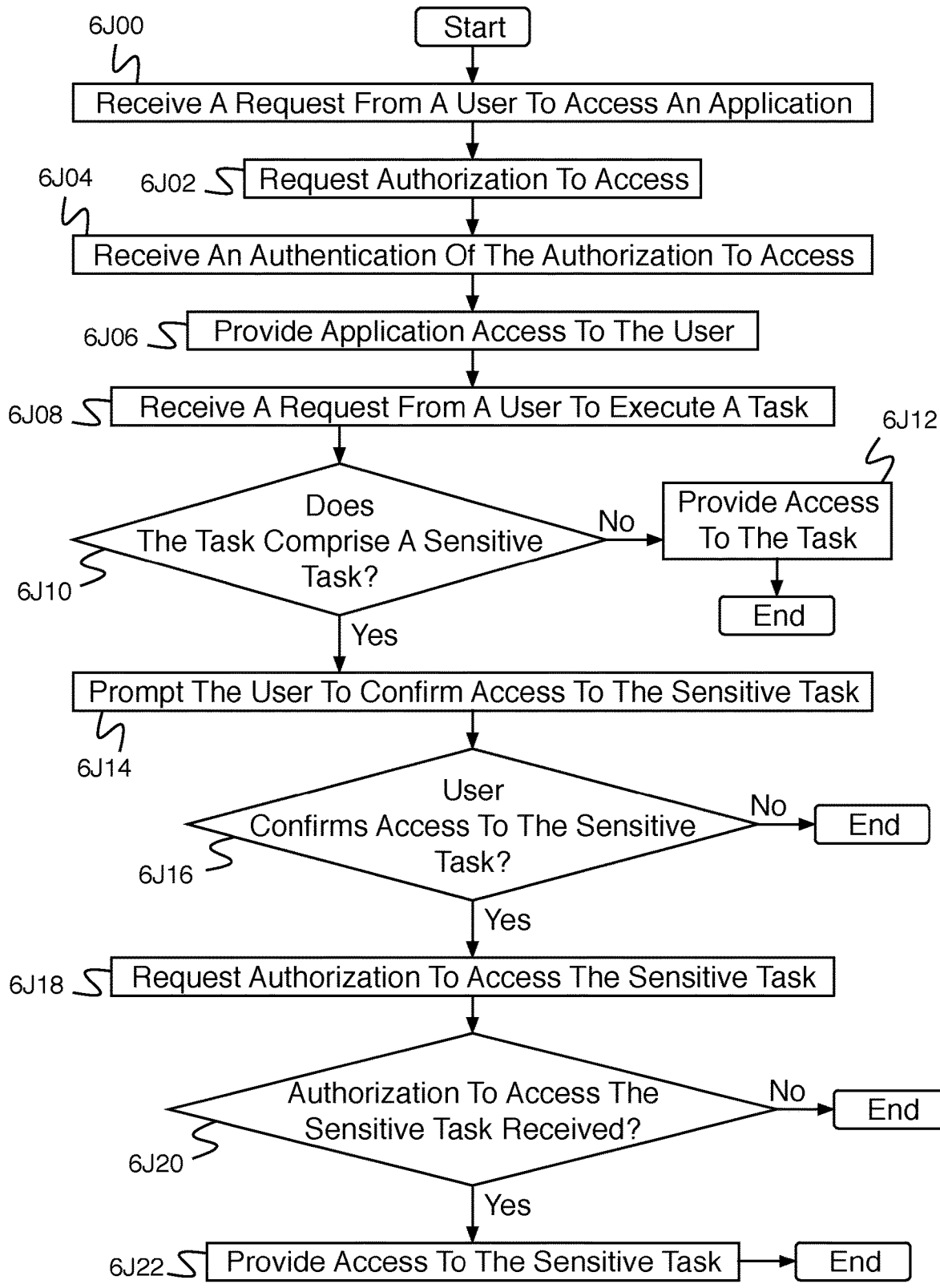
FIG. 6J is a flow diagram illustrating an embodiment of a process for an application system.

FIG. 6J is a flow diagram illustrating an embodiment of a process for an application system. In some embodiments, the process of FIG. 6J is executed by application system 6A08 of FIG. 6A. In the example shown, in 6J00, a request from a user to access an application is received. In 6J02, authorization to access is requested. In 6J04, an authentication of the authorization to access is received. In 6J06, application access is provided to the user. In 6J08, a request is received from the user to execute a task. In 6J10, it is determined whether the task comprises a sensitive task. In the event the task does not comprise a sensitive task, control passes to 6J12. In 6J12, access to the task is provided, and the process ends. In the event it is determined in 6J10 that the task comprises a sensitive task, control passes to 6J14. In 6J14, the user is prompted to confirm access to the sensitive task. In 6J16, it is determined whether the user confirms access to the sensitive task. In the event it is determined that the user does not confirm access to the sensitive task, the process ends. In the event it is determined that the user confirms access to the sensitive task, control passes to 6J18. In 6J18, authorization to access the sensitive task is requested. In 6J20, it is determined whether authorization to access the sensitive task is received. In the event authorization to access the sensitive task is not received, the process ends. In the event authorization to access the sensitive task is received, control passes to 6J22. In 6J22, access to the sensitive task is provided.

The system comprises an interface and a processor. The interface is configured to receive a request from an application for authorization to access, wherein access to the application is requested by a user, and receive a task request from the application for authorization to access a task, wherein access to the task is requested by the user. The processor is configured to authenticate the request from the application for authorization to access, determine that the task comprises a sensitive task, determine a user authentication device, provide a challenge for a digital credential to the user authentication device, wherein the digital credential is backed by data stored in a distributed ledger, receive a response from the user authentication device, determine the response is valid, and provide an authorization to access the sensitive task. In some embodiments, the challenge for the digital credential to the user authentication device is based at least in part on rules. In some embodiments, the task request from the application for authorization to access the sensitive task is received via an encrypted JSON message. In some embodiments, the application prompts the user to confirm access to the sensitive task prior to providing the task request for authorization to access the sensitive task. In some embodiments, authenticating the request from the application for authorization to access comprises providing an access token to the application. In some embodiments, the processor is further configured to validate a signature on the task request from the application for authorization to access the task. In some embodiments, the processor is further configured to determine a user identifier based at least in part on the request from an application for authorization to access. In some embodiments, the processor is further configured to determine the user authentication device based at least in part on the user identifier. In some embodiments, the response is encrypted. In some embodiments, the response is encrypted with a per-channel key. In some embodiments, the response comprises the challenge signed with a user authentication device private key. In some embodiments, the user authentication device signs the challenge with the user authentication device private key in response to user provided biometric data. In some embodiments, determining the response is valid comprises validating the challenge signature. In some embodiments, the response comprises a credential. In some embodiments, the credential is selected from a credential wallet. In some embodiments, the challenge to the user authentication device comprises a set of credentials for satisfying the challenge. In some embodiments, the set of credentials is based at least in part on a context of the task and on rules that enable access. In some embodiments, the processor is further configured to access a public key in a public decentralized ledger and verify the public key corresponds to a decentralized identifier stored by the credential. In some embodiments, determining the response is valid comprises determining that the credential is not expired and that the credential comprises a valid signature associated with the user. In some embodiments, determining the response is valid comprises querying a blockchain to determine that the credential is not revoked.

Case G—Digital Credentials for Access to Sensitive Data

A system for providing access comprises an interface configured to receive an application access request from an application for authorization to access, wherein access to the application is requested by a user, and receive a sensitive data access request from the application for authorization to access a document that includes sensitive data, wherein access to the document is requested by the user, and a processor configured to determine to authorize access to the application in response to the application access request, wherein the authorizing access includes linking a user authentication device with the user, determine the user authentication device in response to the sensitive data access request, provide a secondary request for authorization to access sensitive data to the user authentication device in response to the sensitive data access request, receive a secondary request response from the user authentication device to the secondary request, and provide the secondary request response to the application enabling access to the sensitive data, wherein the document is encrypted for delivery to the application for the user using a blinding secret and an identity private key.

A system for providing access to sensitive data comprises a digital credential aware identity and access management service (DCIAMS) in communication with an application system and a plurality of authentication devices associated with users. A user using a user system remotely accesses an application on the application system—for example, using a web browser. The user accesses the application to store data, access data, analyze data, execute applications, etc. When the user initially accesses the application on the application system, a user login must be established. For example, the user provides a user identifier and password, the user provides biometric information, the user supplies a personal identification number (PIN), etc. When utilizing a digital credential for access, the application server contacts the DCIAMS with user login information. The DCIAMS determines an authentication device associated with the user and a set of credentials satisfactory to authenticate the login, and contacts the authentication device with a request for a credential. In the event that the authentication device satisfactorily provides the credential, the DCIAMS indicates to the application server to allow the user login to the application.

Once the user has completed login and is utilizing the application on the application system, a secondary level of confirmation can be required for access to sensitive data. For example, in the event that the user logs into a database application and then leaves their desk, a different user should be prevented from accessing secure information within the database application (e.g., social security numbers, tax information, personnel review information, etc.). The information also must be transmitted securely to prevent its interception. When the user requests access to a sensitive document, the application responds to the user system with a request for a blinding secret. For example, the blinding secret comprises an asymmetric encryption key. The user system creates the blinding secret and provides the public blinding secret to the application system. The application system creates a document encryption key and uses the document encryption key to encrypt the sensitive document. The application system then determines an authentication system associated with the user and determines a public encryption key associated with the authentication system. For example, the application system looks up the public key in a public key database, looks up a public key reference in a distributed ledger (e.g., a decentralized ledger, a permissioned ledger, a public ledger, a blockchain, etc.). The application system encrypts the document encryption key using the authentication device and passes it along with the blinding secret and the user identifier for the requesting user, to the DCIAMS. At this point only the user authentication device can decrypt with the document encryption key. The DCIAMS identifies the authentication device using the user identifier and provides the encrypted document encryption key and the blinding secret to the authentication device. The authentication device first prompts the user to confirm access to secure data. Since the user always has the authentication device with them, if an attacker attempts to access secure data while they are stepped away from their computer, the process will be stopped here. For extra security a biometric indicator or a PIN can be used to confirm access, preventing confirmation even if the user has left their authentication device behind. In the event the user confirms access, the authentication device decrypts the document encryption key using its private key, and blinds the document encryption key using the blinding secret. The authentication device provides the blinded document encryption key back to the DCIAMS, which provides it to the application server. The application server provides the blinded document encryption key and the encrypted sensitive data to the user system. The user system uses the blinding secret it generated to decrypt the document encryption key, and then uses the document encryption key to decrypt the sensitive document. The user then accesses the sensitive document.

Figure 7A:
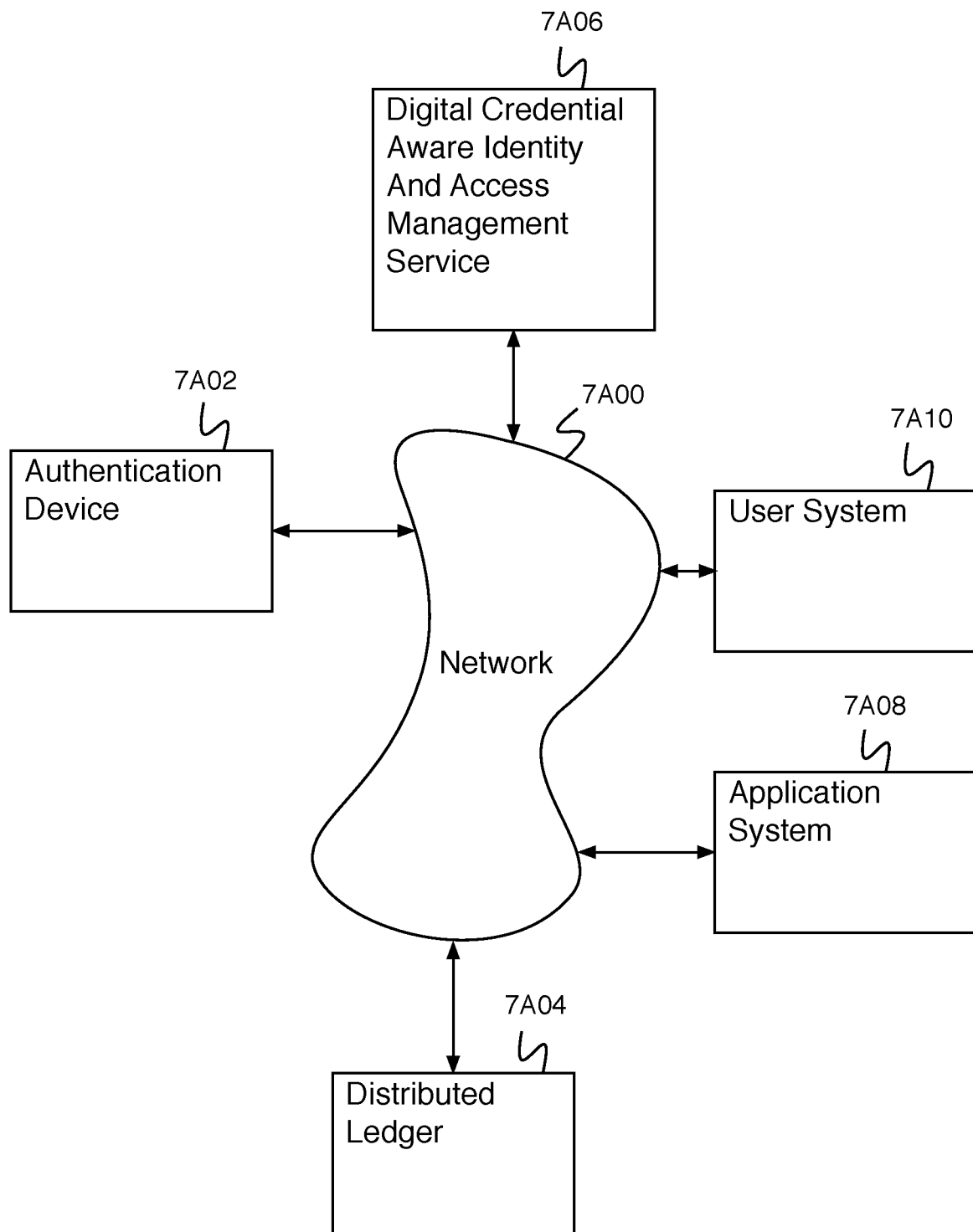
FIG. 7A is a block diagram illustrating an embodiment of a network system.

FIG. 7A is a block diagram illustrating an embodiment of a network system. In some embodiments, the network system of FIG. 7A comprises a network system for a credential system. In the example shown, FIG. 7A comprises network 7A00. In various embodiments, network 7A00 comprises one or more of the following: a local area network, a wide area network, a wired network, a wireless network, the Internet, an intranet, a storage area network, or any other appropriate communication network. Authentication device 7A02, distributed ledger 7A04, digital credential aware identity and access management service 7A06, application system 7A08, and user system communicate via network 7A00. Authentication device 7A02 comprises an authentication device associated with a user (e.g., a user of application system 7A08, a user using user system 7A10). For example, authentication device 7A02 comprises a computer, a smartphone, a tablet, a mobile device, etc. Distributed ledger 7A04 comprises a distributed ledger (e.g., a decentralized ledger, a permissioned ledger, a public ledger, a blockchain, etc.). For example, distributed ledger 7A04 is stored on a plurality of systems and comprises one or more permissioned writer systems for writing to the distributed ledger. Digital credential aware identity and access management service (DCIAMS) 7A06 comprises a system for interacting with authentication device 7A02, distributed ledger 7A04, application system 7A08, and any other appropriate systems. DCIAMS 7A06 comprises a system for coordinating a login for application system 7A08, for providing a credential to authentication device 7A02, for requesting a credential from authentication device 7A02, for verifying a user identifier or a signature in distributed ledger 7A04, etc. Application system 7A08 comprises a system for providing access to an application. For example, application system 7A08 comprises a system for providing access to a database application, a data processing application, a productivity application, a communication application, etc. A user uses user system 7A10 to access applications on application system 7A08. For example, a user uses an application on user system 7A10 (e.g., a web browser) to connect to an application on application system 7A08. The application on application system 7A08 authenticates a user login before granting access.

DCIAMS 7A06 comprises a system for providing authentication for authenticating access to sensitive data. For example, DCIAMS 7A06 comprises an interface configured to receive an application access request from an application for authorization to access, wherein access to the application is requested by a user, and receive a sensitive data access request from the application for authorization to access a document that includes sensitive data, wherein access to the document is requested by the user, and a processor configured to determine to authorize access to the application in response to the application access request, wherein the authorizing access includes linking a user authentication device with the user, determine the user authentication device in response to the sensitive data access request, provide a secondary request for authorization to access sensitive data to the user authentication device in response to the sensitive data access request, receive a secondary request response from the user authentication device to the secondary request, and provide the secondary request response to the application.

Figure 7B:
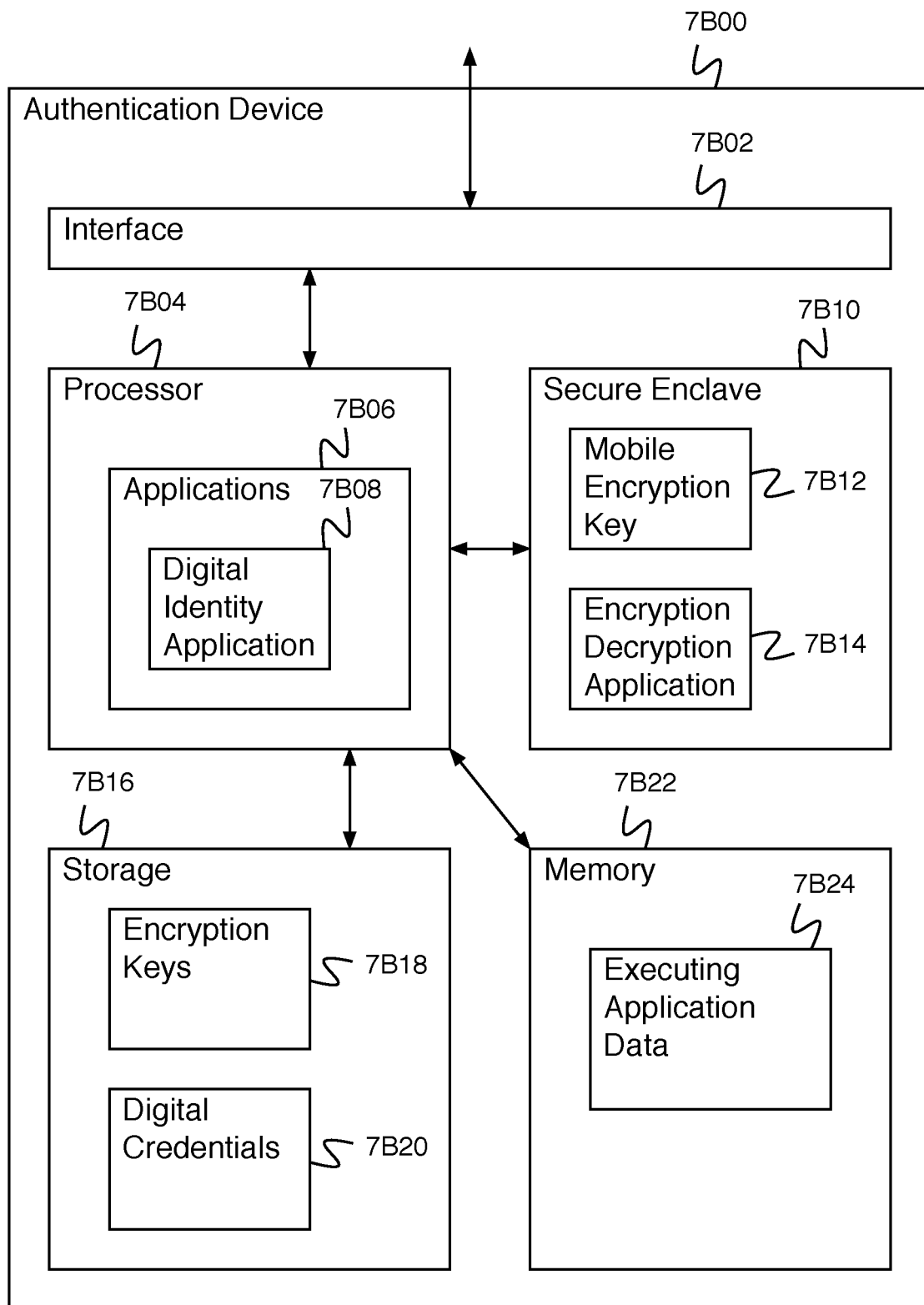
FIG. 7B is a block diagram illustrating an embodiment of an authentication device.

FIG. 7B is a block diagram illustrating an embodiment of an authentication device. In some embodiments, authentication device 7B00 of FIG. 7B comprises authentication device 7A02 of FIG. 7A. In the example shown, authentication device 7B00 comprises interface 7B02. For example, interface 7B02 comprises an interface for receiving data, providing data, receiving a request for data, etc. Processor 7B04 comprises a processor for executing applications 7B06. Applications 7B06 comprise digital identity application 7B08 and any other appropriate applications. Digital identity application 7B08 comprises an application for providing a proof response in response to a proof request. For example, digital identity application 7B08 comprises an application for receiving a credential challenge from a DCIAMS (e.g., DCIAMS 7A06 of FIG. 7A), determining a credential request from the credential challenge, determining one or more credentials that match the credential request, providing a credential list to a user for credential selection, in the event it is determined that a credential is selected, creating a proof response, providing a request to unlock a mobile encryption key, and in the event permission is received, unlocking a mobile encryption key, decrypting an identity key pair private key using the mobile encryption key, signing the proof response using the identity key pair private key, and providing the signed proof response.

Digital identity application 7B08 comprises an application for providing a signature challenge response in response to a signature challenge request. For example, digital identity application 7B08 comprises an application for receiving a signature challenge, unlocking a mobile encryption key (e.g., using a biometric, a PIN, etc.), decrypting a private key using the mobile encryption key, signing the signature challenge using the private key, encrypting the signed signature challenge (e.g., using a per-channel key), and providing the encrypted signed signature challenge. Digital identity application 7B08 additionally comprises an application for responding to a secure data request. For example, digital identity application 7B08 comprises an application for receiving a secondary request for authorization to access sensitive data, requesting permission from a user to unlock a mobile encryption key, in the event permission is received unlocking the mobile encryption key, decrypting a private key using the mobile encryption key, requesting permission from the user to unlock the secondary request, in the event permission is received unlocking the secondary request, accessing an encrypted document encryption key and a blinding secret, decrypting the encrypted document encryption key with the private key, blinding the document encryption key with the blinding secret, and providing a secondary request response comprising the blinded document encryption key.

Secure enclave 7B10 comprises a secure system for storing a mobile encryption key. Secure enclave 7B10 comprises mobile encryption key 7B12 and encryption decryption application 7B14. For example, secure enclave 7B10 comprises multiple mobile encryption keys, an application for generating and/or removing mobile encryption keys, etc. Secure enclave 7B10 comprises a system for receiving data, transforming it by encrypting and/or decrypting the data using a mobile encryption key or keys, and providing the transformed data. For example, secure enclave 7B10 is configured to only provide transformed input data and not to provide mobile encryption key 7B12. In some embodiments, functionality of secure enclave 7B10 is access limited using a biometric (e.g., a fingerprint, a retina scan, a DNA scan, etc.) and/or a PIN. Authentication device 7B00 additionally comprises storage 7B16. Storage 7B16 comprises encryption keys 7B18, for example comprising a public key of an identity key pair, a private key of an identity key pair, a private key of an identity key pair encrypted using mobile encryption key 7B12, etc. For example, an identity key pair of authentication device 7B00 comprises a public key used by other systems for encrypting data in such a way that it can only be decrypted by authentication device 7B00, and a private key for decrypting data encrypted using the public key or for signing data for proving it came from authentication device 7B00. Storage 7B16 additionally comprises digital credentials 7B20, comprising digital certificates representing qualifications (e.g., a college degree, work experience, time living at an apartment, time enrolled in a health insurance plan, etc.). Authentication device 7B00 additionally comprises memory 7B22. Memory 7B22 comprises executing application data 7B24, comprising data associated with applications 7B06.

Figure 7C:
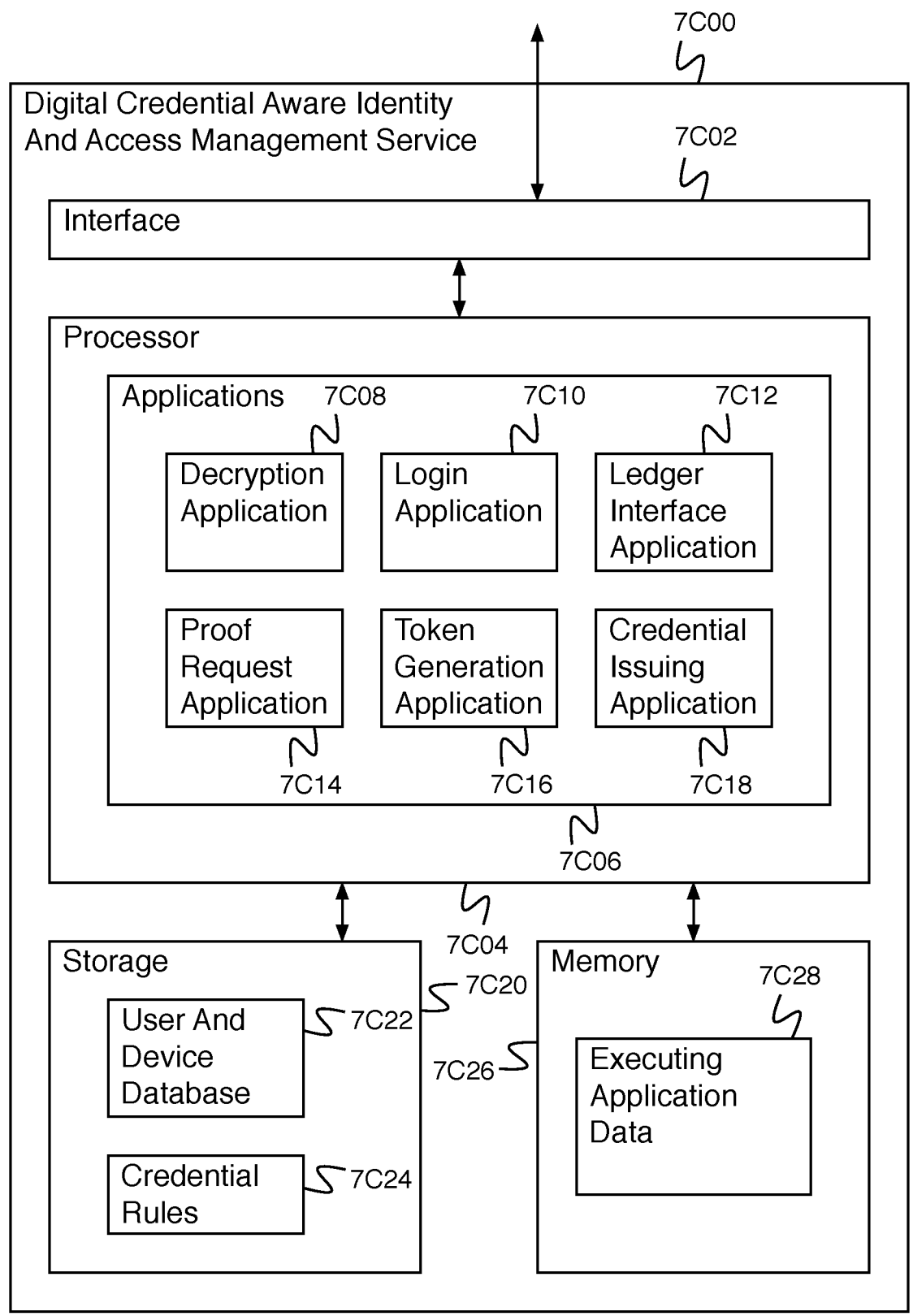
FIG. 7C is a block diagram illustrating an embodiment of a digital credential aware identity and access management service (DCIAMS).

FIG. 7C is a block diagram illustrating an embodiment of a digital credential aware identity and access management service (DCIAMS). In some embodiments, DCIAMS 7C00 comprises DCIAMS 7A06 of FIG. 7A. In the example shown DCIAMS 7C00 comprises interface 7C02. For example, interface 7C02 comprises an interface for receiving data, providing data, receiving a request for data, etc. In some embodiments, interface 7C02 comprises an interface for receiving encrypted messages or encrypted javascript object notation (JSON) messages. Processor 7C04 comprises a processor for executing applications 7C06. Applications 7C06 comprise a set of DCIAMS applications. Decryption application 7C08 comprises an application for decrypting encrypted data using a key. Login application 7C10 comprises an application for receiving login information (e.g., username and password, a credential, a quick response (QR) code challenge, etc.) and providing login credentials (e.g., a login token). Ledger interface application 7C12 comprises an application for interacting with a distributed ledger (e.g., distributed ledger 7A04 of FIG. 7A). For example ledger interface application 7C12 comprises an application for verifying a signature in a ledger or checking a credential identifier for revocation in a ledger. Proof request application 7C14 comprises an application for creating a proof request, sending a proof request, evaluating a proof request response (e.g., a proof response), etc. Token generation application 7C16 comprises an application for generating a login token (e.g., in response to a successful login). Credential issuing application 7C18 comprises an application for issuing a digital credential for proving a qualification in response to a request from a credential issuing authority to issue the credential. Applications 7C06 additionally comprise any other appropriate applications. For example, processor 7C04 comprises a processor configured to determine to authorize access to an application in response to an application access request, wherein the authorizing access includes linking a user authentication device with the user, determine a user authentication device in response to a sensitive data access request, provide a secondary request for authorization to access sensitive data to the user authentication device in response to the sensitive data access request, receive a secondary request response from the user authentication device to the secondary request, and provide the secondary request response to the application. Storage 7C20 comprises user and device database 7C22 and credential rules 7C24. User and device database 7C22 comprises a database of registered users for a given customer organization and user details (e.g., username, password hash, contact information, email address, relationship to devices, registered public keys, registered mapping documents in a distributed ledger, etc.). User and device database 7C22 additionally comprises a device directory comprising all the devices for a given customer organization as well as mapping documents associated with the devices and relationships with users associated with the devices. Credential rules 7C24 comprises a set of credential rules for determining a credential that satisfies a given access request—for example, rules related to a credential associated schema, a credential associated organization, a credential issuer, a credential associated location, a credential associated class identifier, a credential associated license number, or any other appropriate credential rules. In various embodiments, rules comprise rules related to a credential associated schema, rules related to a credential associated organization, rules related to a credential issuer, rules related to a credential associated location, rules related to a credential associated class identifier or identifier number, rules related to a credential associated license or license number, a credential associated class name, or any other appropriate credential rules. In some embodiments, the rules are applied selectively (e.g., based at least in part on a user identifier)— for example, employees with a credential can access application A, contractors with a credential can access application B, or any other appropriate matching of access with identifiers. In various embodiments, the rules are applied selectively based at least in part on current employment, employee type, location of user, qualification by training class, credential from a third party issuer (e.g., division of motor vehicle license, certification from school, etc.), or any other appropriate criterion. As examples of configurable credential rules to grant access: 1) access is granted in the event that a credential indicates that the holder is a current employee (e.g., issuing company is valid, employee status is not expired, and not revoked); 2) access is granted in the event that a credential indicates that the holder is an employee in an organization of the company (e.g., issuing company is valid, organization is specified organization, employee status is not expired, and not revoked); 3) access is granted in the event that a credential indicates that the holder is an employee in a specified location (e.g., issuing company is valid, location is a specified location, employee status is not expired, and not revoked); 4) access is granted in the event that a credential indicates that the holder has necessary training (e.g., issuing company is valid, training status is complete, employee status is not expired, and not revoked); and 5) access is granted in the event that a credential indicates that the holder has outside credential (e.g., issuing company is valid, outside credential is valid, outside credential issuer is third party, employee status is not expired, and not revoked). DCIAMS 7C00 additionally comprises memory 7C26. Memory 7C26 comprises executing application data 7C28, comprising data associated with applications 7C06.

Figure 7D:
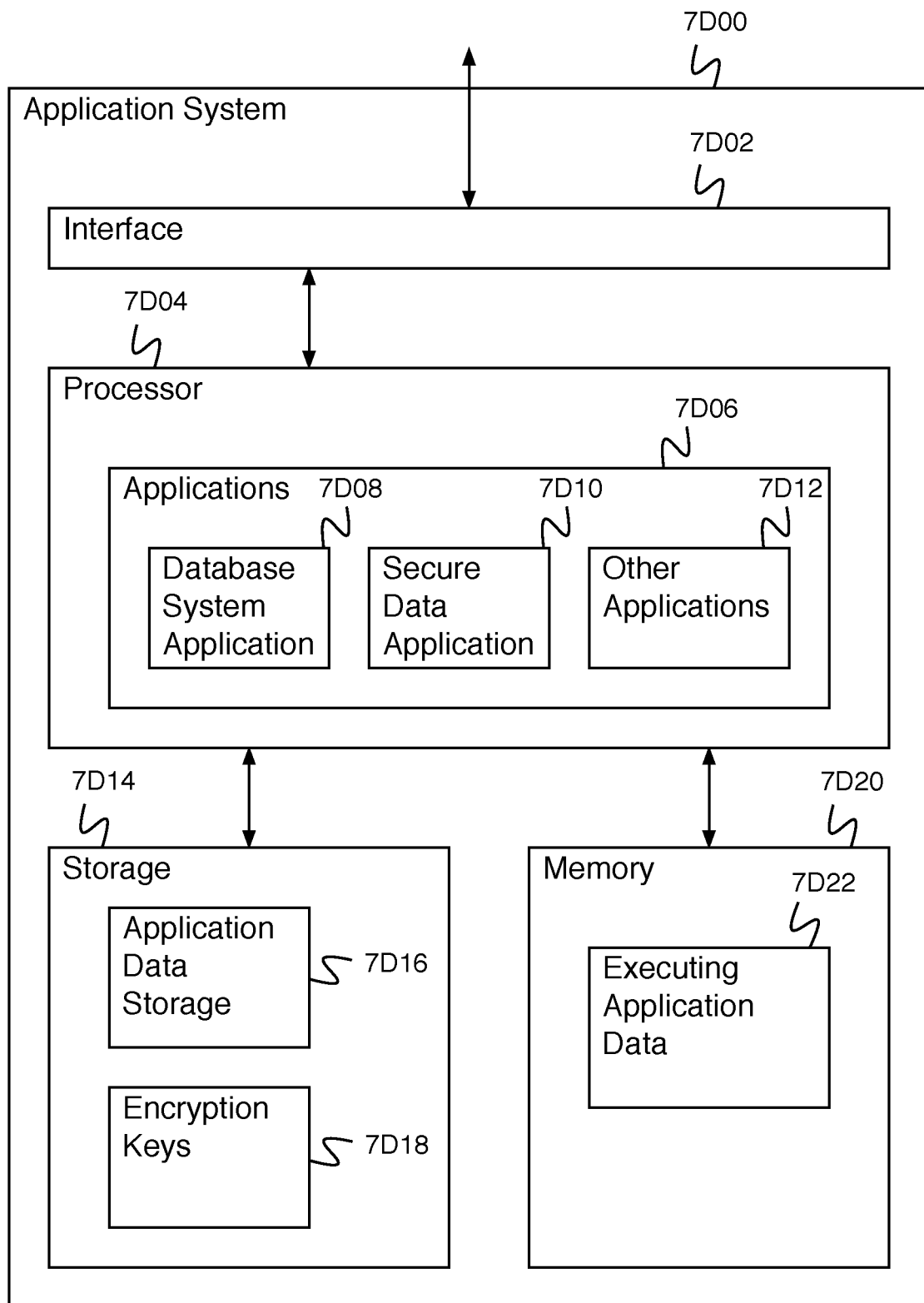
FIG. 7D is a block diagram illustrating an embodiment of an application system.

FIG. 7D is a block diagram illustrating an embodiment of an application system. In some embodiments, application system 7D00 of FIG. 7D comprises application system 7A08 of FIG. 7A. In the example shown, application system 7D00 comprises interface 7D02. For example, interface 7D02 comprises an interface for receiving data, providing data, receiving a request for data, etc. Processor 7D04 comprises a processor for executing applications 7D06. Applications 7D06 comprises database system 7D08 (e.g., application system 7D00 functions as a database system), secure data application 7D10, and other applications 7D10. Secure data application 7D10 comprises an application for encrypting data, decrypting data, generating encryption keys, or any other appropriate secure data processes.

For example, secure data application 7D10 comprises an application for receiving an indication from a user app to access sensitive data, providing a request for a blinding secret to the user app, receiving the blinding secret, generating a document encryption key, encrypting the sensitive data with the document encryption key, determining a public encryption key for an authentication device associated with the user, providing the blinding secret, the encrypted document encryption key, and a user identifier to a DCIAMS, receiving a blinded document encryption key, and providing the encrypted sensitive data and the blinded document encryption key to the user app. Other applications 7D12 comprise any other appropriate applications (e.g., a communications application, a chat application, a web browser application, a document preparation application, a report preparation application, a user interface application, a data analysis application, etc.).

Application system 7D00 additionally comprises storage 7D14. Storage 7D14 comprises application data storage 7D16, for example comprising data stored by applications 7D08. Some data of application data storage 7D16 comprises sensitive data. Storage 7D14 additionally comprises encryption keys 7D18, for example comprising a public key of an identity key pair, a private key of an identity key pair, public keys of other systems, one or more document encryption keys, etc. For example, an identity key pair of application system 7D00 comprises a public key used by other systems for encrypting data in such a way that it can only by decrypted by application system 7D00, and a private key for decrypting data encrypted using the public key or for signing data for proving it came from application system 7D00. Application system 7D00 additionally comprises memory 7D20. Memory 7D20 comprises executing application data 7D22, comprising data associated with applications 7D06.

Figure 7E:
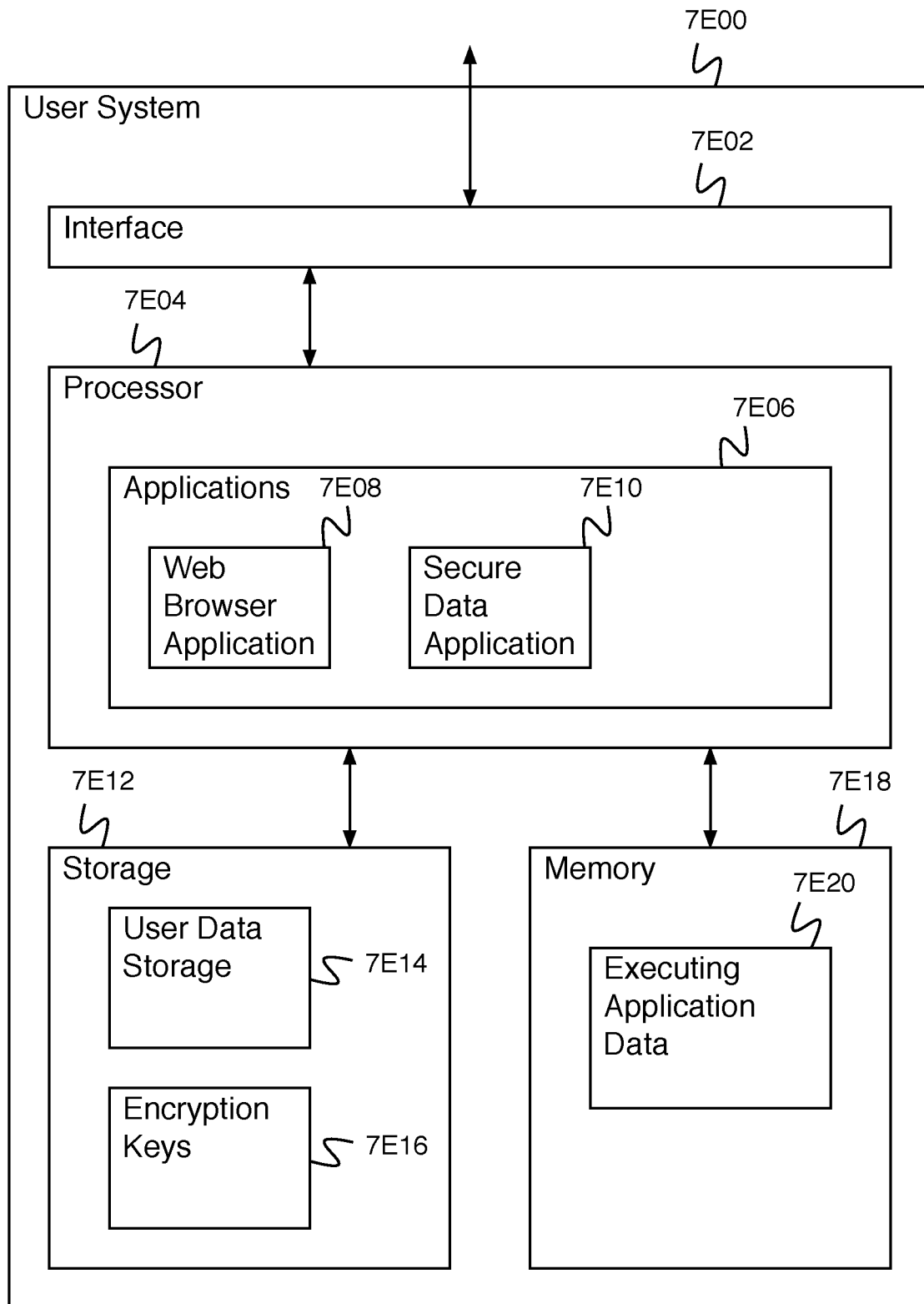
FIG. 7E is a block diagram illustrating an embodiment of a user system.

FIG. 7E is a block diagram illustrating an embodiment of a user system. In some embodiments, user system 7E00 of FIG. 7E comprises user system 7A10 of FIG. 7A. In the example shown, user system 7E00 comprises interface 7E02. For example, interface 7E02 comprises an interface for receiving data, providing data, receiving a request for data, etc. Processor 7E04 comprises a processor for executing applications 7E06. Applications 7E06 comprises web browser application 7E08 (e.g., an application for communicating with other systems using a web protocol), secure data application 7E10, and any other appropriate applications. Secure data application 7E10 comprises an application for encrypting data, decrypting data, generating encryption keys, or any other appropriate secure data processes.

For example, secure data application 7E10 comprises an application for providing an indication to access data to an application on an application system, receiving a request for a blinding secret, generating the blinding secret, providing the blinding secret to the application, in the event the application responds receiving the data encrypted with a document encryption key and the document encryption key blinded with the blinding secret, decrypting the document encryption key with the blinding secret, decrypting the data with the document encryption key, and accessing the data.

User system 7E00 additionally comprises storage 7E12. Storage 7E12 comprises user data storage 7D14—for example comprising any appropriate user data, and encryption keys 7E16, for example comprising a public key of an identity key pair, a private key of an identity key pair, public keys of other systems, etc. For example, an identity key pair of user system 7E00 comprises a public key used by other systems for encrypting data in such a way that it can only by decrypted by user system 7E00, and a private key for decrypting data encrypted using the public key or for signing data for proving it came from user system 7E00. User system 7E00 additionally comprises memory 7E18. Memory 7E18 comprises executing application data 7E20, comprising data associated with applications 7E06.

Figure 7F:
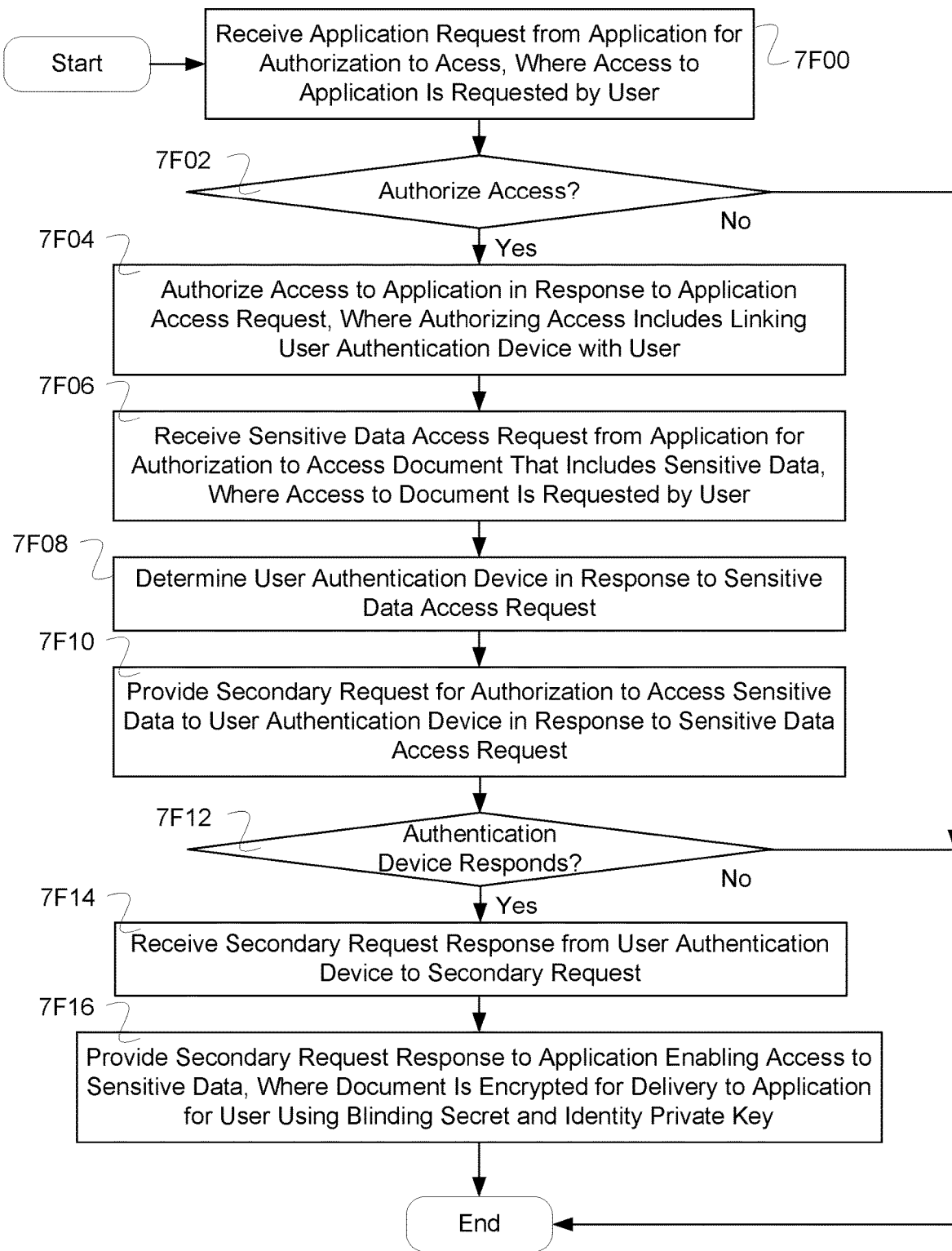
FIG. 7F is a flow diagram illustrating an embodiment of a process for providing access.

FIG. 7F is a flow diagram illustrating an embodiment of a process for providing access. In some embodiments, the process of FIG. 7F is executed by DCIAMS 7A06 of FIG. 7A. In the example shown, in 7F00, an application request is received from an application for authorization to access, wherein access to the application is requested by a user. In 7F02, it is determined whether to authorize access. For example, a determination of whether to authorize access is made based at least in part on a user credential, user login information, a user biometric, a PIN, etc. In the event it is determined not to authorize access, the process ends. In the event it is determined to authorize access, control passes to 7F04. In 7F04, the process authorizes access to the application in response to the application access request, wherein the authorizing access includes linking a user authentication device with the user. In 7F06, a sensitive data access request is received from the application for authorization to access a document that includes sensitive data, wherein access to the document is requested by the user. In 7F08, the user authentication device is determined in response to the sensitive data access request. For example, determining the user authentication device comprises determining the user authentication device linked with the user (e.g., the user authentication device linked with the user in 7F04). In some embodiments, determining the user authentication device linked with the user comprises looking up the link as stored in a user authentication device database as associated with the user identifier. In some embodiments, validity of the user authentication device is determined. For example, the process is further configured to validate a public key associated with the user authentication device in a distributed ledger. In some embodiments, this check is meant to secure the response from the user authentication device to the DCIAMS and, for example, that the signed response matches the registered DID for the user that was challenged. In 7F10, a secondary request for authorization to access sensitive data is provided to the user authentication device in response to the sensitive data access request. For example, the secondary request provided to the user authentication device for authorization to access sensitive data comprises a blinding secret, an encrypted document encryption key, and/or a user identifier, wherein the secondary request includes the blinding secret, the encrypted document encryption key, and/or the user identifier from the sensitive data access request. In some embodiments, the secondary request provided to the user authentication device for authorization to access sensitive data additionally comprises a file name. In some embodiments, the secondary request provided to the user authentication device for authorization to access sensitive data is encrypted using a public key associated with the user authentication device. In 7F12, it is determined whether the authentication device responds (e.g., to the secondary request for authorization to access sensitive data). In the event it is determined that the authentication device does not respond, the process ends. In the event it is determined that the authentication device responds, control passes to 714. In 7F14, a secondary request response to the secondary request is received from the user authentication device. For example, the secondary request response is received via a secure channel. In some embodiments, the process is further configured to determine that the secondary request response is valid. In some embodiments, the response is signed with the Identity Private Key, this signature can then be validated against the current Public Key in the distributed ledger for the user that was challenged to decrypt the document encryption key. In 7F16, the secondary request response is provided to the application enabling access to the sensitive data, wherein the document is encrypted for delivery to the application for the user using a blinding secret and an identity private key. For example, an Identity Private Key is used to provide greater security and privacy through end-to-end encryption of user managed data. End-to-end specifically means creating a mechanism by which any intermediate processing systems do not have access to an unencrypted form of the document requested by the user. This is accomplished by using the combination of a blinding secret and the identity private key held in an authentication device (e.g., a user's digital identity wallet on a user's phone or mobile device). The blinding mechanism involves a private blinding secret that stays in the browser, and a public blinding secret that passes through the flow. The public blinding secret is used to encrypt the result of the mobile decryption, and then the private blinding secret is used to ultimately decrypt the sensitive data. In some embodiments, a blinding secret is created by an application (e.g., a browser) on the client system or user's device (e.g., a laptop). This blinding secret is passed throughout the system to be used on the authentication device and then unblinded when it returns to the client system. In some embodiments, the blinding secret comprises a public blinding secret.

In some embodiments, there are other crypto means by which to perform this blinding operation, one involves blinding as a commutative mathematical operation, in which the encrypted document encryption key is first blinded by encryption code in the browser, then the 'decrypt' in the mobile device is performed against the blinded value, and passed back through the services. Finally the browser performs the unblinding operation on the decrypted but still blinded key to arrive at the plain text for the document encryption key and can then decrypt the data. This would alter the steps described herein, i.e., there would be no blinding that occurs at the mobile device step, and the mobile device would be blind to the document encryption key as well.

Figure 7G:
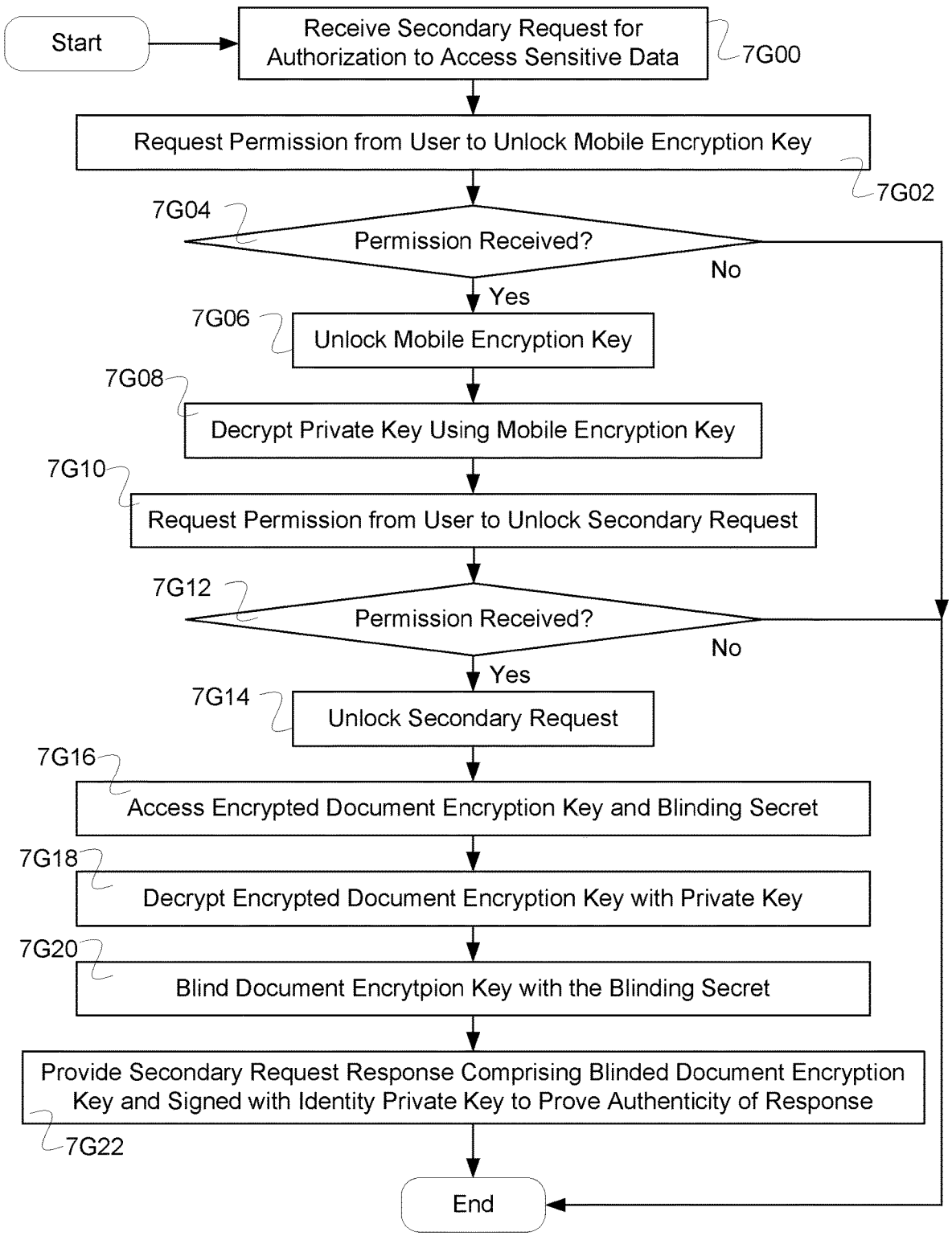
FIG. 7G is a flow diagram illustrating an embodiment of a process for an authentication device.

FIG. 7G is a flow diagram illustrating an embodiment of a process for an authentication device. In some embodiments, the process of FIG. 7G is executed by authentication device 7A02 for responding to a secondary request for authorization to access data. In the example shown, in 7G00, a secondary request for authorization to access sensitive data is received. In 7G02, permission from a user to unlock a mobile encryption key is requested. In 7G04, it is determined whether permission is received. In the event it is determined that permission is not received, the process ends. In the event it is determined that permission is received, control passes to 7G06. In 7G06, the mobile encryption key is unlocked. In 7G08, a private key is decrypted using the mobile encryption key. In 7G10, permission is requested from the user to unlock the secondary request. In 7G12, it is determined whether permission is received. In the event it is determined that permission is not received, the process ends. In the event it is determined that permission is received, control passes to 7G14. In 7G14, the secondary request is unlocked (e.g., using a private key). In 7G16, an encrypted document encryption key and a blinding secret are accessed. In 7G18, the encrypted document encryption key is decrypted with the private key. In 7G20, the document encryption key is blinded with the blinding secret. In 7G22, a secondary request response is provided comprising the blinded document encryption key and signed with the identity private key to prove authenticity of response.

Figure 7H:
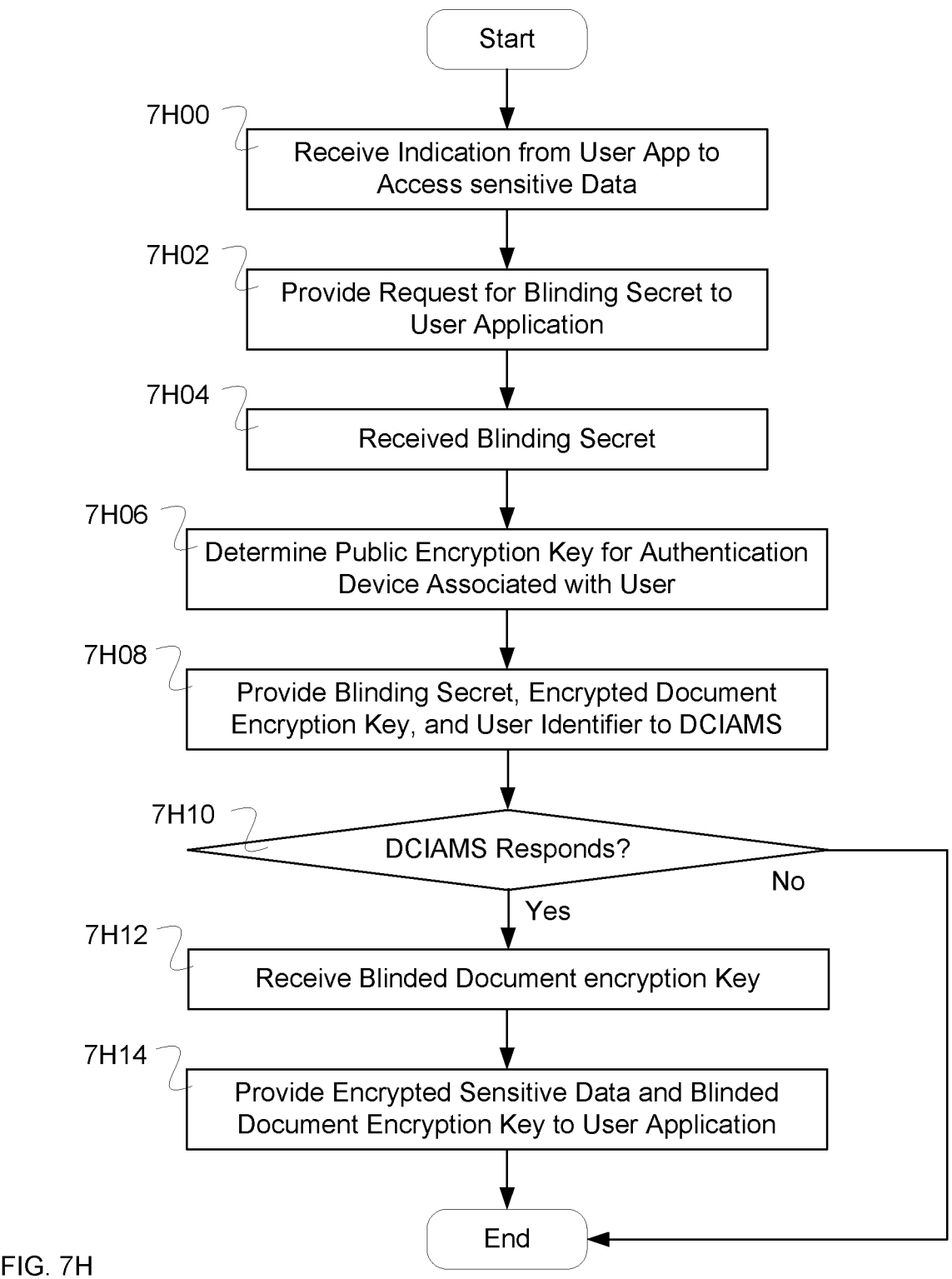
FIG. 7H is a flow diagram illustrating an embodiment of a process for an application system.

FIG. 7H is a flow diagram illustrating an embodiment of a process for an application system. In some embodiments, the process of FIG. 7H is executed by application system 7A08 of FIG. 7A in response to an indication from a user application to access sensitive data. In the example shown, in 7H00, an indication from a user application to access sensitive data is received. For example, the user application comprises a web browser. In 7H02, a request for a blinding secret is provided to the user application. In 7H04, the blinding secret is received. In 7H06, a public encryption key for an authentication device associated with the user is determined. In 7H08, the blinding secret, the encrypted document encryption key, and a user identifier are provided to the DCIAMS. For example, the blinding secret, the encrypted document encryption key, and a user identifier are provided to the DCIAMS via a secure REST call. In some embodiments, a filename is additionally provided to the DCIAMS. In 7H10, it is determined whether the DCIAMS responds. In the event it is determined that the DCIAMS does not respond, the process ends. In the event it is determined that the DCIAMS responds, control passes to 7H12. In 7H12, a blinded document encryption key is received. In 7H14, the encrypted sensitive data and the blinded document encryption key are provided to the user application.

Figure 7I:
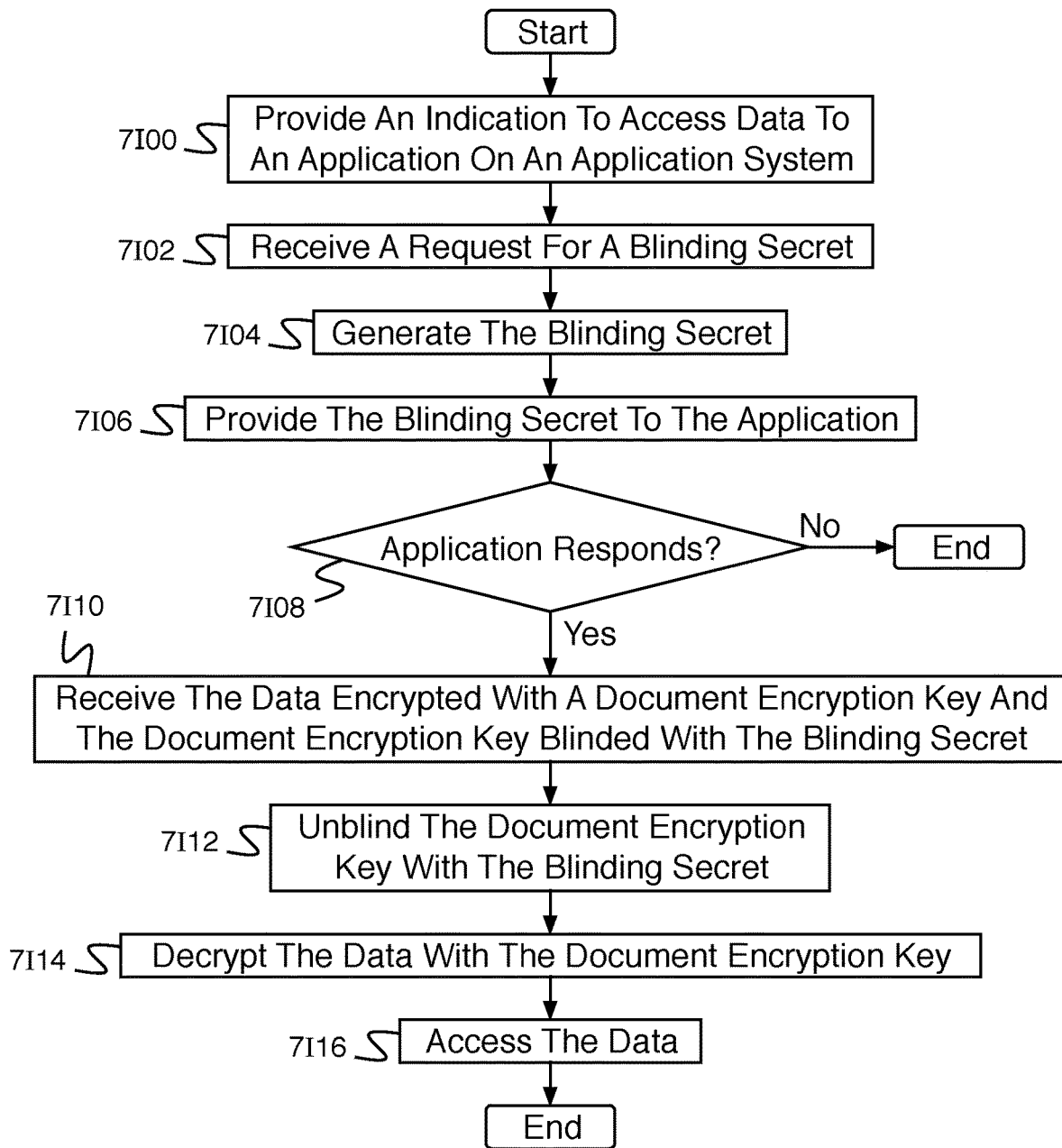
FIG. 7I is a flow diagram illustrating an embodiment of a process for a user system.

FIG. 7I is a flow diagram illustrating an embodiment of a process for a user system. In some embodiments, the process of FIG. 7I is executed by user system 7A10 of FIG. 7A. In the example shown, in 7I00, an indication to access data is provided to an application on an application system. In 7I02, a request for a blinding secret is received. In 7I04, the blinding secret is generated. In 7I06, the blinding secret is provided to the application. In 7I08, it is determined whether the application responds. In the event it is determined that the application does not respond, the process ends. In the event it is determined that the application responds, control passes to 7I10. In 7I10, the data encrypted with a document encryption key and the document encryption key blinded with the blinding secret are received. In some embodiments, the document encryption key is blinded with the public blinding secret. In 7I12, the document encryption key is unblinded with the blinding secret. In 7I14, the data is decrypted with the document encryption key. In 7I16, the data is accessed.

A system for providing access comprises an interface configured to receive an application access request from an application for authorization to access, wherein access to the application is requested by a user, and receive a sensitive data access request from the application for authorization to access a document that includes sensitive data, wherein access to the document is requested by the user, and a processor configured to determine to authorize access to the application in response to the application access request, wherein the authorizing access includes linking a user authentication device with the user, determine the user authentication device in response to the sensitive data access request, provide a secondary request for authorization to access sensitive data to the user authentication device in response to the sensitive data access request, receive a secondary request response from the user authentication device to the secondary request, and provide the secondary request response to the application enabling access to the sensitive data, wherein the document is encrypted for delivery to the application for the user using a blinding secret and an identity private key. In some embodiments, the sensitive data access request from the application for the authorization to access sensitive data comprises the blinding secret, an encrypted document encryption key, and/or a user identifier, wherein the blinding secret is received from a user application, and wherein a document encryption key is encrypted to make the encrypted document encryption key using a public key associated with the user authentication device. In some embodiments, the sensitive data access request from the application for the authorization to access sensitive data additionally comprises a file name. In some embodiments, the document is encrypted using the document encryption key, wherein the document is encrypted for secure transmission in response to a user application request for the document. In some embodiments, determining the user authentication device comprises determining the user authentication device linked with the user. In some embodiments, determining the user authentication device linked with the user comprises looking up the link as stored in a user authentication device database as associated with the user identifier. In some embodiments, the sensitive data access request from the application for the authorization to access sensitive data is transmitted using a secure REST call. In some embodiments, the secondary request provided to the user authentication device for authorization to access sensitive data comprises the blinding secret, an encrypted document encryption key, and/or a user identifier, wherein the secondary request includes the blinding secret, the encrypted document encryption key, and/or the user identifier from the sensitive data access request. In some embodiments, the secondary request provided to the user authentication device for authorization to access sensitive data additionally comprises a file name. In some embodiments, the secondary request provided to the user authentication device for authorization to access sensitive data is encrypted using a public key associated with the identity private key stored on the user authentication device. In some embodiments, the user authentication device decrypts the encrypted document encryption key to generate a document encryption key. In some embodiments, the document encryption key is blinded using the public blinding secret to generate a blinded document encryption key. In some embodiments, the user authentication device provides the secondary request response after confirmation from the user, wherein the secondary request response comprises the blinded document encryption key. In some embodiments, the application is configured to provide the blinded document encryption key and an encrypted document to a user application, wherein the encrypted document is generated by encrypting the document with sensitive data using the document encryption key. In some embodiments, the user application is configured to unblind the blinded document encryption key using the blinding secret to generate the document encryption key and decrypt the encrypted document using the document encryption key to enable the user to access the document with sensitive data. In some embodiments, the user application comprises a web browser. In some embodiments, wherein the processor is further configured to validate a public key associated with the user authentication device in a distributed ledger. In some embodiments, the secondary request response is received via a secure channel. In some embodiments, the processor is further configured to determine that the secondary request response is valid.

Case H—Digital Credentials for Employee Badging

A system for credential authentication comprises an interface configured to receive a create indication to create a badge credential representing an employee badge and receive a claim indication from an authentication device to claim the badge credential, and a processor configured to provide the badge credential to the authentication device in response to the claim indication, receive a proof response from the authentication device comprising the badge credential and a lock identifier, validate the proof response using a distributed ledger, and provide a token for unlocking a lock associated with the lock identifier to the authentication device.

A system for credential authentication comprises a system for using a badge credential to authenticate access to a door (e.g., for entry to a building). When a new user joins an organization, the user installs a digital identity application on a mobile device. The mobile device including the digital identity application comprises an authentication device for the user. The digital identity application is associated with user information (e.g., an email address, user identifier (ID), and/or a user account) for identifying the user. The digital identity application provides a request for a badge credential for authenticating entry to a digital credential aware identity and access management service (DCIAMS). When the DCIAMS receives an indication of the new user, the DCIAMS creates a badge credential associated with the user. The DCIAMS receives the request for the badge credential and provides the badge credential to the authentication device. When the user attempts to enter the building, the user places the authentication device in proximity of a lock system including an automated door lock. The authentication device receives a lock identifier associated with the lock system and provides a request comprising the badge credential and the lock identifier to the DCIAMS. The DCIAMS validates the badge credential (e.g., verifying that the badge credential is not expired, not revoked, has a valid signature, etc.) and the lock identifier (e.g., verifying that the lock identifier is associated with a valid lock, verifying that the user associated with the badge credential has permission to unlock the lock, verifying that the authentication device associated with the badge credential has recently communicated with the lock system, etc.). When it is determined that the badge credential and the lock identifier are valid, the DCIAMS creates a token valid for unlocking the lock and provides the token to the authentication device. The authentication device then provides the token to the lock system for unlocking the lock.

Figure 8A:
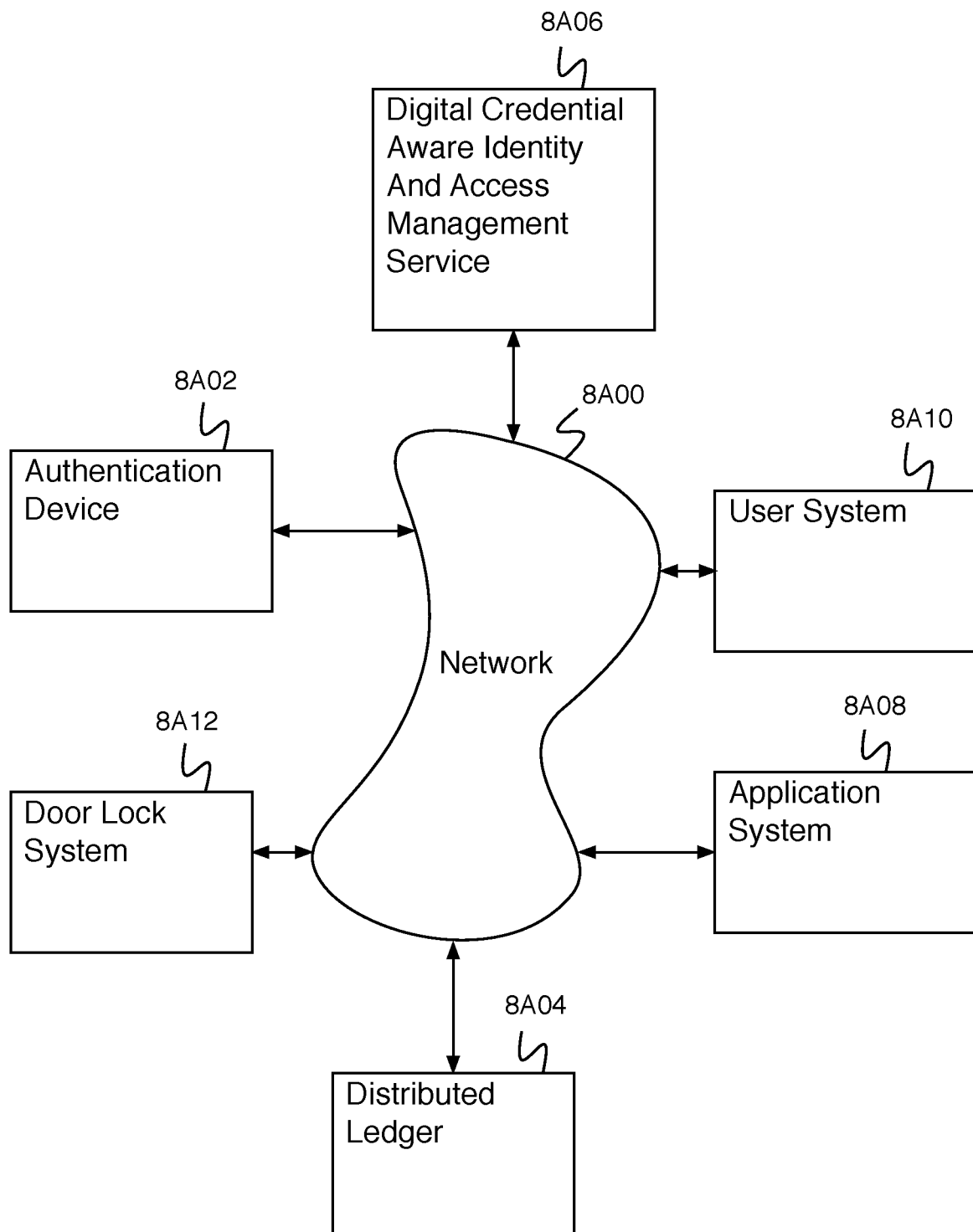
FIG. 8A is a block diagram illustrating an embodiment of a network system.

FIG. 8A is a block diagram illustrating an embodiment of a network system. In some embodiments, the network system of FIG. 8A comprises a network system for a credential system. In the example shown, FIG. 8A comprises network 8A00. In various embodiments, network 8A00 comprises one or more of the following: a local area network, a wide area network, a wired network, a wireless network, the Internet, an intranet, a storage area network, or any other appropriate communication network. Authentication device 8A02, distributed ledger 8A04, digital credential aware identity and access management service 8A06, application system 8A08, user system 8A10, and door lock system 8A12 communicate via network 8A00. Authentication device 8A02 comprises an authentication device associated with a user (e.g., a user of application system 8A08, a user using user system 8A10). For example, authentication device 8A02 comprises a computer, a smartphone, a tablet, a mobile device, etc. Distributed ledger 8A04 comprises a distributed ledger (e.g., a decentralized ledger, a permissioned ledger, a public ledger, a blockchain, etc.). For example, distributed ledger 8A04 is stored on a plurality of systems and comprises one or more permissioned writer systems for writing to the distributed ledger. DCIAMS 8A06 comprises a system for interacting with authentication device 8A02, distributed ledger 8A04, application system 8A08, and any other appropriate systems. DCIAMS 8A06 comprises a system for coordinating a login for application system 8A08, for providing a credential to authentication device 8A02, for requesting a credential from authentication device 8A02, for verifying a user identifier or a signature in distributed ledger 8A04, etc. Application system 8A08 comprises a system for providing access to an application. For example, application system 8A08 comprises a system for providing access to a database application, a data processing application, a productivity application, a communication application, etc. A user uses user system 8A10 to access applications on application system 8A08. For example, a user uses an application on user system 8A10 (e.g., a web browser) to connect to an application on application system 8A08. The application on application system 8A08 authenticates a user login before granting access. Door lock system 8A12 comprises a computer system for controlling access to a door lock. For example, door lock system 8A12 comprises a system for receiving a lock indication and locking the door lock or receiving an unlock indication and unlocking the door lock. A lock indication or an unlock indication can require a cryptographic token for authenticating the lock or unlock action. Computer systems can communicate with door lock system 8A12 via network 8A00 or via a proximity radio system (e.g., Bluetooth, Zigbee, a near field communication (NFC) system, etc.). In various embodiments, the door lock comprises a door to a building, a gate to a building, a gate to an area, a door for a vehicle, a door for a person, a turnstile, a revolving door, or any other appropriate door.

DCIAMS 8A06 comprises a system for providing authentication for authenticating access to unlock a door. For example, DCIAMS 8A06 comprises an interface configured to receive a create indication to create a badge credential representing an employee badge and receive a claim indication from an authentication device to claim the badge credential, and a processor configured to provide the badge credential to the authentication device in response to the claim indication, receive a proof response from the authentication device comprising the badge credential and a lock identifier, validate the proof response using a distributed ledger, and provide a token for unlocking a lock associated with the lock identifier to the authentication device.

Figure 8B:
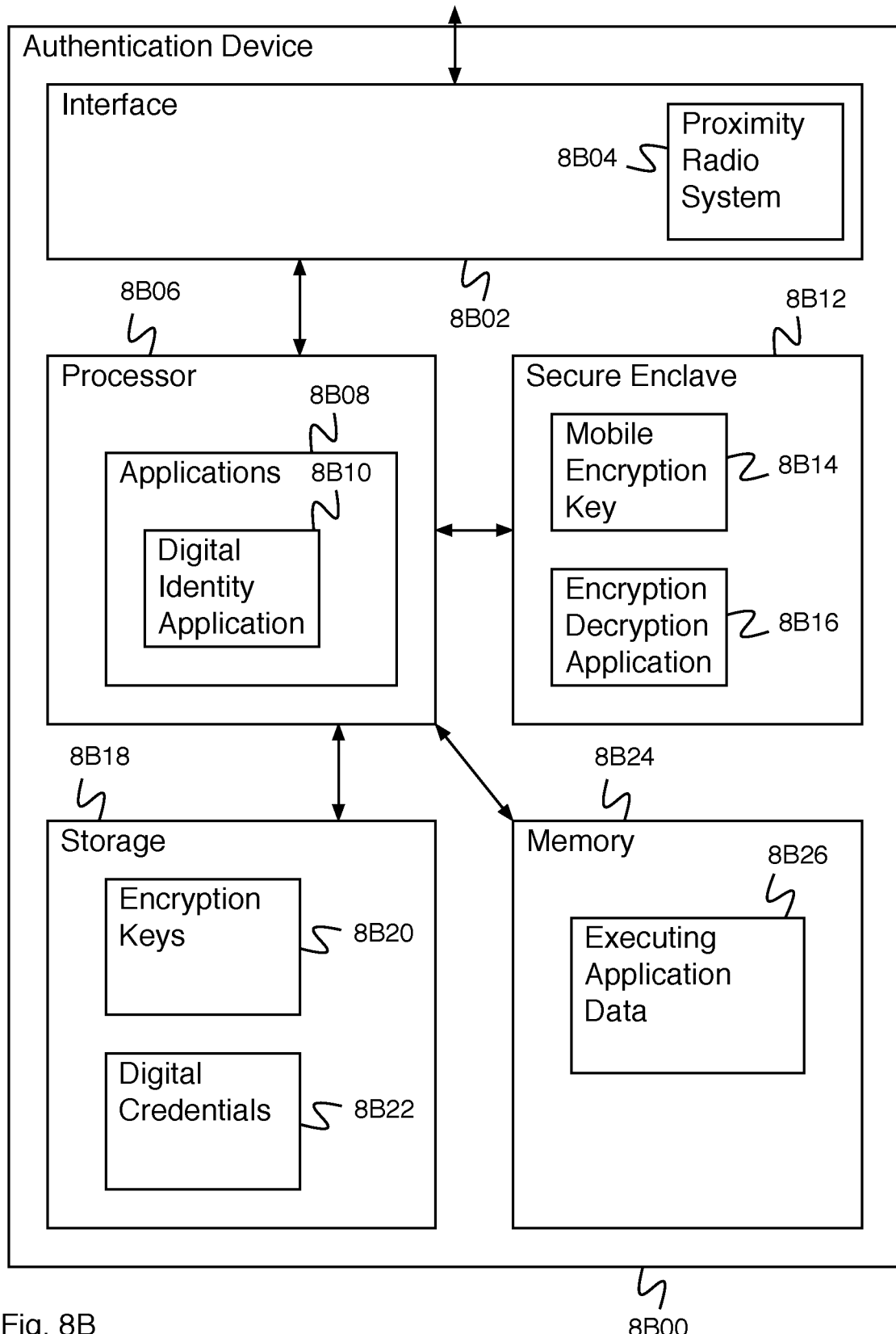
FIG. 8B is a block diagram illustrating an embodiment of an authentication device.

FIG. 8B is a block diagram illustrating an embodiment of an authentication device. In some embodiments, authentication device 8B00 of FIG. 8B comprises authentication device 8A02 of FIG. 8A. In the example shown, authentication device 8B00 comprises interface 8B02. For example, interface 8B02 comprises an interface for receiving data, providing data, receiving a request for data, etc. Interface 8B02 comprises proximity radio system 8B04. Proximity radio system 8B04 comprises a radio system for communication over a short distance. For example, proximity radio system 8B04 comprises a wireless system, a Bluetooth system, a Zigbee system, an ultra-wideband system, an NFC system, an infrared communications system, a wireless personal area network system, etc. Proximity radio system 8B04 comprises a system for communicating with a user system, another authentication device, a lock system, etc. Processor 8B06 comprises a processor for executing applications 8B08. Applications 8B08 comprise digital identity application 8B10 and any other appropriate applications. For example, processor 8B06 comprises a processor for receiving an indication to install digital identity application 8B10 and installing digital identity application 8B10. Digital identity application 8B10 comprises an application for providing a proof response in response to a proof request. For example, digital identity application 8B10 comprises an application for associating with a user email address, requesting a badge credential from a DCIAMS, wherein the request is associated with the user email address, determining whether the DCIAMS responds, and in the event that the DCIAMS responds, receiving the badge credential from the DCIAMS. Additionally, digital identity application 8B10 comprises an application for detecting proximity to a door lock associated with a lock identifier, creating a proof response comprising the badge credential and the lock identifier, providing the proof response to the DCIAMS, determining whether the DCIAMS responds, and in the event that the DCIAMS responds, receiving a door unlock token from the DCIAMS and providing the door unlock token to a door lock system for unlocking the door.

Secure enclave 8B12 comprises a secure system for storing a mobile encryption key. Secure enclave 8B12 comprises mobile encryption key 8B14 and encryption decryption application 8B16. For example, secure enclave 8B12 comprises multiple mobile encryption keys, an application for generating and/or removing mobile encryption keys, etc. Secure enclave 8B12 comprises a system for receiving data, transforming it by encrypting and/or decrypting the data using a mobile encryption key or keys, and providing the transformed data. For example, secure enclave 8B12 is configured to only provide transformed input data and not to provide mobile encryption key 8B14. In some embodiments, functionality of secure enclave 8B12 is access limited using a biometric (e.g., a fingerprint, a retina scan, a DNA scan, etc.) and/or a personal identification number (PIN). Authentication device 8B00 additionally comprises storage 8B18. Storage 8B18 comprises encryption keys 8B20, for example comprising a public key of an identity key pair, a private key of an identity key pair, a private key of an identity key pair encrypted using mobile encryption key 8B14, etc. For example, an identity key pair of authentication device 8B00 comprises a public key used by other systems for encrypting data in such a way that it can only by decrypted by authentication device 8B00, and a private key for decrypting data encrypted using the public key or for signing data for proving it came from authentication device 8B00. Storage 8B18 additionally comprises digital credentials 8B22, comprising digital certificates representing qualifications (e.g., a college degree, work experience, time living at an apartment, time enrolled in a health insurance plan, etc.). For example, digital credentials 8B22 comprise a credential wallet. In some embodiments, digital credentials 8B22 comprise a locked digital wallet able to be unlocked by a user. For example, digital credentials 8B22 are unlocked using a biometric and/or a PIN. Once the locked digital wallet is unlocked, a credential is retrieved. Authentication device 8B00 additionally comprises memory 8B24. Memory 8B24 comprises executing application data 8B26, comprising data associated with applications 8B08.

Figure 8C:
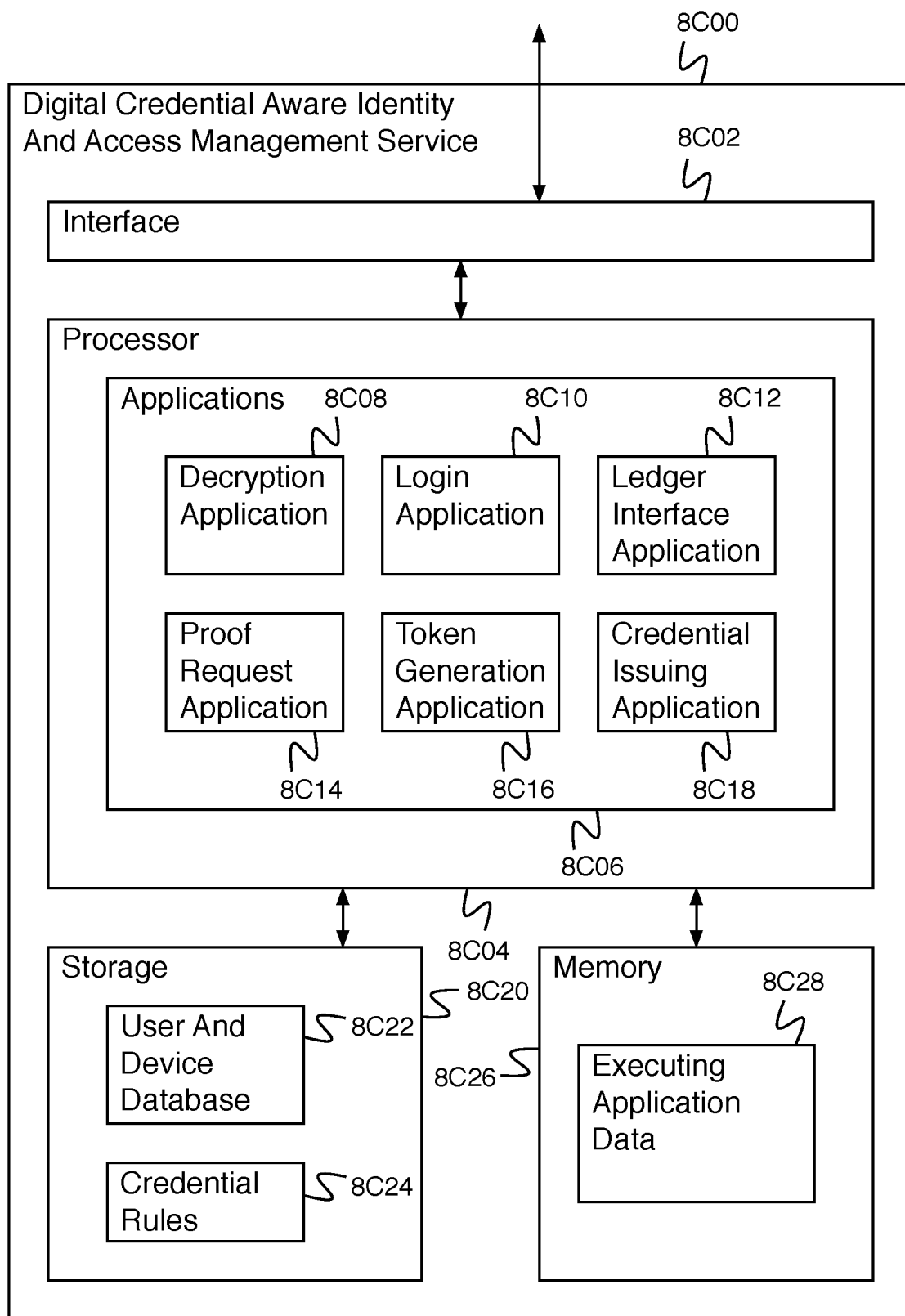
FIG. 8C is a block diagram illustrating an embodiment of a digital credential aware identity and access management service (DCIAMS).

FIG. 8C is a block diagram illustrating an embodiment of a digital credential aware identity and access management service (DCIAMS). In some embodiments, DCIAMS 8C00 comprises DCIAMS 8A06 of FIG. 8A. In the example shown DCIAMS 8C00 comprises interface 8C02. For example, interface 8C02 comprises an interface for receiving data, providing data, receiving a request for data, etc. In some embodiments, interface 8C02 comprises an interface for receiving encrypted messages or encrypted javascript object notation (JSON) messages. Processor 8C04 comprises a processor for executing applications 8C06. Applications 8C06 comprise a set of DCIAMS applications. Decryption application 8C08 comprises an application for decrypting encrypted data using a key. Login application 8C10 comprises an application for receiving login information (e.g., username and password, a credential, a quick response (QR) code challenge, etc.) and providing login credentials (e.g., a login token). Ledger interface application 8C12 comprises an application for interacting with a distributed ledger (e.g., distributed ledger 8A04 of FIG. 8A). For example ledger interface application 8C12 comprises an application for verifying a signature in a ledger or checking a user identifier for revocation in a ledger. Proof request application 8C14 comprises an application for creating a proof request, sending a proof request, evaluating a proof request response (e.g., a proof response), etc. Token generation application 8C16 comprises an application for generating a login token (e.g., in response to a successful login). Credential issuing application 8C18 comprises an application for issuing a digital credential for proving a qualification in response to a request from a credential issuing authority to issue the credential. Applications 8C06 additionally comprise any other appropriate applications.

For example, processor 8C04 comprises a processor for receiving an indication of a new employee associated with an email address, creating a badge credential for the employee associated with the email address, receiving a request from an authentication device for the credential, determining whether the email address associated with the badge credential matches the email address associated with the request, and in the event it is determined that the email address associated with the badge credential matches the email address associated with the request, providing the badge credential to the authentication device. Processor 8C04 additionally comprises a processor for receiving a proof response from an authentication device comprising a badge credential and a lock identifier, determining whether the proof response is valid, and in the event it is determined that the proof response is valid determining whether the lock identifier is valid, and in the event it is determined that the lock identifier is valid, creating a door unlock token associated with the lock identifier, and providing the door unlock token to the authentication device for unlocking the door.

Storage 8C20 comprises user and device database 8C22 and credential rules 8C24. User and device database 8C22 comprises a database of registered users for a given customer organization and user details (e.g., username, password hash, contact information, email address, relationship to devices, registered public keys, registered mapping documents in a decentralized ledger, etc.). User and device database 8C22 additionally comprises a device directory comprising all the devices for a given customer organization as well as mapping documents associated with the devices and relationships with users associated with the devices. Credential rules 8C24 comprises a set of credential rules for determining a credential that satisfies a given access request, for example rules related to a credential associated schema, a credential associated organization, a credential issuer, a credential associated location, a credential associated class identifier, a credential associated license number, or any other appropriate credential rules. In various embodiments, rules comprise rules related to a credential associated schema, rules related to a credential associated organization, rules related to a credential issuer, rules related to a credential associated location, rules related to a credential associated class identifier or identifier number, rules related to a credential associated license or license number, a credential associated class name, or any other appropriate credential rules. In some embodiments, the rules are applied selectively (e.g., based at least in part on a user identifier)—for example, employees with a credential can access application A, contractors with a credential can access application B, or any other appropriate matching of access with identifiers. In various embodiments, the rules are applied selectively based at least in part on current employment, employee type, location of user, qualification by training class, credential from a third party issuer (e.g., division of motor vehicle license, certification from school, etc.), or any other appropriate criterion. As examples of configurable credential rules to grant access: 1) access is granted in the event that a credential indicates that the holder is a current employee (e.g., issuing company is valid, employee status is not expired, and not revoked); 2) access is granted in the event that a credential indicates that the holder is an employee in an organization of the company (e.g., issuing company is valid, organization is specified organization, employee status is not expired, and not revoked); 3) access is granted in the event that a credential indicates that the holder is an employee in a specified location (e.g., issuing company is valid, location is a specified location, employee status is not expired, and not revoked); 4) access is granted in the event that a credential indicates that the holder has necessary training (e.g., issuing company is valid, training status is complete, employee status is not expired, and not revoked); and 5) access is granted in the event that a credential indicates that the holder has outside credential (e.g., issuing company is valid, outside credential is valid, outside credential issuer is third party, employee status is not expired, and not revoked). DCIAMS 8C00 additionally comprises memory 8C26. Memory 8C26 comprises executing application data 8C28, comprising data associated with applications 8C06.

Figure 8D:
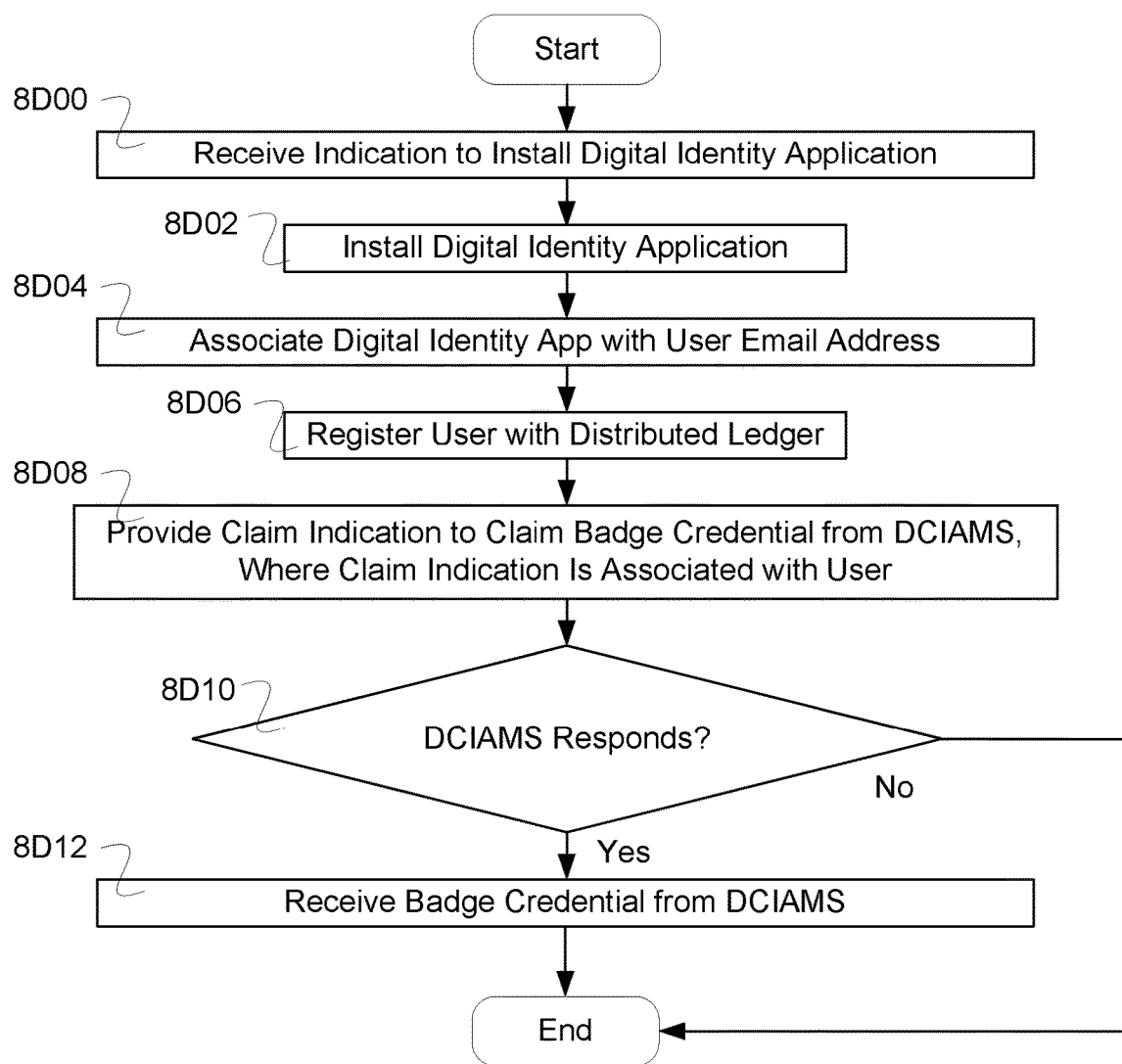
FIG. 8D is a flow diagram illustrating an embodiment of a process for preparing an authentication device for credentialing.

FIG. 8D is a flow diagram illustrating an embodiment of a process for preparing an authentication device for credentialing. In some embodiments, the process of FIG. 8D is executed by authentication device 8A02 of FIG. 8A. In the example shown, in 8D00, an indication is received to install a digital identity app. For example, the indication to install a digital identity app is received as part of a human resources system employee startup process. In some embodiments, the user receives a one-time use token by email. In 8D02, the digital identity app is installed. In 8D04, the digital identity app is associated with a user email address. For example, the token is then invoked opening a web page with a per-user/per-token quick response code (QR) code that the digital identity app scans to associate the digital identity app with the user. In some embodiments, the user's mobile device pushes the one-time use token into the mobile context to start the enrollment process. In 8D06, user is registered with distributed ledger. For example, a DID keypair that is associated with the user is generated on the mobile device and sent to the DCIAMS to be registered as a DID document with the distributed ledger. In some embodiments, registering with the distributed ledger also comprises associating the DID keypair with a badge credential, which is issued by an issuer, registered with the distributed ledger, and provided to/stored on a user's authentication device. In 8D08, a claim indication is provided to claim a badge credential from the DCIAMS, wherein the claim indication is associated with the user. For example, the authentication device requests a badge credential from the DCIAMS. The badge credential is associated with a user (e.g., via an email address, a user ID, a user account, etc.). In 8D10, it is determined whether the DCIAMS responds. In the event it is determined that the DCIAMS does not respond, the process ends. In the event it is determined that the DCIAMS responds, control passes to 8D12. In 8D12, the badge credential is received from the DCIAMS.

Figure 8E:
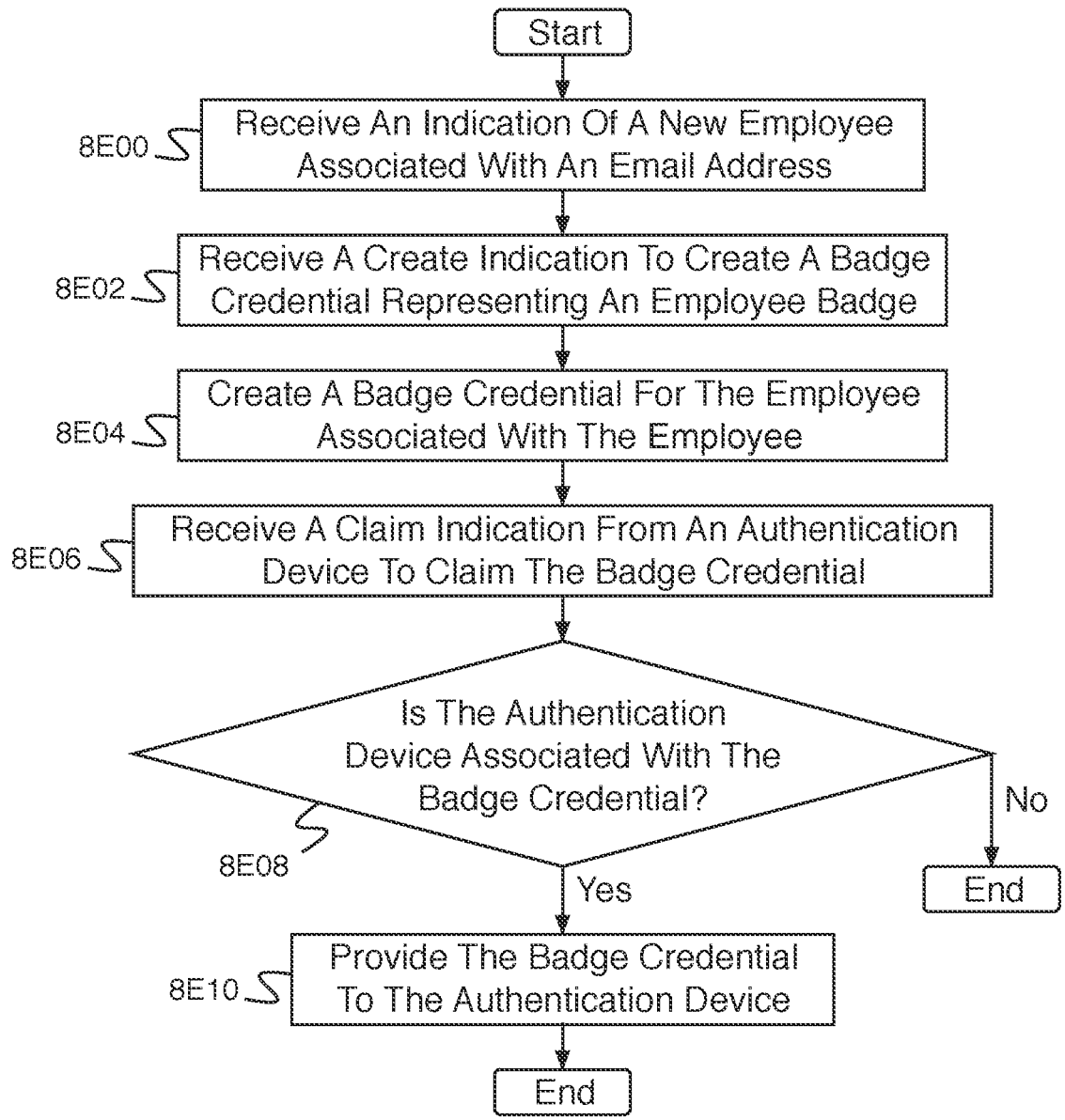
FIG. 8E is a flow diagram illustrating an embodiment of a process for preparing a DCIAMS for credential authentication.

FIG. 8E is a flow diagram illustrating an embodiment of a process for preparing a DCIAMS for credential authentication. In some embodiments, the process of FIG. 8E is executed by DCIAMS 8A06 of FIG. 8A. In the example shown, in 8E00, an indication of a new employee associated with an email address is received. In 8E02, a create indication to create a badge credential representing an employee badge is received. For example, the create indication is provided to the DCIAMS by a human resources system employee setup process (e.g., a badge credential is created for an employee as part of setting up the employee in the human resources system). For example, the create indication is associated with an email address. In 8E04, a badge credential is created for the employee associated with the employee. For example, the badge credential is created for the employee and registered in the distributed ledger associated with the email address received, an employee identifier, an employee account, etc. In 8E06, a claim indication to claim the badge credential is received from an authentication device. For example, the claim indication is associated with an email address. In 8E08, it is determined whether the authentication device is associated with the badge credential. For example, determining whether the authentication device is associated with the badge credential comprises determining whether the email address, the user ID (e.g., an IKP), and/or user account associated with the badge credential matches information (e.g., an identifier in the DID document) registered in a distributed ledger. In the event it is determined that the authentication device is not associated with the badge credential, the process ends. In the event it is determined that the authentication device is associated with the badge credential, control passes to 8E10. In 8E10, the badge credential is provided to the authentication device.

Figure 8F:
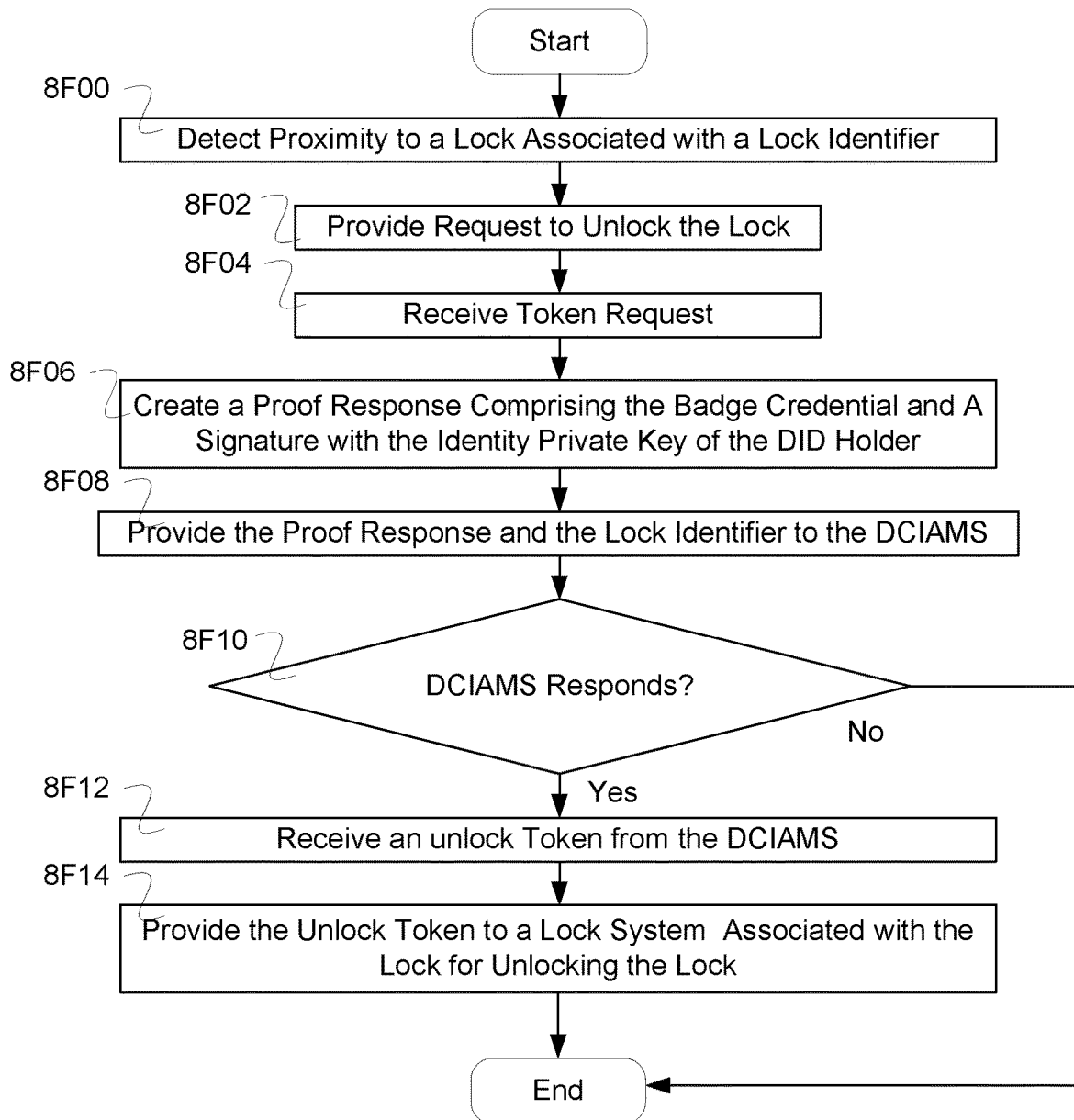
FIG. 8F is a flow diagram illustrating an embodiment of a process for unlocking a lock.

FIG. 8F is a flow diagram illustrating an embodiment of a process for unlocking a lock. In some embodiments, the process of FIG. 8F is executed by authentication device 8A02 of FIG. 8A. In the example shown, in 8F00, proximity to a lock associated with a lock identifier is determined. For example, proximity to the lock is determined using a proximity radio system to determine proximity to a lock system associated with the lock. In 8F02, a request is provided to unlock the lock. For example, the request is provided to the lock system associated with the lock. In some embodiments, the authentication device communicates with the lock system associated with the lock system via a wireless protocol (e.g., Bluetooth or NFC). In 8404, a token request is received. For example, the token request is received from the lock system associated with the lock. In 8F06, a proof response is created comprising the badge credential and a signature with the identity private key of the DID holder. In 8F08, the proof response and the lock identifier are provided to the DCIAMS. In 8F10, it is determined whether the DCIAMS responds. In the event it is determined that the DCIAMS does not respond, the process ends. In the event it is determined that the DCIAMS responds, control passes to 8F12. In 8F12, an unlock token is received from the DCIAMS. In 8F14, the unlock token is provided to a lock system associated with the lock for unlocking the lock. For example, the lock system associated with the lock unlocks the lock in response to receiving the token.

Figure 8G:
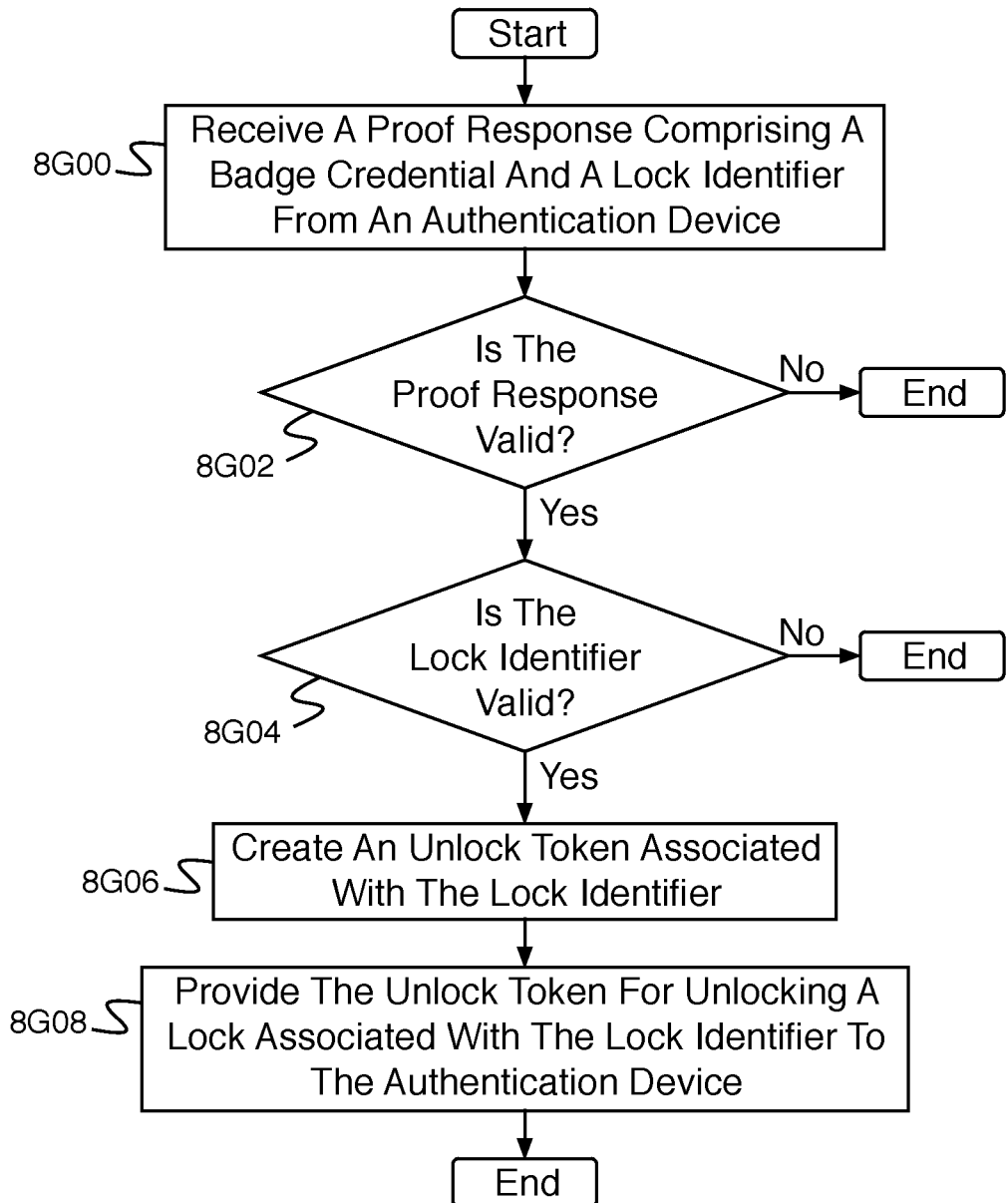
FIG. 8G is a flow diagram illustrating an embodiment of a process for credential authentication.

FIG. 8G is a flow diagram illustrating an embodiment of a process for credential authentication. In some embodiments, the process of FIG. 8G is executed by DCIAMS 8A06 of FIG. 8A. In the example shown, in 8G00, a proof response comprising a badge credential and a lock identifier are received from an authentication device. In 8G02, it is determined whether the proof response is valid. In the event it is determined that the proof response is not valid, the process ends. In the event it is determined that the proof response is valid, control passes to 8G04. In 8G04, it is determined whether the lock identifier is valid. For example, determining whether the lock identifier is valid comprises verifying that the lock identifier is associated with a valid lock, verifying that the user associated with the badge credential has permission to unlock the lock, verifying that the authentication device associated with the badge credential has recently communicated with the lock system, etc. In the event it is determined that the lock identifier is not valid, the process ends. In the event it is determined that the lock identifier is valid, control passes to 8G06. In 8G06, an unlock token is created associated with the lock identifier. In 8G08, the unlock token is provided to the authentication device for unlocking a lock associated with the lock identifier.

Figure 8H:
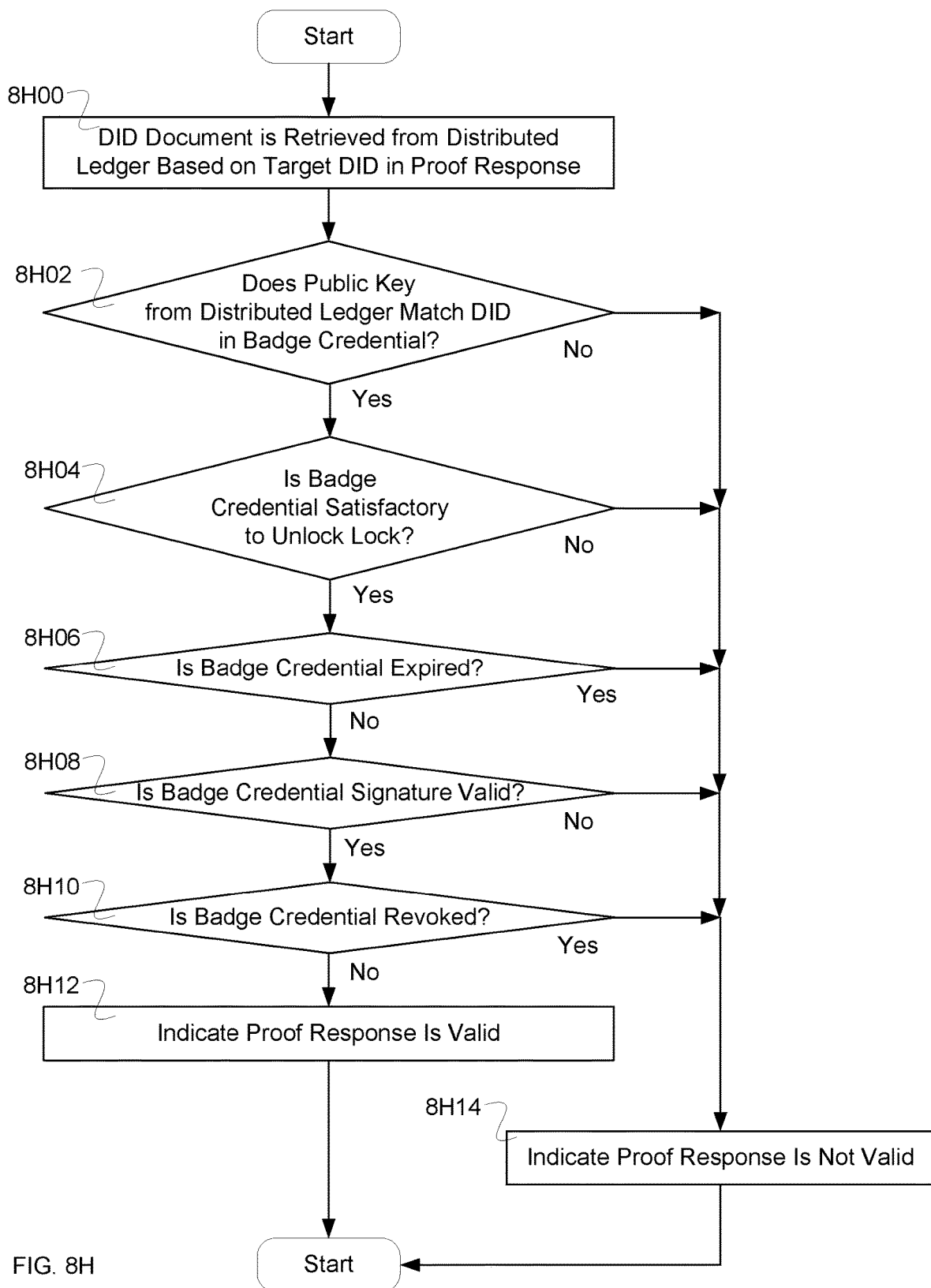
FIG. 8H is a flow diagram illustrating an embodiment of a process for determining whether a proof response is valid.

FIG. 8H is a flow diagram illustrating an embodiment of a process for determining whether a proof response is valid. In some embodiments, the process of FIG. 8H implements 8G02 of FIG. 8G. In the example shown, in 8H00, a DID document is retrieved from distributed ledger based on target DID in proof response. In 8H02, it is determined whether a public key from a decentralized ledger matches a DID (e.g., a decentralized identifier) in a badge credential (e.g., the badge credential of the proof response). In the event it is determined that a public key from a decentralized ledger does not match a DID in the badge credential, control passes to 8H14. In the event it is determined in 8H02 that that a public key from a decentralized ledger matches a DID in the badge credential, control passes to 8H04. In 8H04, it is determined whether the badge credential is satisfactory to unlock the lock. In the event it is determined that the badge credential is not satisfactory to unlock the lock, control passes to 8H14. In the event it is determined in 8H04 that the badge credential is satisfactory to unlock the lock, control passes to 8H06. In 8H06, it is determined whether the badge credential is expired. In the event it is determined that the badge credential is expired, control passes to 8H14. In the event it is determined in 8H06 that the badge credential is not expired, control passes to 8H08. In 8H08, it is determined whether the badge credential signature is valid. In some embodiments, the badge credential has two signatures, one from the original issuer of the credential and one from the holder of the credential, which are both checked for validity or only one of which is checked for validity. In the event it is determined that the badge credential signature is not valid, control passes to 8H14. In the event it is determined in 8H08 that the badge credential signature is valid, control passes to 8H10. In 8H10, it is determined whether the badge credential is revoked. For example, determining whether the badge credential is revoked comprises querying a revocation registry of a distributed ledger (e.g., a public ledger, a decentralized ledger, a permissioned ledger, a blockchain, etc.). In the event it is determined that the badge credential is revoked, control passes to 8H14. In the event it is determined that the badge credential is not revoked, control passes to 8H12. In 8H12, the process indicates that the proof response is valid, and the process ends. In 8H14, the process indicates that the proof response is not valid.

A system for credential authentication comprises an interface configured to receive a create indication to create a badge credential representing an employee badge and receive a claim indication from an authentication device to claim the badge credential, and a processor configured to provide the badge credential to the authentication device in response to the claim indication, receive a proof response from the authentication device comprising the badge credential and a lock identifier, validate the proof response using a distributed public ledger, and provide a token for unlocking a lock associated with the lock identifier to the authentication device. In some embodiments, the create indication to create a badge credential is associated with an email address. In some embodiments, the claim indication from the authentication device to claim the badge credential is associated with an email address. In some embodiments, the processor is further configured to verify the badge credential is associated with the authentication device. In some embodiments, verifying the badge credential is associated with the authentication device comprises comparing a badge credential email address with an authentication device email address. In some embodiments, the proof response is received in response to a token request provided to the authentication device by the lock system associated with the lock. In some embodiments, the token request is provided in response to an authentication device request to unlock the lock. In some embodiments, the authentication device and the lock system associated with the lock communicate using a wireless protocol. In some embodiments, the wireless protocol comprises Bluetooth, NFC, or Zigbee. In some embodiments, validating the proof response comprises determining that the badge credential is satisfactory to unlock the lock associated with the lock identifier. In some embodiments, validating the proof response comprises determining that the badge credential comprises a valid signature. In some embodiments, determining that the badge credential comprises a valid signature comprises querying a distributed ledger. In some embodiments, validating the proof response comprises determining that the badge credential is not expired. In some embodiments, validating the proof response comprises determining that the badge credential is not revoked. In some embodiments, the authentication device provides the token to the lock system associated with the lock. In some embodiments, the lock system associated with the lock unlocks the lock in response to receiving the token. In some embodiments, the indication to create a badge credential is provided by a human resources system employee startup process. In some embodiments, the claim indication from an authentication device to claim the badge credential is provided in response to an indication to install a digital identity app. In some embodiments, the indication to install a digital identity app is in received as part of a human resources system employee startup process.

Case I—Digital Credentials for Physical Building Access

A system for credential authentication comprises an interface configured to receive a create indication to create a guest credential representing a guest badge associated with a visitor and receive a claim indication from an authentication device to claim the guest credential, and a processor configured to provide the guest credential to the authentication device in response to the claim indication, provide a proof request to the authentication device, receive a proof response from the authentication device, validate the proof response, determine a visitor tracking system associated with a request from the authentication device to authenticate entry, and provide a check-in indication to the visitor tracking system that the visitor has checked in.

A system for credential authentication comprises a system for using a guest credential to authenticate access to a check-in site (e.g., at a physical location for a guest to check in to a building). When a new user is invited to visit an organization, a user account and/or user identifier is established in the system including registering the guest credential at a distributed ledger. Also, the user installs a digital identity application on a mobile device and receives the guest credential on the mobile device. The mobile device including the digital identity application comprises an authentication device for the user. The digital identity application is associated with user information (e.g., an email address, user identifier, user account, etc.) for identifying the user. The digital identity application provides a request for a guest credential for authenticating check-in to a digital credential aware identity and access management service (DCIAMS). When the DCIAMS receives an indication of the new user, the DCIAMS creates a guest credential associated with the user. The DCIAMS requests a guest credential and provides the guest credential to an authentication device. When the user attempts to check in at a check-in device (e.g., a check-in kiosk, a tablet on a receptionist desk, etc.), the user places the authentication device in proximity of the check-in device. The authentication device receives a check-in site identifier associated with the check-in device and provides a request for authentication (e.g., including the check-in site identifier) to the DCIAMS. The DCIAMS responds to the authentication device with a proof request (e.g., a request for a credential proving authentication is allowed). The authentication device creates a proof response comprising the guest credential to the DCIAMS. The DCIAMS validates the guest credential (e.g., verifying that the guest credential is not expired, not revoked, has a valid signature, etc.) using the distributed ledger and the check-in site identifier (e.g., verifying that the check-in site identifier is associated with a valid check-in site, verifying that the user associated with the guest credential has permission to access the check-in site, verifying that the authentication device associated with the guest credential has recently communicated with the check-in site, etc.). When it is determined that the guest credential and the check-in site identifier are valid, the DCIAMS determines the check-in site associated with the request (e.g., from the check-in site identifier) and provides a check-in indication to the visitor tracking system that a visitor has checked in.

Figure 9A:
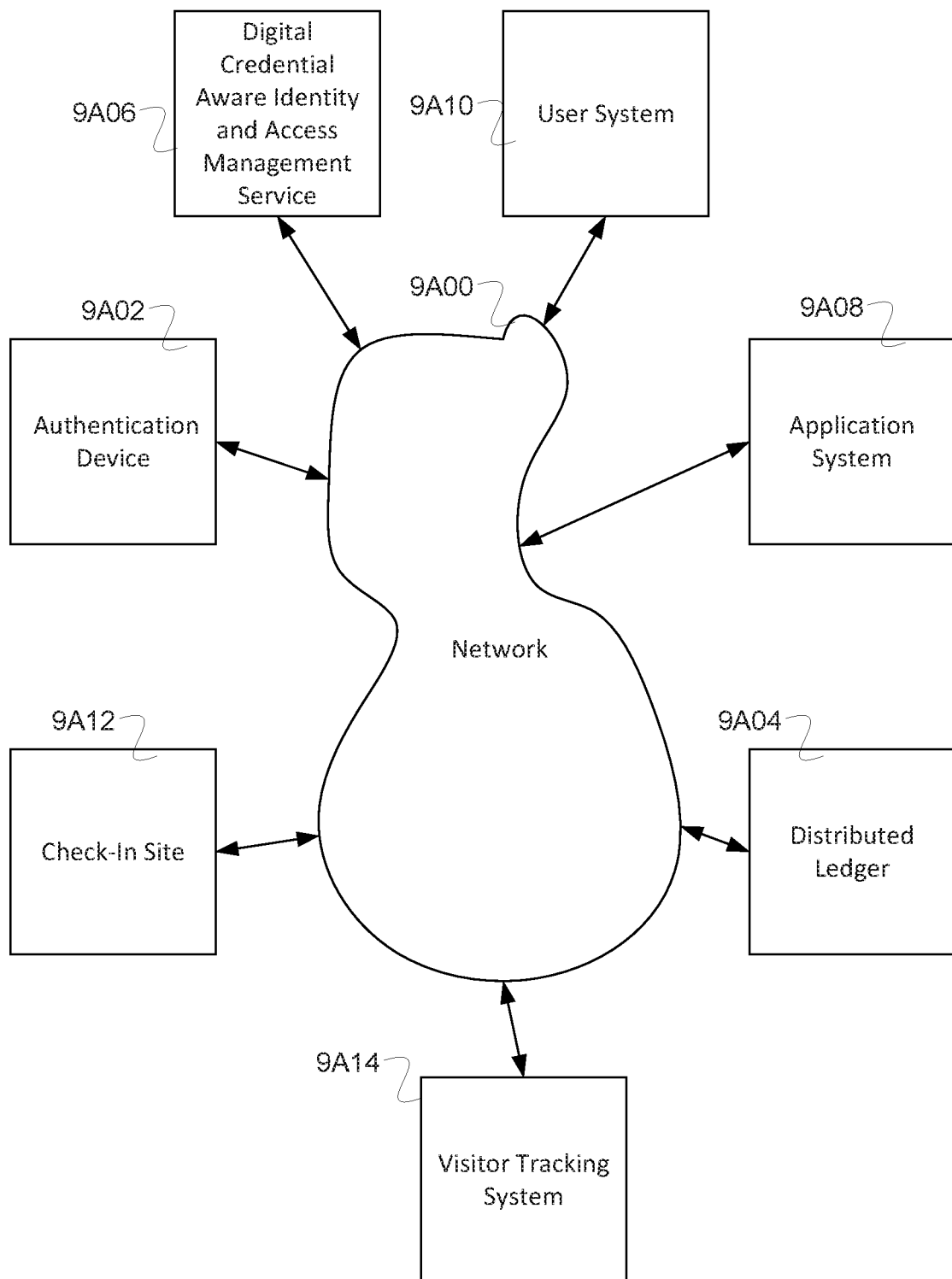
FIG. 9A is a block diagram illustrating an embodiment of a network system.

FIG. 9A is a block diagram illustrating an embodiment of a network system. In some embodiments, the network system of FIG. 9A comprises a network system for a credential system. In the example shown, FIG. 9A comprises network 9A00. In various embodiments, network 9A00 comprises one or more of the following: a local area network, a wide area network, a wired network, a wireless network, the Internet, an intranet, a storage area network, or any other appropriate communication network. Authentication device 9A02, distributed ledger 9A04, digital credential aware identity and access management service (DCIAMS) 9A06, application system 9A08, user system 9A10, visitor tracking system 9A14, and check-in site 9A12 communicate via network 9A00. Authentication device 9A02 comprises an authentication device associated with a user (e.g., a user of application system 9A08, a user using user system 9A10). For example, authentication device 9A02 comprises a computer, a smartphone, a tablet, a mobile device, etc. Distributed ledger 9A04 comprises a distributed ledger (e.g., a permissioned ledger, a public ledger, a decentralized ledger, a blockchain, etc.). For example, distributed ledger 9A04 is stored on a plurality of systems and comprises one or more permissioned writer systems for writing to the distributed ledger. DCIAMS 9A06 comprises a system for interacting with authentication device 9A02, distributed ledger 9A04, application system 9A08, and any other appropriate systems. DCIAMS 9A06 comprises a system for coordinating a login for application system 9A08, for providing a credential to authentication device 9A02, for requesting a credential from authentication device 9A02, for verifying a user identifier or a signature in distributed ledger 9A04, etc. Application system 9A08 comprises a system for providing access to an application. For example, application system 9A08 comprises a system for providing access to a database application, a data processing application, a productivity application, a communication application, etc. A user uses user system 9A10 to access applications on application system 9A08. For example, a user uses an application on user system 9A10 (e.g., a web browser) to connect to an application on application system 9A08. The application on application system 9A08 authenticates a user login before granting access. Check-in site 9A12 comprises a computer system for controlling access to a guest check-in. For example, check-in site 9A12 comprises a check-in tablet at a guest entry site. For example, check-in site 9A12 comprises a system for receiving a check-in authentication and allowing check-in or receiving an indication check-in is not authenticated and not allowing check-in. Computer systems can communicate with check-in site 9A12 via network 9A00 or via a proximity radio system (e.g., Bluetooth, Zigbee, near-field communication (NFC), etc.).

DCIAMS 9A06 comprises a system for providing authentication to check in at a check-in site. For example, DCIAMS 9A06 comprises an interface configured to receive a create indication to create a guest credential representing a guest badge associated with a visitor and receive a claim indication from an authentication device to claim the guest credential, and a processor configured to provide the guest credential to the authentication device in response to the claim indication, provide a proof request to the authentication device, receive a proof response from the authentication device, validate the proof response using a distributed ledger, determine a visitor tracking system associated with a request from the authentication device to authenticate entry, and provide a check-in indication to the visitor tracking system that the visitor has checked in. Visitor tracking system 9A14 informs a host of a guest arrival by email/text message and/or stores a record of arrival/departure in a database.

Figure 9B:
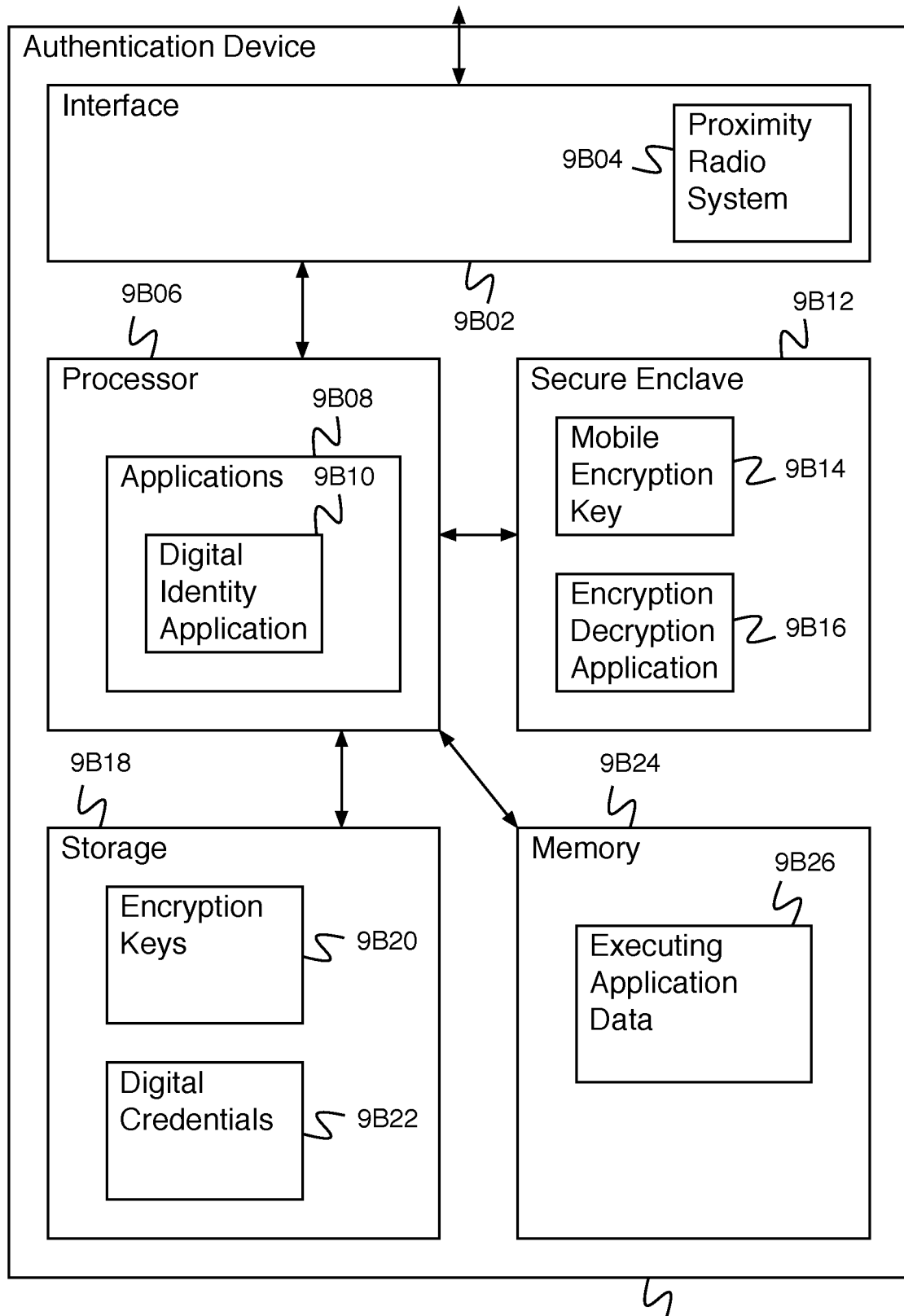
FIG. 9B is a block diagram illustrating an embodiment of an authentication device.

FIG. 9B is a block diagram illustrating an embodiment of an authentication device. In some embodiments, authentication device 9B00 of FIG. 9B comprises authentication device 9A02 of FIG. 9A. In the example shown, authentication device 9B00 comprises interface 9B02. For example, interface 9B02 comprises an interface for receiving data, providing data, receiving a request for data, etc. Interface 9B02 comprises proximity radio system 9B04. Proximity radio system 9B04 comprises a radio system for communication over a short distance. For example, proximity radio system 9B04 comprises a wireless system, a Bluetooth system, a Zigbee system, an ultrawideband system, an NFC system, an infrared communications system, a wireless personal area network system, etc. Proximity radio system 9B04 comprises a system for communicating with a user system, another authentication device, a lock system, etc. Processor 9B06 comprises a processor for executing applications 9B08. Applications 9B08 comprises digital identity application 9B10 and any other appropriate applications. For example, processor 9B06 comprises a processor for receiving an indication to install digital identity application 9B10 and installing digital identity application 9B10. Digital identity application 9B10 comprises an application for providing a proof response in response to a proof request. For example, digital identity application 9B10 comprises an application for associating with a user email address, where the mail sent to the user contains a one-time use token, that token is used to link a private key on the device to an identity management system DCIAMS, and then the public key that goes with that private one is registered in the distributed ledger via a DID document registration. Digital identity application 9B10 also comprises an application for requesting a guest credential from a DCIAMS, wherein the request is associated with the user email address or user identifier, determining whether the DCIAMS responds, and in the event that the DCIAMS responds, receiving the guest credential from the DCIAMS. Additionally, digital identity application 9B10 comprises an application for detecting proximity to a check-in site associated with a check-in site identifier, creating a proof response comprising the guest credential and the check-in site identifier, providing the proof response to the DCIAMS, determining whether access is granted, and in the event that access is granted, receiving check-in access.

Secure enclave 9B12 comprises a secure system for storing a mobile encryption key. Secure enclave 9B12 comprises mobile encryption key 9B14 and encryption decryption application 9B16. For example, secure enclave 9B12 comprises multiple mobile encryption keys, an application for generating and/or removing mobile encryption keys, etc. Secure enclave 9B12 comprises a system for receiving data, transforming it by encrypting and/or decrypting the data using a mobile encryption key or keys, and providing the transformed data. For example, secure enclave 9B12 is configured to only provide transformed input data and not to provide mobile encryption key 9B14. In some embodiments, functionality of secure enclave 9B12 is access limited using a biometric (e.g., a fingerprint, a retina scan, a DNA scan, etc.) or a personal identification number (PIN). Authentication device 9B00 additionally comprises storage 9B18. Storage 9B18 comprises encryption keys 9B20—for example, comprising a public key of an identity key pair, a private key of an identity key pair, a private key of an identity key pair encrypted using mobile encryption key 9B14, etc. For example, an identity key pair of authentication device 9B00 comprises a public key used by other systems for encrypting data in such a way that it can only by decrypted by authentication device 9B00, and a private key for decrypting data encrypted using the public key or for signing data for proving it came from authentication device 9B00. Storage 9B18 additionally comprises digital credentials 9B22, comprising digital certificates representing qualifications (e.g., a college degree, work experience, time living at an apartment, time enrolled in a health insurance plan, etc.). For example, digital credentials 9B22 comprises a credential wallet. In some embodiments, digital credentials 9B22 comprises a locked digital wallet able to be unlocked by a user. For example, digital credentials 9B22 is unlocked using a biometric or a PIN. Once the locked digital wallet is unlocked, a credential is retrieved. Authentication device 9B00 additionally comprises memory 9B24. Memory 9B24 comprises executing application data 9B26, comprising data associated with applications 9B08.

Figure 9C:
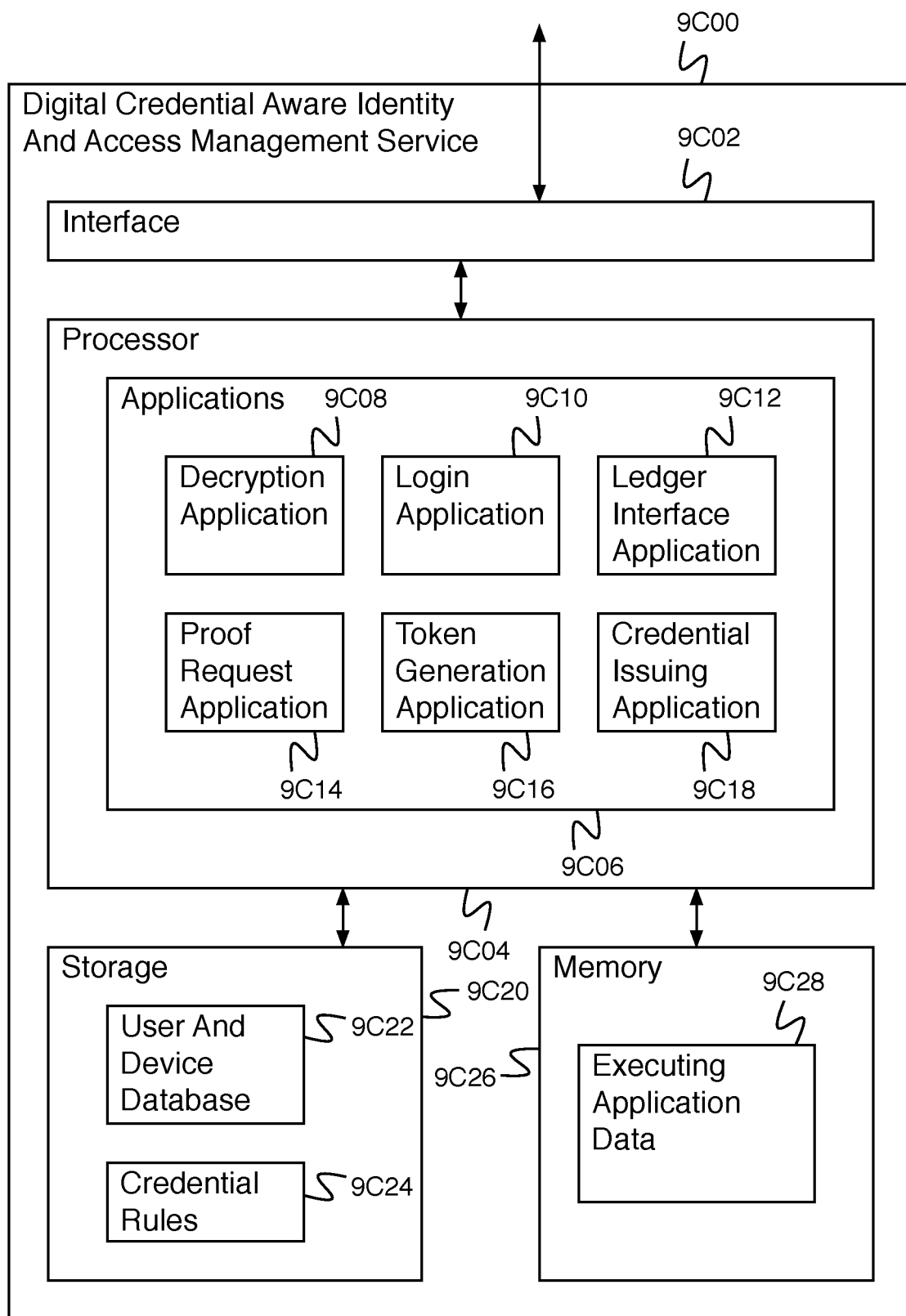
FIG. 9C is a block diagram illustrating an embodiment of a digital credential aware identity and access management service (DCIAMS).

FIG. 9C is a block diagram illustrating an embodiment of a digital credential aware identity and access management service (DCIAMS). In some embodiments, DCIAMS 9C00 comprises DCIAMS 9A06 of FIG. 9A. In the example shown DCIAMS 9C00 comprises interface 9C02. For example, interface 9C02 comprises an interface for receiving data, providing data, receiving a request for data, etc. In some embodiments, interface 9C02 comprises an interface for receiving encrypted messages or encrypted javascript object notation (JSON) messages. Processor 9C04 comprises a processor for executing applications 9C06. Applications 9C06 comprises a set of DCIAMS applications. Decryption application 9C08 comprises an application for decrypting encrypted data using a key. Login application 9C10 comprises an application for receiving login information (e.g., username and password, a credential, a quick response (QR) code challenge, etc.) and providing login credentials (e.g., a login token). Ledger interface application 9C12 comprises an application for interacting with a distributed ledger (e.g., distributed ledger 9A04 of FIG. 8A). For example ledger interface application 9C12 comprises an application for verifying a signature in a ledger or checking a user identifier for revocation in a ledger. Proof request application 9C14 comprises an application for creating a proof request, sending a proof request, evaluating a proof request response (e.g., a proof response), etc. Token generation application 9C16 comprises an application for generating a login token (e.g., in response to a successful login). Credential issuing application 9C18 comprises an application for issuing a digital credential for proving a qualification in response to a request from a credential issuing authority to issue the credential. Applications 9C06 additionally comprises any other appropriate applications.

For example, processor 9C04 comprises a processor for receiving an indication of a new guest associated with an email address, receiving a create indication to create a guest credential representing a guest badge associated with a guest, creating the guest credential for the guest associated with the email address, receiving a claim indication from an authentication to claim the guest credential, determining whether the authentication device is associated with the guest credential, and in the event it is determined that the authentication device is associated with the guest credential, providing the guest credential to the authentication device. Processor 9C04 additionally comprises a processor for receiving a request to authenticate entry from an authentication device, wherein the request comprises a check-in site identifier, providing a proof request to the authentication device, receiving a proof response comprising a guest credential, determining whether the proof response is valid using a distributed ledger, and in the event it is determined that the proof response is valid, determining whether the check-in site identifier is valid, and in the event the check-in site identifier is valid, determining a guest check-in site associated with the request to authenticate entry from the authentication device, and providing a check-in indication to the visitor tracking system that a visitor has checked in.

Storage 9C20 comprises user and device database 9C22 and credential rules 9C24. User and device database 9C22 comprises a database of registered users for a given customer organization and user details (e.g., username, password hash, contact information, email address, relationship to devices, registered public keys, registered mapping documents in a decentralized ledger, etc.). User and device database 9C22 additionally comprises a device directory comprising all the devices for a given customer organization as well as mapping documents associated with the devices and relationships with users associated with the devices. Credential rules 9C24 comprises a set of credential rules for determining a credential that satisfies a given access request, for example rules related to a credential associated schema, a credential associated organization, a credential issuer, a credential associated location, a credential associated class identifier, a credential associated license number, or any other appropriate credential rules. In various embodiments, rules comprise rules related to a credential associated schema, rules related to a credential associated organization, rules related to a credential issuer, rules related to a credential associated location, rules related to a credential associated class identifier or identifier number, rules related to a credential associated license or license number, a credential associated class name, or any other appropriate credential rules. In some embodiments, the rules are applied selectively (e.g., based at least in part on a user identifier)—for example, employees with a credential can access application A, contractors with a credential can access application B, or any other appropriate matching of access with identifiers. In various embodiments, the rules are applied selectively based at least in part on current employment, employee type, location of user, qualification by training class, credential from a third party issuer (e.g., division of motor vehicle license, certification from school, etc.), or any other appropriate criterion. As examples of configurable credential rules to grant access: 1) access is granted in the event that a credential indicates that the holder is a current employee (e.g., issuing company is valid, employee status is not expired, and not revoked); 2) access is granted in the event that a credential indicates that the holder is an employee in an organization of the company (e.g., issuing company is valid, organization is specified organization, employee status is not expired, and not revoked); 3) access is granted in the event that a credential indicates that the holder is an employee in a specified location (e.g., issuing company is valid, location is a specified location, employee status is not expired, and not revoked); 4) access is granted in the event that a credential indicates that the holder has necessary training (e.g., issuing company is valid, training status is complete, employee status is not expired, and not revoked); and 5) access is granted in the event that a credential indicates that the holder has outside credential (e.g., issuing company is valid, outside credential is valid, outside credential issuer is third party, employee status is not expired, and not revoked). DCIAMS 9C00 additionally comprises memory 9C26. Memory 9C26 comprises executing application data 9C28, comprising data associated with applications 9C06.

Figure 9D:
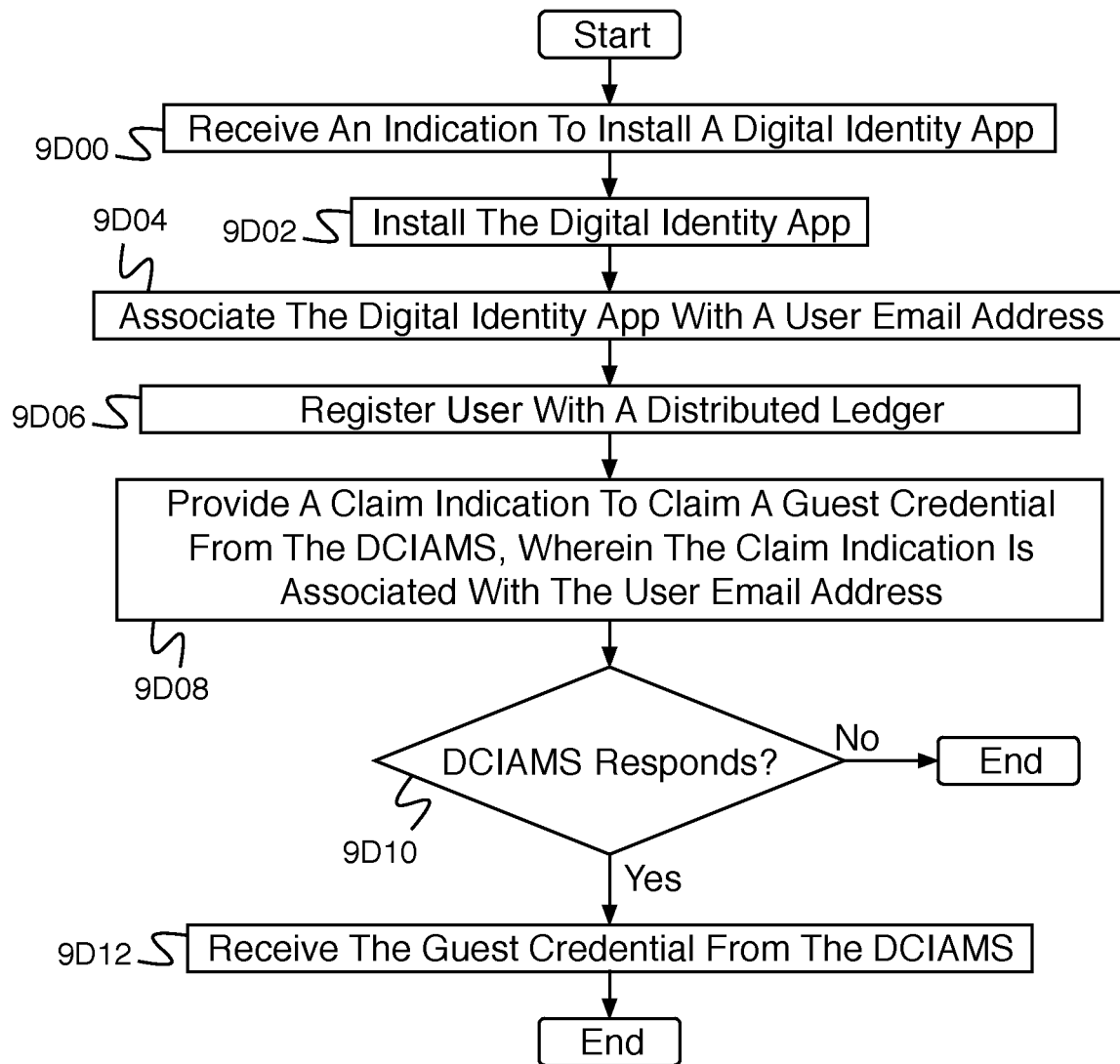
FIG. 9D is a flow diagram illustrating an embodiment of a process for preparing an authentication device for credential authentication.

FIG. 9D is a flow diagram illustrating an embodiment of a process for preparing an authentication device for credential authentication. In some embodiments, the process of FIG. 9D is executed by authentication device 9A02 of FIG. 9A. In the example shown, in 9D00, an indication to install a digital identity app is received. For example, the indication to install a digital identity app is received as part of a human resources system guest setup process. In 9D02, the digital identity app is installed. In 9D04, the digital identity app is associated with a user email address. For example, a human resources system guest setup process provides a one-time use token (e.g., a hypertext link) delivered to the email address associated with the user. When the user invokes the link on a computer (e.g., a laptop or desktop computer) the user is provided a quick response (QR) code for access by the authentication device. When the authentication device accesses the QR code using the digital identity app, the digital identity app becomes associated with the user email address. In some embodiments, the claim indication from the authentication device to claim the guest credential comprise a one-time token being used that causes generation of a DID keypair, wherein the private key component is stored on the authentication device and the public key component is stored on the distributed ledger, and that causes providing the guest credential to the authentication device. In the event the user invokes the link using the digital identity app, the token is pushed into the mobile context to associated the digital identity app with the user email address. In 9D06, the user is registered with a distributed ledger. For example, a user, user identifier, or user account associated with the email address is registered with a distributed ledger—for example, by invoking a link that has been delivered to the email address, scanning a QR code, registering a decentralized identifier (DID) in a distributed ledger, associating the DID with a guest credential, etc. In 9D08, a claim indication is provided to claim a guest credential from the DCIAMS, wherein the claim indication is associated with the user email address, user identifier, or user account. In 9D10, it is determined whether the DCIAMS responds. In the event it is determined that the DCIAMS does not respond, the process ends. In the event it is determined that the DCIAMS responds, control passes to 9D12. In 9D12, the guest credential is received from the DCIAMS.

Figure 9E:
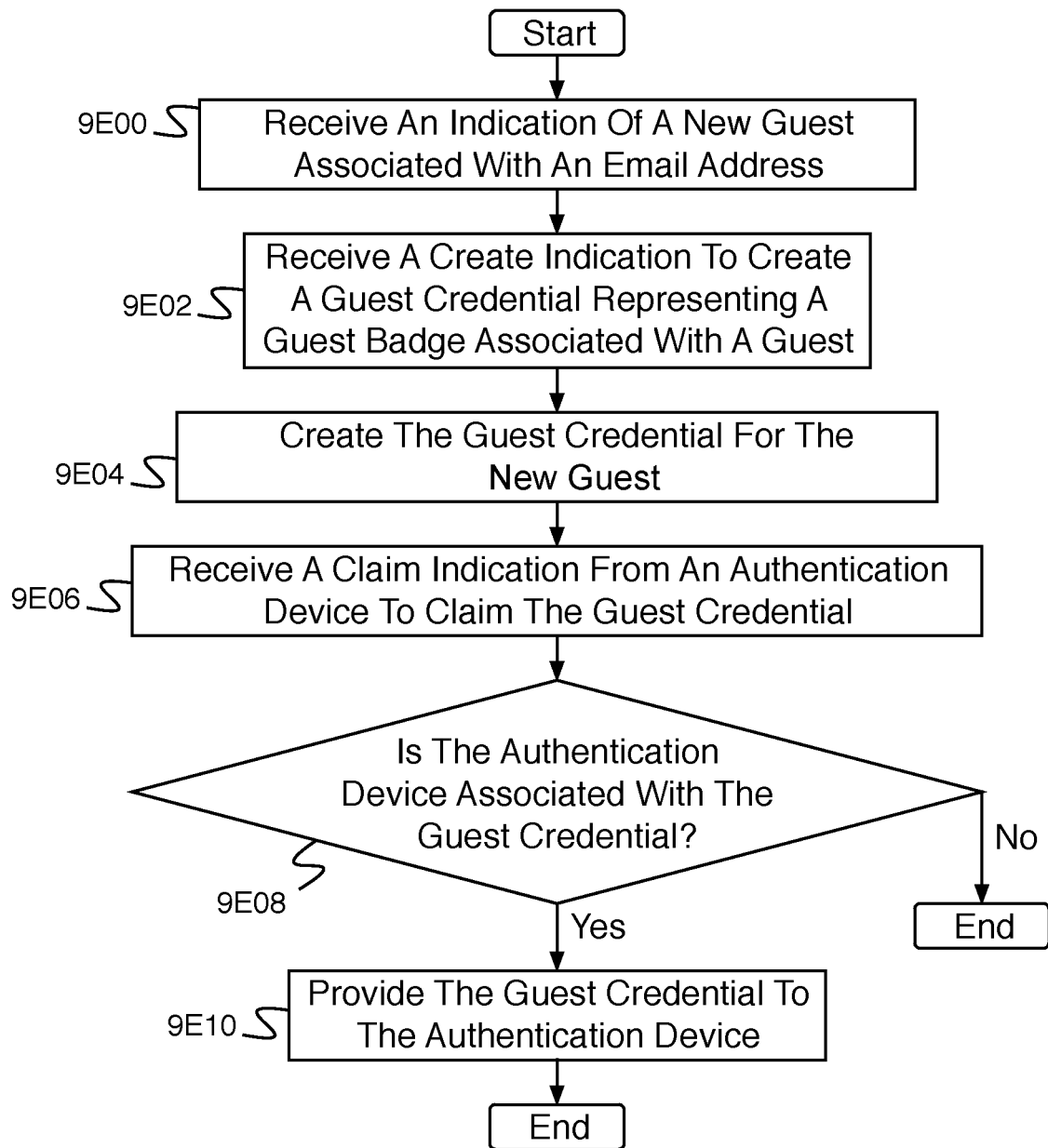
FIG. 9E is a flow diagram illustrating an embodiment of a process for preparing a DCIAMS for credential authentication.

FIG. 9E is a flow diagram illustrating an embodiment of a process for preparing a DCIAMS for credential authentication. In some embodiments, the process of FIG. 9E is executed by DCIAMS 9A06 of FIG. 9A. In the example shown, in 9E00, an indication is received of a new guest associated with an email address. In 9E02, a create indication to create a guest credential representing a guest badge associated with a guest is received. For example, the create indication is provided to the DCIAMS by a human resources system employee setup process (e.g., a guest credential is created for an employee as part of setting up the employee in the human resources system). For example, the create indication is associated with an email address, a user ID, and/or a user account. In 9E04, the guest credential is created for the new guest. For example, the guest credential is created and registered in a distributed ledger. In 9E06, a claim indication is received from an authentication device to claim the guest credential. In 9E08, it is determined whether the authentication device is associated with the guest credential. For example, determining whether the authentication device is associated with the guest credential comprises determining whether the email address, the user ID (e.g., an IKP), and/or the user account associated with the guest credential matches information (e.g., an identifier in the DID document) registered in a distributed ledger. In the event it is determined that the authentication device is not associated with the guest credential, the process ends. In the event it is determined that the authentication device is associated with the guest credential, control passes to 9E10. In 9E10, the guest credential is provided to the authentication device.

Figure 9F:
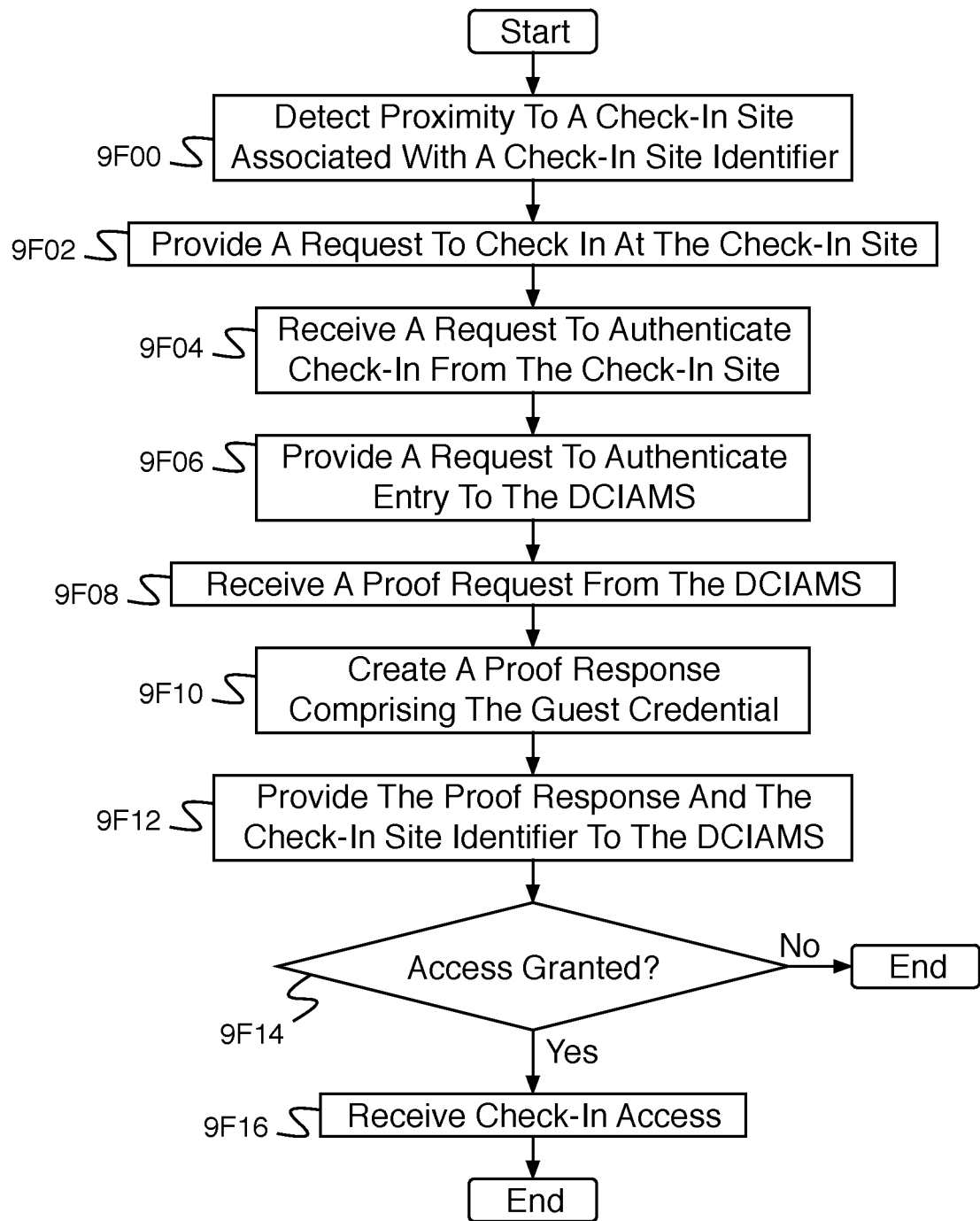
FIG. 9F is a flow diagram illustrating an embodiment of a process for credential authentication.

FIG. 9F is a flow diagram illustrating an embodiment of a process for credential authentication. In some embodiments, the process of FIG. 9F is executed by authentication device 9A02 of FIG. 9A. In the example shown, in 9F00, proximity to a check-in site associated with a check-in site identifier is determined. For example, proximity to the check-in site is determined using a proximity radio system. In 9F02, a request is provided to check in at the check-in site (e.g., the request to check in is provided to the check-in site). In some embodiments, the authentication device communicates with the check-in site via a wireless protocol (e.g., Bluetooth, Zigbee, NFC, etc.). In 9F04, a request to authenticate entry is received from the check-in site. In 9F06, a request to authenticate entry is provided to the DCIAMS. In 9F08, a proof request is received from the DCIAMS. In 9F10 a proof response comprising the guest credential is created. In some embodiments, the proof response is signed (e.g., with an authentication device private key). In 9F12, the proof response and the check-in site identifier are provided to the DCIAMS. In 9F14, it is determined whether access is granted. In the event it is determined that access is not granted, the process ends. In the event it is determined that access is granted, control passes to 9F16. In 9F16, check-in access is received.

Figure 9G:
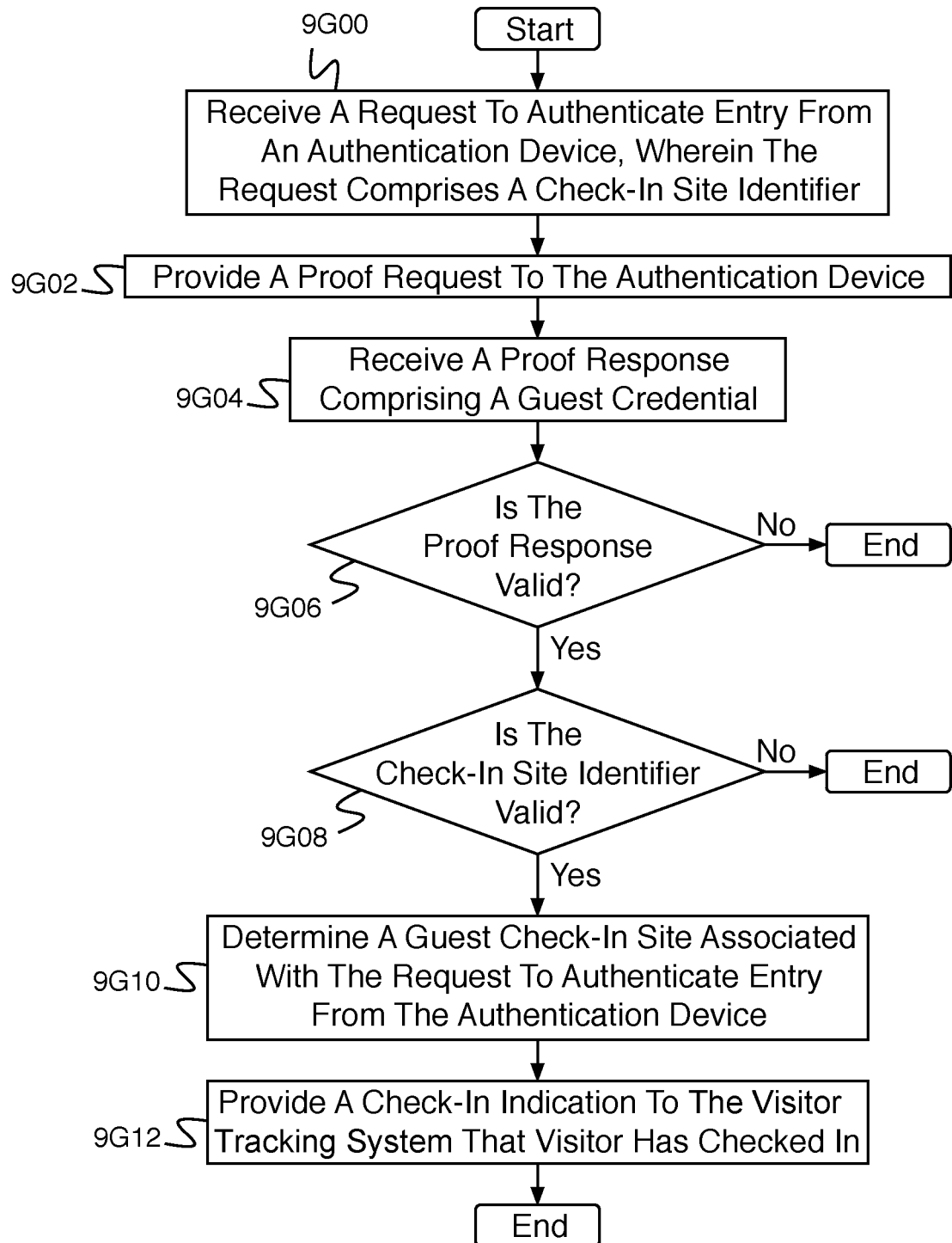
FIG. 9G is a flow diagram illustrating an embodiment of a process for credential authentication.

FIG. 9G is a flow diagram illustrating an embodiment of a process for credential authentication. In some embodiments, the process of FIG. 9G is executed by DCIAMS 9A06 of FIG. 9A. In the example shown, in 9G00, a request to authenticate entry is received from an authentication device, wherein the request comprises a check-in site identifier. In 9G02, a proof request is provided to the authentication device. In 9G04, a proof response comprising a guest credential is received. In 9G06, it is determined whether the proof response is valid. For example, the guest credential is checked against information stored in the distributed ledger to determine whether the guest credential is valid—for example, has an appropriate schema, has an appropriate definition, is not expired, and/or is not revoked. In the event it is determined that the proof response is not valid, the process ends. In the event it is determined that the proof response is valid, control passes to 9G08. In 9G08, it is determined whether the check-in site identifier is valid. For example, determining that the check-in site identifier is valid comprises verifying that the check-in site identifier is associated with a valid check-in site, verifying that the user associated with the guest credential has permission to access the check-in site, verifying that the authentication device associated with the guest credential has recently communicated with the check-in site, etc. In the event it is determined that the check-in site identifier is not valid, the process ends. In the event it is determined that the check-in site identifier is valid, control passes to 9G10. In 9G10, a guest check-in site associated with the request to authenticate entry from the authentication device is determined. In 9G12, a check-in indication is provided to the visitor tracking system that a visitor has checked in.

Figure 9H:
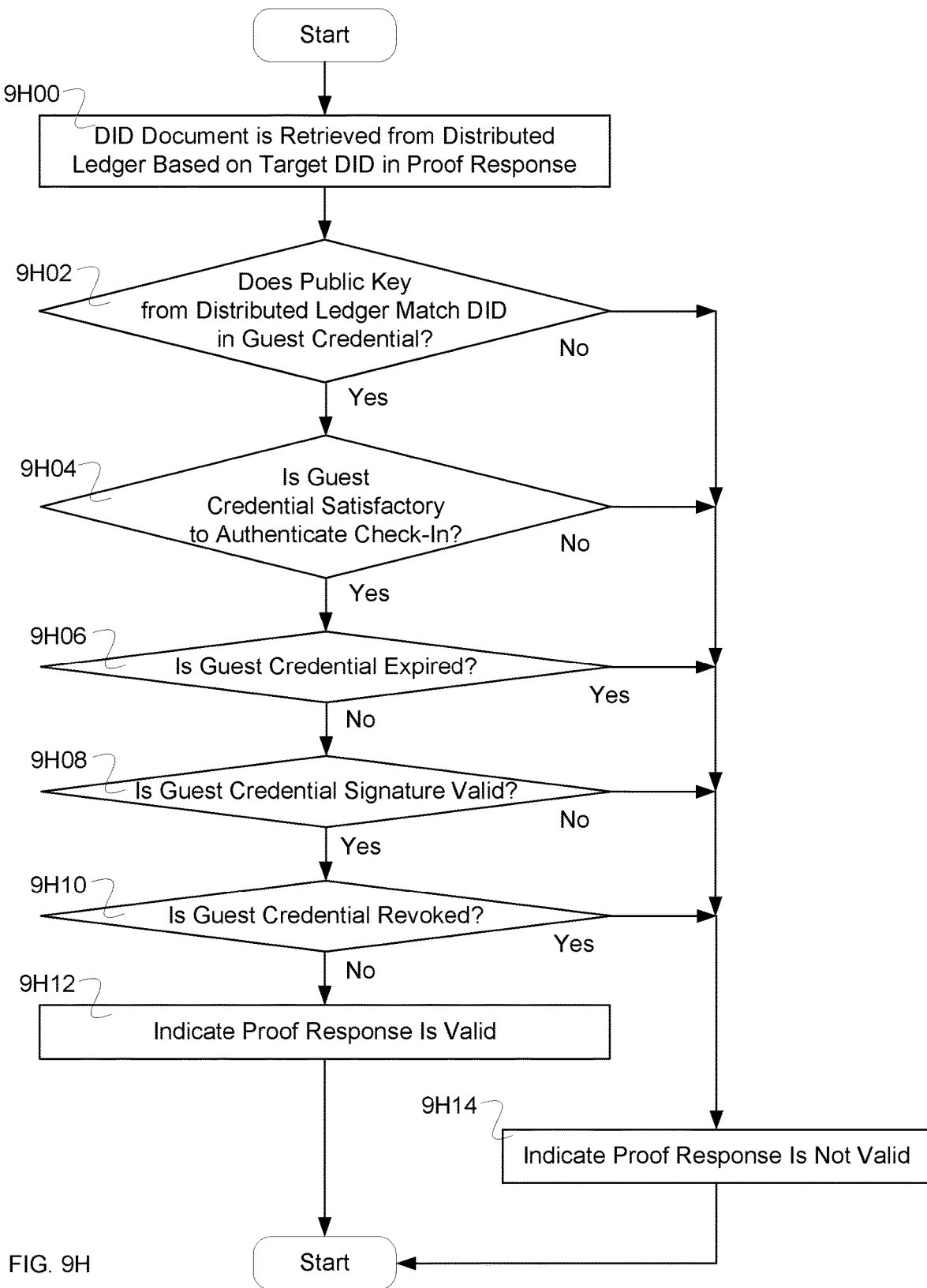
FIG. 9H is a flow diagram illustrating an embodiment of a process for determining whether a proof response is valid.

FIG. 9H is a flow diagram illustrating an embodiment of a process for determining whether a proof response is valid. In some embodiments, the process of FIG. 9H implements 9G06 of FIG. 9G. In the example shown, in 9H00, a DID document is retrieved from a distributed ledger based on target DID in proof response. In 9H02, it is determined whether a public key from a decentralized ledger matches a DID in a guest credential (e.g., the guest credential of the proof response). In the event it is determined that a public key from a decentralized ledger does not match a DID in the guest credential, control passes to 9H14. In the event it is determined in 9H02 that that a public key from a decentralized ledger matches a DID in the guest credential, control passes to 9H04. In 9H04, it is determined whether the guest credential is satisfactory to authenticate check-in. For example, determining whether the guest credential is satisfactory to authenticate check-in comprises determining whether the guest credential is on a list of guest credentials certified for visiting, determining whether the visitor associated with the guest credential has a scheduled appointment, determining whether the visitor associated with the guest credential has an employee authorization to enter, etc. In the event it is determined that the guest credential is not satisfactory to authenticate check-in, control passes to 9H14. In the event it is determined in 9H04 that the guest credential is satisfactory to authenticate check-in, control passes to 9H06. In 9H06, it is determined whether the guest credential is expired. In the event it is determined that the guest credential is expired, control passes to 9H14. In the event it is determined in 9H06 that the guest credential is not expired, control passes to 9H08. In 9H08, it is determined whether the guest credential signature is valid. For example, the guest credential signature comprises a signature from the credential issuer (e.g., a DCIAMS) or from the credential holder (e.g., the authentication device). In the event it is determined that the guest credential signature is not valid, control passes to 9H14. In the event it is determined in 9H08 that the guest credential signature is valid, control passes to 9H10. In 9H10, it is determined whether the guest credential is revoked. For example, determining whether the guest credential is revoked comprises querying a revocation registry of a distributed ledger (e.g., a decentralized ledger, a permissioned ledger, a public ledger, a blockchain, etc.). In the event it is determined that the guest credential is revoked, control passes to 9H14. In 9H14, the process indicates that the proof response is not valid, and the process ends. In the event it is determined that the guest credential is not revoked, control passes to 9H12. In 9H12, the process indicates that the proof response is valid, and the process ends.

A system for credential authentication comprises an interface configured to receive a create indication to create a guest credential representing a guest badge associated with a visitor and receive a claim indication from an authentication device to claim the guest credential, and a processor configured to provide the guest credential to the authentication device in response to the claim indication, provide a proof request to the authentication device, receive a proof response from the authentication device, validate the proof response, determine a visitor tracking system associated with a request from the authentication device to authenticate entry, and provide a check-in indication to the visitor tracking system that the visitor has checked in. In some embodiments, the create indication to create a guest credential is associated with an email address, a user ID, or a user account. In some embodiments, the claim indication from the authentication device to claim the guest credential comprise a one-time token being used that causes generation of a DID keypair, wherein the private key component is stored on the authentication device and the public key component is stored on the distributed ledger, and that causes providing the guest credential to the authentication device. In some embodiments, the processor is further configured to verify the guest credential is associated with the authentication device. In some embodiments, verifying the guest credential is associated with the authentication device comprises comparing a guest credential email address with an authentication device email address. In some embodiments, the proof request is provided in response to a request to authenticate entry received from the authentication device. In some embodiments, the request to authenticate entry is provided by the authentication device in response to an authentication request from the guest check-in site. In some embodiments, the authentication request from the guest check-in site is provided in response to a check-in request from the authentication device. In some embodiments, the check-in request from the authentication device is provided automatically upon detection of proximity of the authentication device to the guest check-in site. In some embodiments, the authentication device and the guest check-in site communicate using a wireless protocol. In some embodiments, the wireless protocol comprises Bluetooth, NFC, or Zigbee. In some embodiments, the request to authenticate entry from the authentication device comprises a check-in site identifier. In some embodiments, the proof response comprises the guest credential. In some embodiments, the proof response is signed with an authentication device private key. In some embodiments, validating the proof response using the distributed ledger comprises determining that the guest credential is satisfactory to authenticate check-in, determining that a guest credential signature is valid, determining that the guest credential is not expired, or determining that the guest credential is not revoked. In some embodiments, validating the proof response comprises determining that the visitor has a scheduled appointment or an employee authorization to enter. In some embodiments, the create indication to create a guest credential is provided by a human resources system guest setup process. In some embodiments, the claim indication from an authentication device to claim the guest credential is provided in response to an authentication device digital identification app setup. In some embodiments, the authentication device digital identification app setup is in response to an email sent as part of a human resources system guest setup process.

Case J—Digital Credentials for Visitor Network Access

A system for credential authentication comprises an interface configured to receive a create indication to create a visitor network credential and receive a certify indication to certify an authentication device to use a network, and a processor configured to provide the visitor network credential to the authentication device in response to the certify indication, provide a proof request to the authentication device, receive a proof response, validate the proof response using a distributed ledger, generate a network certificate, and provide the network certificate to the authentication device.

A system for credential authentication comprises a system for using a visitor network credential to authenticate access to a guest network (e.g., a guest wifi network). When a new user is invited to visit an organization, the user installs a digital identity application on a mobile device. The mobile device including the digital identity application comprises an authentication device for the user. The digital identity application is associated with user information (e.g., an email address, a user identifier (ID), a user account, etc.) for identifying the user. The user enrolls in the credential server using a one-time use token associated with their email, gets an identity keypair (IKP), and then uses that IKP from the authentication device to get the credential from the credential server. By signing the request to the credential server with the IKP, the platform can find the associated credentials and also securely release them to the authentication device. The digital identity application, after providing the request for a visitor network credential for authenticating network access, then receives the visitor network credential from the credential server. When the credential server receives an indication of the new user, the credential server creates a visitor network credential associated with the user and registers the new user and the visitor network credential in a distributed ledger (e.g., a decentralized ledger, a permissioned ledger, a public ledger, a blockchain, etc.). The credential server request for the visitor network credential and provides the visitor network credential to the authentication device. When the user attempts to access the network using the authentication device, the network access device provides the authentication device with a captive portal for authenticating. The captive portal includes a user interface element (e.g., a button) for the user to indicate to authenticate access using a digital credential. When the user indicates to authenticate access using a digital credential, the authentication device activates a digital identity app for accessing the visitor network credential. The user is presented with a list of available credentials and selects the visitor network credential. The digital identity app then provides a certify indication to a credential server to certify use of the guest wifi network. The credential server provides a proof request to the digital identity app and the digital identity app provides the credential server a proof response including the network credential. The credential server validates the proof response using the distributed ledger, and in the event the proof response is valid, creates a network certificate for authentication device. The credential server then provides the network certificate to the authentication device. The authentication device receives the network certificate and presents the network certificate to the captive portal for authentication. The captive portal then validates the network certificate and creates a network session for the authentication device. In some embodiments, network session settings for the authentication device (e.g., available bandwidth, session time, available session connections) are based on user information included in the network certificate.

Figure 10A:
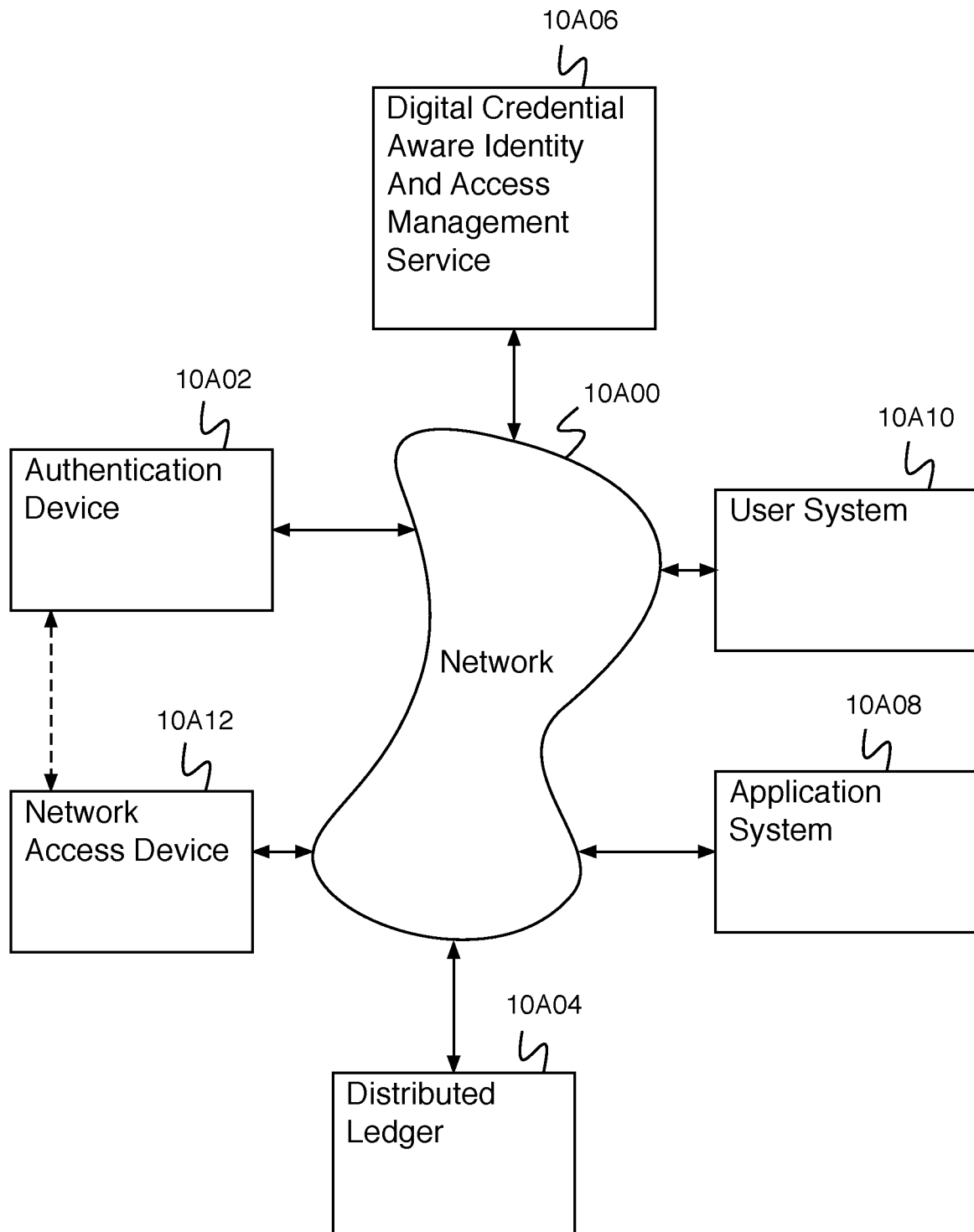
FIG. 10A is a block diagram illustrating an embodiment of a network system.

FIG. 10A is a block diagram illustrating an embodiment of a network system. In some embodiments, the network system of FIG. 10A comprises a network system for a credential system. In the example shown, FIG. 10A comprises network 10A00. In various embodiments, network 10A00 comprises one or more of the following: a local area network, a wide area network, a wired network, a wireless network, the Internet, an intranet, a storage area network, or any other appropriate communication network. Authentication device 10A02, distributed ledger 10A04, digital credential aware identity and access management service (DCIAMS) 10A06, application system 10A08, user system 10A10, and network access device 10A12 communicate via network 10A00. Authentication device 10A02 comprises an authentication device associated with a user (e.g., a user of application system 10A08, a user using user system 10A10). For example, authentication device 10A02 comprises a computer, a smartphone, a tablet, a mobile device, etc. Distributed ledger 10A04 comprises a distributed ledger (e.g., a permissioned ledger, a public ledger, a decentralized ledger, a blockchain, etc.). For example, distributed ledger 10A04 is stored on a plurality of systems and comprises one or more permissioned writer systems for writing to the distributed ledger. DCIAMS 10A06 comprises a system for interacting with authentication device 10A02, distributed ledger 10A04, application system 10A08, and any other appropriate systems. DCIAMS 10A06 comprises a system for coordinating a login for application system 10A08, for providing a credential to authentication device 10A02, for requesting a credential from authentication device 10A02, for verifying a user identifier or a signature in distributed ledger 10A04, etc. Application system 10A08 comprises a system for providing access to an application. For example, application system 10A08 comprises a system for providing access to a database application, a data processing application, a productivity application, a communication application, etc. A user uses user system 10A10 to access applications on application system 10A08. For example, a user uses an application on user system 10A10 (e.g., a web browser) to connect to an application on application system 10A08. The application on application system 10A08 authenticates a user login before granting access. Network access device 10A12 comprises a system for providing network access. For example, network access device 10A12 comprises a guest wifi access point of an organization. In some embodiments, authentication device 10A02 communicates with network access device 10A12 for access to network 10A00. For example, network access device 10A12 provides network access at a higher speed, at a lower cost, with greater security, etc., than authentication device 10A02 is able to achieve on its own. Network access device 10A12 provides network access to authentication device 10A02 after authentication device 10A12 has authenticated access.

DCIAMS 10A06 comprises a system for managing digital credentials for visitor network access. For example, DCIAMS 10A06 comprises an interface configured to receive a create indication to create a visitor network credential and receive a certify indication to certify an authentication device to use a network, and a processor configured to provide the visitor network credential to the authentication device in response to the certify indication, provide a proof request to the authentication device, receive a proof response, validate the proof response using a distributed ledger, generate a network certificate, and provide the network certificate to the authentication device.

Figure 10B:
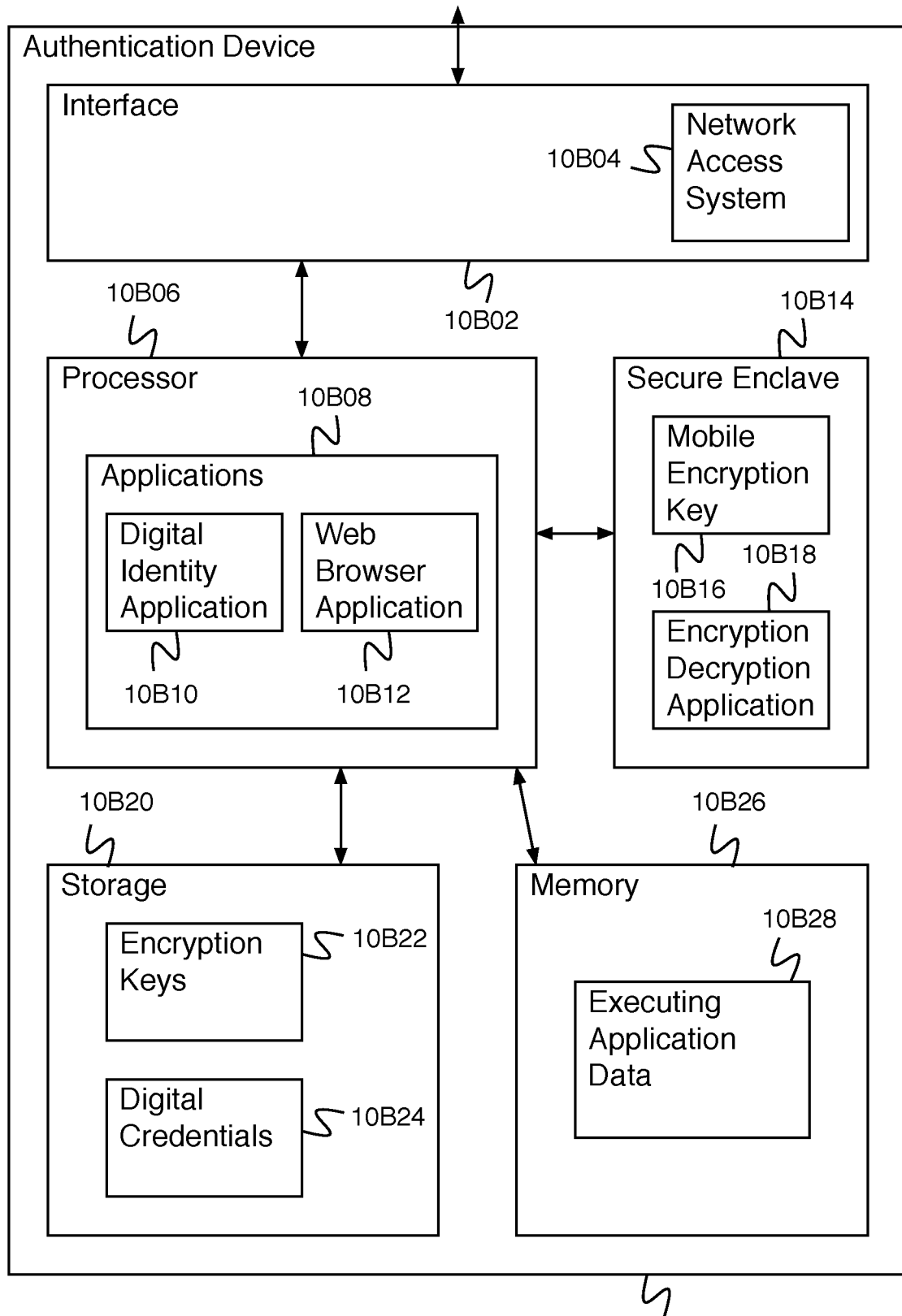
FIG. 10B is a block diagram illustrating an embodiment of an authentication device.

FIG. 10B is a block diagram illustrating an embodiment of an authentication device. In some embodiments, authentication device 10B00 of FIG. 10B comprises authentication device 10A02 of FIG. 10A. In the example shown, authentication device 10B00 comprises interface 10B02. For example, interface 10B02 comprises an interface for receiving data, providing data, receiving a request for data, etc. Interface 10B02 comprises network access system 10B04. Network access system 10B04 comprises a radio system for interacting with a network access device. For example, network access system 10B04 comprises a wifi access system. Processor 10B06 comprises a processor for executing applications 10B08. Applications 10B08 comprise digital identity application 10B10, web browser application 10B12 and any other appropriate applications. For example, processor 10B06 comprises a processor for receiving an indication to install digital identity application 10B10 and installing digital identity application 10B10. Digital identity application 10B10 comprises an application for providing a proof response in response to a proof request. For example, digital identity application 10B10 comprises an application for associating with a user email address, a user ID, and/or a user account, registering the email address, the user ID, and/or the user account with a distributed ledger, requesting a visitor network credential from a DCIAMS, wherein the request is associated with the user email address, the user ID, and/or the user account, determining whether the DCIAMS responds, and in the event that the DCIAMS responds, receiving the visitor network credential from the DCIAMS. Additionally digital identity application 10B10 comprises an application for receiving a redirect from a captive portal in a web browser, receiving an indication to use a visitor network credential, providing a certify indication to a DCIAMS to certify user of a guest wifi network, receiving a proof request from the DCIAMS, providing a proof response, receiving a network certificate, and providing the network certificate to the captive portal. Web browser application 10B12 comprises an application for accessing network data using a web protocol. For example, web browser application 10B12 comprises an application for receiving a captive portal for authenticating access to a network.

Secure enclave 10B14 comprises a secure system for storing a mobile encryption key. Secure enclave 10B14 comprises mobile encryption key 10B16 and encryption decryption application 10B18. For example, secure enclave 10B14 comprises multiple mobile encryption keys, an application for generating and/or removing mobile encryption keys, etc. Secure enclave 10B14 comprises a system for receiving data, transforming it by encrypting and/or decrypting the data using a mobile encryption key or keys, and providing the transformed data. For example, secure enclave 10B14 is configured to only provide transformed input data and not to provide mobile encryption key 10B16. In some embodiments, functionality of secure enclave 10B14 is access limited using a biometric (e.g., a fingerprint, a retina scan, a DNA scan, etc.) and/or a personal identification number (PIN). Authentication device 10B00 additionally comprises storage 10B20. Storage 10B20 comprises encryption keys 10B22—for example, a public key of an identity key pair, a private key of an identity key pair, a private key of an identity key pair encrypted using mobile encryption key 10B16, etc. For example, an identity key pair of authentication device 10B00 comprises a public key used by other systems for encrypting data in such a way that it can only by decrypted by authentication device 10B00, and a private key for decrypting data encrypted using the public key or for signing data for proving it came from authentication device 10B00. Storage 10B20 additionally comprises digital credentials 10B24, comprising digital certificates representing qualifications (e.g., a college degree, work experience, time living at an apartment, time enrolled in a health insurance plan, etc.). For example, digital credentials 10B24 comprise a credential wallet. In some embodiments, digital credentials 10B24 comprise a locked digital wallet able to be unlocked by a user. For example, digital credentials 10B24 are unlocked using a biometric or a PIN. Once the locked digital wallet is unlocked, a credential is retrieved. Authentication device 10B00 additionally comprises memory 10B26. Memory 10B26 comprises executing application data 10B28, comprising data associated with applications 10B08.

Figure 10C:
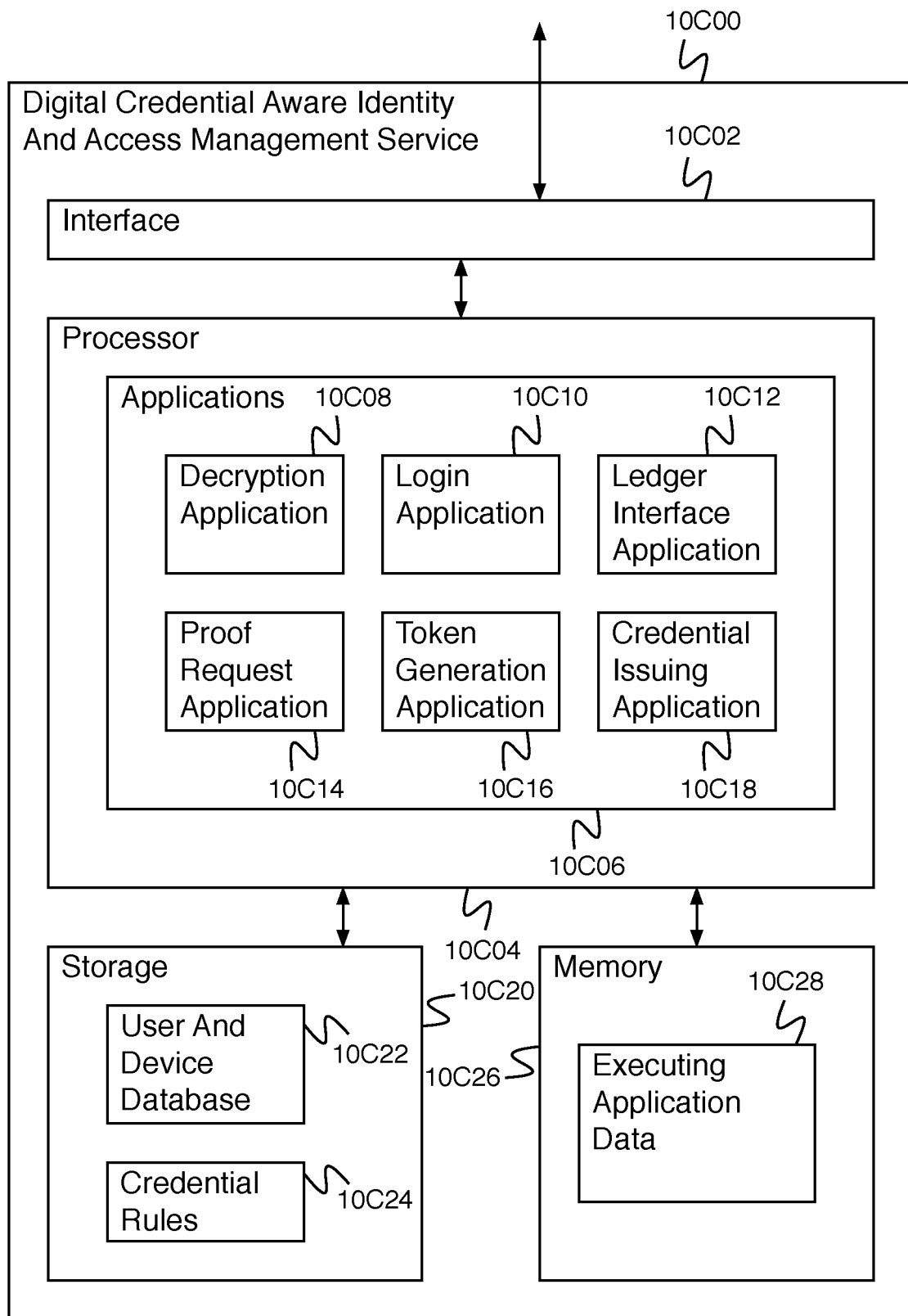
FIG. 10C is a block diagram illustrating an embodiment of a digital credential aware identity and access management service (DCIAMS).

FIG. 10C is a block diagram illustrating an embodiment of a digital credential aware identity and access management service (DCIAMS). In some embodiments, DCIAMS 10C00 comprises DCIAMS 10A06 of FIG. 10A. In the example shown DCIAMS 10C00 comprises interface 10C02. For example, interface 10C02 comprises an interface for receiving data, providing data, receiving a request for data, etc. In some embodiments, interface 10C02 comprises an interface for receiving encrypted messages or encrypted javascript object notation (JSON) messages. Processor 10C04 comprises a processor for executing applications 10C06. Applications 10C06 comprise a set of DCIAMS applications. Decryption application 10C08 comprises an application for decrypting encrypted data using a key. Login application 10C10 comprises an application for receiving login information (e.g., username and password, a credential, a quick response (QR) code challenge, etc.) and providing login credentials (e.g., a login token). Ledger interface application 10C12 comprises an application for interacting with a distributed ledger (e.g., distributed ledger 10A04 of FIG. 10A). For example, ledger interface application 10C12 comprises an application for verifying a signature in a ledger or checking a user identifier for revocation in a ledger. Proof request application 10C14 comprises an application for creating a proof request, sending a proof request, evaluating a proof request response (e.g., a proof response), etc. Token generation application 10C16 comprises an application for generating a login token (e.g., in response to a successful login). Credential issuing application 10C18 comprises an application for issuing a digital credential for proving a qualification in response to a request from a credential issuing authority to issue the credential. Applications 10C06 additionally comprise any other appropriate applications.

In the example shown, processor 10C04 comprises a processor for receiving an indication of a new guest associated with an email address, receiving a create indication to create a visitor network credential representing a network access associated with a guest, creating the visitor network credential for the guest associated with the email address, receiving a claim indication from an authentication device to claim the visitor network credential, determining whether the authentication device is associated with the visitor network credential, and in the event it is determined that the authentication device is associated with the visitor network credential, providing the visitor network credential to the authentication device. Processor 10C04 additionally comprises a processor for receiving a certify indication to certify an authentication device to use a network, providing a proof request to the authentication device, receiving a proof response, determining whether the proof response is valid using the distributed ledger (e.g., by checking that the proof response corresponds to the previously registered information in the distributed ledger), and in the event it is determined that the proof response is valid, generating a network certificate and providing the network certificate to the authentication device.

Storage 10C20 comprises user and device database 10C22 and credential rules 10C24. User and device database 10C22 comprises a database of registered users for a given customer organization and user details (e.g., username, password hash, contact information, email address, relationship to devices, registered public keys, registered mapping documents in a decentralized ledger, etc.). User and device database 10C22 additionally comprises a device directory comprising all the devices for a given customer organization as well as mapping documents associated with the devices and relationships with users associated with the devices.

Credential rules 10C24 comprises a set of credential rules for determining a credential that satisfies a given access request—for example, rules related to a credential associated schema, a credential associated organization, a credential issuer, a credential associated location, a credential associated class identifier, a credential associated license number, or any other appropriate credential rules. DCIAMS 10C00 additionally comprises memory 10C26. Memory 10C26 comprises executing application data 10C28, comprising data associated with applications 10C06.

Figure 10D:
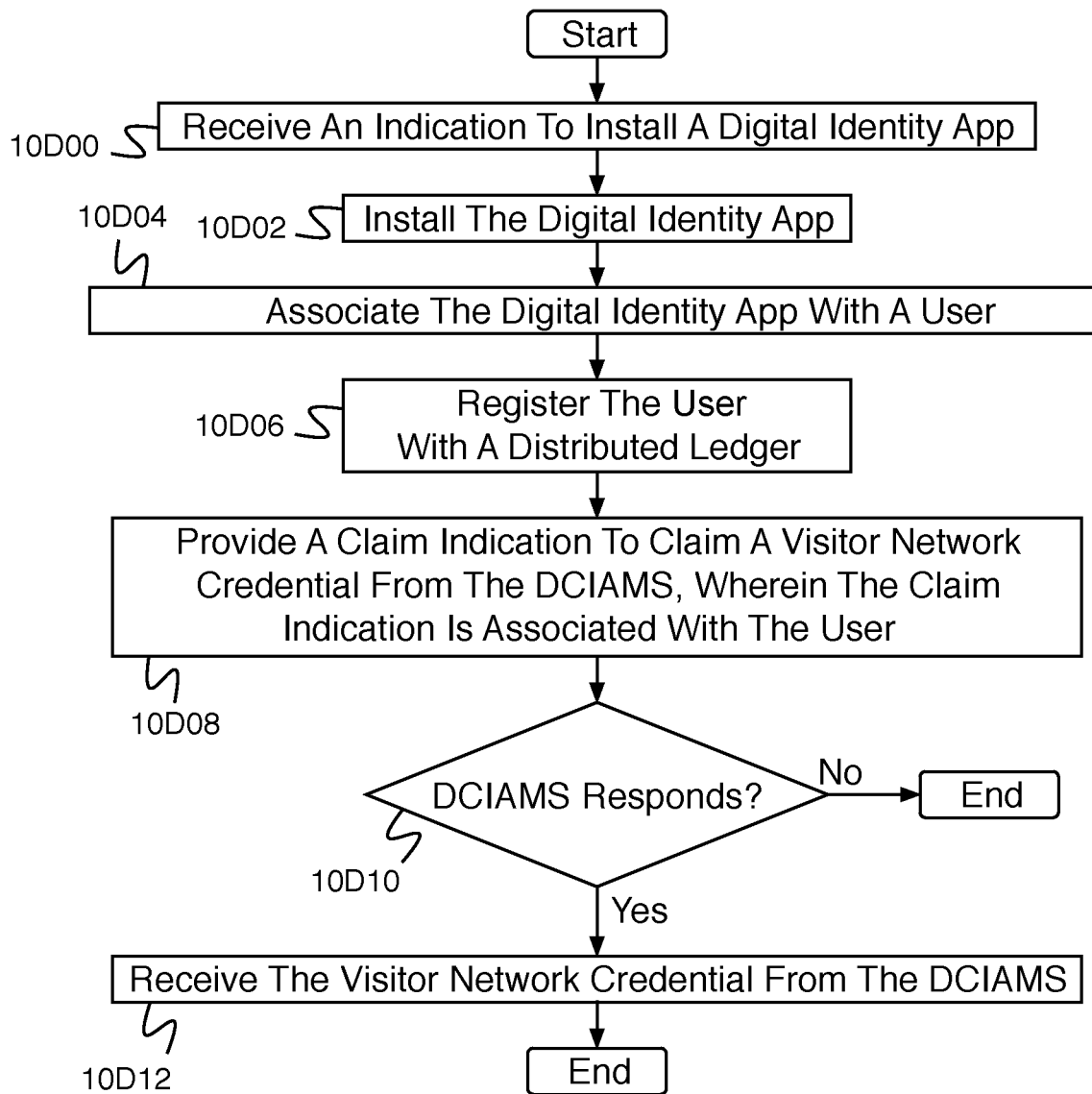
FIG. 10D is a flow diagram illustrating an embodiment of a process for preparing an authentication device for credential authentication.

FIG. 10D is a flow diagram illustrating an embodiment of a process for preparing an authentication device for credential authentication. In some embodiments, the process of FIG. 10D is executed by authentication device 10A02 of FIG. 10A. In the example shown, in 10D00, an indication to install a digital identity app is received. For example, the indication to install a digital identity app is received as part of a human resources system guest setup process. In 10D02, the digital identity app is installed. In 10D04, the digital identity app is associated with a user email address, a user ID, and/or a user account. For example, a human resources system guest setup process provides a one-time use token (e.g., a hypertext link) delivered to the email address associated with the user. When the user invokes the link on a computer (e.g., a laptop or desktop computer) the user is provided a QR code for access by the authentication device. When the authentication device accesses the QR code using the digital identity app, the digital identity app becomes associated with the user. For example, the digital identity app is associated with the user via an email address, a user ID, and/or a user account as embodied in a DID document. In the event the user invokes the link using the digital identity app, the token is pushed into the mobile context to associate the digital identity app with the user email address, the user ID, and/or the user account. In 10D06, the user is registered with a distributed ledger. For example, registering the user with a distributed ledger comprises invoking a link that has been delivered to the email address, scanning a QR code, registering a DID (e.g., a decentralized identifier) in a distributed ledger, associating the DID with a visitor network credential, registering the visitor network credential in the distributed ledger, etc. In 10D08, a claim indication is provided to claim a visitor network credential from the DCIAMS, wherein the claim indication is associated with the user. In 10D10, it is determined whether the DCIAMS responds. In the event it is determined that the DCIAMS does not respond, the process ends. In the event it is determined that the DCIAMS responds, control passes to 10D12. In 10D12, the visitor network credential is received from the DCIAMS.

Figure 10E:
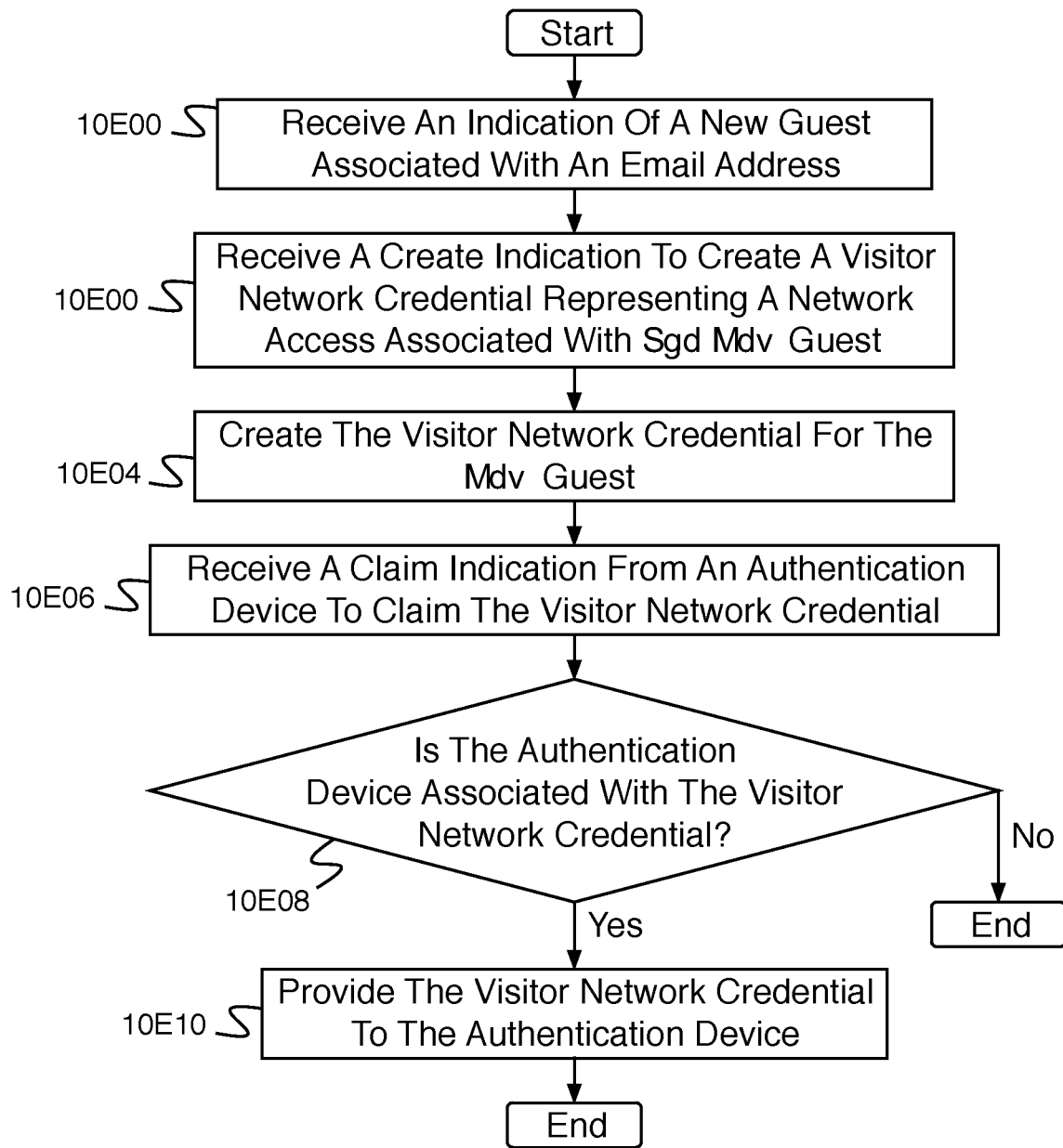
FIG. 10E is a flow diagram illustrating an embodiment of a process for preparing a DCIAMS for credential authentication.

FIG. 10E is a flow diagram illustrating an embodiment of a process for preparing a DCIAMS for credential authentication. In some embodiments, the process of FIG. 10E is executed by DCIAMS 10A06 of FIG. 10A. In the example shown, in 10E00, an indication is received of a new guest associated with an email address. In 10E02, a create indication to create a visitor network credential representing a network access associated with the new guest is received. For example, the create indication is provided to the DCIAMS by a human resources system employee setup process (e.g., a visitor network credential is created for a guest as part of setting up the guest in the human resources system). For example, the create indication is associated with an email address, a user ID, and/or a user account. In 10E04, the visitor network credential is created for the new guest. In 10E06, a claim indication is received from an authentication device to claim the visitor network credential.

In 10E08, it is determined whether the authentication device is associated with the visitor network credential. For example, determining whether the authentication device is associated with the visitor network credential comprises determining whether the email address, the user ID (e.g., an IKP), and/or the user account associated with the visitor network credential matches information (e.g., an identifier in the DID document) registered in a distributed ledger. In the event it is determined that the authentication device is not associated with the visitor network credential, the process ends. In the event it is determined that the authentication device is associated with the visitor network credential, control passes to 10E10. In 10E10, the visitor network credential is provided to the authentication device.

Figure 10F:
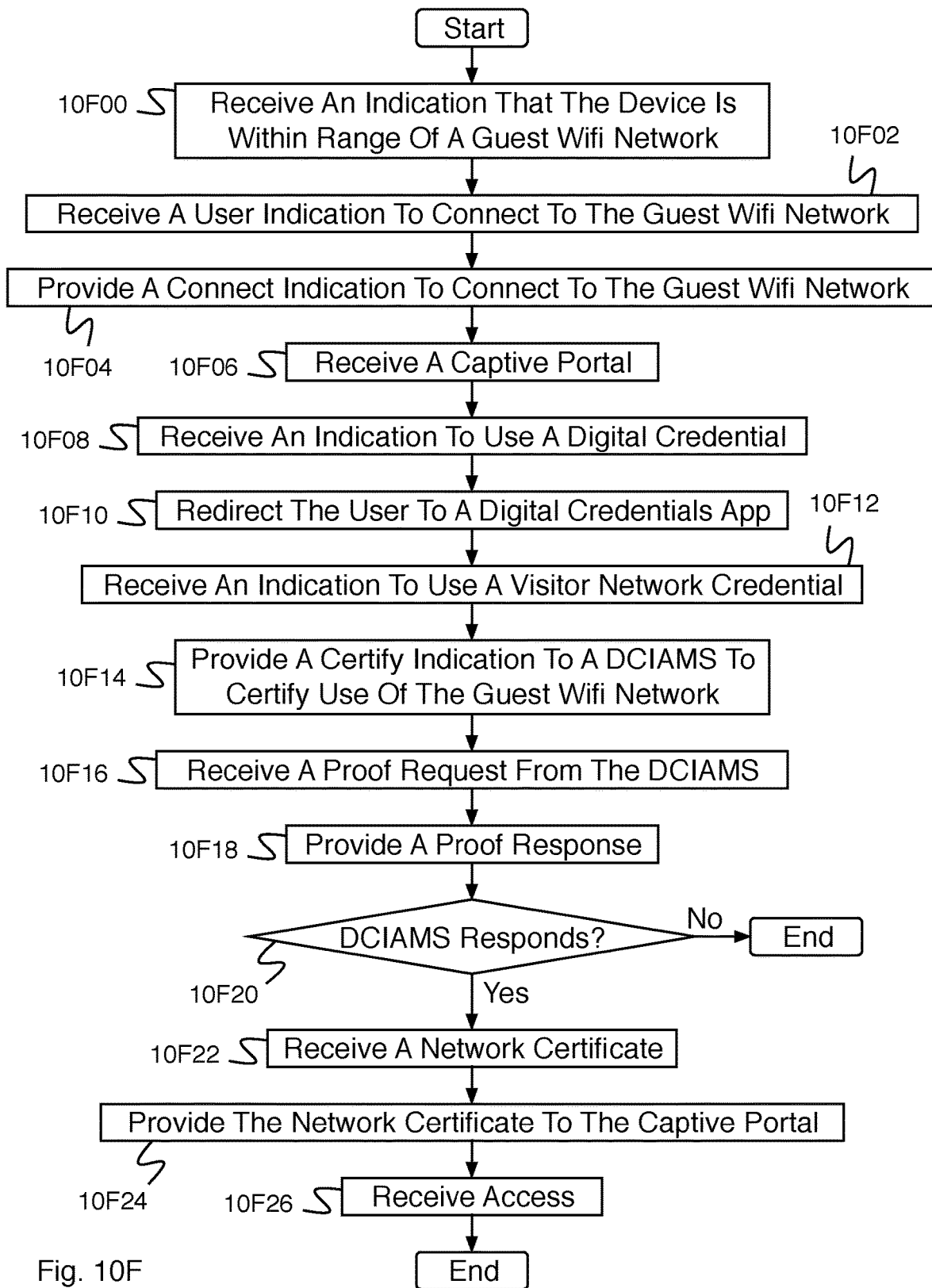
FIG. 10F is a flow diagram illustrating an embodiment of a process for accessing a network.

FIG. 10F is a flow diagram illustrating an embodiment of a process for accessing a network. In some embodiments, the process of FIG. 10F is executed by authentication device 10A02 of FIG. 10A. In the example shown, in 10F00, an indication is received that the device is within range of a guest wifi network. In 10F02, a user indication is received to connect to the guest wifi network. For example, the user indication is received to connect to the guest wifi network in response to an indication to the user that the device is within range of the guest wifi network. In 10F04, a connect indication is provided to connect to the guest wifi network. For example, the connect indication is provided to a wifi access point. In 10F06, a captive portal is received. For example, a captive portal comprises an app for authenticating access to the guest wifi network. In some embodiments, the captive portal comprises a use digital credential user interface object (e.g., a button). In 10F08, an indication is received to use a digital credential. In 10F10, the user is redirected (e.g., by the captive portal) to use a digital credentials app (e.g., for providing a digital credential). In 10F12, an indication is received to use a visitor network credential. For example, the digital credentials app determines a list of credentials (e.g., a list of credentials on the authentication device, a list of credentials able to authenticate access to a wifi network, etc.), presents the list of credentials to a user, and receives a selection of the visitor network credential from the user. In 10F14, a certify indication is provided to a DCIAMS to certify use of the guest wifi network. For example, a certify indication comprises a request for a proof request. In 10F16, a proof request is received from the DCIAMS. In 10F18, a proof response is provided. For example, the proof response comprises the visitor network credential. In 10F20, it is determined whether the DCIAMS responds. In the event it is determined that the DCIAMS does not respond, the process ends. In the event it is determined that the DCIAMS responds, control passes to 10F22. In 10F22, a network certificate is received. For example, the network certificate comprises an x509 digital certificate. In some embodiments, since the digital certificates are based on asymmetric cryptography, the network certificate issued would be a Private Key and a signed bundle of data around a Public Key that goes with that private key. Once the authenticator app has this private key, it can use it to sign requests as the certificate holder, including signing a request to the captive portal software to prove control. In 10F24, the network certificate is provided to the captive portal. In 10F26, access (e.g., access to the guest wifi network) is received.

Figure 10G:
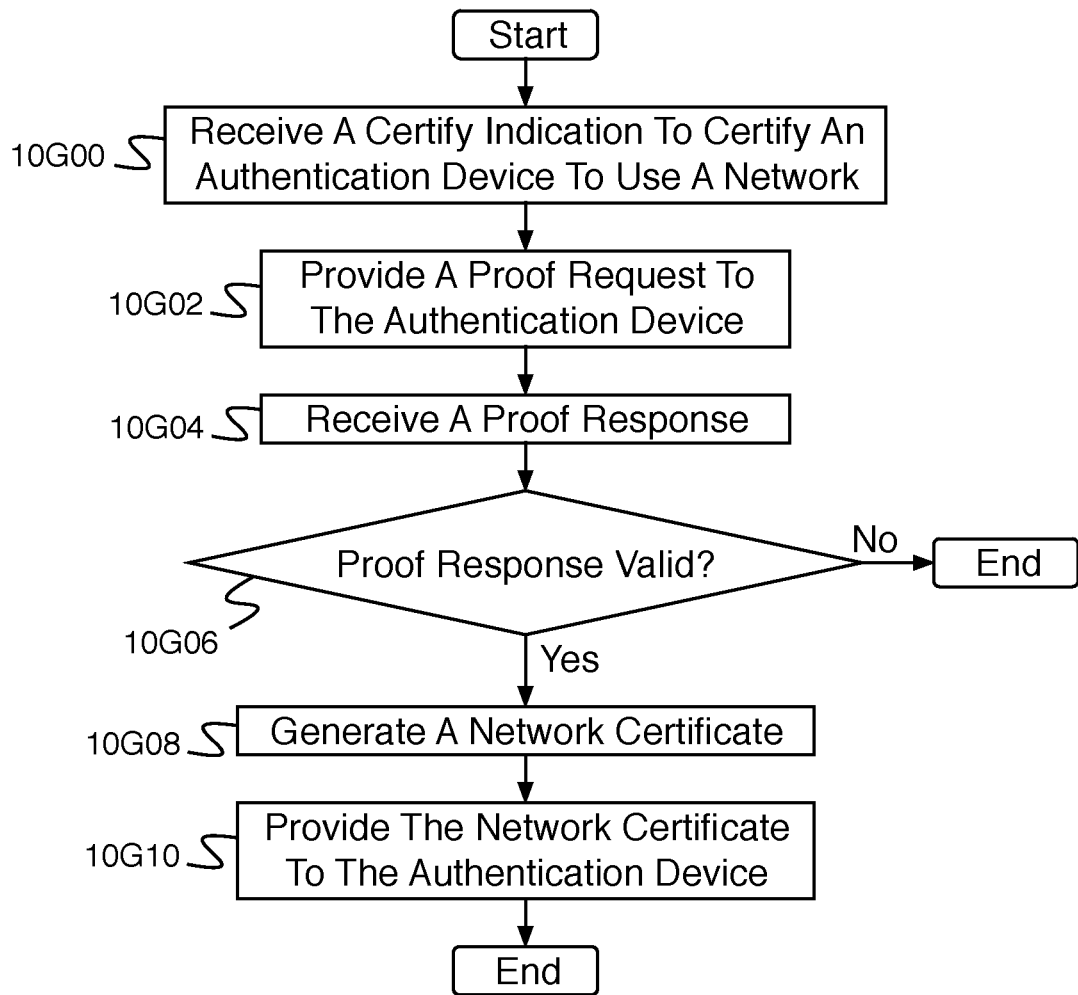
FIG. 10G is a flow diagram illustrating an embodiment of a process for credential authentication.

FIG. 10G is a flow diagram illustrating an embodiment of a process for credential authentication. In some embodiments, the process of FIG. 10G is executed by DCIAMS 10A06 of FIG. 10A. In the example shown, in 10G00, a certify indication is received to certify an authentication device to use a network. In 10G02, a proof request is provided to the authentication device. In 10G04, a proof response is received. For example, the proof response created using the visitor credential is received from the authentication device holding the visitor credential. In 10G06, it is determined whether the proof response is valid. In the event it is determined that the proof response is not valid, the process ends. In the event it is determined that the proof response is valid, control passes to 10G08. In 10G08, a network certificate is generated. For example, the network certificate is based at least in part on a visitor network credential of the proof response, the network certificate comprises authentication device identifier data, the network certificate comprises user identity data (e.g., user identity data from the visitor network credential), etc. In 10G10, the network certificate is provided to the authentication device.

Figure 10H:
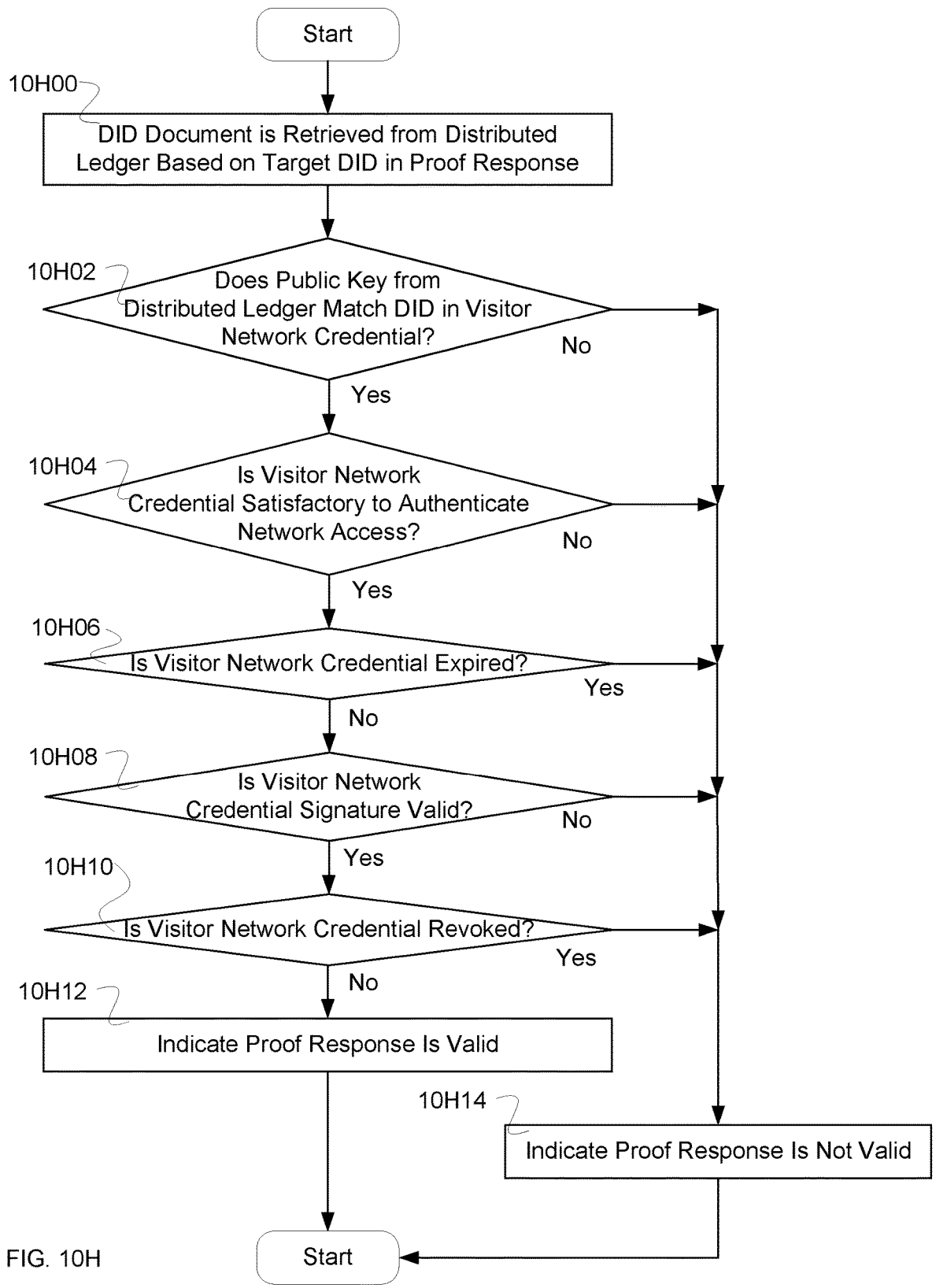
FIG. 10H is a flow diagram illustrating an embodiment of a process for determining whether a proof response is valid.

FIG. 10H is a flow diagram illustrating an embodiment of a process for determining whether a proof response is valid. In some embodiments, the process of FIG. 10H implements 10G06 of FIG. 10G. In the example shown, in 10H00, DID document is retrieved from distributed ledger based on target DID in proof response. In 10H02, it is determined whether a public key from a decentralized ledger matches a DID (e.g., a decentralized identifier) in a visitor network credential (e.g., the visitor network credential of the proof response). In the event it is determined that a public key from a decentralized ledger does not match a DID in the visitor network credential, control passes to 10H14. In the event it is determined in 10H02 that a public key from a decentralized ledger matches a DID in the visitor network credential, control passes to 10H04. In 10H04, it is determined whether the visitor network credential is satisfactory to authenticate network access. For example, determining whether the visitor network credential is satisfactory to authenticate network access comprises determining whether the visitor network credential is on a list of visitor network credentials certified for network access, determining whether the visitor associated with the visitor network credential is scheduled to be in the network location, determining whether the visitor associated with the visitor network credential has an employee authorization to use the network, etc. In the event it is determined that the visitor network credential is not satisfactory to authenticate network access, control passes to 10H14. In the event it is determined in 10H04 that the visitor network credential is satisfactory to authenticate network access, control passes to 10H06. In 10H06, it is determined whether the visitor network credential is expired. In the event it is determined that the visitor network credential is expired, control passes to 10H14. In the event it is determined in 10H06 that the visitor network credential is not expired, control passes to 10H08. In 10H08, it is determined whether the visitor network credential signature is valid. For example, the visitor network credential signature comprises a signature from the credential issuer (e.g., a DCIAMS) or from the credential holder (e.g., the authentication device). In the event it is determined that the visitor network credential signature is not valid, control passes to 10H14. In the event it is determined in 10H08 that the visitor network credential signature is valid, control passes to 10H10. In 10H10, it is determined whether the visitor network credential is revoked. For example, determining whether the visitor network credential is revoked comprises querying a revocation registry of a distributed ledger (e.g., a permission ledger, a decentralized ledger, a public ledger, a blockchain, etc.). In the event it is determined that the visitor network credential is revoked, control passes to 10H14. In the event it is determined that the visitor network credential is not revoked, control passes to 10H12. In 10H12, the process indicates that the proof response is valid, and the process ends. In 10H14, the process indicates that the proof response is not valid, and the process ends.

Figure 10I:
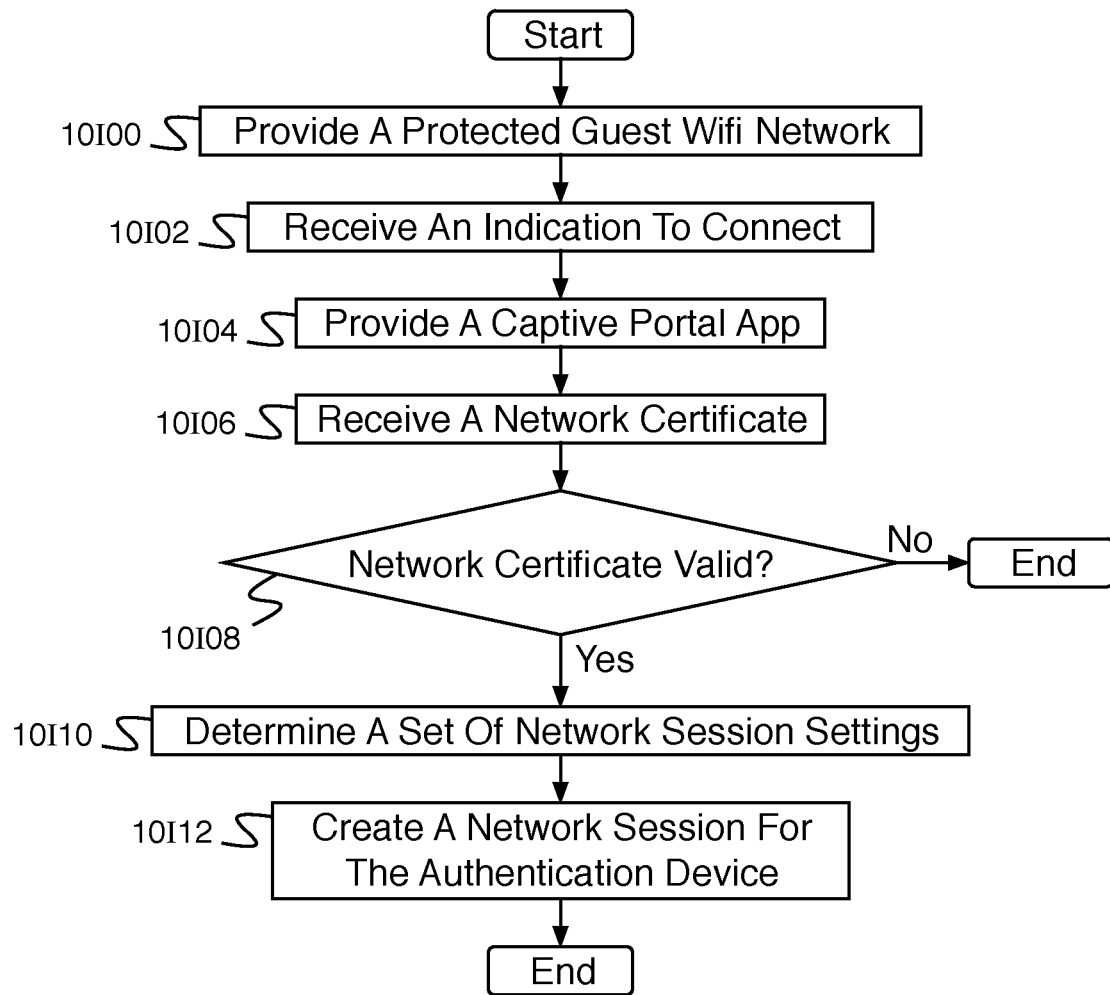
FIG. 10I is a flow diagram illustrating an embodiment of a process for authenticating network access.

FIG. 10I is a flow diagram illustrating an embodiment of a process for authenticating network access. In some embodiments, the process of FIG. 10I is executed by network access device 10A12 of FIG. 10A. In the example shown, in 10I00, a protected guest wifi network is provided. In 10I02, an indication to connect is received (e.g., from an authentication device). In 10I04, a captive portal app is provided. In 10I06, a network certificate is received. In 10I08, it is determined whether the network certificate is valid. In the event it is determined that the network certificate is not valid, the process ends. In the event it is determined that the network certificate is valid, control passes to 10I10. In 10I10, a set of network session settings are determined. For example, network session settings comprise session speed, access to a sandboxed network, or access to a limited set of connections. In some embodiments, network session settings are determined based at least in part on the network certificate (e.g., on visitor network credential data of the network certificate, of authentication device identifier data of the network certificate, etc.). In 10I12, a network session for the authentication device is created. For example, the network session uses the network session settings determined in 10I12. Creating a network session for the authentication device comprises providing network access to the authentication device.

A system for credential authentication comprises an interface configured to receive a create indication to create a visitor network credential and receive a certify indication to certify an authentication device to use a network, and a processor configured to provide the visitor network credential to the authentication device in response to the certify indication, provide a proof request to the authentication device, receive a proof response, validate the proof response using a distributed ledger, generate a network certificate, and provide the network certificate to the authentication device. In some embodiments, the create indication to create the visitor network credential is associated with an email address. In some embodiments, the interface is further configured to receive a claim indication from the authentication device to claim the visitor network credential. In some embodiments, the claim indication from the authentication device to claim the visitor network credential comprises a one-time token being used that causes generation of a DID keypair, wherein the private key component is stored on the authentication device and the public key component is stored on the distributed ledger, and that causes providing the visitor network credential to the authentication device. In some embodiments, the claim indication from the authentication device to claim the visitor network credential is provided in response to an authentication device digital identification app setup. In some embodiments, the authentication device digital identification app setup is in response to an email sent as part of a human resources system guest setup process. In some embodiments, the processor is further configured to verify the visitor network credential is associated with the authentication device. In some embodiments, verifying the visitor network credential is associated with the authentication device comprises checking an identifier in a DID document associated with the visitor network credential which are registered in the distributed ledger. In some embodiments, the certify indication to certify the authentication device to use the network is received from a digital credential app on the authentication device. In some embodiments, the authentication device provides the certify indication to certify the authentication device to use the network to the system for credential authentication in response to a user confirmation. In some embodiments, the digital credential app is initiated by a captive portal on the authentication device. In some embodiments, the captive portal is initiated in response to a user attempting to access a network. In some embodiments, validating the proof response using the distributed ledger comprises determining that a credential associated with the proof response satisfies the proof request, determining that a proof response signature is valid, determining that the credential associated with the proof response is not expired, or determining that the credential associated with the proof response is not revoked by looking in the distributed ledger. In some embodiments, the network certificate comprises an X.509 certificate. In some embodiments, the network certificate comprises user identity data. In some embodiments, the user identity data is based at least in part on user identity data stored by the visitor network credential. In some embodiments, the authentication device returns to a captive portal for validation of the network certificate. In some embodiments, the captive portal creates a network session for the authentication device. In some embodiments, network session settings are based at least in part on the network certificate. In some embodiments, the network session settings comprise session speed, access to a sandboxed network, or access to a limited set of connections. In some embodiments, the create indication to create the visitor network credential is provided by a human resources system guest setup process.

Case K—Digital Credentials for Location Aware Check in

A system for credential authentication comprises an interface configured to receive a create indication to create a location aware credential, wherein the location aware credential specifies visit location data and receive a check in indication to check in from an authentication device, wherein the authentication device provides the check in indication to check in in response to determining that a detected location is within a geographic boundary designated in the visit location data of the location aware credential, and a processor configured to provide a proof request, receive a proof response, validate the proof response using a distributed ledger, and provide a success indication of successful check in.

A system for credential authentication comprises a system for using a location aware credential to authenticate a location aware check in. The location aware credential enables an authentication device to monitor its location and automatically initiate a check-in to a location requiring authorization based on visit locations specified in the location aware credential. When a new user is invited to visit an organization, a user account and/or user identifier is established in the system including registering the location aware credential at a distributed ledger. Also, the user installs a digital identity application on a mobile device and receives the location aware credential on the mobile device. The mobile device including the digital identity application comprises an authentication device for the user. The digital identity application is associated with user information (e.g., an email address, a user identifier (ID), a user account, etc.) for identifying the user. The digital identity application provides a request for a location aware credential for authenticating network access to a digital credential aware identity and access management service (DCIAMS). When the DCIAMS receives an indication of the new user, the DCIAMS creates a location aware credential associated with the user. For example, the location aware credential specifies visit location data comprising a location, set of locations, geofence boundary, etc. within which it is valid. The DCIAMS request for the location aware credential and provides the location aware credential to the authentication device. When the authentication device enters a geographic boundary with an unexpired location aware credential, the authentication device indicates that the process for check in should begin. The authentication device verifies that the location aware credential is not expired at the current date and time and provides a check in indication to the DCIAMS. The DCIAMS provides a proof request comprising a request for the location aware credential and the authentication device provides a proof response comprising the credential. The DCIAMS validates the credential (e.g., verifying that the guest credential is not expired, not revoked, has a valid signature, etc.) using the distributed ledger, and in response to determining that the credential is valid, provides an indication of success (e.g., to the authentication device, to a visitor host, to a visitor tracking system, etc.). In some embodiments, the credential server additionally provides a location specific message to the user.

Figure 11A:
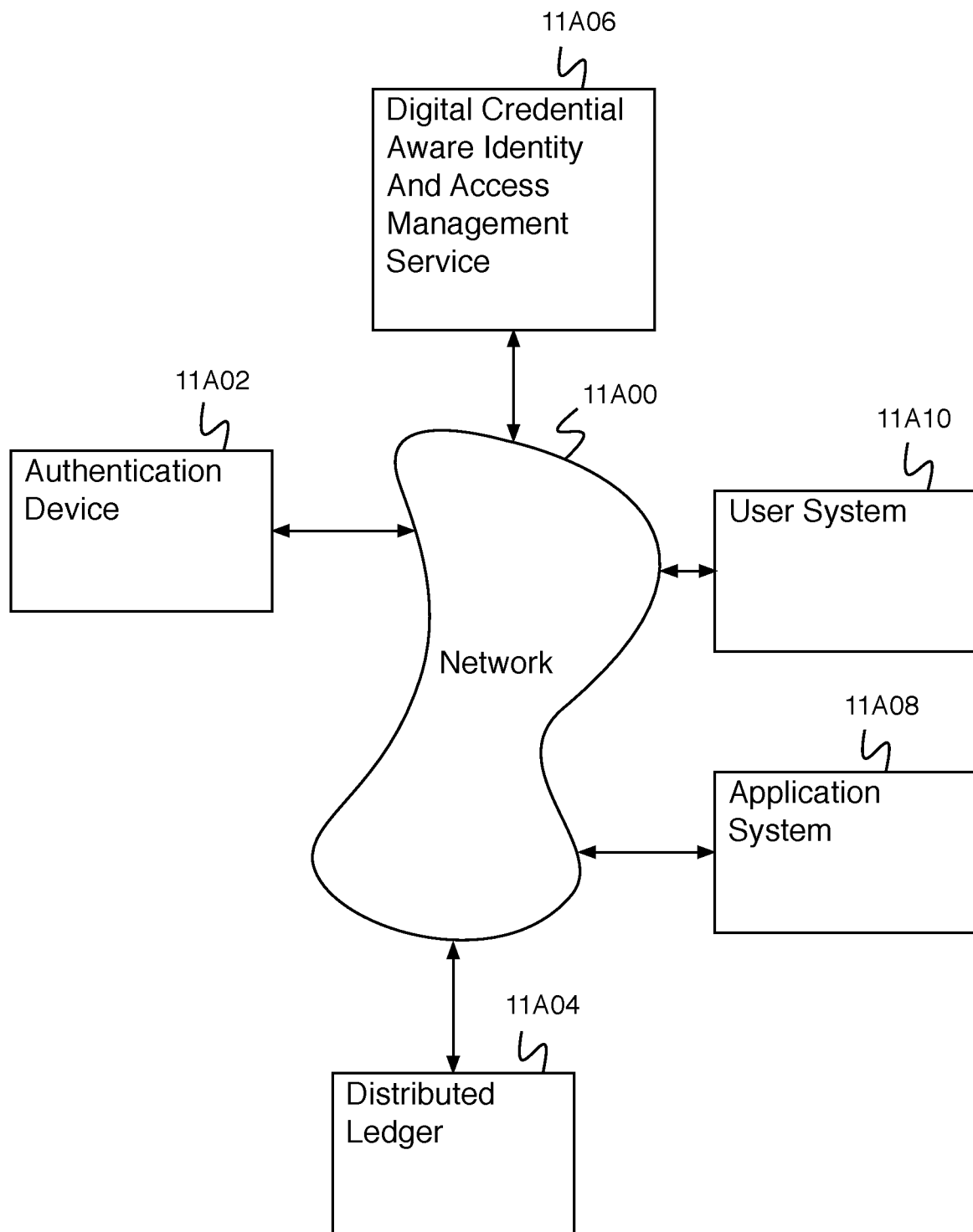
FIG. 11A is a block diagram illustrating an embodiment of a network system.

FIG. 11A is a block diagram illustrating an embodiment of a network system. In some embodiments, the network system of FIG. 11A comprises a network system for a credential system. In the example shown, FIG. 11A comprises network 11A00. In various embodiments, network 11A00 comprises one or more of the following: a local area network, a wide area network, a wired network, a wireless network, the Internet, an intranet, a storage area network, or any other appropriate communication network. Authentication device 11A02, distributed ledger 11A04, DCIAMS 11A06, application system 11A08, user system 11A10, and network access device 11A12 communicate via network 11A00. Authentication device 11A02 comprises an authentication device associated with a user (e.g., a user of application system 11A08 and/or a user using user system 11A10). For example, authentication device 11A02 comprises a computer, a smartphone, a tablet, a mobile device, etc. Distributed ledger 11A04 comprises a distributed ledger (e.g., a decentralized ledger, a permissioned ledger, a public ledger, a blockchain, etc.). For example, distributed ledger 11A04 is stored on a plurality of systems and comprises one or more permissioned writer systems for writing to the distributed ledger. DCIAMS 11A06 comprises a system for interacting with authentication device 11A02, distributed ledger 11A04, application system 11A08, and any other appropriate systems. DCIAMS 11A06 comprises a system for coordinating a login for application system 11A08, for providing a credential to authentication device 11A02, for requesting a credential from authentication device 11A02, for verifying a user identifier or a signature in distributed ledger 11A04, etc. Application system 11A08 comprises a system for providing access to an application. For example, application system 11A08 comprises a system for providing access to a database application, a data processing application, a productivity application, a communication application, etc. A user uses user system 11A10 to access applications on application system 11A08. For example, a user uses an application on user system 11A10 (e.g., a web browser) to connect to an application on application system 11A08. The application on application system 11A08 authenticates a user login before granting access.

DCIAMS 11A06 comprises a system for digital credentials for location aware check in. For example, DCIAMS 11A06 comprises an interface configured to receive a create indication to create a location aware credential, wherein the credential specifies visit location data, and receive a check in indication to check in from an authentication device, wherein the authentication device provides the check in indication to check in in response to determining that a detected location is within a geographic boundary designated in the visit location data of the location aware credential, and a processor configured to provide a proof request, receive a proof response, validate the proof response using a distributed ledger, and provide a success indication of successful check in.

Figure 11B:
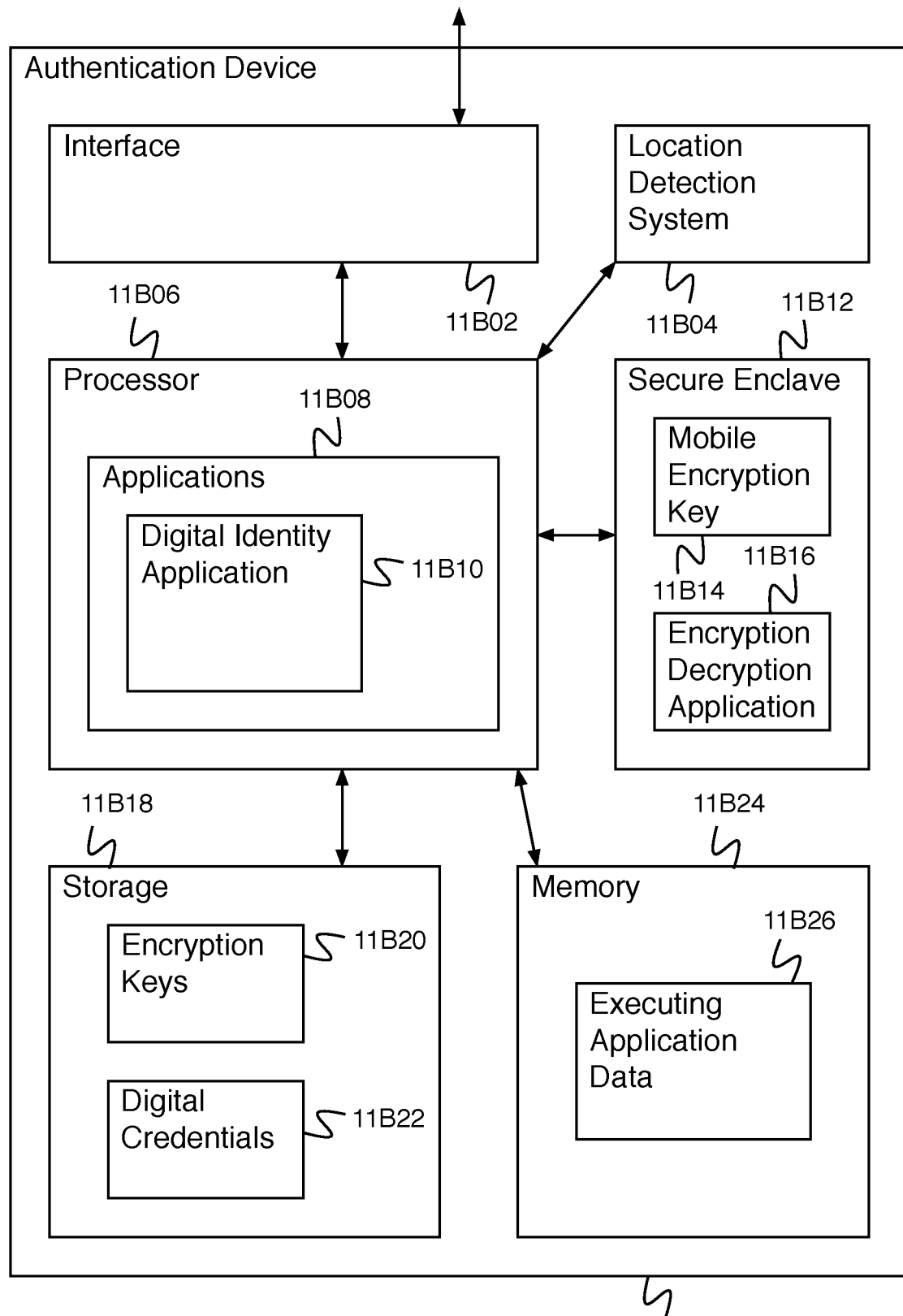
FIG. 11B is a block diagram illustrating an embodiment of an authentication device.

FIG. 11B is a block diagram illustrating an embodiment of an authentication device. In some embodiments, authentication device 11B00 of FIG. 11B comprises authentication device 11A02 of FIG. 11A. In the example shown, authentication device 11B00 comprises interface 11B02. For example, interface 11B02 comprises an interface for receiving data, providing data, receiving a request for data, etc. Authentication device 11B00 additionally comprises location detection system 11B04. Location detection system 11B04 comprises a location detection system for detecting a detected location. For example, location detection system 11B04 comprises a global positioning system (e.g., a GPS). Processor 11B06 comprises a processor for executing applications 11B08. Applications 11B08 comprise digital identity application 11B10 and any other appropriate applications. For example, processor 11B06 comprises a processor for receiving an indication to install digital identity application 11B10 and installing digital identity application 11B10. Digital identity application 11B10 comprises an application for providing a proof response in response to a proof request.

For example, digital identity application 11B10 comprises an application for associating with a user email address, where the mail sent to use contains a one-time use token, that token is used to link a private key on the device to an identity management system DCIAMS, and then the public key that goes with that private one is registered in the distributed ledger via a DID document registration. Digital identity application 11B10 also comprises an application for providing a claim indication to claim a location aware credential from the DCIAMS, wherein the claim indication is associated with the user email address, user ID, and/or user account, determining whether the DCIAMS responds, and in the event that the DCIAMS responds, receiving the location aware credential from the DCIAMS. Additionally, digital identity application 11B10 comprises an application for determining whether a detected location is within a geographic boundary designated by the location aware credential, in response to a determination that the detected location of the authentication device is within a geographic boundary, determining whether a location aware credential is unexpired at the current time, in response to a determination that a location aware credential is unexpired at the current time, providing a check in prompt to a user, determining whether the user accepts the prompt to check in, in response to a determination that the user accepts the prompt to check in, providing an indication to check in to the DCIAMS, receiving a proof request from the DCIAMS, providing a proof response to the DCIAMS, determining whether the DCIAMS responds, in response to a determination that the DCIAMS responds, receiving a success indication and receiving a location specific message.

Secure enclave 11B12 comprises a secure system for storing a mobile encryption key. Secure enclave 11B12 comprises mobile encryption key 11B14 and encryption decryption application 11B16. For example, secure enclave 11B12 comprises multiple mobile encryption keys, an application for generating and/or removing mobile encryption keys, etc. Secure enclave 11B12 comprises a system for receiving data, transforming it by encrypting and/or decrypting the data using a mobile encryption key or keys, and providing the transformed data. For example, secure enclave 11B12 is configured to only provide transformed input data and not to provide mobile encryption key 11B14. In some embodiments, functionality of secure enclave 11B12 is access limited using a biometric (e.g., a fingerprint, a retina scan, a DNA scan, etc.) or a personal identification number. Authentication device 11B00 additionally comprises storage 11B18. Storage 11B18 comprises encryption keys 11B20, for example comprising a public key of an identity key pair, a private key of an identity key pair, a private key of an identity key pair encrypted using mobile encryption key 11B14, etc. For example, an identity key pair of authentication device 11B00 comprises a public key used by other systems for encrypting data in such a way that it can only by decrypted by authentication device 11B00, and a private key for decrypting data encrypted using the public key or for signing data for proving it came from authentication device 11B00. Storage 11B18 additionally comprises digital credentials 11B22, comprising digital certificates representing qualifications (e.g., a college degree, work experience, time living at an apartment, time enrolled in a health insurance plan, etc.). For example, digital credentials 11B22 comprises a credential wallet. In some embodiments, digital credentials 11B22 comprises a locked digital wallet able to be unlocked by a user. For example, digital credentials 11B22 is unlocked using a biometric or a personal identification number (PIN). Once the locked digital wallet is unlocked, a credential is retrieved. Authentication device 11B00 additionally comprises memory 11B24. Memory 11B24 comprises executing application data 11B26, comprising data associated with applications 11B08.

Figure 11C:
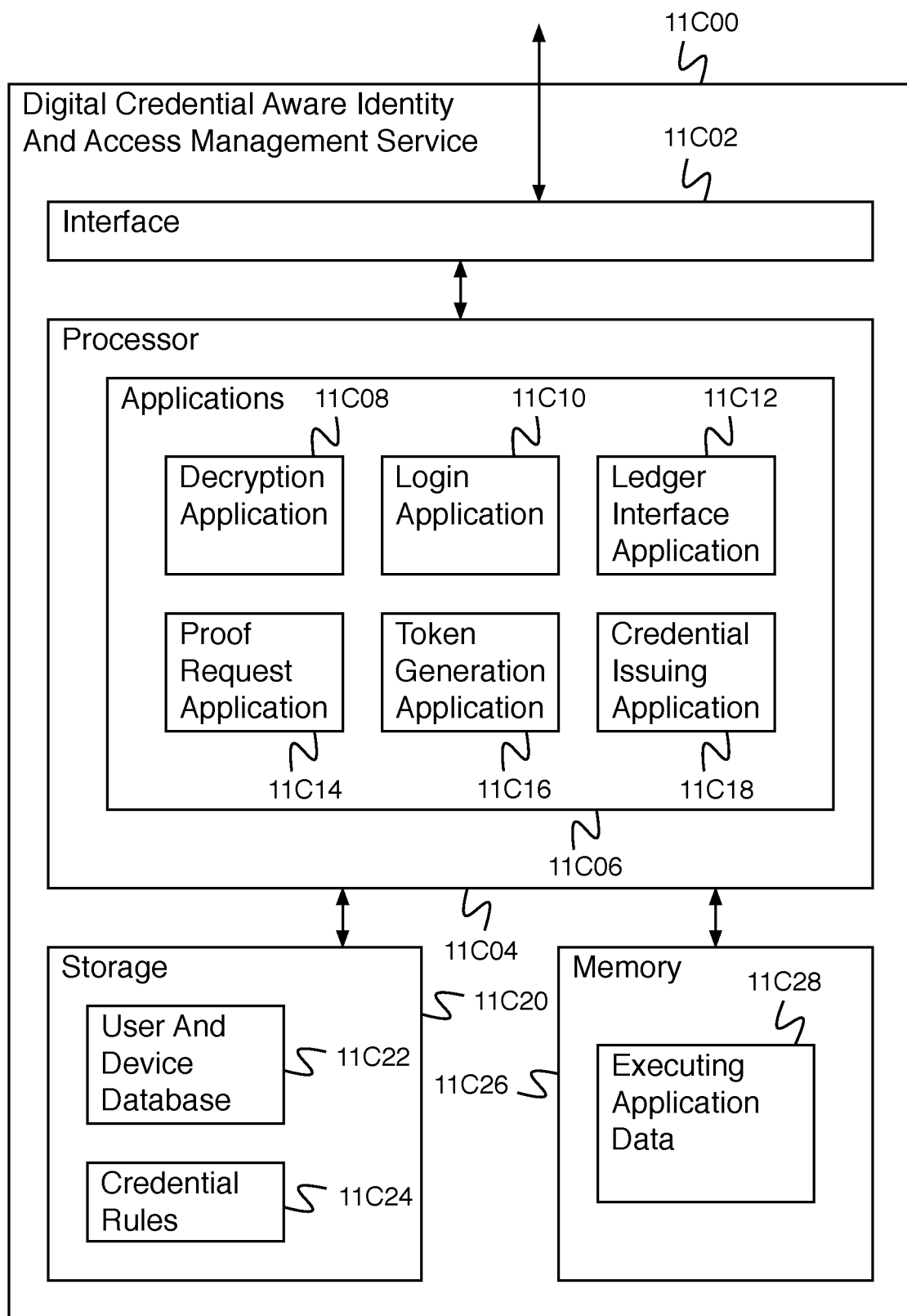
FIG. 11C is a block diagram illustrating an embodiment of a digital credential aware identity and access management service (DCIAMS).

FIG. 11C is a block diagram illustrating an embodiment of a digital credential aware identity and access management service (DCIAMS). In some embodiments, DCIAMS 11C00 comprises DCIAMS 11A06 of FIG. 11A. In the example shown DCIAMS 11C00 comprises interface 11C02. For example, interface 11C02 comprises an interface for receiving data, providing data, receiving a request for data, etc. In some embodiments, interface 11C02 comprises an interface for receiving encrypted messages or encrypted javascript object notation (JSON) messages. Processor 11C04 comprises a processor for executing applications 11C06. Applications 11C06 comprise a set of DCIAMS applications. Decryption application 11C08 comprises an application for decrypting encrypted data using a key. Login application 11C10 comprises an application for receiving login information (e.g., username and password, a credential, a QR code challenge, etc.) and providing login credentials (e.g., a login token). Ledger interface application 11C12 comprises an application for interacting with a distributed ledger (e.g., distributed ledger 11A04 of FIG. 11A). For example ledger interface application 11C12 comprises an application for verifying a signature in a ledger or checking a credential identifier for revocation in a ledger. Proof request application 11C14 comprises an application for creating a proof request, sending a proof request, evaluating a proof request response (e.g., a proof response), etc. Token generation application 11C16 comprises an application for generating a login token (e.g., in response to a successful login). Credential issuing application 11C18 comprises an application for issuing a digital credential for proving a qualification in response to a request from a credential issuing authority to issue the credential. Applications 11C06 additionally comprise any other appropriate applications.

For example, processor 11C04 comprises a processor for receiving an indication of a new guest associated with an email address, receiving a create indication to create a location aware credential representing a location sensitive visitor permission associated with the guest, creating the location aware credential for the guest associated with the email address, a user identifier (ID), and/or a user account, receiving a claim indication from an authentication device to claim the location aware credential, determining whether the authentication device is associated with the location aware credential, and in the event it is determined that the authentication device is associated with the location aware credential, providing the location aware credential to the authentication device. Processor 11C04 additionally comprises a processor for receiving a check in indication to check in from an authentication device, providing a proof request to the authentication device, receiving a proof response, determining whether the proof response is valid using a distributed ledger, and in the event it is determined that the proof response is valid, providing a success indication of a successful check in and providing a location specific message.

Storage 11C20 comprises user and device database 11C22 and credential rules 11C24. User and device database 11C22 comprises a database of registered users for a given customer organization and user details (e.g., username, password hash, contact information, email address, relationship to devices, registered public keys, registered mapping documents in a distributed ledger, etc.). User and device database 11C22 additionally comprises a device directory comprising all the devices for a given customer organization as well as mapping documents associated with the devices and relationships with users associated with the devices. Credential rules 11C24 comprises a set of credential rules for determining a credential that satisfies a given access request—for example, rules related to a credential associated schema, a credential associated organization, a credential issuer, a credential associated location, a credential associated class identifier, a credential associated license number, or any other appropriate credential rules. In various embodiments, rules comprise rules related to a credential associated schema, rules related to a credential associated organization, rules related to a credential issuer, rules related to a credential associated location, rules related to a credential associated class identifier or identifier number, rules related to a credential associated license or license number, a credential associated class name, or any other appropriate credential rules. In some embodiments, the rules are applied selectively (e.g., based at least in part on a user identifier)—for example, employees with a credential can access application A, contractors with a credential can access application B, or any other appropriate matching of access with identifiers. In various embodiments, the rules are applied selectively based at least in part on current employment, employee type, location of user, qualification by training class, credential from a third party issuer (e.g., division of motor vehicle license, certification from school, etc.), or any other appropriate criterion. As examples of configurable credential rules to grant access: 1) access is granted in the event that a credential indicates that the holder is a current employee (e.g., issuing company is valid, employee status is not expired, and not revoked); 2) access is granted in the event that a credential indicates that the holder is an employee in an organization of the company (e.g., issuing company is valid, organization is specified organization, employee status is not expired, and not revoked); 3) access is granted in the event that a credential indicates that the holder is an employee in a specified location (e.g., issuing company is valid, location is a specified location, employee status is not expired, and not revoked); 4) access is granted in the event that a credential indicates that the holder has necessary training (e.g., issuing company is valid, training status is complete, employee status is not expired, and not revoked); and 5) access is granted in the event that a credential indicates that the holder has outside credential (e.g., issuing company is valid, outside credential is valid, outside credential issuer is third party, employee status is not expired, and not revoked). DCIAMS 11C00 additionally comprises memory 11C26. Memory 11C26 comprises executing application data 11C28, comprising data associated with applications 11C06.

Figure 11D:
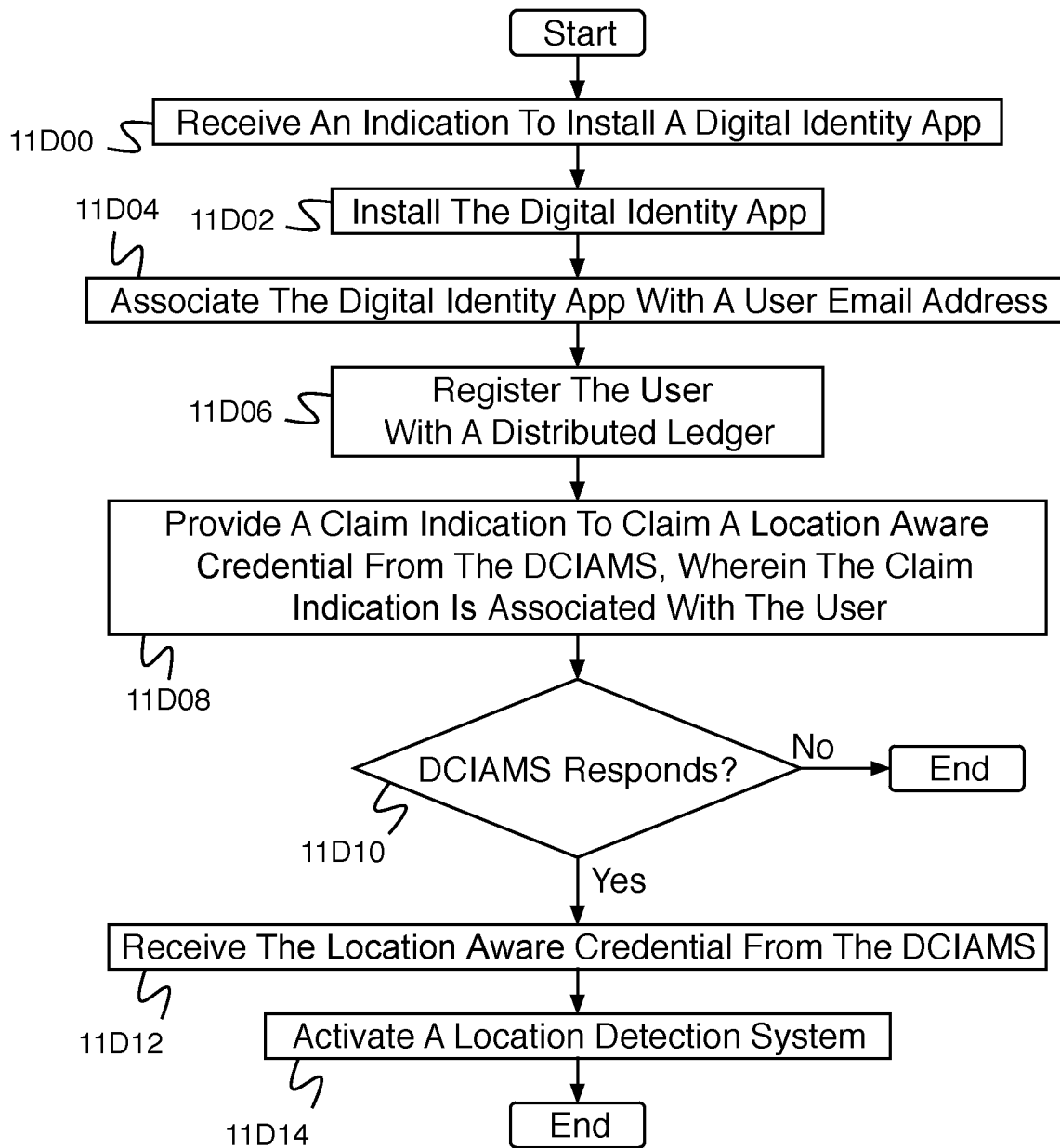
FIG. 11D is a flow diagram illustrating an embodiment of a process for preparing an authentication device for credential authentication.

FIG. 11D is a flow diagram illustrating an embodiment of a process for preparing an authentication device for credential authentication. In some embodiments, the process of FIG. 11D is executed by authentication device 11A02 of FIG. 11A. In the example shown, in 11D00, an indication to install a digital identity app is received. For example, the indication to install a digital identity app is received as part of a human resources system guest setup process. In 11D02, the digital identity app is installed. In 11D04, the digital identity app is associated with a user. For example, the digital identity app is associated with a user using a user email address, a user ID, and/or a user account. For example, a human resources system guest setup process provides a one-time use token (e.g., a hypertext link) delivered to the email address associated with the user. When the user invokes the link on a computer (e.g., a laptop or desktop computer) the user is provided a quick response (QR) code for access by the authentication device. When the authentication device accesses the QR code using the digital identity app, the digital identity app becomes associated with the user email address. In some embodiments, the claim indication from the authentication device to claim the location aware credential comprise a one-time token being used that causes generation of a DID keypair, wherein the private key component is stored on the authentication device and the public key component is stored on the distributed ledger, and that causes providing the guest credential to the authentication device. In the event the user invokes the link using the digital identity app, the token is pushed into the mobile context to associate the digital identity app with the user email address. In 11D06, the user is registered with a distributed ledger. For example, a user, user identifier, or user account associated with the email address is registered with a distributed ledger—for example, by invoking a link that has been delivered to the email address, scanning a QR code, registering a DID (e.g., a decentralized identifier) in a distributed ledger, associating the DID with a guest credential, etc. In 11D08, a claim indication is provided to claim a location aware credential from the DCIAMS, wherein the claim indication is associated with the user. For example, the location aware credential is only valid in a specific location, within a specific region, etc. In 11D10, it is determined whether the DCIAMS responds. In the event it is determined that the DCIAMS does not respond, the process ends. In the event it is determined that the DCIAMS responds, control passes to 11D12. In 11D12, the location aware credential is received from the DCIAMS. In 11D14, a location detection system is activated (e.g., in order to determine when the authentication device is in a location where the location aware credential is valid).

Figure 11E:
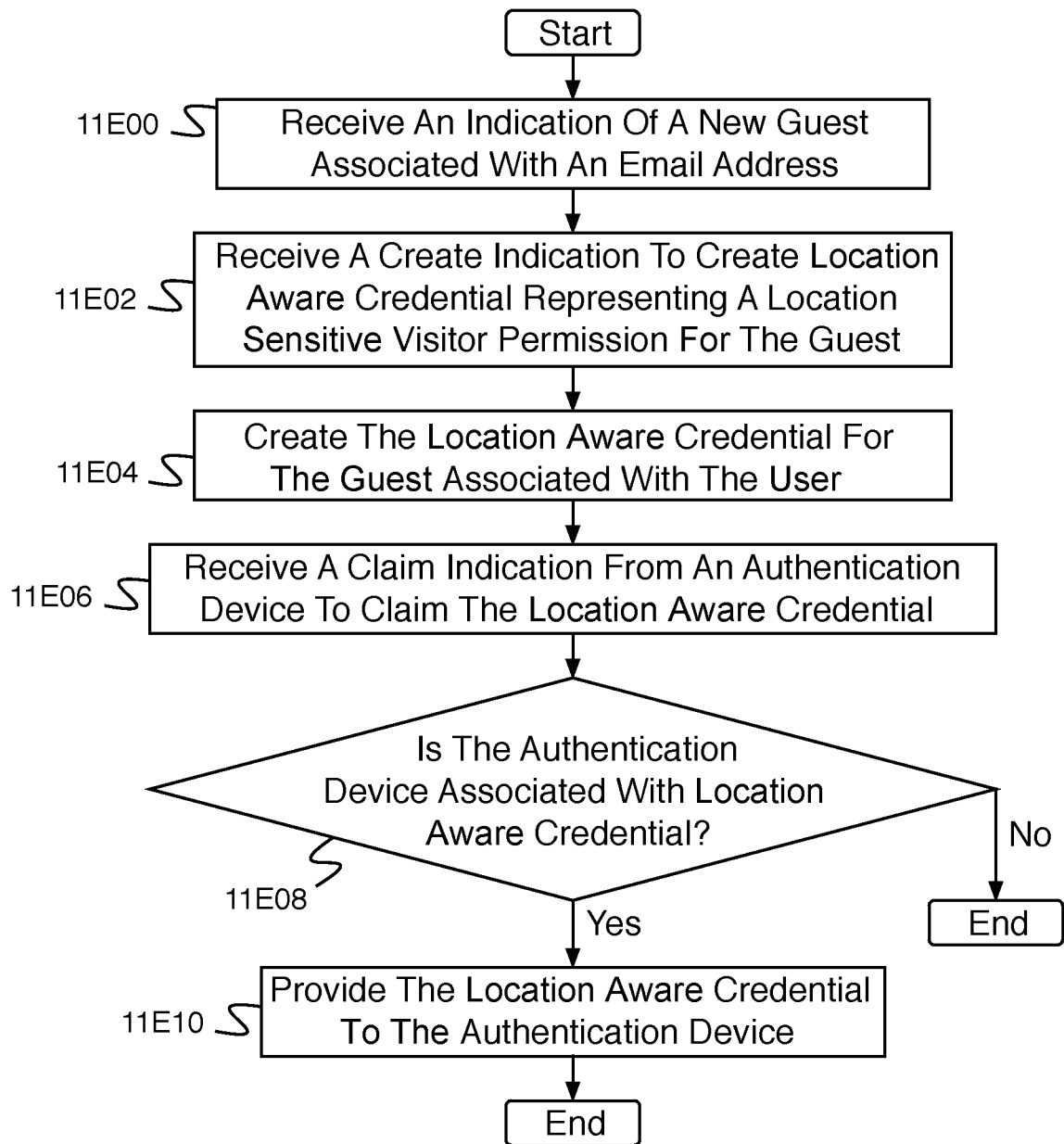
FIG. 11E is a flow diagram illustrating an embodiment of a process for preparing a DCIAMS for credential authentication.

FIG. 11E is a flow diagram illustrating an embodiment of a process for preparing a DCIAMS for credential authentication. In some embodiments, the process of FIG. 11E is executed by DCIAMS 11A06 of FIG. 11A. In the example shown, in 11E00, an indication is received of a new guest associated with an email address. In 11E02, a create indication to create a location aware credential representing a location sensitive visitor permission associated with the guest is received. For example, the create indication is provided to the DCIAMS by a human resources system employee setup process (e.g., a location aware credential is created for a guest as part of setting up the guest in the human resources system). For example, the create indication is associated with an email address, a user ID, and/or a user account. The credential specifies visit location data (e.g., a location, a set of locations, a latitude and longitude, a region, etc. wherein the credential is valid). In 11E04, the location aware credential is created for the guest associated with a user. In 11E06, a claim indication is received from an authentication device to claim the location aware credential. In 11E08, it is determined whether the authentication device is associated with the location aware credential. For example, determining whether the authentication device is associated with the location aware credential comprises determining whether the email address, the user ID (e.g., an IKP), and/or user account associated with the location aware credential matches information (e.g., an identifier in the DID document) registered in a distributed ledger. In the event it is determined that the authentication device is not associated with the location aware credential, the process ends. In the event it is determined that the authentication device is associated with the location aware credential, control passes to 11E10. In 11E10, the location aware credential is provided to the authentication device.

Figure 11F:
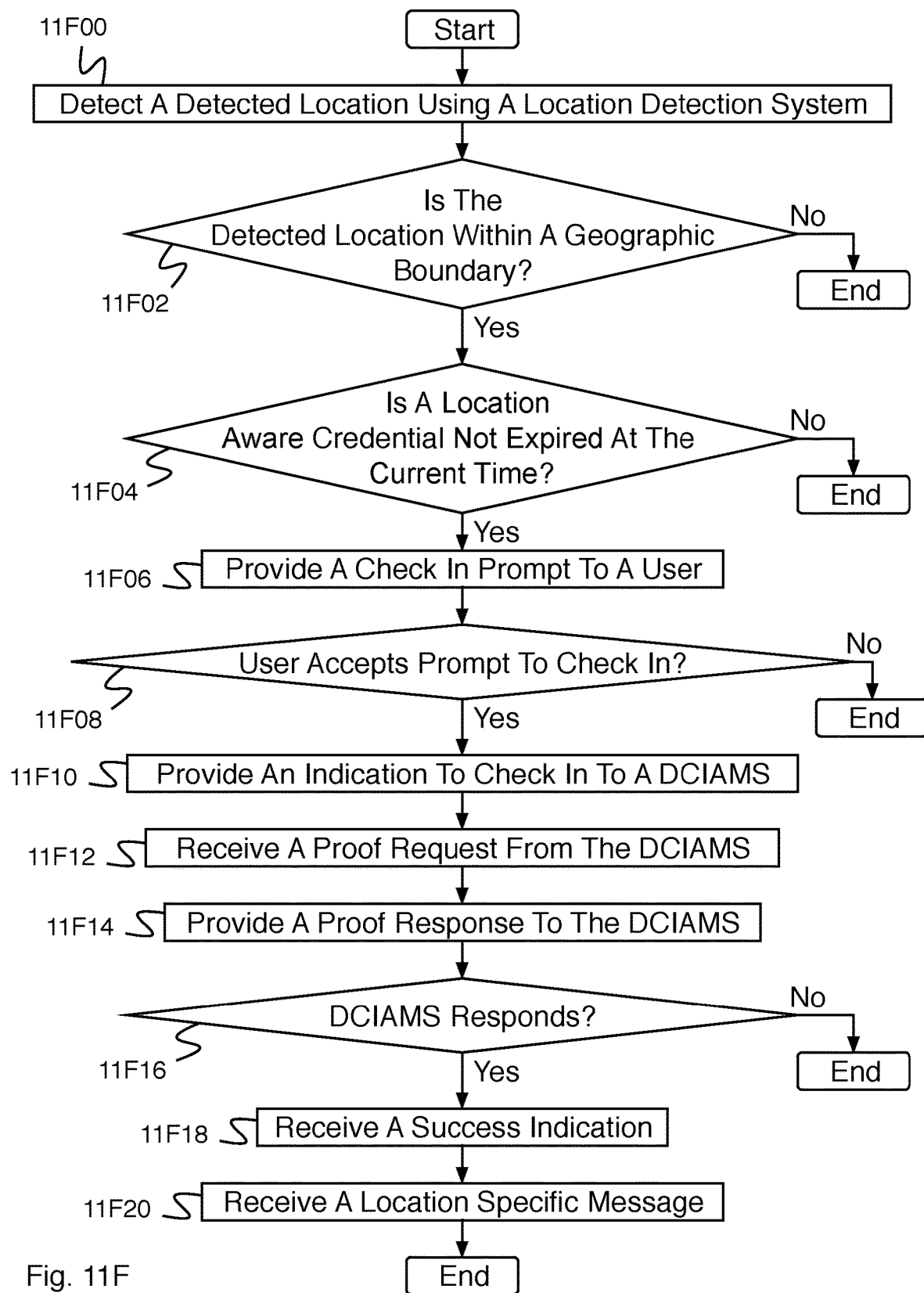

FIG. 11F is a flow diagram illustrating an embodiment of a process for check in. In some embodiments, the process of FIG. 11F is executed by authentication device 11A02 of FIG. 11A. In the example shown, in 11F00, a detected location is detected using a location detection system. For example, an authentication device is periodically running location services (e.g., detecting a location using a GPS, say every minute) the authentication device holds a location aware credential that is not expired. In 11F02, it is determined whether the detected location is within a geographic boundary. For example, the geographic boundary comprises a distance from a location in the visit location data specified in a location aware credential, a user-defined geofence (e.g., specified by a system administrator, a human resources administrator, etc.), etc. In various embodiments, the visit location data includes a complete specification of the location, a distance or radius around a location, a geofence definition encompassing a location, a geographic boundary, or any other appropriate location data. In the event it is determined that the detected location is not within a geographic boundary, the process ends. In the event it is determined that the detected location is within a geographic boundary, control passes to 11F04. In 11F04, it is determined whether a location aware credential is not expired at the current time. In some embodiments, determining whether a location aware credential is not expired at the current time comprises determining whether the location aware credential is not expired on the current day and/or date. In some embodiments, the check in indication to check in additionally is in response to determining that the location aware credential is valid at a current time or for a current date. In the event it is determined that the location aware credential is expired at the current time, the process ends. In the event it is determined that the location aware credential is not expired at the current time, control passes to 11F06. In 11F06, a check in prompt is provided to a user. For example, a check in prompt comprises information for the user (e.g., a host location to meet a host or a badge location to receive guest identification). In 11F08, it is determined whether the user accepts the prompt to check in. In the event it is determined that the user does not accept the prompt to check in, the process ends. In the event it is determined that the user accepts the prompt to check in, control passes to 11F10. In 11F10, an indication is provided to a DCIAMS to check in. In 11F12, a proof request is received from the DCIAMS. In 11F14, a proof response is provided to the DCIAMS. For example, the proof response comprises the location aware credential. In 11F16, it is determined whether the DCIAMS responds. In the event it is determined that the DCIAMS does not respond, the process ends. In the event it is determined that the DCIAMS responds, control passes to 11F18. In 11F18, a success indication is received. In 11F20, a location specific message is received.

Figure 11G:
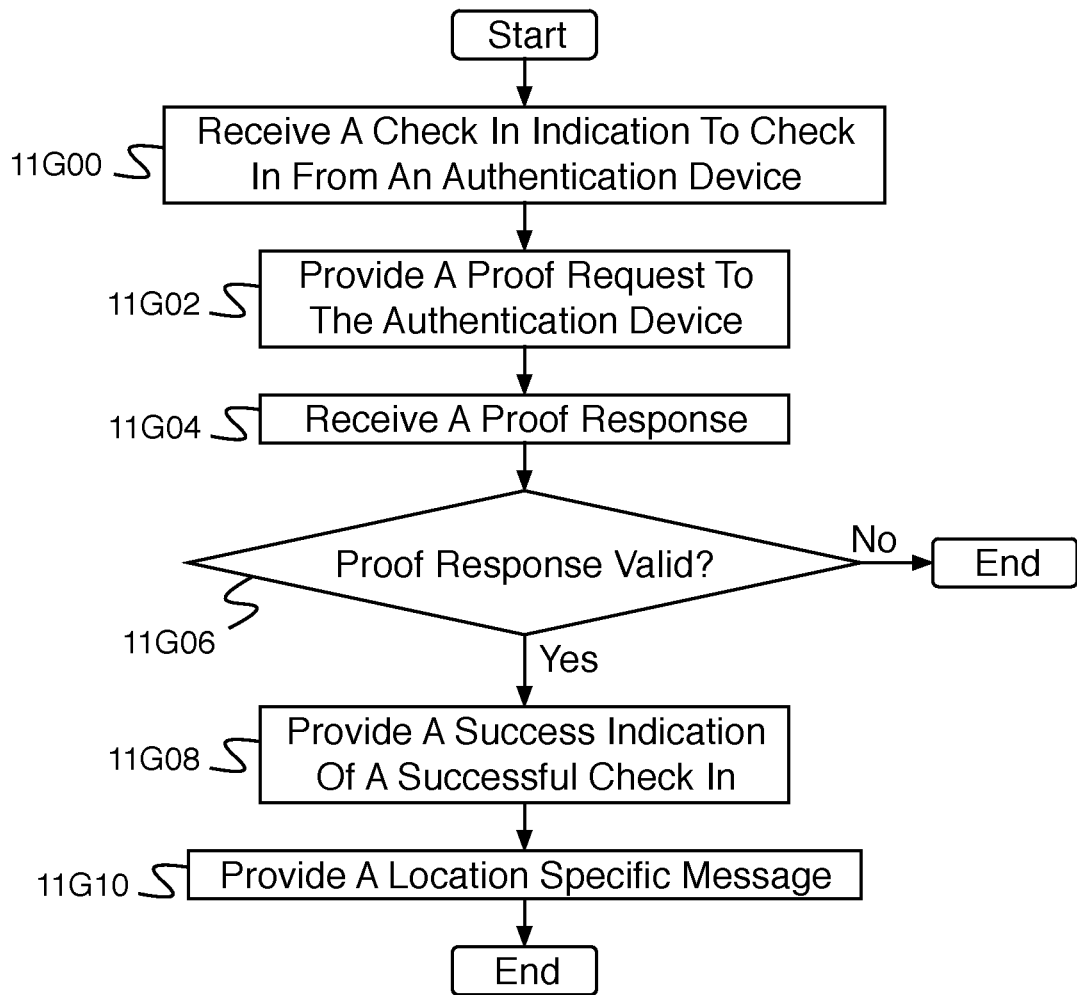
FIG. 11G is a flow diagram illustrating an embodiment of a process for credential authentication.

FIG. 11G is a flow diagram illustrating an embodiment of a process for credential authentication. In some embodiments, the process of FIG. 11G is executed by DCIAMS 11A06 of FIG. 11A. In the example shown, in 11G00, a check in indication to check in is received from an authentication device. In 11G02, a proof request is provided to the authentication device. In 11G04, a proof response is received. In 11G06, it is determined whether the proof response is valid. For example, the guest credential is checked against information stored in the distributed ledger to determine whether the guest credential is valid—for example, has an appropriate schema, has an appropriate definition, is not expired, and/or is not revoked. In the event it is determined that the proof response is valid, control passes to 11G08. In 11G08, a success indication of a successful check in is provided. For example, the success indication of a successful check in is provided to a visitor tracking system, to a visitor host, to the authentication device, etc. In 11G10, a location specific message is provided.

Figure 11H:
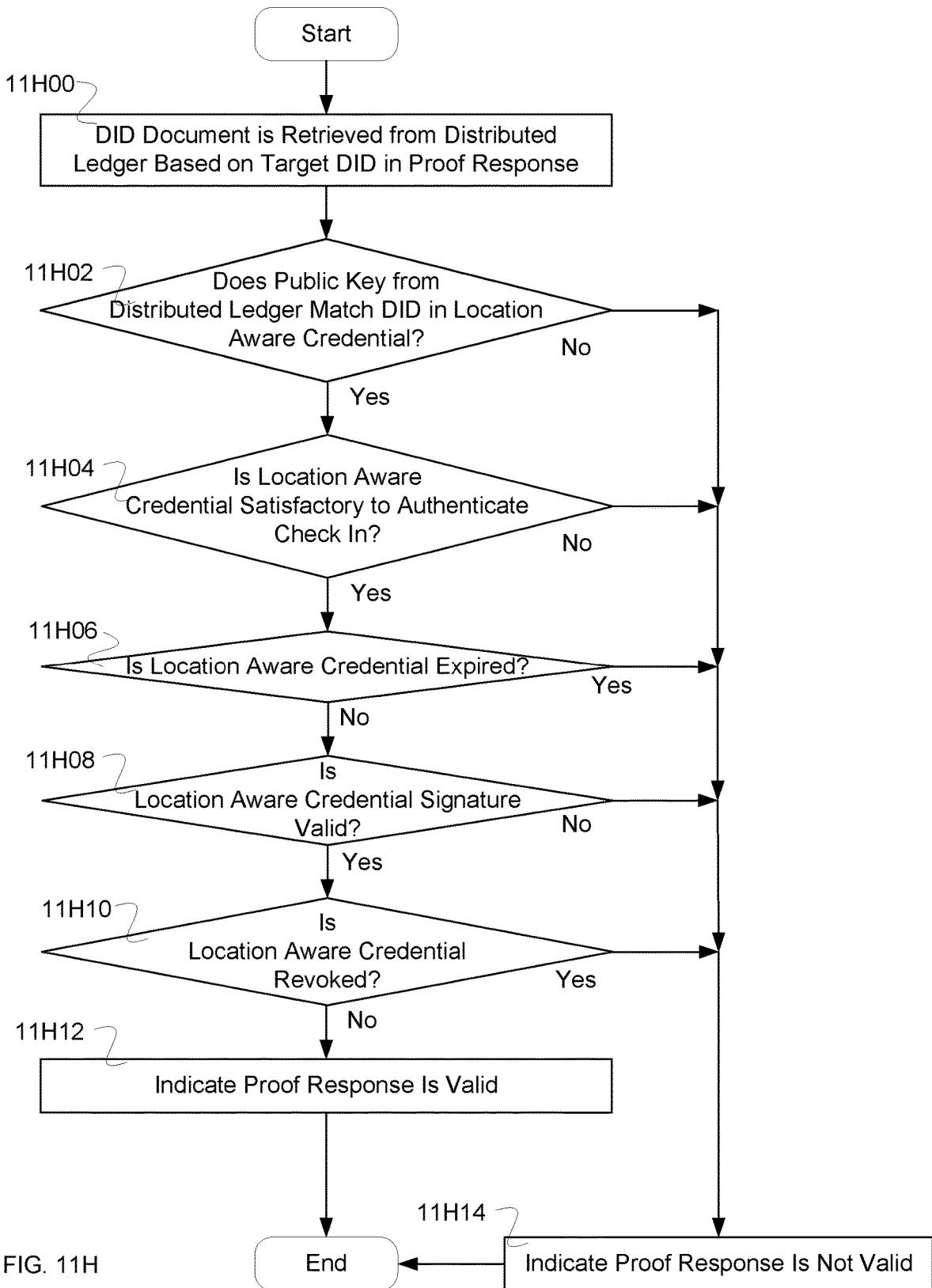
FIG. 11H is a flow diagram illustrating an embodiment of a process for determining whether a proof response is valid.

FIG. 11H is a flow diagram illustrating an embodiment of a process for determining whether a proof response is valid. In some embodiments, the process of FIG. 11H implements 11G06 of FIG. 11G. In the example shown, in 11H00, a DID document is retrieved from a distributed ledger based on a target DID in the proof response. In 11H02, it is determined whether a public key from a distributed ledger matches a DID (e.g., a decentralized identifier) in a location aware credential (e.g., the location aware credential of the proof response). In the event it is determined that a public key from a distributed ledger does not match a DID in the location aware credential, control passes to 11H14. In the event it is determined in 11H02 that that a public key from a distributed ledger matches a DID in the location aware credential, control passes to 11H04. In 11H04, it is determined whether the location aware credential is satisfactory to authenticate check in. For example, determining whether the location aware credential is satisfactory to authenticate check in comprises determining whether the location aware credential is on a list of location aware credentials certified for check in, determining whether the visitor associated with the location aware credential is scheduled to visit, determining whether the visitor associated with the location aware credential has an employee authorization to visit, etc. In the event it is determined that the location aware credential is not satisfactory to authenticate check in, control passes to 11H14. In the event it is determined in 11H04 that the location aware credential is satisfactory to authenticate check in, control passes to 11H06. In 11H06, it is determined whether the location aware credential is expired. In the event it is determined that the location aware credential is expired, control passes to 11H14. In the event it is determined in 11H06 that the location aware credential is not expired, control passes to 11H08. In 11H08, it is determined whether the location aware credential signature is valid. For example, the visitor network credential signature comprises a signature from the credential issuer (e.g., a DCIAMS) or from the credential holder (e.g., the authentication device). In the event it is determined that the location aware credential signature is not valid, control passes to 11H14. In the event it is determined in 11H08 that the location aware credential signature is valid, control passes to 11H10. In 11H10, it is determined whether the location aware credential is revoked. For example, determining whether the location aware credential is revoked comprises querying a revocation registry of a distributed ledger (e.g., a decentralized ledger, a permissioned ledger, a public ledger, a blockchain, etc.). In the event it is determined that the location aware credential is revoked, control passes to 11H14. In the event it is determined that the location aware credential is not revoked, control passes to 11H12. In 11H12, the process indicates that the proof response is valid, and the process ends. In 11H14, the process indicates that the proof response is not valid, and the process ends.

Figure 11I:
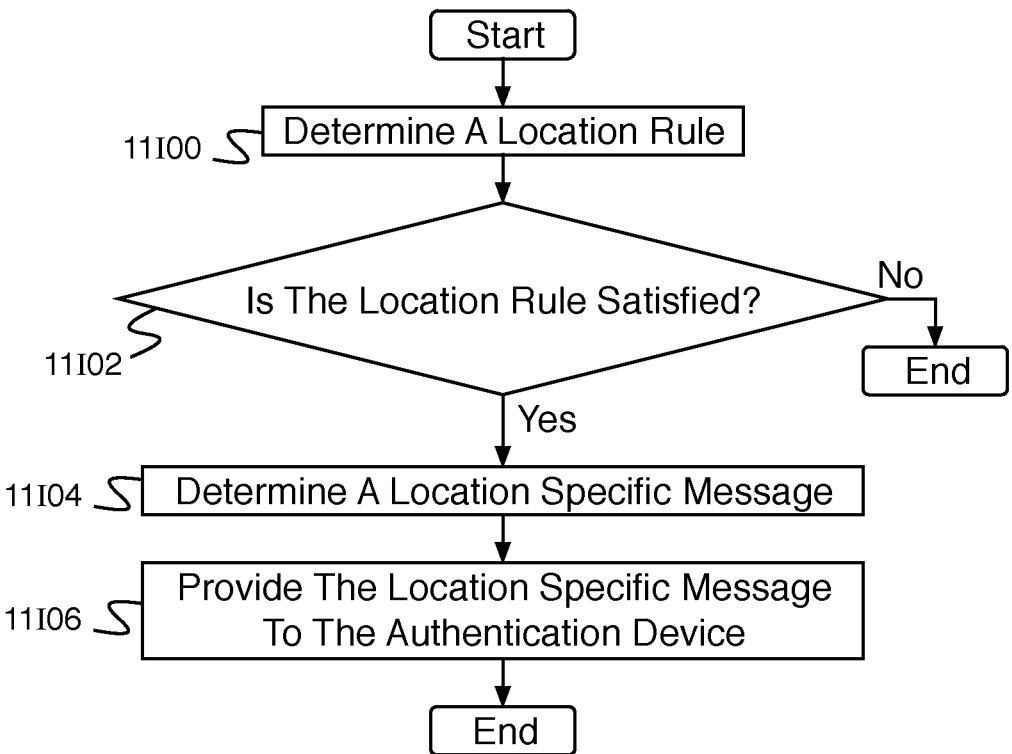
FIG. 11I is a flow diagram illustrating an embodiment of a process for providing a location specific message.

FIG. 11I is a flow diagram illustrating an embodiment of a process for providing a location specific message. In some embodiments, the process of FIG. 11I implements 11G10. In the example shown, in 11I00, a location rule is determined. For example, a location rule comprises a home location rule (e.g., is this location the user home location), a recent locations rule (e.g., what other locations has the user been to recently), an unusual location rule (e.g., is this an unusual location for the user), etc. In 11I02, it is determined whether the location rule is satisfied. In the event the location rule is not satisfied, the process ends. In the event the location rule is satisfied, a location specific message is determined. For example, a location specific message comprises emergency information, local point of contact information, local destination information, etc. In 11I06, the location specific message is provided to the authentication device.

A system for credential authentication comprises an interface configured to receive a create indication to create a location aware credential, wherein the credential specifies visit location data and receive a check in indication to check in from an authentication device, wherein the authentication device provides the check in indication to check in in response to determining that a detected location is within a geographic boundary designated in the visit location data of the location aware credential, and a processor configured to provide a proof request, receive a proof response, validate the proof response using a distributed ledger, and provide a success indication of successful check in. In some embodiments, the interface is further configured to receive a claim indication from the authentication device to claim the location aware credential. In some embodiments, the authentication device is configured to activate a location detection system upon claiming the location aware credential, wherein the detected location is measured by the location detection system of the authentication device and is monitored by the authentication device to determine when to provide the check in indication to check in. In some embodiments, the authentication device provides a check in indication only in response to holding a location aware credential that is not expired at a current time or for a current date. In some embodiments, the visit location data comprises a latitude and a longitude. In some embodiments, the location aware credential comprises a set of locations. In some embodiments, the detected location is detected using a global positioning system. In some embodiments, the geographic boundary comprises a distance from a location of the visitor location data specified by the location aware credential. In some embodiments, the geographic boundary comprises a user-defined geofence. In some embodiments, the authentication device provides the check in indication to check in after an accepted user prompt to check in. In some embodiments, the authentication device prompts a user to check in automatically in response to determining that the detected location is within the geographic boundary that is specified in the visit location data of the location aware credential that is being held by the authentication device. In some embodiments, the user prompt additionally comprises a host location to meet a host or a badge location to receive guest identification. In some embodiments, the success indication of successful check in is provided to a visitor tracking system or a visitor host. In some embodiments, the processor is additionally configured to provide a location specific message to the authentication system. In some embodiments, the location specific message comprises emergency information, local point of contact information, or local destination information. In some embodiment, the processor provides the location specific message in response to a determination that a location rule is satisfied. In some embodiments, the location rule comprises a home location rule, a recent locations rule, or a unusual location rule. In some embodiments, validating the proof response using the distributed ledger comprises determining that a credential associated with the proof response satisfies the proof request, determining that a proof response signature is valid, determining that a credential associated with the proof response is not expired, or determining that a credential associated with the proof response is not revoked by looking in the distributed ledger.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system for creating an identity mapping on a distributed ledger, comprising:
an interface configured to:
  receive a request to create an identity mapping on a distributed ledger, wherein
the distributed ledger comprises a blockchain; a hardware processor configured to:
  generate an identity key pair;
  generate a mobile encryption key;
  encrypt a private identity key of the identity key pair using the mobile encryption key to create an encrypted private key;
  store the encrypted private key;
  create a mapping document, wherein the mapping document maps a user identifier of a user to a public identity key of the identity key pair;
  sign the mapping document with the private identity key of the identity key pair;
  provide the signed mapping document, wherein the signed mapping document is added to the blockchain in response to a determination that the signed mapping document is valid;
  receive a proof request challenge comprising a request for one or more digital credentials; and in response to receiving the proof request challenge:
    determine a subset of stored digital credentials corresponding to the one or more digital credentials and that satisfy the proof request challenge;
    provide a user interface allowing the user to select from the subset of stored digital credentials;
    receive from the user a selection of a digital credential from the subset of stored digital credentials; and
    provide a proof response comprising a signed verifiable form of the selected digital credential of the subset of stored digital credentials, wherein the signed verifiable form of the selected digital credential is signed with the private identity key.

2. The system of claim 1, wherein the processor is further configured to install a digital identity application.

3. The system of claim 1, wherein the identity key pair comprises an identity key pair generated using an RSA algorithm or an ed25519 algorithm.

4. The system of claim 1, wherein the mobile encryption key is stored in a secure enclave.

5. The system of claim 1, wherein the mobile encryption key is access limited using a biometric.

6. The system of claim 1, wherein the encrypted private key is stored on a user device.

7. The system of claim 6, wherein the user device comprises a mobile device.

8. The system of claim 1, wherein the mapping document comprises a decentralized identifier.

9. The system of claim 1, wherein the mapping document conforms to a World Wide Web Consortium decentralized identifier document specification.

10. The system of claim 1, wherein the processor is further configured to receive an indication that the signed mapping document was validated.

11. The system of claim 1, wherein the signed mapping document is provided to a permissioned writer for the distributed ledger.

12. The system of claim 1, wherein the system further comprises a storage for storing a digital credential for proving a user qualification.

13. The system of claim 1, wherein the one or more digital credentials are determined according to rules.

14. The system of claim 13, wherein the rules are associated with a credential schema, a credential organization, a credential issuer, a credential location, a credential class identifier, a credential class name, an identification number associated with the credential, or a license associated with the credential.

15. The system of claim 13, wherein the rules are applied selectively.

16. The system of claim 15, wherein the rules are applied based at least in part on a user identifier.

17. A method for creating an identity mapping on a distributed ledger, comprising:
    receiving a request to create an identity mapping on a distributed ledger, wherein the distributed ledger comprises a blockchain;
    generating, using a processor, an identity key pair;
    generating a mobile encryption key;
    encrypting a private identity key of the identity key pair using the mobile encryption key to create an encrypted private key;
    storing the encrypted private key;
    creating a mapping document, wherein the mapping document maps a user identifier of a user to a public identity key of the identity key pair;
    signing the mapping document with the private identity key of the identity key pair;
    providing the signed mapping document, wherein the signed mapping document is added to the blockchain in response to a determination that the signed mapping document is valid;
    receiving a proof request challenge comprising a request for one or more digital credentials; and
    in response to receiving the proof request challenge:
        determining a subset of stored digital credentials corresponding to the one or more digital credentials and that satisfy the proof request challenge;
        providing a user interface allowing the user to select from the subset of stored digital credentials;
        receiving from the user a selection of a digital credential from the subset of stored digital credentials; and
        providing a proof response comprising a signed verifiable form of the selected digital credential of the subset of stored digital credentials, wherein the signed verifiable form of the selected digital credential is signed with the private identity key.

18. A computer program product for creating an identity mapping on a distributed ledger, the computer program product being embodied in a non-transitory computer readable storage medium and comprising computer instructions for:
    receiving a request to create an identity mapping on a distributed ledger, wherein the distributed ledger comprises a blockchain;
    generating an identity key pair;
    generating a mobile encryption key;
    encrypting a private identity key of the identity key pair using the mobile encryption key to create an encrypted private key;
    storing the encrypted private key;
    creating a mapping document, wherein the mapping document maps a user identifier of a user to a public identity key of the identity key pair;
    signing the mapping document with the private identity key of the identity key pair;
    providing the signed mapping document, wherein the signed mapping document is added to the blockchain in response to a determination that the signed mapping document is valid;
    receiving a proof request challenge comprising a request for one or more digital credentials; and
    in response to receiving the proof request challenge:
        determining a subset of stored digital credentials corresponding to the one or more digital credentials and that satisfy the proof request challenge;
        providing a user interface allowing the user to select from the subset of stored digital credentials;
        receiving from the user a selection of a digital credential from the subset of stored digital credentials; and
        providing a proof response comprising a signed verifiable form of the selected digital credential of the subset of stored digital credentials, wherein the signed verifiable form of the selected digital credential is signed with the private identity key.

* * * * *